US012700976B2

(12) United States Patent
Medin et al.

(10) Patent No.: US 12,700,976 B2
(45) Date of Patent: Aug. 4, 2026

(54) LOW DATA RATE SERVICE FOR A TERMINAL OF A SATELLITE COMMUNICATION SYSTEM

(71) Applicant: Logos Space Services Inc., Redwood City, CA (US)

(72) Inventors: Milo Steven Medin, Atherton, CA (US); Paul Kolodzy, Falls Church, VA (US); Ramakrishna Akella, San Diego, CA (US)

(73) Assignee: Logos Space Services Inc., Mountain View, CA (US)

( * ) Notice: Subject to any disclaimer, the term of this patent is extended or adjusted under 35 U.S.C. 154(b) by 0 days.

(21) Appl. No.: 19/181,179

(22) Filed: Apr. 16, 2025

(65) Prior Publication Data

US 2026/0019213 A1     Jan. 15, 2026

Related U.S. Application Data

(60) Provisional application No. 63/635,760, filed on Apr. 18, 2024.

(51) Int. Cl.
| | |
|---|---|
| *H04W 4/00* | (2018.01) |
| *H04L 5/00* | (2006.01) |
| *H04L 9/08* | (2006.01) |
| *H04W 72/0446* | (2023.01) |

(52) U.S. Cl.
CPC .............. *H04L 5/0055* (2013.01); *H04L 9/08* (2013.01); *H04W 72/0446* (2013.01)

(58) Field of Classification Search
CPC ... H04L 15/0055; H04L 9/08; H04W 72/0446

USPC .......................................................... 370/329
See application file for complete search history.

(56) References Cited

U.S. PATENT DOCUMENTS

| | | | |
|---|---|---|---|
| 6,142,423 A | 11/2000 | Wehner | |
| 6,222,828 B1 | 4/2001 | Ohlson | |
| 6,335,951 B1 | 1/2002 | Cangiani | |
| 7,260,026 B1 | 8/2007 | Wu | |
| 8,035,558 B2 * | 10/2011 | Cohen | G01S 19/05 |
| | | | 342/357.42 |
| 10,165,453 B1 | 12/2018 | Leiba | |

(Continued)

FOREIGN PATENT DOCUMENTS

| | | |
|---|---|---|
| CN | 106571863 | 4/2017 |
| CN | 107505832 | 11/2019 |

(Continued)

OTHER PUBLICATIONS

Hu et al., Method and device for obtaining navigation uplink pseudo-distance correction amount applied to ground station, English translation of CN116299603A, Published Jun. 23, 2023, 23 pages.

(Continued)

*Primary Examiner* — Marceau Milord
(74) *Attorney, Agent, or Firm* — Van Pelt, Yi & James LLP

(57) ABSTRACT

A satellite system includes a receiver, a transmitter, and a processor. The processor is configured to receive a LDR-PNT signal using the receiver of a terminal of the satellite system; provide a network entry request using the transmitter of the terminal of the satellite system; and receive acknowledgement of network entry for communication.

20 Claims, 63 Drawing Sheets

(56) References Cited

U.S. PATENT DOCUMENTS

| | | | | |
|---|---|---|---|---|
| 10,408,943 | B2 * | 9/2019 | Lennen | G01S 19/393 |
| 10,523,312 | B1 | 12/2019 | Tong | |
| 10,645,561 | B1 | 5/2020 | Guo | |
| 10,884,132 | B1 | 1/2021 | Judd | |
| 11,677,469 | B1 | 6/2023 | Matsumori | |
| 11,681,052 | B2 * | 6/2023 | Turpin | G01S 19/49 |
| | | | | 342/357.71 |
| 2005/0020275 | A1 | 1/2005 | Agrawala | |
| 2008/0246655 | A1 * | 10/2008 | Winkel | G01S 19/02 |
| | | | | 375/147 |
| 2009/0315764 | A1 * | 12/2009 | Cohen | G01S 19/23 |
| | | | | 342/357.64 |
| 2010/0091760 | A1 | 4/2010 | Yoon | |
| 2010/0283673 | A1 | 11/2010 | Farrokhi | |
| 2010/0309951 | A1 | 12/2010 | Dowla | |
| 2013/0051552 | A1 | 2/2013 | Handschuh | |
| 2014/0009340 | A1 | 1/2014 | Meador | |
| 2014/0185579 | A1 | 7/2014 | Popovski | |
| 2014/0247701 | A1 | 9/2014 | Honda | |
| 2016/0011318 | A1 | 1/2016 | Cohen | |
| 2016/0269116 | A1 | 9/2016 | Welle | |
| 2017/0366252 | A1 | 12/2017 | Caudill | |
| 2018/0034534 | A1 | 2/2018 | Jalali | |
| 2018/0041269 | A1 | 2/2018 | Buer | |
| 2018/0167134 | A1 | 6/2018 | Mo | |
| 2018/0224555 | A1 * | 8/2018 | Lennen | G01S 19/393 |
| 2019/0115971 | A1 | 4/2019 | Tani | |
| 2019/0250279 | A1 | 8/2019 | Fleizach | |
| 2019/0260628 | A1 | 8/2019 | Lin | |
| 2019/0342000 | A1 | 11/2019 | Zheng | |
| 2020/0025927 | A1 | 1/2020 | Reed | |
| 2020/0278452 | A1 | 9/2020 | Kennedy | |
| 2020/0314799 | A1 * | 10/2020 | Henry | H04W 4/80 |
| 2020/0326419 | A1 | 10/2020 | Parsche | |
| 2020/0337162 | A1 | 10/2020 | Perkins | |
| 2020/0374976 | A1 | 11/2020 | Dutta | |
| 2021/0048537 | A1 * | 2/2021 | Marmet | G01S 19/243 |
| 2021/0119697 | A1 | 4/2021 | Wang | |
| 2021/0208286 | A1 | 7/2021 | Turpin | |
| 2021/0209955 | A1 | 7/2021 | Fan | |
| 2021/0311202 | A1 * | 10/2021 | Reis | G01S 19/421 |
| 2021/0311203 | A1 | 10/2021 | Reis | |
| 2021/0396866 | A1 | 12/2021 | Giancristofaro | |
| 2022/0018971 | A1 | 1/2022 | Bennington | |
| 2022/0061004 | A1 * | 2/2022 | Wigard | H04W 36/0088 |
| 2022/0132349 | A1 | 4/2022 | Li | |
| 2022/0209850 | A1 | 6/2022 | Lee | |
| 2022/0291395 | A1 | 9/2022 | Iyengar | |
| 2022/0350032 | A1 | 11/2022 | Gick | |
| 2022/0352971 | A1 | 11/2022 | Liberg | |
| 2022/0369374 | A1 * | 11/2022 | Taherzadeh Boroujeni | H04W 48/10 |
| 2023/0003907 | A1 * | 1/2023 | Grayson | G01S 19/423 |
| 2023/0027380 | A1 | 1/2023 | Sutton-Shearer | |
| 2023/0051098 | A1 | 2/2023 | Kim | |
| 2023/0194727 | A1 | 6/2023 | Cobb | |
| 2023/0198610 | A1 | 6/2023 | Ma | |
| 2023/0198726 | A1 | 6/2023 | Jiang | |
| 2023/0204792 | A1 | 6/2023 | Lawrence | |
| 2023/0258824 | A1 | 8/2023 | Raghupathy | |
| 2023/0269780 | A1 | 8/2023 | Ravishankar | |
| 2023/0288552 | A1 | 9/2023 | Beale | |
| 2023/0388078 | A1 | 11/2023 | Jang | |
| 2024/0014893 | A1 | 1/2024 | Yao | |
| 2024/0241263 | A1 | 7/2024 | Luo | |
| 2024/0291522 | A1 | 8/2024 | Speidel | |
| 2024/0329256 | A1 * | 10/2024 | Kossin | G01S 19/47 |
| 2024/0333398 | A1 | 10/2024 | Bush | |
| 2024/0349164 | A1 | 10/2024 | Preston | |
| 2025/0008589 | A1 | 1/2025 | Song | |
| 2025/0112690 | A1 | 4/2025 | Beale | |
| 2025/0126536 | A1 | 4/2025 | Damnjanovic | |
| 2025/0164645 | A1 | 5/2025 | Peng | |
| 2025/0192824 | A1 | 6/2025 | Ramabadran | |
| 2025/0324319 | A1 | 10/2025 | Mariam | |

FOREIGN PATENT DOCUMENTS

| | | |
|---|---|---|
| CN | 112542997 | 3/2021 |
| CN | 116299603 | 6/2023 |

OTHER PUBLICATIONS

Alain Sultan, "5G System Overview", retrieved from <https://www.3gpp.org/technologies/5g-system-overview>, Aug. 8, 2022.

Alex Lim, "5G Non-Standalone to 5G Standalone—made real: New opportunities for Communications Service Providers", retrieved from <https://pupuweb.com/5g-non-standalone-new-opportunities-csp/>, Jul. 24, 2021.

Baktybekov et al., "Design of Software Defined Radio of Ground Station for Receiving Nano-Satellites Image Data in S-Band", https://doi.org/10.31489/2024No4/79-87, Eurasian Physical Technical Journal, 2024, 21, 4(50)—published online Dec. 25, 2024.

Chen et al., "Fast and Efficient Phase-Only Beam Nulling for NGSO Satellite Communication Systems", IEEE Wireless Communications Letters, vol. 13, No. 12, Dec. 2024.

Guo et al., "Optimal design of the long-term LEO almanac by considering the atmosphere drag effects", Geo-Spatial Information Science, DOI: https://doi.org/10.1080/10095020.2024.2416902, Nov. 12, 2024.

Khader et al., "Time Synchronization Over a Free-Space Optical Communication Channel," 2018 IEEE International Frequency Control Symposium (IFCS), Olympic Valley, CA, USA, 2018, pp. 1-3, doi: 10.1109/FCS.2018.8597493. May 2018.

Motziegemba et al., "Optical Inter Satellite Links for Broadband Networks", 2019 9th International Conference on Recent Advances in Space Technologies (RAST), Jun. 2019.

Newbury et al., "Frequency Comb Based Optical Time Transfer", Decadal Survey on Biological and Physical Sciences Research in Space 2023-2032, Dec. 23, 2021.

Pany et al., "GNSS Software-Defined Radio: History, Current Developments, and Standardization Efforts", Navigation, 71(1). https://doi.org/10.33012/navi.628, Journal of the Institute of Navigation, Mar. 2024.

Prokhorenko et al., "Null Forming with Multichannel Receiving SDRs", 2023 Radiation and Scattering of Electromagnetic Waves RSEMW, Jun. 26-30, 2023.

Selvan et al., "Precise orbit determination of LEO satellites: a systematic review", GPS Solutions (2023) 27:178—Published online <https://doi.org/10.1007/s10291-023-01520-7> on Aug. 1, 2023.

Sikri et al., "Multi-Beam Phased Array with Full Digital Beamforming for SATCOM and 5G", Microwave Journal, Mar. 2019.

Wang et al., "URE and URA for predicted LEO satellite orbits at different altitudes", Advances in Space Research 70 (2022) 2412-2423, Available online Aug. 20, 2022.

Hai-Feng Kang, A circuit system based on PC104 stack, English Translation of CN-112542997-A, Published Mar. 23, 2021, 11 pages.

Joseph T. Mayhan, Area Coverage Adaptive Nulling from Geosynchronous Satellites: Phased Arrays Versus Multiple-Beam Antennas, IEEE Transactions on Antennas and Propagation, vol. AP-34, No. 3, Mar. 1986, pp. 410-419.

Kai-Bor Yu, Adaptive Beamforming for Satellite Communication with Selective Earth Coverage and Jammer Nulling Capability, IEEE Transactions on Signal Processing, vol. 44, No. 12, Dec. 1996, pp. 3162-3166.

Prol et al., Position, Navigation, and Timing (PNT) Through Low Earth Orbit (LEO) Satellites: A Survey on Current Status, Challenges, and Opportunities, IEEE Access vol. 10, Aug. 15, 2022, pp. 83971-84002.

* cited by examiner

500

550                                                552

800

804

802

806

CONSTELLATION:

1300

Establish Initial Contact with Receiver Using Wide Beam Antenna

1302

Determine Narrow Beam Antenna Setup Based on Data from Initial Contact

1304

Determine Direction of Interfering Beam

1306

Generate Spatial Null in Direction of Interfering Beam

1308

Provide Position Coordinates and Time Information Using Narrow Beam Antenna Setup 1500 — Perform a Scan of Received Signals 1502 — Compute Beams with Maximal Signal Strength 1504 — Test Null in Direction of Strongest Untested Beam 1506 — Did Null Improve PNT Signal?

1508 — Maintain Null in Direction of Beam

1510 — Track PNT Signal-carrying Beam

1512 — More Beams to Test?

2400

2402

2404

2406

2408

2410

RF Wave
Segment
(N Waves)

Chip
(M RF Wave
Segments)

Symbol
(L Chips)

User
Bits
(K bits/
Symbol)

Frame
(J bits)

Block
(I Frames)

2600

2602

Block

Frame (1000 bits)

12 User Groups

Satellite Motion Model (partial)
Satellite Almanac (partial)
CryptoKey Updates (partial)

LOW DATA RATE SERVICE FOR A TERMINAL OF A SATELLITE COMMUNICATION SYSTEM

CROSS REFERENCE TO OTHER APPLICATIONS

This application claims priority to U.S. Provisional Patent Application No. 63/635,760 entitled SATELLITE COMMUNICATION SYSTEM filed Apr. 18, 2024 which is incorporated herein by reference for all purposes.

BACKGROUND OF THE INVENTION

A number of current low earth orbit (LEO), medium earth orbit (MEO) systems, and geosynchronous earth orbit (GEO) systems operate in a co-channel diplex configuration. The frequency for uplink (earth to space communications) is often the same for these systems and the frequency for downlink (space to earth communications) is also often the same for these systems. This presents a problem in that LEO, MEO, and GEO system transmissions can interfere with each other's system receivers. A significant effort is made to avoid the earth to satellite communications for the LEO and MEO systems from interfering with the earth to satellite communications for the GEO systems. For example, to avoid in-line events (e.g., when the LEO or MEO satellite is along the same line of bearing as the GEO satellite from a terminal), the solution is to dynamically select a different satellite that is not in-line (e.g., a line of sight for receiving a signal that is closer to the horizon and not as overhead in the sky as a GEO satellite is). Similarly, the LEO or MEO terminal systems avoid transmitting to a LEO or MEO satellite by dynamically pointing the beam in a direction avoiding a GEO-arc in order to limit the amount of aggregated transmitted power that could be received by the GEO satellite. In addition, a consideration is made for the aggregated effect of multiple earth-to-satellite transmitters and satellite-to-earth transmitters which produce this aggregated effect at GEO satellites and ground stations. These efforts need to be determined using a dynamically constrained optimization calculation and compensated for since the locations of the LEO and MEO satellites are constantly changing.

In addition to the above communications interference issue for satellite systems, Global Navigation Satellite Systems (GNSS) such as Global Positioning System (GPS), Globalnaya Navigazionnaya Sputnikovaya Sistema (GLONASS), Galileo, and BeiDou suffer from additional problems that arise from allowing low-to-the-horizon signals— deliberate jamming or spoofing of their position-navigation-timing (PNT) signals. PNT signals are broadcast in standard frequency bands within the 1-2 GHz range and rely on narrow bandwidths (approximately 10 MHz), low broadcast angles (i.e., near parallel to the horizon), and static waveform parameters. These characteristics allow for PNT signals to be used by a broad set of receivers. However, current GNSS systems have significant drawbacks. Narrow bandwidths limit the resolution to which a receiver system can determine its location. Also, given the static waveform parameters, current PNT signals are also relatively easy to spoof, jam, or otherwise intercept. Low broadcast angles are one cause of this problem as transmitters located near the horizon may interfere with PNT signals. Further, GNSS satellites rely on regular updates from ground stations to mitigate errors requiring an extensive and expensive system to support these updates that include ionospheric calibration and atmospheric scintillation effects, as well as updates on satellite locations and times.

BRIEF DESCRIPTION OF THE DRAWINGS

Various embodiments of the invention are disclosed in the following detailed description and the accompanying drawings.

DETAILED DESCRIPTION

Figure 1:
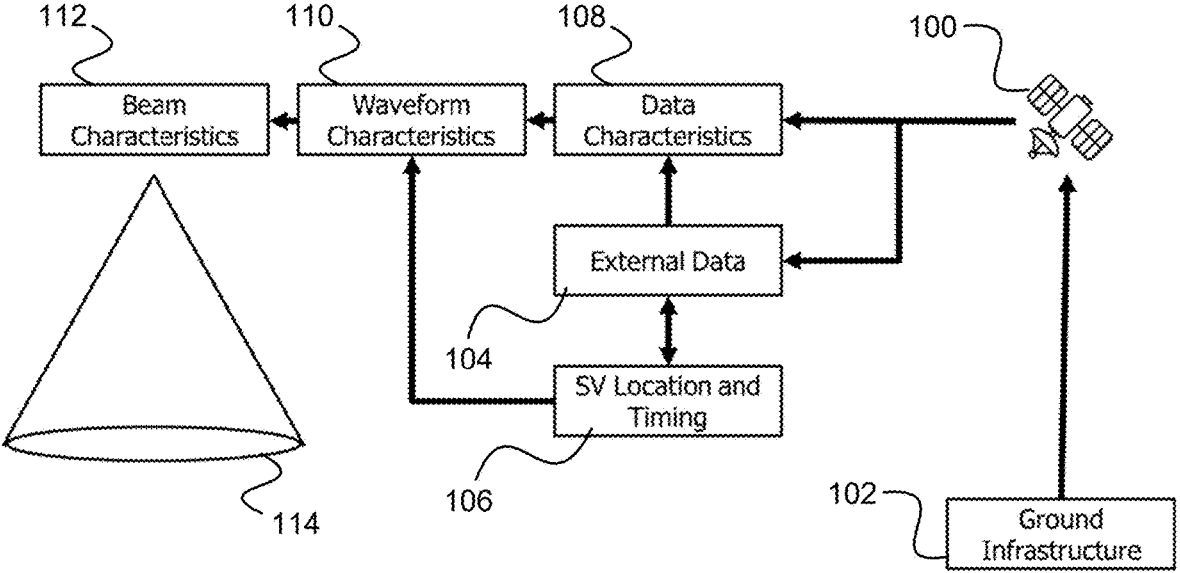
FIG. 1 is a diagram illustrating an embodiment of a satellite communication system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A number of current low earth orbit (LEO) systems, medium earth orbit (MEO), and geosynchronous earth orbit (GEO) systems operate in a co-channel diplex configuration. The frequency for uplink (e.g., earth-to-space communications) is the same for these systems and the frequency for downlink (e.g., space-to-earth communications) is also the same for these systems. This presents a problem in that LEO system, MEO system, and GEO system transmissions can interfere with each other's receivers. A significant effort is made to avoid the earth-to-satellite communications for the LEO and MEO systems from interfering with the earth-to-space communications for the GEO systems. For example, to avoid in-line events (e.g., when the LEO or MEO satellite is along the same line as the GEO satellite from a terminal), the solution is to dynamically select a different satellite that is not in-line. Similarly, the LEO or MEO terminal systems avoid transmitting to a LEO or MEO satellite by dynamically avoiding a GEO-arc in order to limit the amount of transmitted power that could be received by the GEO satellite. In addition, a consideration is made for the aggregated effect of multiple earth-to-satellite transmitters and satellite-to-earth transmitters which produce this aggregated affect at GEO satellites and ground stations. These efforts need to be determined using a dynamically constrained optimization calculation and compensated for since the locations of the LEO and MEO satellites are constantly changing.

In addition to the above communications interference issue for satellite systems, Global Navigation Satellite Systems (GNSS) such as Global Positioning System (GPS), Globalnaya Navigazionnaya Sputnikovaya Sistema (GLO-NASS), Galileo, and BeiDou suffer from additional problems that arise from allowing low-to-the-horizon signals-deliberate jamming or spoofing of their position-navigation-timing (PNT) signals. PNT signals are broadcast in standard frequency bands within the 1-2 GHz range and rely on narrow bandwidths (approximately 10 MHZ), low broadcast angles (i.e., near parallel to the horizon), and static waveform parameters. These characteristics allow for PNT signals to be used by a broad set of receivers. However, current GNSS systems have significant drawbacks. Narrow bandwidths limit the resolution to which a receiver system can determine its location. Also, given the static waveform parameters, current PNT signals are also relatively easy to spoof, jam, or otherwise intercept. Low broadcast angles are one cause of this problem as transmitters located near the horizon may interfere with PNT signals. Further, GNSS satellites rely on regular updates from ground stations to mitigate errors requiring an extensive and expensive system to support these updates that include ionospheric calibration and atmospheric scintillation effects, as well as updates on satellite locations and times.

A satellite communication system is disclosed. The satellite communication system comprises a first frequency reference generator of a satellite or aircraft, a communication receiving channel, a second frequency reference generator of the satellite or aircraft, and a communication transmission channel. The first frequency reference generator generates a first frequency reference signal in a first frequency band. The communication receiving channel is for receiving a first signal at the satellite or aircraft using the first frequency reference signal. The second frequency reference generator generates a second frequency reference signal in a second frequency band. The communication transmission channel is for transmitting a second signal from the satellite or aircraft using the second frequency reference signal, wherein a legacy satellite system comprises a legacy communication receiving channel for receiving data at the legacy satellite using the second frequency band. In some embodiments, the first signal or the second signal comprise a direct spread or a frequency hopped signal.

In some embodiments, the communication transmission channel transmits position-navigation-timing (PNT) data. In some such embodiments, the communication transmission channel also transmits ranging accuracy of the PNT data. In an example, the PNT data allows a ground terminal to determine its position to within a ten-meter radius, and a notification of the ten-meter radius is transmitted alongside the PNT data. In some embodiments, ranging accuracy of the PNT data is greater than or equal to ranging accuracy of Global Positioning System (GPS) data. In some embodiments, ranging accuracy is selectable (e.g., based on a user group associated with the ground terminal).

In some embodiments, frequencies of the communication transmission channel are greater than transmission frequencies of a GPS signal. In some such embodiments, the frequencies of the communication transmission channel are at least 25 GHz.

In some embodiments, the satellite communication system uses the frequency band 25.5-27.0 GHz for satellite to earth communications.

In some embodiments, the satellite communication system uses the frequency band 37.5-42.5 GHz for satellite to earth communications.

In some embodiments, chip rates of the second signal (e.g., a direct spread or a frequency hopped signal) are at least 100 MHz. In some such embodiments, the chip rates of the second signal (e.g., a direct spread or a frequency hopped signal) are selectable up to 1 GHz. In some embodiments, processing gain of the second signal (e.g., a direct spread or frequency hopped signal) is greater than processing gain of a GPS signal.

In some embodiments, the communication transmission channel is one of a set of transmission channels. In some embodiments, a channel of the set of transmission channels is associated with a user group. For example, a first channel is available to all users, while a second channel is available only to a subset of users. In another example, channels are associated with a spreading code (e.g., N user teams corresponding to N different spreading codes—for example, 2, 3, 4, 5, 6, 7, 8, 9, or any other appropriate number of different spreading codes) and carry signals including multiple encrypted data payloads. In some embodiments, a user group is associated with a combination of a spreading code and an encrypted key (e.g., there are M encrypted keys being associated with one of the multiple encrypted data payloads—for example, N user teams and M encryption keys for N×M different user groups, where M is 2, 3, 4, 5, 6, 7, 8, 8, 9, or any other appropriate number of spreading codes). In some embodiments, a channel of the set of transmission channels is encrypted. In various such embodiments, the channel is encrypted via data encryption standard (DES), advanced encryption standard (AES), shared key authentication (SKA), or any other appropriate encryption method(s). In some embodiments, a channel of the set of transmission channels is associated with a spreading factor. In some such embodiments, the spreading factor is between 30 dB and 60 dB. In some embodiments, a first channel of the set of transmission channels transmits PNT data with a first ranging accuracy and a second channel of the set of transmission channels transmits PNT data with a second ranging accuracy, wherein the first ranging accuracy is greater than the second ranging accuracy. In an example, a channel available to all users transmits PNT data with a lower ranging accuracy than a channel available only to a particular user group.

In some embodiments, the satellite or the aircraft is at most 1000 km above a ground plane. In some embodiments, the transmission angle of the communication transmission channel is not less than a minimum number of degrees (e.g., is greater than a minimum number of degrees—for example, 45, 36, or any other appropriate number of degrees) with respect to a ground plane.

A satellite system is disclosed. The satellite system is configured to communicate between its ground terminal stations and satellites using frequencies that do not interfere with legacy satellite systems. This is achieved by reversing one or more of the frequencies used to send from earth-to-space and space-to-earth—for example, the satellite system uses the legacy system frequency for receiving signals from earth to instead transmit signals to earth (e.g., ground terminals and/or aircraft terminals). In various embodiments, the satellite system uses the legacy system frequency for receiving signals from earth to instead transmit signals to earth, the satellite system uses the legacy system frequency for transmitting signals from space to earth to instead receive signals from earth, or the satellite system reverses both the legacy system frequencies for receiving at and transmitting from the satellite to use the opposite frequencies from the legacy satellite to communicate with ground stations.

In some embodiments, the satellite system operates at frequencies that enable high data speed communications between a ground terminal and the satellite that can be passed between satellites of a constellation and then back down to a different ground terminal. The frequencies that enable this high data speed communication can also be used to provide signals that enable position, navigation, and time determinations, where this satellite system is designed to avoid some problems associated with the existing position, navigation, and time systems (e.g., GPS, GLONASS, Galileo, and BeiDou). First, the system is able to avoid being as easy to jam or interfere with by limiting incoming signals to a ground terminal to being more overhead so that ground or near ground signals will not be an issue. Also, the higher frequencies enable higher ranging accuracy compared to current position, navigation, and time systems and also enable the use of signal spreading to increase the system's ability to extract useful signal from a noisy background environment. Last, the higher frequencies enable higher data rates and larger payloads of data compared to current position, navigation, and time systems allowing for multiple selectable channels to be transmitted from satellites. This allows for different groups to receive different accuracies of signals, and for groups to receive signals that are spatially selective (e.g., in one geography enabled, but in another geography not enabled).

In various embodiments, the system is configurable to enable selectability of different waveforms, encryptions, and/or data formats so that the system's communication protocols can be changed/improved over time. For example, the combinations of wave modulations, the encryption types and/or keys, the data frames, error correction coding, and/or interleaving can be each be chosen to create a large variety of different signaling protocols.

A ground terminal is disclosed. The ground terminal comprises a frequency reference generator and a communication receiving channel. The frequency reference generator generates a frequency reference signal in a frequency band. The communication receiving channel is for receiving a direct spread or frequency hopped signal from a satellite or an aircraft using the frequency reference signal, wherein a legacy satellite system comprises a legacy communication receiving channel for receiving data at the legacy satellite using the frequency band.

In some embodiments, the ground communication system includes an other frequency reference generator, and a communication transmission channel. The other frequency reference generator generates an other frequency reference signal in an other frequency band. The communication transmission channel is for transmitting a signal (e.g., a direct spread or frequency hopped signal) to a satellite or aircraft using the other frequency reference signal.

In some embodiments, the communication receiving channel is configured to receive position-navigation-timing (PNT) data. In some such embodiments, the communication receiving channel is configured to receive ranging accuracy of the PNT data. In an example, the PNT data allows for the ground terminal to determine its position to within a ten-meter radius, and the ground terminal is notified of the ten-meter radius accuracy. In some embodiments, ranging accuracy of the PNT data is greater than or equal to ranging accuracy of Global Positioning System (GPS) data. In some embodiments, ranging accuracy is selectable (e.g., based on a user group associated with the ground terminal).

In an example, a signal includes a frame spanning 100 ms. In some embodiments, the frame includes at least three datagrams spanning up to 400 bits. A datagram of the at least three datagrams is associated with a user group. In some such embodiments, the user group is associated with a distinct cryptographic key. In various embodiments, the datagram includes a time reference update, an ephemeris update for one or more satellites (e.g., a subset of satellites within field of view of a receiver system), propagation corrections, an accuracy estimate, satellite motion model parameters, a satellite almanac, cryptographic key updates, data structure formatting, or any other appropriate data. In some embodiments, the at least three datagrams are separately modified (e.g., accuracy is modified or in some cases impaired differently within each datagram of the at least three datagrams).

In some embodiments, frequencies of the communication receiving channel are greater than frequencies of a GPS signal. In some such embodiments, the frequencies of the communication receiving channel are at least 25 GHZ.

In some embodiments, the ground terminal uses the frequency band 25.5-27.0 GHz for satellite to earth communications.

In some embodiments, the ground terminal uses the frequency band 37.5-42.5 GHz for satellite to earth communications.

In some embodiments, chip rates of the direct spread signal are at least 100 MHz. In some such embodiments, the chip rates of the direct spread signal are selectable up to 1 GHz. In some embodiments, a processing gain of the direct spread signal is at least the processing gain of a GPS signal.

In some embodiments, the communication receiving channel is one of a set of receiving channels. In some such embodiments, a channel of the set of receiving channels is associated with a user group. For example, a first channel is available to all users, while a second channel is available only to a subset of users. In some embodiments, a channel of the set of receiving channels is encrypted. In various embodiments, the channel is encrypted via data encryption standard (DES), advanced encryption standard (AES), shared key authentication (SKA), or any other appropriate encryption method. In some embodiments, a channel of the set of receiving channels is associated with a spreading factor. In some such embodiments, the spreading factor is between 30 dB and 60 dB. In some embodiments, a first channel of the set of receiving channels receives PNT data with a first ranging accuracy and a second channel of the set of receiving channels receives PNT data with a second ranging accuracy, wherein the first ranging accuracy is greater than the second ranging accuracy. For example, a channel available to all users receives PNT data with a lower ranging accuracy than a channel available only to a particular user group.

In some embodiments, the satellite or the aircraft is at most 1000 km above a ground plane. In some embodiments, the receiving angle of the communication receiving channel is not less than a minimum number of degrees (e.g., is greater than a minimum number of degrees—for example, 45, 36, or any other appropriate number of degrees) with respect to a ground plane.

A ground terminal is disclosed. The ground terminal is configured to communicate with satellites or aircraft using frequencies that do not interfere with legacy satellite systems. This is achieved by reversing one or more of the frequencies used to send from earth-to-space and space-to-earth—for example, the satellite system uses the legacy system frequency for receiving signals from earth to instead transmit signals to earth. In various embodiments, the ground terminal uses the legacy system frequency for receiving signals from space to instead transmit signals to space, the ground terminal uses the legacy system frequency for transmitting signals from earth to space to instead receive signals from space, or the communication system reverses both the legacy system frequencies for receiving from and transmitting to a satellite to use the opposite frequencies from the legacy system to communicate with satellites.

In some embodiments, the ground terminal operates at frequencies that enable high data speed communications between the ground terminal and the satellite that can be passed between satellites of a constellation and then back down to a different ground terminal. The frequencies that enable high data speed communications can also be used to provide signals that enable position, navigation, and time determinations, where this communication system is designed to avoid some problems associated with the existing position, navigation, and time systems (e.g., GPS, GLO-NASS, Galileo, and BeiDou). First, the ground terminal is able to avoid being as easy to jam or interfere with by limiting incoming signals to being more overhead so that ground or near ground signals will not be an issue. In some embodiments, both reduction of antenna gain in the horizontal plane and reduction of susceptibility to natural terrain features that block higher frequencies improve the ground terminal's performance. Also, the higher frequencies enable higher ranging accuracy compared to current position, navigation, and time systems and also enable the use of signal spreading to increase the ground terminal's ability to extract useful signal from a noisy background environment. Last, the higher frequencies enable higher data rates and larger payloads of data compared to current position, navigation, and time systems allowing for multiple selectable channels to be transmitted from satellites. This allows for different groups of ground terminals to receive different accuracies of PNT signals, and for groups to receive signals that are spatially selective (e.g., in one geographical area enabled, but in another geographical area not enabled).

In various embodiments, the communication system is configurable to enable selectability of different waveforms, encryptions, and/or data formats so that the system's communication protocols can be changed/improved over time.

For example, the combinations of wave modulations, the encryption types and/or keys, the data frames, error correction coding, and/or interleaving can be each be chosen to create a large variety of different signaling protocols.

In some embodiments, a terminal or receiver is located in an aircraft or airplane and this terminal or receiver communicates with one or more satellites to receive PNT information.

In some embodiments, the system improves delivery of PNT information by using higher frequency carriers compared to existing PNT systems (e.g., higher than 1 GHz of current PNT systems, higher than 10 GHz, higher than 20 GHz, etc.) enabling communications that have improved noise immunity by using coding techniques (e.g., using selectable long spreading codes or frequency hopping codes) and by using the higher ranging accuracy of these signals to avoid using lower in the sky angles than existing PNT systems (e.g., avoiding potential interference from ground based jammers or spoofers). In addition, higher frequency carriers also offer more data capacity for the system enabling multiple groups, multiple accuracy, multiple location area, and multiple time period selectivity to delivered PNT services. In some embodiments, programmability of communication characteristics enable flexibility for signaling and selectability of functionality for different groups, different location areas, different time periods, and different accuracy and mixing and matching these selectable functions for any give group of users. In some embodiments, the system further improves PNT services by having antennas that are able to provide dynamic patterns for the sensitivity or transmission of signals enabling pointing of reception, nulling of reception, pointing of transmission, and nulling of transmission to one or more targeted transmitters and/or one or more targeted receivers that the system is communicating between.

In various embodiments, the system improves satellite communications and/or PNT services through the use of one or more of the following: 1) spectrum use that does not interfere with existing spectrum use (e.g., using reverse frequencies, when appropriate, of existing satellite systems), 2) dynamic antenna pointing (e.g., use of antenna arrays for pointing of antennas both on receiver and transmitters), 3) use of dynamic antenna nulling (e.g., use of antenna arrays for suppression of unwanted signals or preventing interference by preventing sending in a particular direction), 4) programmable channels (e.g., enabling selectable teams and/or groups based on time and/or location with a variety of programmable waveform characteristics, data characteristics, and encryption), 5) precision constellation location and timing synchronization (e.g., by having intersatellite timing and location determinations that frequently update—for example, every L seconds, N minutes, M hours, etc. and sourcing from the ground less frequently and/or from fewer locations than current PNT systems), and 6) flexible low and high data rate services (e.g., enabling reliable and adaptable communication services with programmable channels and selectable user groups and teams for these services. In some embodiments, one or more processors of a satellite and/or terminal/receiver are used to control/provide instructions to program channel, antenna, communication mode (e.g., LDR, HDR, etc.), and/or waveform characteristics as well as synchronizing and determining location calibrations.

FIG. 1 is a diagram illustrating an embodiment of a satellite communication system. In some embodiments, the satellite communication system of FIG. 1 comprises a PNT system. In the example shown, satellite 100 is in communication with ground infrastructure 102 and is configured to broadcast signal 114 via an antenna. In various embodiments, signal 114 carries PNT data (e.g., satellite coordinates, time information, PNT accuracy, etc.), comms data (e.g., to establish a handshake with a receiver system), satellite data (e.g., model data, ephemeris data, almanac data, etc. for satellite 100 and/or other satellites), encryption data (e.g., a portion of a cryptographic key), or any other appropriate data. In the example shown, signal 114 carries PNT data. Signal 114 and its data conform to beam characteristics 112, waveform characteristics 110, and data characteristics 108. In various embodiments, beam characteristics 112 include effective isotropic radiated power (EIRP), beam direction, beam shape, or any other appropriate characteristic. In various embodiments, waveform characteristics 110 include frequency, power, bandwidth, chip rate, modulation, or any other appropriate characteristic. In various embodiments, data characteristics 108 include ephemeris, timing, encryption, accuracy, or any other appropriate characteristic.

In various embodiments, beam characteristics 112, waveform characteristics 110, and data characteristics 108 are determined internally (e.g., by a processor on satellite 100), are determined externally (e.g., sent to satellite 100 by ground infrastructure 102), are based on external data 104, are based on space vehicle (SV) location and timing 106, or are based on any combination thereof. In an example, ground infrastructure 102 transmits ephemeris data to satellite 100, which is included in data characteristics 108, while waveform characteristics 110 are based on SV location and timing 106, which is determined using information (e.g., from a reference clock) internally available to satellite system 100.

In some embodiments, waveform characteristics 110 are based on one or more frequency reference generators (not shown) on satellite 100. For example, in the embodiment shown, satellite 100 includes a first frequency reference generator and a second frequency reference generator. Satellite 100 generates a first frequency reference signal in a first frequency band using the first frequency reference generator and receives one or more signals using the first frequency reference signal (i.e., receives signals in the first frequency band). Satellite 100 generates a second frequency reference signal in a second frequency band using the second frequency reference generator and transmits one or more direct spread or frequency hopped signals (e.g., signal 114) using the second frequency reference signal. In an example, satellite 100 receives initial communications (e.g., from a receiver system (not shown), from ground infrastructure 102, etc.) in the first frequency band. In response, signal 114 is transmitted according to waveform characteristics 110, which include signal 114 being in the second frequency band.

In some embodiments, the first frequency band and/or the second frequency band are utilized by a legacy communication system. For example, satellite 100 uses the legacy system frequency for receiving signals from earth to instead transmit signals to earth. In various embodiments, satellite 100 uses the legacy system frequency for receiving signals from earth to instead transmit signals to earth, satellite 100 uses the legacy system frequency for transmitting signals from space to earth to instead receive signals from earth, or satellite 100 reverses both the legacy system frequencies for receiving at and transmitting from the satellite to use the opposite frequencies from the legacy satellite to communicate with ground stations.

In some embodiments, satellite 100 establishes initial contact with a terrestrial system (e.g., a PNT receiver, ground terminal, an aircraft receiver, etc., not shown) using a wide beam antenna setup. For example, a wide beam antenna setup for the antenna causes signal 114 to approximate a cone with at most a maximum number of degree aperture (e.g., a maximum of 90 degrees, 80 degrees, 72 degrees, etc.) pointed directly toward the surface of the earth (e.g., via beam characteristics 112). In some embodiments, based at least in part on data from the initial contact (e.g., data sent by the terrestrial system as part of a handshake reply or interference data such as weather, obstruction, or other data relating to interference from an external system), satellite 100 determines a narrow beam antenna setup. For example, a narrow beam antenna setup modifies beam characteristics 112 such that signal 114 approximates a cone with at most a 40-degree aperture pointed directly toward the terrestrial system. In some embodiments, satellite 100 configures data characteristics 108 such that satellite 100 uses the narrow beam antenna setup to provide PNT data to the terrestrial system.

In some embodiments, the system initially broadcasts from a satellite a low data rate (LDR) signal that is received at a terminal. The system uses the information in the LDR signal to establish better communication between the satellite and the terminal (e.g., by using location information to better point a receiving antenna of the terminal, to change transmission signals to increase security or data rate, to change encryption or modulation, etc.). In some embodiments, the system changes to different LDR signaling. In some embodiments, the system changes to high data rate (HDR) signaling.

Figure 2:
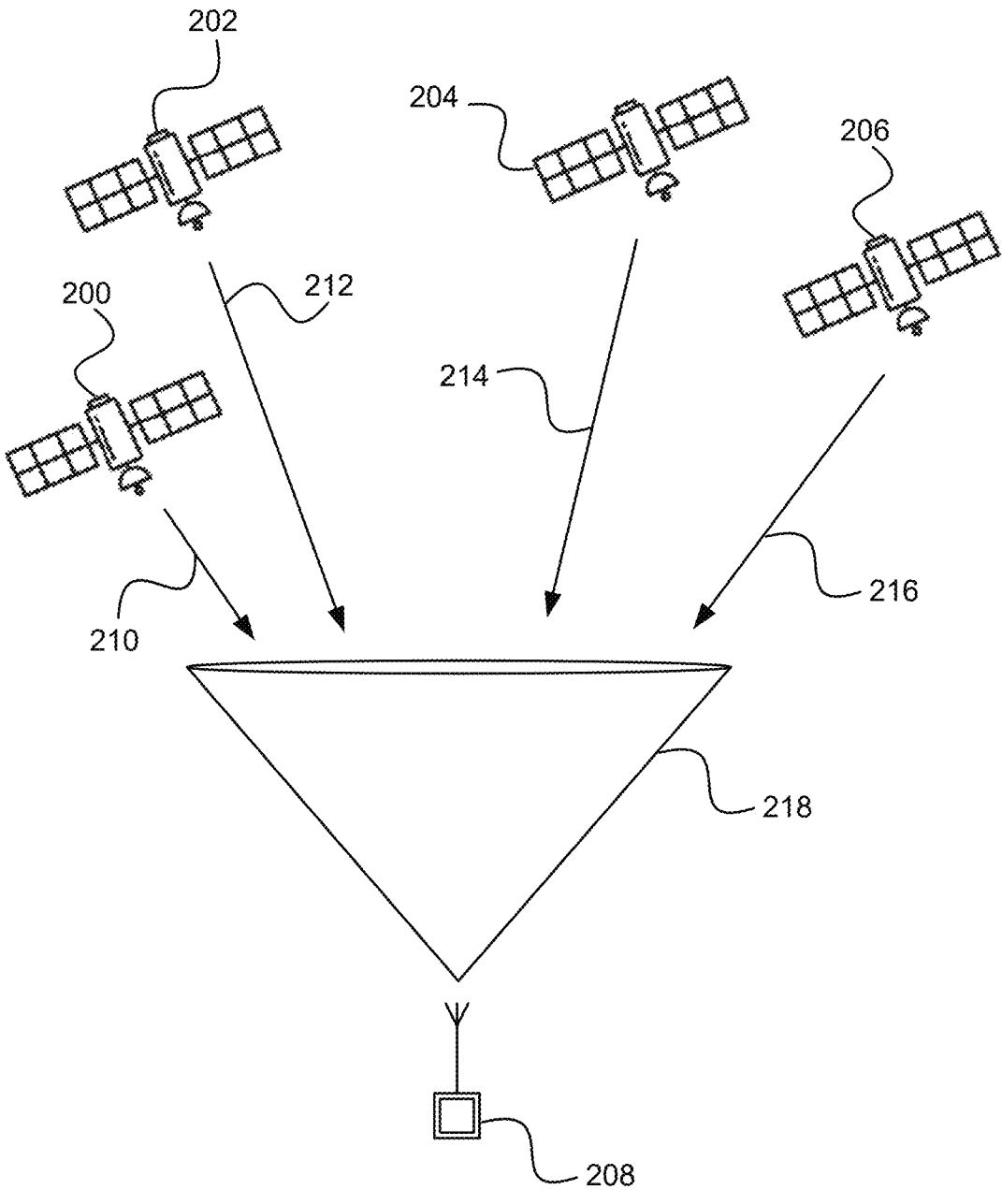
FIG. 2 is a diagram illustrating an embodiment of a satellite PNT system.

FIG. 2 is a diagram illustrating an embodiment of a satellite PNT system. In various embodiments, satellite 200, satellite 202, satellite 204, and/or satellite 206 comprise satellite 100 of FIG. 1. In the example shown, satellite 200, satellite 202, satellite 204, and satellite 206 are configured to transmit signal 210, signal 212, signal 214, and signal 216, respectively, to receiver 208 (e.g., in a manner analogous to satellite 100 of FIG. 1). In various embodiments, signal 210, signal 212, signal 214, and signal 216 carry PNT data (e.g., satellite coordinates, time information, PNT accuracy, etc.), comms data (e.g., to establish communication with receiver 208), satellite data (e.g., satellite motion model data, ephemeris data, almanac data, etc.), encryption data (e.g., a portion of a cryptographic key), or any other appropriate data. In the example shown, receiver 208 is configured to determine position coordinates and time information based on PNT data from satellite 200, satellite 202, satellite 204, and satellite 206 (e.g., carried by signal 210, signal 212, signal 214, and signal 216).

In some embodiments, receiver 208 uses one or more frequency reference generators (not shown). For example, in the embodiment shown, receiver 208 includes a frequency reference generator and generates a frequency reference signal in a frequency band using the frequency reference generator. Receiver 208 receives one or more signals using the frequency reference signal (i.e., receives direct spread or frequency hopped signals in the frequency band). For example, signal 210, signal 212, signal 214, and signal 216 are received in the frequency band. In some embodiments, receiver 208 generates an other frequency reference signal in an other frequency band using an other frequency reference generator and transmits one or more signals using the other frequency reference signal. For example, receiver 208 transmits an initial communication (e.g., to satellite 200) in the other frequency band.

In some embodiments, one or more frequency bands used by receiver 208 are also utilized by a legacy communication system. For example, receiver 208 uses the legacy communication system frequency for transmitting signals to space to instead receive signals from space. In various embodiments, receiver 208 uses the legacy system frequency for receiving signals from space to instead transmit signals to space, receiver 208 uses the legacy system frequency for transmitting signals to space to instead receive signals from space, or receiver 208 reverses both the legacy system frequencies for receiving from and transmitting to the satellite to use the opposite frequencies from the legacy communication system to communicate with satellites.

In some embodiments, receiver 208 establishes initial contact with one or more satellites (e.g., satellite 200) using wide beam antenna setup 218. In the example shown, wide beam antenna setup 218 approximates a cone with a N-degree aperture (e.g., any appropriate aperture—for example, a 90-degree aperture, a 80-degree aperture, a 72-degree aperture, etc.) pointed directly upward. In some embodiments, based at least in part on satellite data from the initial contact (e.g., data sent by satellite 200 in the initial contact), receiver 208 determines a plurality of narrow beam antenna setups. In some embodiments, four narrow beam antenna setups are determined. In some embodiments, the narrow beam antenna setups approximate cones with at most M-degree apertures (e.g., a narrower aperture than an initial aperture—for example, 40 degrees, 30 degrees, 25 degrees, 10 degrees, 4 degrees, etc.) pointed directly toward satellite 200, satellite 202, satellite 204, and satellite 206. In some embodiments, multiple narrow beam antenna setups may correspond to one satellite. For example, satellite 200 moves across the sky into positions comparable to satellite 202, satellite 204, and satellite 206, and the plurality of narrow beam antenna setups are used to communicate with satellite 200 as it moves.

The plurality of narrow beam antenna setups allow receiver 208 to receive PNT data. In the example shown, PNT data is transmitted by signal 210, signal 212, signal 214, and signal 216. Receiver 208 is configured to determine position coordinates and time information from the PNT data received from the plurality of narrow beam antenna setups. For example, based on the PNT data received from signal 210, signal 212, signal 214, and signal 216, receiver 208 determines relative distances from satellite 200, satellite 202, satellite 204, and satellite 206, respectively, and using the relative distances, determines the position coordinates and time information. Receiver 208 is configured to provide the position coordinates and time information (e.g., to a user via a user interface (not shown) on receiver 208).

Figure 3A:
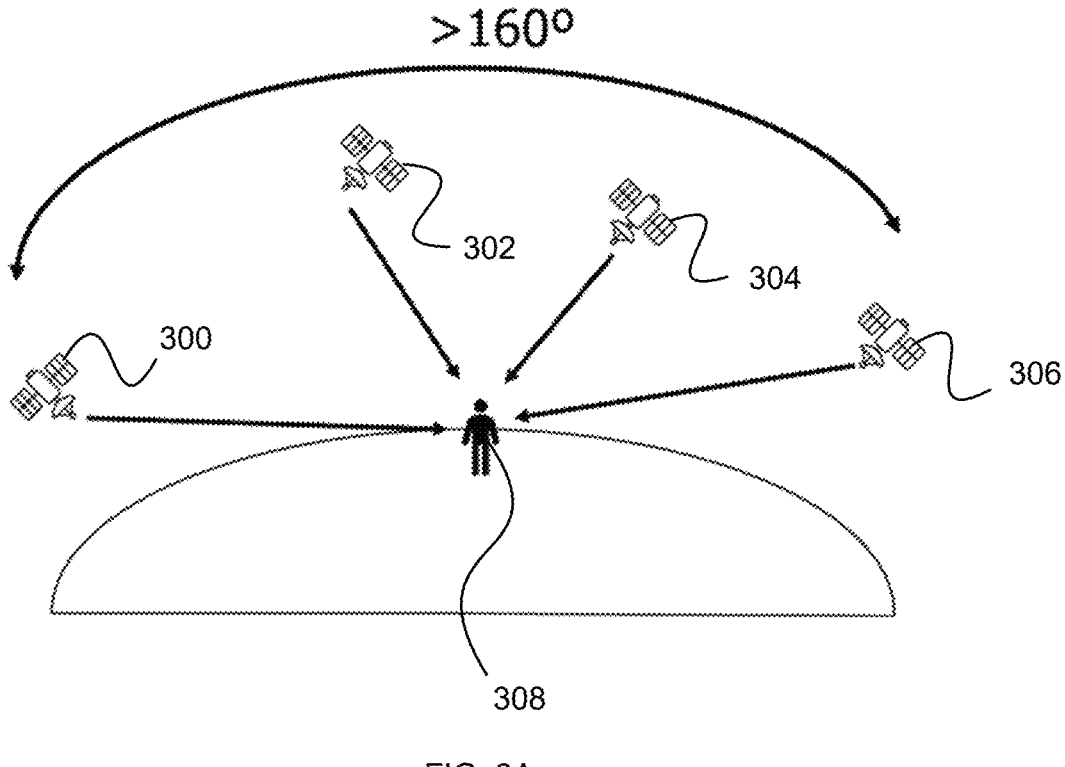
FIGS. 3A and 3B are diagrams illustrating embodiments of a satellite PNT system.
Figure 3B:
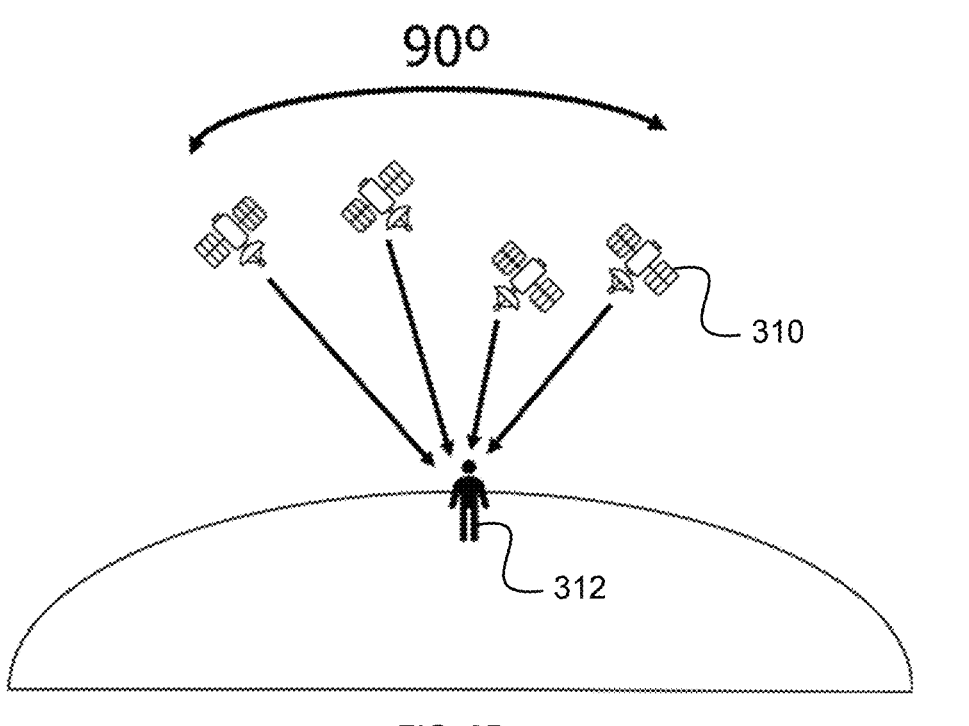

FIGS. 3A and 3B are diagrams illustrating embodiments of a satellite PNT system. In various embodiments, satellites 300, 302, 304, and/or 306 of FIG. 3A and/or satellites 310 of FIG. 3B comprise satellite 100 of FIG. 1. In the example shown, satellites 300, 302, 304, and 306 of FIG. 3A are spread apart at a 160-degree or greater angle across the sky (i.e., are in communication with user 308 at low elevation angles with respect to the horizon). Satellites 310 of FIG. 3B (only one of which is labeled) are spread apart at a 90-degree angle across the sky (i.e., are in communication with user 312 at elevation angles of 45 degrees or greater with respect to the horizon).

In some embodiments, signals from satellite 300, satellite 302, satellite 304, and satellite 306 use standard frequency bands within the 1-2 GHz range. The low elevation angle of communication allows user 308 to determine their position and time using signals in these frequency bands. However, these frequencies limit the accuracy of PNT data and the low elevation angles make signals from satellite 300, 302, 304, and 308 easy to jam, spoof, or otherwise interfere with.

In some embodiments, signals from satellites 310 use frequency bands above the 1-2 GHz range. In some such embodiments, the frequencies of the communication receiving channel are at least 25 GHz. In various embodiments, satellites 310 utilize the 25.5-27.0 GHZ frequency band, the 37.5-42.5 GHz frequency band, or another appropriate frequency band. The high frequencies allow for PNT data to be transmitted from satellites 310 at a higher accuracy than the standard 1-2 GHz range. In some embodiments, utilizing the high frequencies, user 312 is able to determine their position and time to an accuracy comparable to or greater than user 308. Additionally, the high elevation angles of satellites 310 make communications with satellites 310 more difficult to jam, spoof, or otherwise interfere with.

Figure 3C:
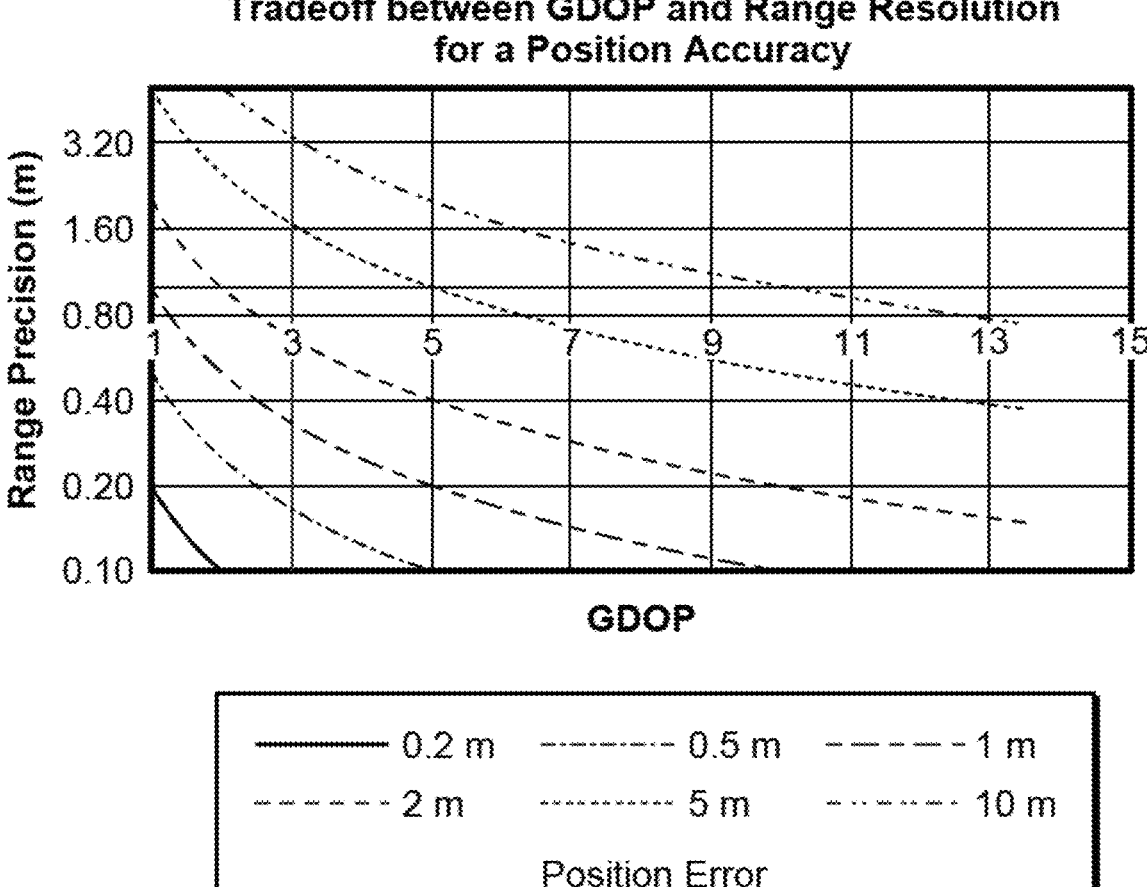
FIG. 3C is a graph depicting range resolution and geometric dilution of precision (GDOP).

FIG. 3C is a graph depicting range resolution and geometric dilution of precision (GDOP). In some embodiments, the graph of FIG. 3C helps understanding of the tradeoffs associated with changing from the signal geometry of FIG. 3A to FIG. 3B. In the example shown, graph 320 includes axes corresponding to range precision of a PNT signal and GDOP. Graph 320 also includes curves corresponding to various position errors along the axes. The range precision is limited by the frequency of the PNT signal. Thus, using a higher frequency signal results in more precise (i.e., lower on the vertical axis) determination of position. As the signal is received more directly overhead, angular spacing between satellites decreases and GDOP increases. Thus, determining position using signals received more directly overhead requires the signals' frequencies to increase as well. For example, in graph 320, two meters of position error may be achieved using signals very near the horizon with range precision nearing two meters, or it may be achieved using signals farther overhead (e.g., angled 45 degrees or greater above the horizon, where GDOP is at least 10) with range precision of 0.2 meters. In other words, the advantages of high elevation angles, as described in the context of FIGS. 3A-3B, may be achieved using signals of greater range precision, and by extension, may be achieved using signals of higher frequency than standard frequency bands.

Figure 4A:
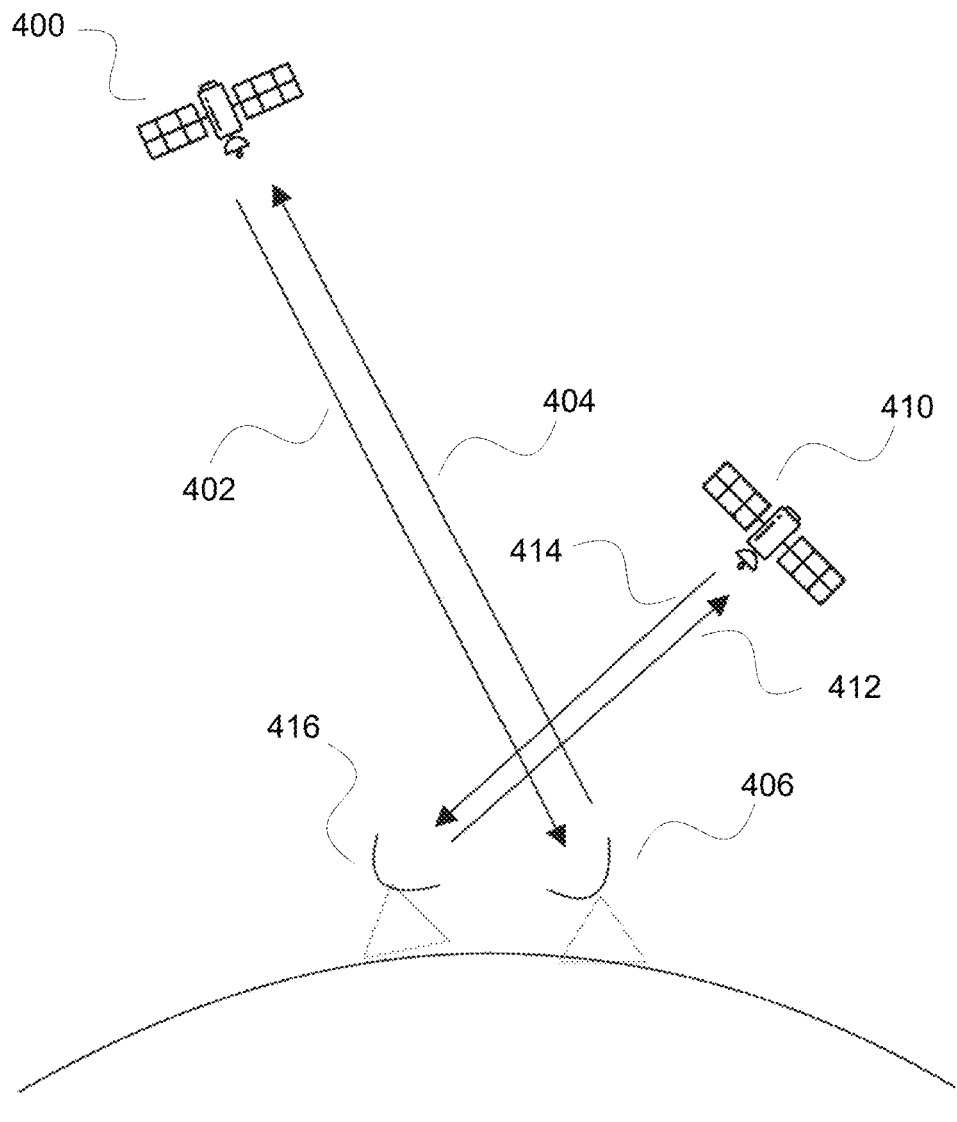
FIG. 4A is a diagram illustrating an embodiment of a satellite communication system.

FIG. 4A is a diagram illustrating an embodiment of a satellite communication system. In some embodiments, satellite 410 comprises satellite 100 of FIG. 1. In the example shown, satellite system 400 (e.g., a geostationary earth orbit (GEO) satellite system) communicates with a terminal 406 on a space to earth frequency 402 (F1) and an earth to space frequency 404 (F2). Satellite 410 (e.g., a low earth orbit (LEO) satellite system) uses a reverse of the earth to space frequency 412 (F1) and space to earth frequency 414 (F2) selection compared to satellite system 400 (e.g., the GEO satellite system). Satellite 410 (e.g., a LEO satellite system) communicates with Terminal 416 on a space to earth frequency 414 (F2) and earth to space frequency 412 (F1). Though examples are given in the context of a GEO system and a LEO system, various embodiments including other combinations of satellite systems (e.g., MEO/GEO, MEO/LEO, or any other appropriate combination) function in a manner analogous to the satellite systems shown. The system uses the spectrum in a normal and reverse diplex configuration (e.g., reversing the space-to-earth and/or the earth-to-space directions relative to the legacy system) while co-existing and not interfering with the legacy system.

In other words, satellite system 400 (e.g., the GEO satellite system) is transmitting to the earth using space to earth frequency 402 (F1) and is receiving radio signals from terminal 406 (e.g., a customer user terminal) on earth to space frequency 404 (F2). Terminal 406 (e.g., a GEO user terminal) receives signals from satellite system 400 on space to earth frequency 402 (F1) and transmits to satellite system 400 on earth to space frequency 404 (F2).

While several LEO satellites (e.g., like satellite 410) are likely in the view of terminal 416, consider one satellite (e.g., satellite 410) with terminal 416 assigned to communicate with at a specific time. Satellite 410 (e.g., a LEO satellite) transmits a signal using a directional antenna pointed at terminal 416 using space to earth frequency 414 (F2). Terminal 416 (e.g., the LEO user terminal) transmits up to satellite 410 (e.g., the LEO satellite) on earth to space frequency 412 (F1), the frequency (e.g., space to earth frequency 402) used by satellite system 400 (e.g., the legacy geo satellite) to transmit to the earth on. Satellite 410 has a directional antenna that receives frequency F1 (e.g., earth to space frequency 412) only from the earth, and not from above the satellite.

Satellite system 400 (e.g., the GEO satellite system) is transmitting to the earth using frequency F1 (e.g., space to earth frequency 402) and is listening for communications from terminal 406 (e.g., a customer user terminal) on frequency F2 (e.g., earth to space frequency 404). Because satellite system 400 is transmitting on F1, satellite system 400 cannot effectively receive a signal on frequency F1. Radio signals sent in the direction of satellite system 400 will not interfere with signals received at frequency F2. Terminal 406 (e.g., the GEO user terminal) receives signals from satellite system 400 (e.g., the GEO satellite system) on frequency F1 and transmits to satellite system 400 on frequency F2. Because terminal 406 transmits on frequency F2, terminal 406 cannot effectively receive a signal on frequency F2.

Interference with the legacy satellite systems (e.g., the GEO satellites systems) is avoided by having the newer satellite systems (e.g., the LEO satellite systems) reverse the space to earth and/or earth to space frequencies being used by the legacy satellite system (e.g., the GEO satellite systems) and avoid the interference that can occur when both the legacy and newer satellite systems (e.g., the LEO and GEO satellite systems) operate in the same diplexing configuration.

In some embodiments, satellite 410 (e.g., the newer LEO satellite system) transmits a highly directional signal to terminal 416 using space to earth frequency 414 (F2). Because this signal is pointed down to the earth and not above where satellite system 400 (e.g., the legacy GEO satellite system) orbits, no radio signal at frequency F2 is emitted in the direction of satellite system 400. Likewise terminal 406 does not receive on frequency F2 because it is transmitting on frequency F2, and no interference to terminal 406 occurs.

In some embodiments, terminal 416 (e.g., the newer LEO user terminal) transmits up to satellite 410 (e.g., the newer LEO satellite system) on frequency F1, and although this signal propagates up to higher orbits where satellite system 400 is located, satellite system 400 is not receiving on frequency F1, and therefore terminal 416 (e.g., the newer LEO user terminal) does not interfere with satellite system 400.

This spectrum configuration for LEO and GEO satellite systems allows the frequencies F1 and F2 to be used by both satellite systems without mutual interference.

In some embodiments, a LEO satellite system must receive regulatory authorization to operate. If the LEO operator wishes to reuse the same spectrum being used by a GEO satellite system, the LEO system design would need to reverse the frequencies used for earth to space and space to earth operation.

In some embodiments, the reversed frequency operation (reversed diplexing) would need to be submitted as part of the request for regulatory approval and be designed into the satellite's communications systems.

In some embodiments, the above elements are necessary if both the geostationary and low earth orbit systems are both bidirectional communications systems. In some embodiments in which one system is unidirectional (broadcast only or receive only), fewer elements are needed.

In some embodiments, terminal 406 and terminal 416 would not normally interfere with each other if this diplexing approach is used. However, if terminal 406 and terminal 416 are located very close together and near metal or other material that reflects radio signals, then the reflected energy from one of the terminals transmissions could be received by the other terminal. An example of this might be two terminals located very close to each other on a ship's deck, with masts nearby that could reflect some of the transmitted radio signals back into the antenna of the other terminal.

One way of improving the system operation in this example (beyond introducing additional separation distance between the terminals or prohibiting the use of LEO terminals in close proximity to GEO terminals) would be to coordinate frequency use between the systems so that the exact same frequencies would not be used by both terminals. For example, instead of transmitting on frequency F1, terminal 416 could operate higher or lower in the same band of frequencies for earth to space communications to satellite 410, perhaps 100 to 200 MHz away. This could result in fewer frequencies being used by terminal 416 in the earth to space direction resulting in lower performance but may be an acceptable alternative to prohibiting nearby operation.

Any LEO system operator or designer seeking spectrum to operate could utilize the disclosed to reuse the same spectrum in use by a geostationary satellite system, without aperture restrictions.

Spectrum is a finite resource and by using the disclosed, the same GEO satellite system spectrum can be reused for new LEO systems.

In some embodiments, the disclosed is useful in other scenarios where there is similar spatial separation between systems where Frequency Division Duplexing (FDD) is being used.

In some embodiments, in the case where directional antennas can keep radio frequency energy being radiated above or below a communications node, such as at different altitudes, the disclosed is useful in resolving interference between satellite and non-satellite systems, or even where both systems are non-satellite systems.

Also, the disclosed can be used in other configurations of satellite or other communication systems that can operate in the same spectrum but are spatially separated. This could be airborne systems (e.g., an airplane, an aircraft, a balloon, a blimp, etc.), or other satellite configurations such as geostationary systems spectrum being reused by medium earth orbit (MEO) systems with greater aperture flexibility than in use today.

In some embodiments, the interference between the system and the legacy system is avoided by exploiting properties of antennas. A high level of spatial diversity is achieved by use of large antennas, which are able to produce pencil beams that can be precisely scheduled, controlled, and used with or without co-ordination in both transmitting and receiving directions without interference to legacy systems.

In addition, with the reversed system frequencies, the system can communicate in both space to earth and earth to space directions with much smaller scan angles relative to broadside communications and in no instance crossing 45 degrees of scan in either direction. This profile for signal scanning avoids clutter and occlusion problems.

In some embodiments, the earth to satellite communication frequency and the satellite to earth communication frequency are 20 GHz and above (e.g., Ka band or higher).

In some embodiments, the earth to satellite communication frequency and the satellite to earth communication frequency are 10 GHz and above (e.g., Ku band or higher).

In some embodiments, the satellite to earth spectrum comprises 27-30 GHz, 40-42 GHz, and 47-52 GHz for data signals, whereas the legacy GEO system uses 17-20 GHz, 20-24 GHZ, and 37.5-42.5 GHz spectrum, respectively, for satellite to earth transmissions. In some embodiments, the earth to satellite spectrum comprises 17-20 GHz, 20-24 GHz, and 37.5-42.5 GHz for data signals, whereas the legacy GEO system uses a 27-30 GHz, 40-42 GHZ, and 47-52 GHz spectrum, respectively, for satellite to earth transmissions.

Figure 4B:
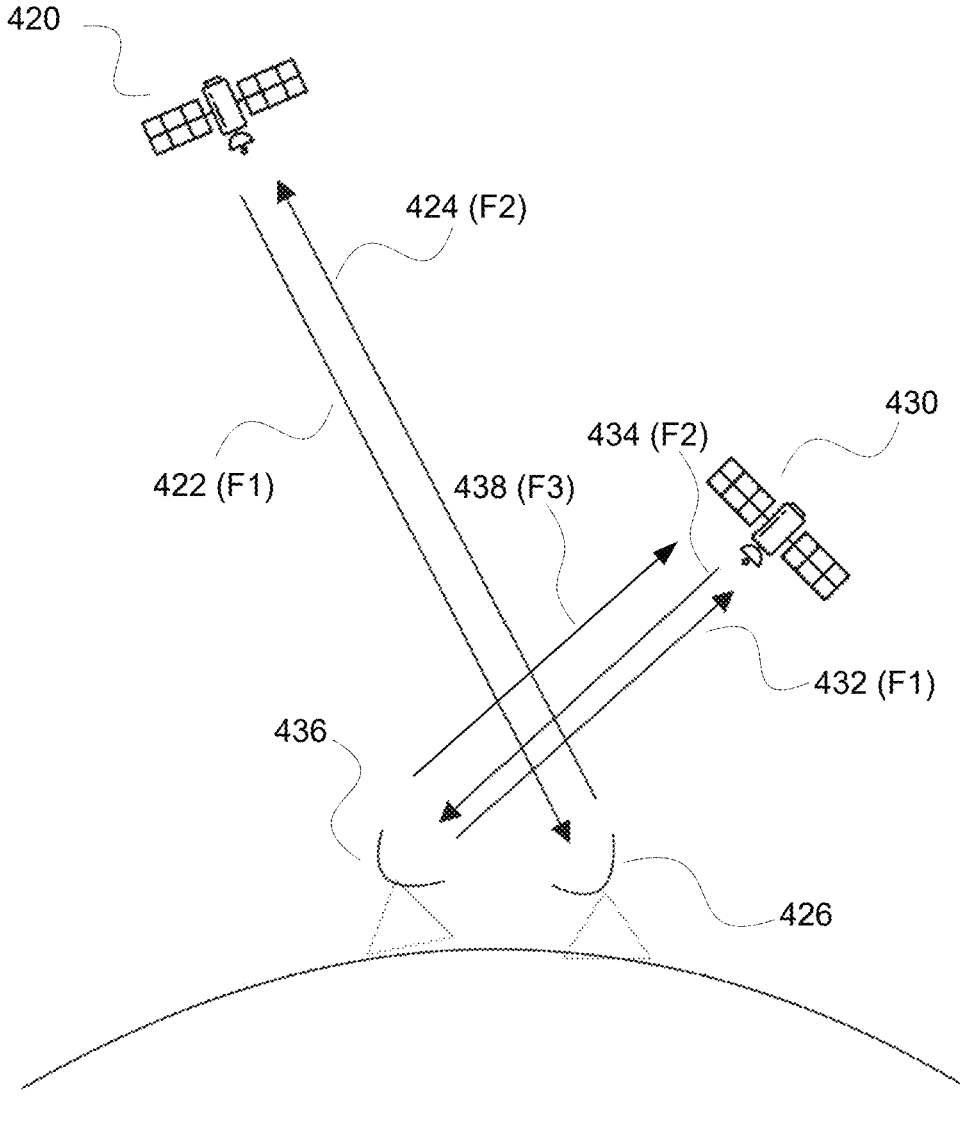
FIG. 4B is a diagram illustrating an embodiment of a satellite communication system.

FIG. 4B is a diagram illustrating an embodiment of a satellite communication system. In some embodiments, satellite 460 comprises satellite 100 of FIG. 1. In the example shown, satellite system 420 (e.g., a GEO satellite system) communicates with a terminal 426 on a space to earth frequency 422 and an earth to space frequency 424. Satellite system 430 (e.g., a LEO satellite system) uses a reverse of the earth to space and space to earth frequency selection compared to satellite system 420 (e.g., the GEO satellite system). Satellite system 430 (e.g., a LEO satellite system) communicates with Terminal 436 on an earth to space frequency 432 of F1 and space to earth frequency 434 of F2. In addition, satellite system 430 (e.g., the LEO satellite system) receives communication signal(s) from Terminal 436 using frequency 438 either F1 or F3. In some embodiments, F3 is not in the same band as either F1 or F2. In some embodiments, F3 is in the same band as F1 but angular techniques are used to avoid sending signals toward a GEO satellite.

In the example shown, satellite system 420 (e.g., a geostationary earth orbit (GEO) satellite system) communicates with a terminal 426 on a space to earth frequency 422 (F1) and an earth to space frequency 424 (F2). Satellite system 430 (e.g., a low earth orbit (LEO) satellite system) uses a reverse of the earth to space frequency 432 (F1) and space to earth frequency 434 (F2) selection compared to satellite system 420 (e.g., the GEO satellite system, where the legacy system uses frequency 422 (F1) in the space to earth direction and frequency 424 (F2) in the earth to space direction). Satellite system 430 (e.g., a LEO satellite system) communicates with Terminal 436 on a space to earth frequency 434 (F2) and earth to space frequency 432 (F1).

In other words, satellite system 420 (e.g., the GEO satellite system) is transmitting to the earth using space to earth frequency 422 (F1) and is receiving radio signals from terminal 426 (e.g., a customer user terminal) on earth to space frequency 424 (F2). Terminal 426 (e.g., a GEO user terminal) receives signals from satellite system 420 on space to earth frequency 422 (F1) and transmits to satellite system 420 on earth to space frequency 424 (F2).

While several LEO satellites (e.g., like satellite system 430) are likely in the view of terminal 436, consider one satellite (e.g., satellite system 430) with terminal 436 assigned to communicate with at a specific time. Satellite system 430 (e.g., a LEO satellite) transmits a signal using a directional antenna pointed at terminal 436 using space to earth frequency 434 (F2). Terminal 436 (e.g., the LEO user terminal) transmits up to satellite system 430 (e.g., the LEO satellite) on earth to space frequency 432 (F1), the frequency (e.g., space to earth frequency 422) used by satellite system 420 (e.g., the legacy GEO satellite) to transmit to the earth on. Satellite system 430 has a directional antenna that receives frequency F1 (e.g., earth to space frequency 432) only from the earth, and not from above the satellite.

Satellite system 420 (e.g., the GEO satellite system) is transmitting to the earth using frequency F1 (e.g., space to earth frequency 422) and is listening for communications from terminal 426 (e.g., a customer user terminal) on frequency F2 (e.g., earth to space frequency 424). Because satellite system 420 is transmitting on F1, satellite system 420 cannot effectively receive a signal on frequency F1. Radio signals sent in the direction of satellite system 420 will not interfere with signals received at frequency F2. Terminal 426 (e.g., the GEO user terminal) receives signals from satellite system 420 (e.g., the GEO satellite system) on frequency F1 and transmits to satellite system 420 on frequency F2. Because terminal 426 transmits on frequency F2, terminal 426 cannot effectively receive a signal on frequency F2.

Interference with the legacy satellite systems (e.g., the GEO satellites systems) is avoided by having the newer satellite systems (e.g., the LEO satellite systems) reverse the space to earth and earth to space frequencies being used by the legacy satellite system (e.g., the GEO satellite systems) and avoid the interference that can occur when both the legacy and newer satellite systems (e.g., the LEO and GEO satellite systems) operate in the same diplexing configuration. Though examples are given in the context of a GEO system and a LEO system, various embodiments including other combinations of satellite systems (e.g., MEO/GEO, MEO/LEO, or any other appropriate combination) function in a manner analogous to the satellite systems shown.

In some embodiments, satellite system 430 (e.g., the newer LEO satellite system) transmits a highly directional signal to terminal 436 using space to earth frequency 434 (F2). Because this signal is pointed down to the earth and not above where satellite system 420 (e.g., the legacy GEO satellite system) orbits, no radio signal at frequency F2 is emitted in the direction of satellite system 420. Likewise terminal 426 does not receive on frequency F2 because it is transmitting on frequency F2, no interference to terminal 426 occurs.

In some embodiments, terminal 436 (e.g., the newer LEO user terminal) transmits up to satellite system 430 (e.g., the newer LEO satellite system) on frequency F1, and although this signal propagates up to higher orbits where satellite system 420 is located, satellite system 420 is not receiving on frequency F1, and therefore terminal 436 (e.g., the newer LEO user terminal) does not interfere with satellite system 420.

This spectrum configuration for LEO and GEO satellite systems allows the frequencies F1 and F2 to be used by both satellite systems without mutual interference.

In some embodiments, a LEO satellite system must receive regulatory authorization to operate. If the LEO operator wishes to reuse the same spectrum being used by a GEO satellite system, the LEO system design would need to reverse the frequencies used for earth to space and space to earth operation.

In some embodiments, the reversed frequency operation (reversed diplexing) would need to be submitted as part of the request for regulatory approval and be designed into the satellite's communications systems.

In some embodiments, the above elements are necessary if both the geostationary and low earth orbit systems are both bidirectional communications systems. In some embodiments in which one system is unidirectional (broadcast only or receive only), fewer elements are needed.

In some embodiments, terminal 426 and terminal 436 would not normally interfere with each other if this diplexing approach is used. However, if terminal 426 and terminal 436 are located very close together and near lots of metal that reflects radio signals, then the reflected energy from one of the terminals transmissions could be received by the other terminal. An example of this might be two terminals located very close to each other on a ship's deck, with masts nearby that could reflect some of the transmitted radio signals back into the antenna of the other terminal.

One way of improving the system operation in this case (beyond introducing additional separation distance between the terminals or prohibiting the use of LEO terminals in close proximity to GEO terminals) would be to coordinate frequency use between the systems so that the exact same frequencies would not be used by both terminals. For example, instead of transmitting on frequency F1, terminal 436 could operate higher or lower in the same band of frequencies for earth to space communications to satellite system 430, perhaps 100 to 300 MHz away. This could result in fewer frequencies being used by terminal 436 in the earth to space direction resulting in lower performance but may be an acceptable alternative to prohibiting nearby operation.

Any low earth orbit (LEO) system operator or designer seeking spectrum to operate could utilize the disclosed to reuse the same spectrum in use by a geostationary satellite system, without aperture restrictions.

Spectrum is a finite resource and by using the disclosed, the same GEO satellite system spectrum can be reused for new LEO systems.

In some embodiments, the disclosed is useful in other scenarios where there is similar spatial separation between systems where bidirectional Frequency Division Duplexing (FDD) is being used.

In some embodiments, in the case where directional antennas keeps radio frequency energy being radiated above or below a communications node, such as at different altitudes, the disclosed is useful in resolving interference between satellite and non-satellite systems, or even where both systems are non-satellite systems.

Also, in various embodiments, the disclosed is used in other configurations of satellite or other communication systems that operate in the same spectrum but are spatially separated. In various embodiments, this is an airborne system (e.g., an airplane, an aircraft, a balloon, a blimp, etc.), or other satellite configuration such as geostationary systems spectrum being reused by medium earth orbit (MEO) systems with greater aperture flexibility than in use today.

Figure 4C:
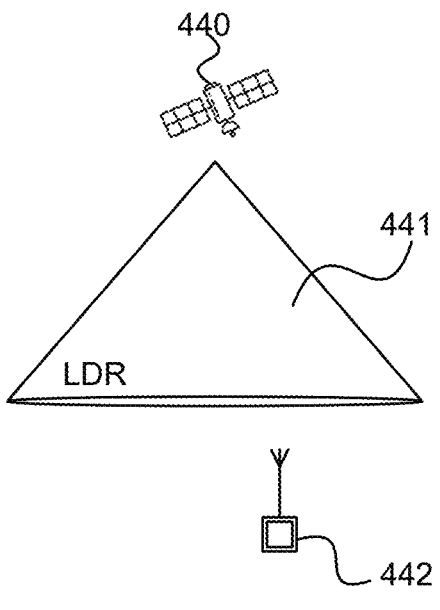
FIG. 4C is a diagram illustrating an embodiment of a satellite communication system.

FIG. 4C is a diagram illustrating an embodiment of a satellite communication system. In some embodiments, satellite 440 comprises satellite 100 of FIG. 1 or satellite 410 of FIG. 4A. In some embodiments, terminal 442 comprises terminal 416 of FIG. 4A. In the example shown, satellite 440 broadcasts wide beam 441 LDR communication using a first waveform and a first data characteristic and terminal 442 receives information regarding LDR communication configurations (e.g., satellite locations, etc.). In some embodiments, satellite 440 broadcasts using frequency F2 (e.g., F2 of FIG. 4A).

Figure 4D:
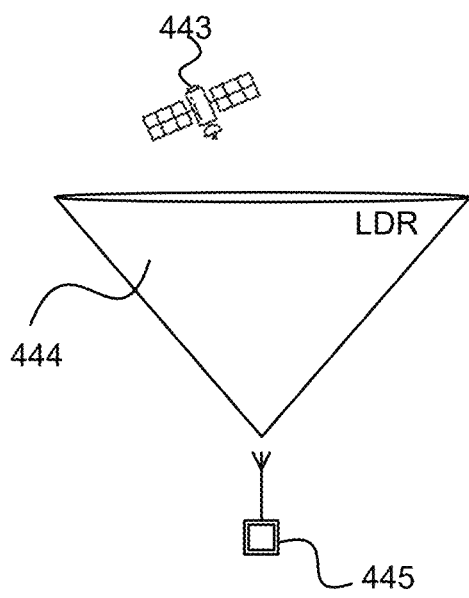
FIG. 4D is a diagram illustrating an embodiment of a satellite communication system.

FIG. 4D is a diagram illustrating an embodiment of a satellite communication system. In some embodiments, satellite 443 comprises satellite 100 of FIG. 1 or satellite 410 of FIG. 4A. In some embodiments, terminal 445 comprises terminal 416 of FIG. 4A. In the example shown, the communication of FIG. 4D follows the initial communication of FIG. 4C. Terminal 445 transmits wide beam 444 LDR communication responds to satellite 443 using a first waveform and a first data characteristic. In some embodiments, bidirectional LDR communication is enabled between satellite 443 and terminal 445 (e.g., using the first waveform and first data characteristic and a wide beam antenna configuration). In some embodiments, bidirectional LDR communication is enabled between satellite 443 and terminal 445 using another waveform and another data characteristic and a wide beam antenna configuration that is informed by a first set of communications between satellite 443 and terminal 445. In some embodiments, terminal 445 broadcasts using frequency F1 (e.g., F1 of FIG. 4A).

Figure 4E:
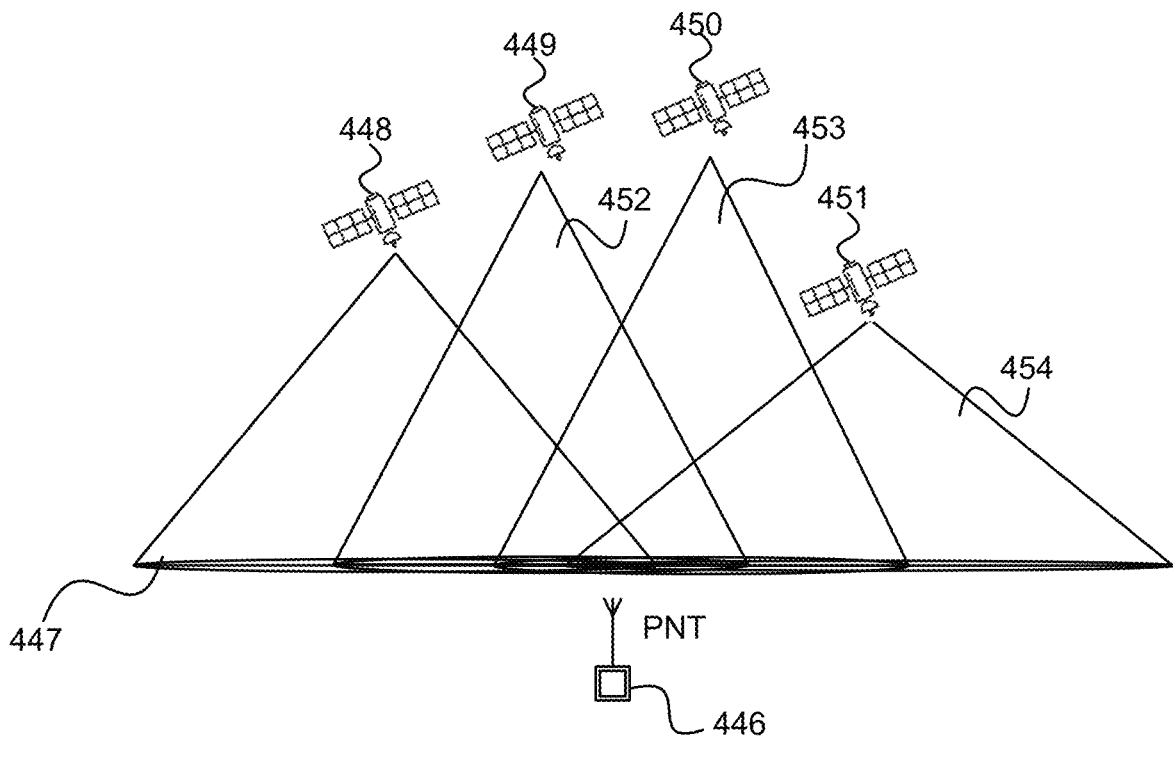
FIG. 4E is a diagram illustrating an embodiment of a satellite communication system.

FIG. 4E is a diagram illustrating an embodiment of a satellite communication system. In some embodiments, satellite 448, satellite 449, satellite system 450, and satellite 451 each comprises satellite 100 of FIG. 1 or satellite 410 of FIG. 4A. In some embodiments, terminal 446 comprises terminal 416 of FIG. 4A. In the example shown, terminal 446 receives a PNT communication from wide beam 447 of satellite 448, wide beam 452 of satellite 449, wide beam 453 of satellite system 450, and wide beam 454 of satellite 451, and using the information (e.g., timing information and time information) from the satellites, terminal 446 is able to determine position (e.g., a local location) and time (e.g., a true time). In some embodiments, the position and time are used to determine relative satellite positions from terminal 446. In some embodiments, wide beam 447 of satellite 448, wide beam 452 of satellite 449, wide beam 453 of satellite system 450, and wide beam 454 of satellite 451 are each broadcast on F2 (e.g., F2 of FIG. 4A). In some embodiments, the acquisition of multiple satellites and computation of position is enabled using the LDR communications of FIG. 4C and FIG. 4D.

In some embodiments, FIGS. 4F through 4I comprise a sequence of communication states for a satellite communication system.

Figure 4F:
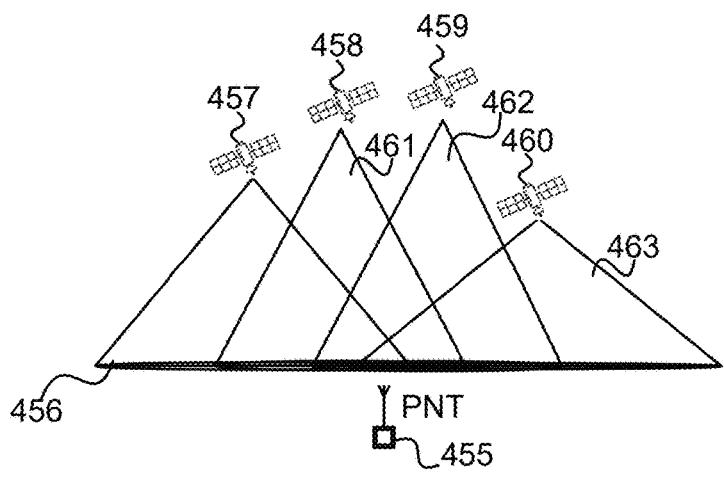
FIG. 4F is a diagram illustrating an embodiment of a communication system.

FIG. 4F is a diagram illustrating an embodiment of a satellite communication system. In some embodiments, satellite 457, satellite 458, satellite 459, and satellite 460 each comprises satellite 100 of FIG. 1 or satellite 410 of FIG. 4A. In some embodiments, terminal 455 comprises terminal 416 of FIG. 4A. In the example shown, terminal 455 receives a PNT communication from wide beam 456 of satellite 457, wide beam 461 of satellite 458, wide beam 462 of satellite 459, and wide beam 463 of satellite 460, and using the information (e.g., timing information and time information) from the satellites, terminal 455 is able to determine position (e.g., a local location) and time (e.g., a true time). In some embodiments, the position and time are used to determine relative satellite positions from terminal 455. In some embodiments, wide beam 456 of satellite 457, wide beam 461 of satellite 458, wide beam 462 of satellite 459, and wide beam 463 of satellite 460 are each broadcast on F2 (e.g., F2 of FIG. 4A).

In some embodiments, the position and time information are used by a satellite and a terminal to form more narrow beams for communication.

Figure 4G:
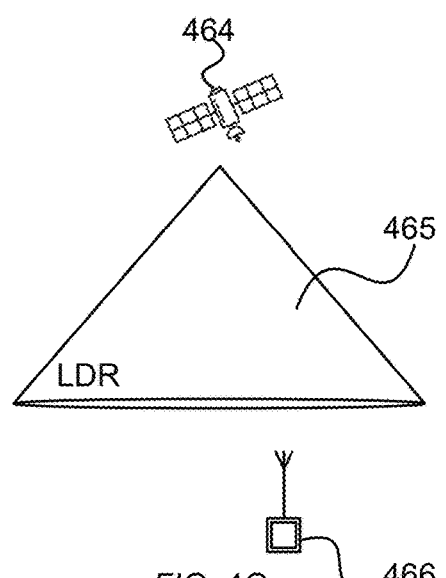
FIG. 4G is a diagram illustrating an embodiment of a satellite communication system.

FIG. 4G is a diagram illustrating an embodiment of a satellite communication system. In some embodiments, satellite 464 comprises satellite 100 of FIG. 1 or satellite 410 of FIG. 4A. In some embodiments, terminal 466 comprises terminal 416 of FIG. 4A. In the example shown, satellite 464 schedules a narrow beam LDR communication—for example, satellite 464 broadcasts wide beam 465 LDR communication using a first waveform and a first data characteristic and terminal 466 receives information regarding LDR communication configurations (e.g., satellite locations, etc.). In some embodiments, satellite 464 broadcasts using frequency F2 (e.g., F2 of FIG. 4A).

Figure 4H:
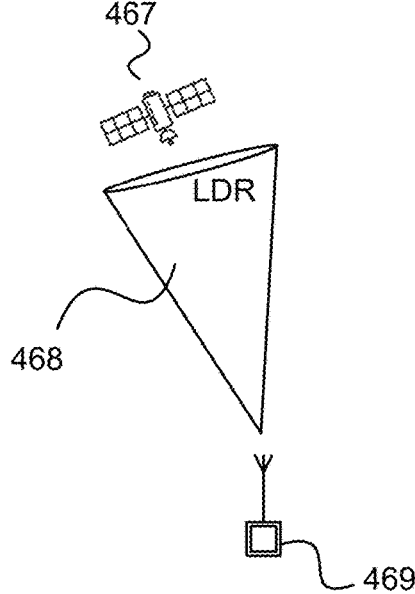
FIG. 4H is a diagram illustrating an embodiment of a satellite communication system.

FIG. 4H is a diagram illustrating an embodiment of a satellite communication system. In some embodiments, satellite 467 comprises satellite 100 of FIG. 1 or satellite 410 of FIG. 4A. In some embodiments, terminal 469 comprises terminal 416 of FIG. 4A. In the example shown, the communication of FIG. 4H follows the communication of FIG. 4G. Terminal 469 transmits narrow beam 468 LDR communication responds to satellite 467 using another waveform and another data characteristic. In some embodiments, bidirectional LDR communication is enabled between satellite 467 and terminal 469 (e.g., using the other waveform and the other data characteristic and a narrow beam antenna configuration). In some embodiments, terminal 469 broadcasts using frequency F1 or F3 (e.g., F1 of FIG. 4A or F3 of FIG. 4B).

Figure 4I:
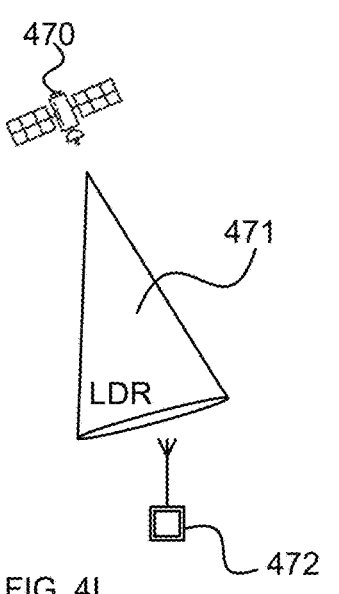
FIG. 4I is a diagram illustrating an embodiment of a satellite communication system.

FIG. 4I is a diagram illustrating an embodiment of a satellite communication system. In some embodiments, satellite 470 comprises satellite 100 of FIG. 1 or satellite 410 of FIG. 4A. In some embodiments, terminal 472 comprises terminal 416 of FIG. 4A. In the example shown, satellite 470 communicates a narrow beam LDR communication—for example, satellite 470 broadcasts narrow beam 471 LDR communication using the other waveform and the other data characteristic and terminal 471 receives and decodes the LDR communication. In some embodiments, satellite 470 broadcasts using frequency F2 (e.g., F2 of FIG. 4A).

In some embodiments, FIGS. 4J through 4O comprise a sequence of communication states for a satellite communication system.

Figures 4J, 4K, 4L, 4M, 4N, 4O:
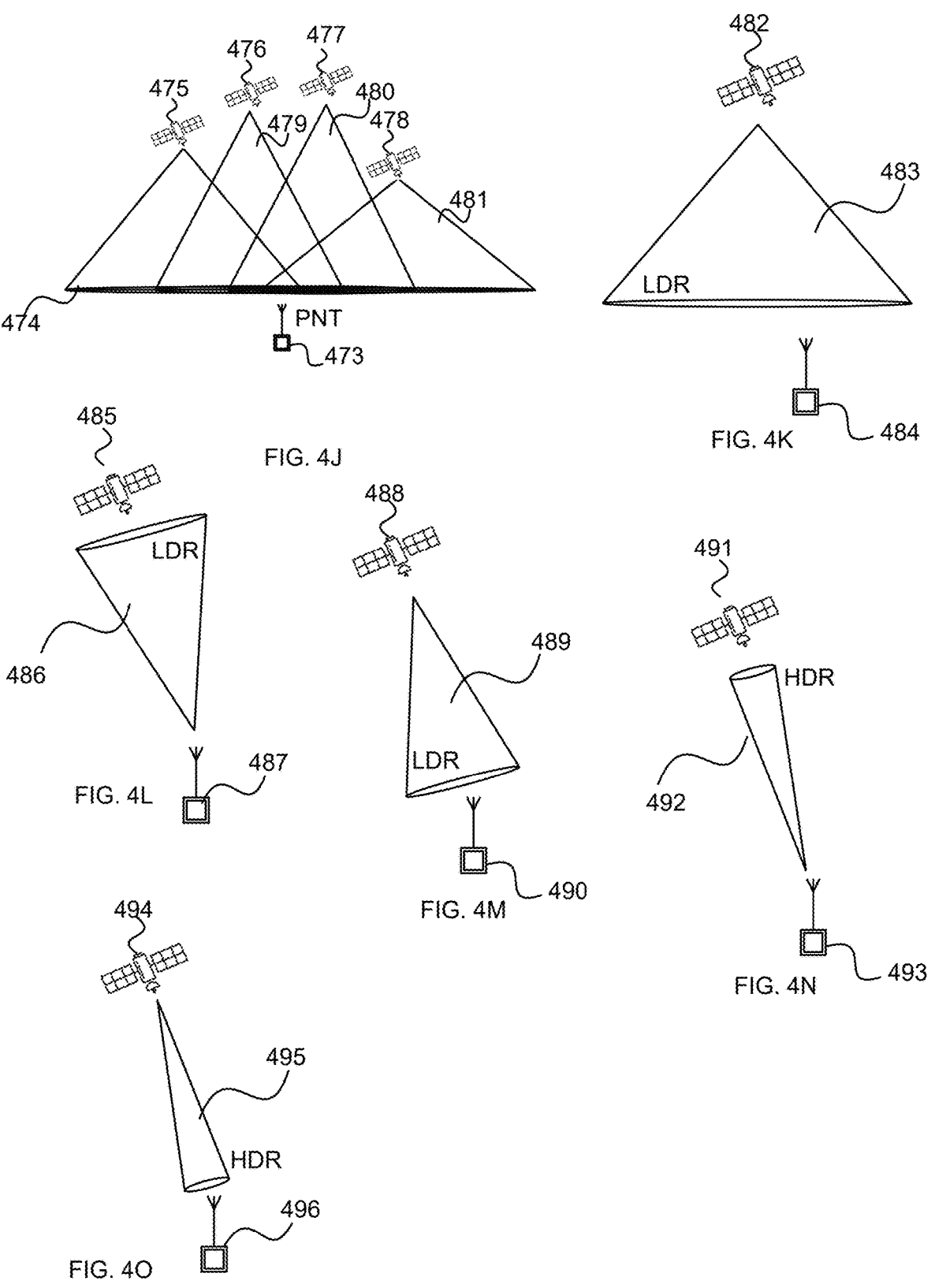
FIG. 4J is a diagram illustrating an embodiment of a communication system.
FIG. 4K is a diagram illustrating an embodiment of a satellite communication system.
FIG. 4L is a diagram illustrating an embodiment of a satellite communication system.
FIG. 4M is a diagram illustrating an embodiment of a satellite communication system.
FIG. 4N is a diagram illustrating an embodiment of a satellite communication system.
FIG. 4O is a diagram illustrating an embodiment of a satellite communication system.

FIG. 4J is a diagram illustrating an embodiment of a communication system. In some embodiments, satellite 475, satellite 476, satellite 477, and satellite 478 each comprises satellite 100 of FIG. 1 or satellite 410 of FIG. 4A. In some embodiments, terminal 473 comprises terminal 416 of FIG. 4A. In the example shown, terminal 473 receives a PNT communication from wide beam 474 of satellite 475, wide beam 479 of satellite 476, wide beam 480 of satellite 477, and wide beam 481 of satellite 478, and using the information (e.g., timing information and time information) from the satellites, terminal 473 is able to determine position (e.g., a local location) and time (e.g., a true time). In some embodiments, the position and time are used to determine relative satellite positions from terminal 473. In some embodiments, wide beam 474 of satellite 475, wide beam 479 of satellite 476, wide beam 480 of satellite 477, and wide beam 481 of satellite 478 are each broadcast on F2 (e.g., F2 of FIG. 4A).

In some embodiments, the position and time information is used by a satellite and a terminal to form more narrow beam LDR communication and/or for narrow beam HDR communication.

FIG. 4K is a diagram illustrating an embodiment of a satellite communication system. In some embodiments, satellite 482 comprises satellite 100 of FIG. 1 or satellite 410 of FIG. 4A. In some embodiments, terminal 484 comprises terminal 416 of FIG. 4A. In the example shown, satellite 482 schedules a narrow beam LDR communication—for example, satellite 482 broadcasts wide beam 483 LDR communication using a first waveform and a first data characteristic and terminal 484 receives information regarding LDR communication configurations (e.g., satellite locations, etc.). In some embodiments, satellite 482 broadcasts using frequency F2 (e.g., F2 of FIG. 4A).

FIG. 4L is a diagram illustrating an embodiment of a satellite communication system. In some embodiments, satellite 485 comprises satellite 100 of FIG. 1 or satellite 410 of FIG. 4A. In some embodiments, terminal 487 comprises terminal 416 of FIG. 4A. In the example shown, the communication of FIG. 4L follows the communication of FIG. 4K. Terminal 487 transmits narrow beam 486 LDR communication to satellite 485 using another waveform and another data characteristic. In some embodiments, bidirectional LDR communication is enabled between satellite 485 and terminal 487 (e.g., using the other waveform and the other data characteristic and a narrow beam antenna configuration). In some embodiments, terminal 487 broadcasts using frequency F1 or F3 (e.g., F1 of FIG. 4A or F3 of FIG. 4B).

FIG. 4M is a diagram illustrating an embodiment of a satellite communication system. In some embodiments, satellite 488 comprises satellite 100 of FIG. 1 or satellite 410 of FIG. 4A. In some embodiments, terminal 490 comprises terminal 416 of FIG. 4A. In the example shown, satellite 488 communicates a narrow beam LDR communication—for example, satellite 488 broadcasts narrow beam 489 LDR communication using the other waveform and the other data characteristic and terminal 490 receives and decodes the LDR communication. In some embodiments, satellite 488 broadcasts using frequency F2 (e.g., F2 of FIG. 4A).

FIG. 4N is a diagram illustrating an embodiment of a satellite communication system. In some embodiments, satellite 491 comprises satellite 100 of FIG. 1 or satellite 410 of FIG. 4A. In some embodiments, terminal 493 comprises terminal 416 of FIG. 4A. In the example shown, the HDR communication of FIG. 4N and FIG. 4O follows the LDR communication of FIG. 4L and FIG. 4M. Terminal 493 transmits narrow beam 492 HDR communication to satellite 491 using a different waveform and a different data characteristic. In some embodiments, bidirectional HDR communication is enabled between satellite 491 and terminal 493 (e.g., using the different waveform and the different data characteristic and a narrow beam antenna configuration). In some embodiments, terminal 493 broadcasts using frequency F1 or F3 (e.g., F1 of FIG. 4A or F3 of FIG. 4B).

FIG. 4O is a diagram illustrating an embodiment of a satellite communication system. In some embodiments, satellite 494 comprises satellite 100 of FIG. 1 or satellite 410 of FIG. 4A. In some embodiments, terminal 496 comprises terminal 416 of FIG. 4A. In the example shown, satellite 494 communicates a narrow beam HDR communication—for example, satellite 494 broadcasts narrow beam 495 HDR communication using the different waveform and the different data characteristic and terminal 496 receives and decodes the HDR communication. In some embodiments, satellite 494 broadcasts using frequency F2 (e.g., F2 of FIG. 4A).

In some embodiments, the satellite communication system sequence skips the LDR bidirectional communication of FIG. 4L and FIG. 4M and goes directly to FIG. 4N and FIG. 4O.

Figure 5A:
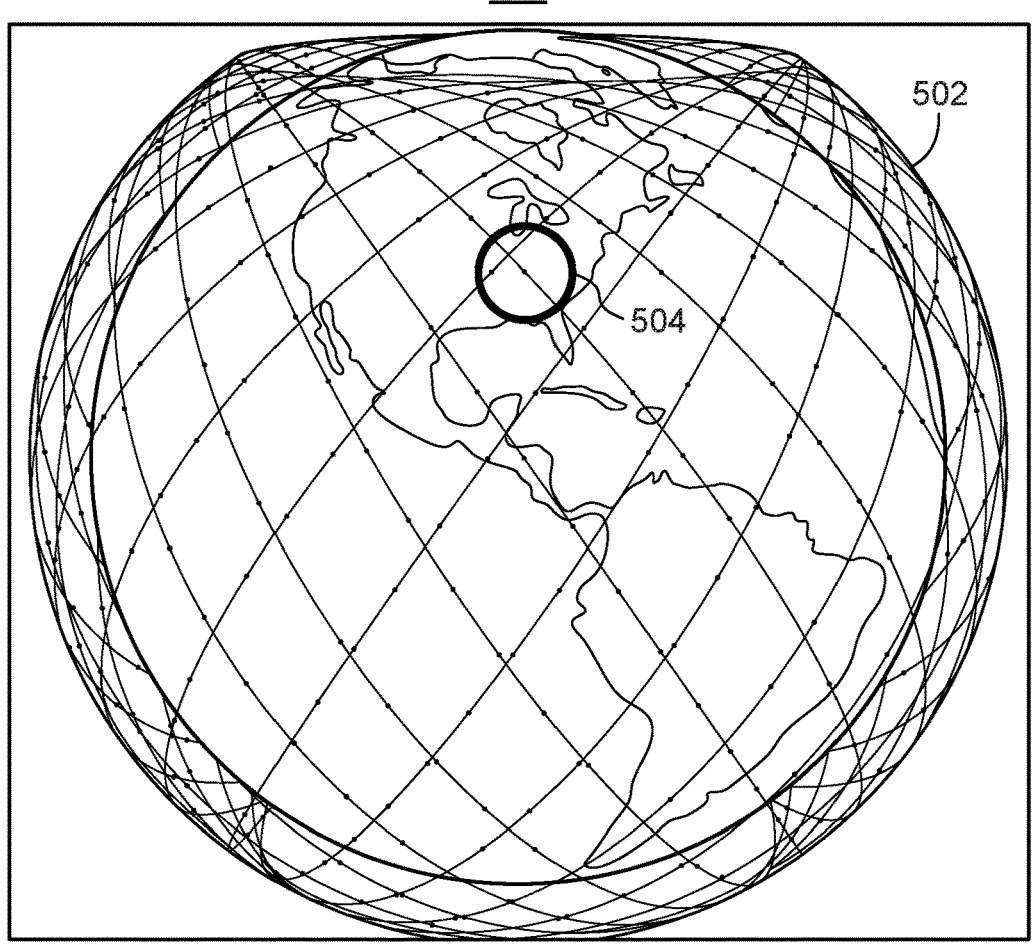
FIG. 5A depicts example embodiments of a portion of a satellite PNT system.

FIG. 5A depicts example embodiments of a portion of a satellite PNT system. FIG. 5A includes embodiment 500 of shell 502. Shell 502 includes a plurality of satellites (e.g., analogous to satellite 100 of FIG. 1, satellite 200 of FIG. 2, satellite 310 of FIG. 3, satellite 410 of FIG. 4, etc.) and depicts their orbits around the earth. In the example shown, the plurality of satellites are in LEO at approximately equivalent altitudes with respect to the surface of the earth (e.g., 900 km). In some embodiments, shell 502 is one of a plurality of shells. For example, the plurality of shells include satellites with orbits offset from shell 502 (e.g., including orbits above, below, or otherwise offset from those of shell 502 relative to the surface of the earth). In some embodiments, multiple satellites correspond to a depicted orbit.

In some embodiments, receiver systems located on or near the surface of the earth utilize one or more satellites from shell 502 to determine position coordinates and time information. In some embodiments, signals from satellites of shell 502 use frequency bands above the 1-2 GHz range. In some such embodiments, the frequencies of the communication receiving channel are at least 25 GHz. In various embodiments, the 25.5-27.0 GHz frequency band, the 37.5-42.5 GHz frequency band, or another appropriate frequency band are used. The high frequencies allow for PNT data to be transmitted from satellites in shell 502 at a higher accuracy than the standard 1-2 GHz range. Thus, in some embodiments, the receiver systems determine their position and time to an accuracy comparable to or greater than standard PNT systems. In some embodiments, satellites are lower in altitude than 1000 km and transmit signals in the high frequencies within a reduced geographical area on the surface of the earth. In the example shown, area 504 may correspond to a satellite within shell 502 at a given time. In some embodiments, the size of area 504 and comparable broadcasting areas of other satellites within shell 502 relative to the surface of the earth allows for the satellites within shell 502 to transmit a signal associated with a constrained geographical area (e.g., an area approximating a first country receives a first signal, an area approximating a second country receives a second signal, etc.).

Figure 5B:
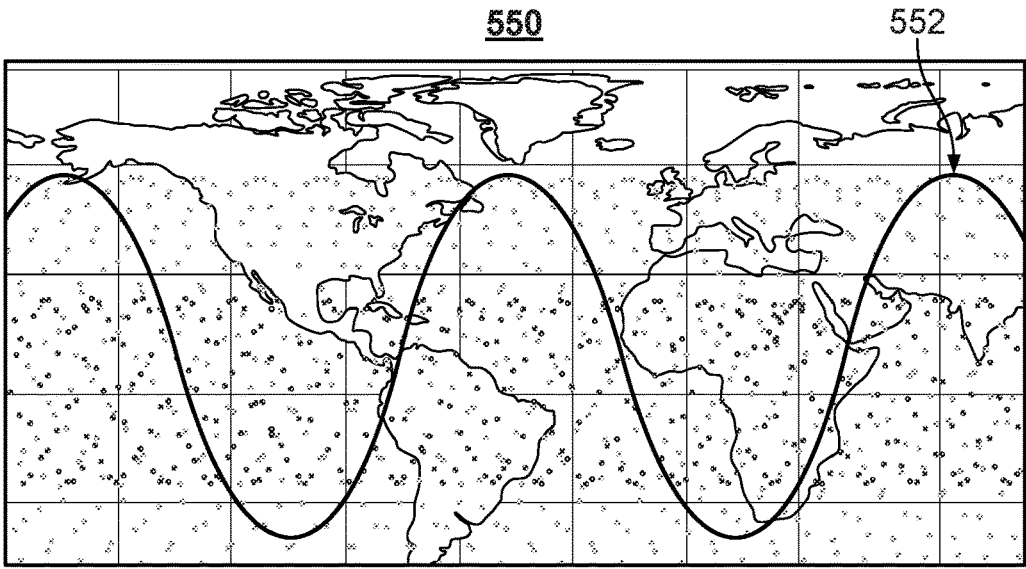
FIG. 5B depicts example embodiments of a portion of a satellite PNT system.

FIG. 5B depicts example embodiments of a portion of a satellite PNT system. In the example shown, FIG. 5B includes embodiment 550 of a shell (e.g., shell 502) in which satellite 552 is labeled and the orbit of satellite 552 is highlighted.

Figure 6:
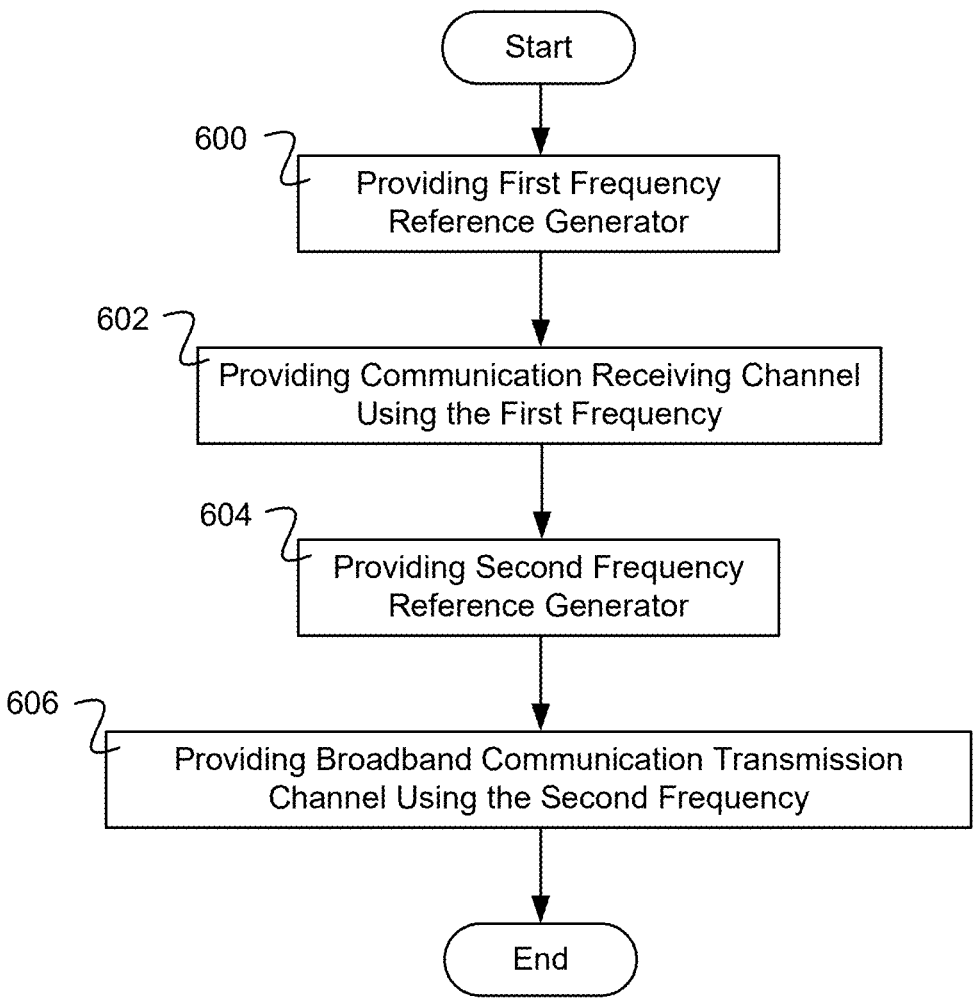
FIG. 6 is a flow diagram illustrating an embodiment of a process for a satellite system.

FIG. 6 is a flow diagram illustrating an embodiment of a process for a satellite system. In some embodiments, the process of FIG. 6 is associated with a satellite or aircraft system (e.g., satellite 100 of FIG. 1, satellite 200 of FIG. 2, satellite 310 of FIG. 3, satellite 410 of FIG. 4, etc.). In the example shown, in 600 a first frequency reference generator is provided. In some embodiments, the first frequency reference generator generates a first frequency reference signal in a first frequency band. In various embodiments, the first frequency band is higher than 10 GHz, the first frequency band is higher than 20 GHz, or any other appropriate frequency band. In 602, a communication receiving channel is provided using the first frequency. For example, the satellite or aircraft of the satellite system receives data using a signal in the first frequency band, which is a reverse of a legacy satellite system that includes a legacy communication transmission channel for transmitting data from a legacy satellite in the first frequency band. In some embodiments, the communication receiving channel comprises a broadband channel (e.g., 1,000 MHz, 500 MHz, 320 MHz of the 3.45 GHz band within the frequency range of 20.1-23.55 GHz).

In some embodiments, the satellite system uses the frequency band 25.5-27.0 GHz for satellite to earth communications.

In some embodiments, the satellite system uses the frequency band 27-30 GHz for satellite to earth communications.

In some embodiments, the satellite system uses the frequency band 40-42 GHz for satellite to earth communications.

In some embodiments, the satellite system uses the frequency band 47-52 GHz for satellite to earth communications.

In some embodiments, the legacy satellite system uses the frequency band 17-20 GHz for satellite to earth communications.

In some embodiments, the legacy satellite system uses the frequency band 20-24 GHz for satellite to earth communications.

In some embodiments, the legacy satellite system uses the frequency band 25.5-27 GHz for satellite to earth communications.

In some embodiments, the legacy satellite system uses the frequency band 37.5-42.5 GHz for satellite to earth communications.

In 604, a second frequency reference generator is provided. In some embodiments, a second frequency reference generator generates a second frequency reference signal in a second frequency band. In various embodiments, the second frequency band is higher than 10 GHz, the second frequency band is higher than 20 GHz, or any other appropriate frequency band. In 606, a communication transmission channel is provided using the second frequency. For example, the satellite or aircraft system transmits using the second frequency, which is a reverse of a legacy satellite system that includes a legacy communication receiving channel for receiving data at the legacy satellite in the second frequency band. In some embodiments, the communication transmission channel comprises a broadband channel (e.g., 1,000 MHz, 500 MHz, 320 MHz of the 3.35 GHz band within the frequency range of 20.2-23.55 GHz).

In some embodiments, the satellite system uses the frequency band 25.5-27.0 GHz for earth to satellite communications.

In some embodiments, the satellite system uses the frequency band 20-24 GHz for earth to satellite communications.

In some embodiments, the satellite system uses the frequency band 37.5-42.5 GHz for earth to satellite communications.

In some embodiments, the legacy satellite system uses the frequency band 27-30 GHz for earth to satellite communications.

In some embodiments, the legacy satellite system uses the frequency band 40-42 GHz for earth to satellite communications.

In some embodiments, the legacy satellite system uses the frequency band 47-52 GHz for earth to satellite communications.

In some embodiments, the satellite system further comprises a receiving antenna, wherein the communication receiving channel for receiving a direct spread or frequency hopped signal uses the receiving antenna. In some embodiments, the satellite system further comprises a transmission antenna, wherein the communication transmission channel for transmitting a direct spread or frequency hopped signal uses the transmission antenna.

In some embodiments, the receiving antenna comprises an antenna capable of forming a central beam with a half width of less than 20 degrees (e.g., 0.5, 1, 2, 5, 10, 15, or any other appropriate number of degrees). In various embodiments, the receiving antenna comprises a beamformed antenna, a phased-array antenna, a metamaterial antenna, an radio frequency (RF) lens, an array with a reflector, a multi-element antenna (e.g., with 500-20,000 elements), or any other appropriate antenna or combination of antennas. In some embodiments, the receiving antenna is configured to receive multiple beams simultaneously. In some embodiments, the receiving antenna forms a null to reduce signal degradation from an interfering signal.

In some embodiments, the transmission antenna comprises an antenna capable of forming a central beam with a half width of less than 20 degrees (e.g., 0.5, 1, 2, 5, 10, 15, or any other appropriate number of degrees). In various embodiments, the transmission antenna comprises a beam-formed antenna, a phased-array antenna, a metamaterial antenna, an RF lens, an array with a reflector, a multi-element antenna (e.g., with 500-20,000 elements), or any other appropriate antenna or combination of antennas. In some embodiments, the transmitting antenna is configured to transmit multiple beams simultaneously. In some embodiments, the transmission antenna forms a null to reduce transmission towards an interfering receiver.

Figure 7:
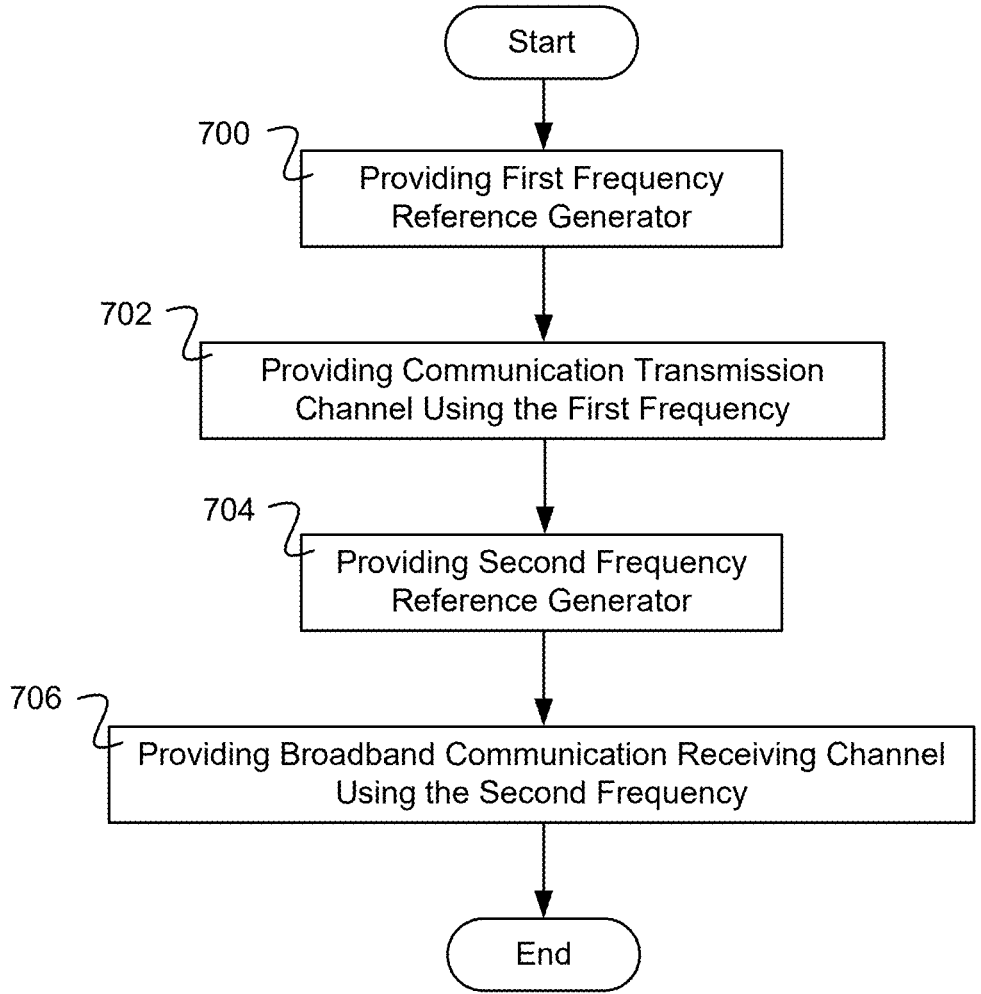
FIG. 7 is a flow diagram illustrating an embodiment of a process for a receiver system.

FIG. 7 is a flow diagram illustrating an embodiment of a process for a receiver system. In some embodiments, the process of FIG. 7 is associated with a receiver (e.g., receiver 208 of FIG. 2), a user (e.g., user 308 of FIG. 3), a terminal (e.g., terminal 416 of FIG. 4), or any other appropriate receiver system. In the example shown, in 700 a first frequency reference generator is provided. In some embodiments, the first frequency reference generator generates a first frequency reference signal in a first frequency band. In various embodiments, the first frequency band is higher than 10 GHz, the first frequency band is higher than 20 GHz, or any other appropriate frequency band is used. In 702, a communication transmission channel is provided using the first frequency. For example, the receiver system transmits data using a signal in the first frequency band, which is a reverse of a legacy satellite system that includes a legacy communication receiving channel for receiving data from a legacy satellite in the first frequency band. In some embodiments, the communication transmission channel comprises a broadband channel (e.g., 1,000 MHz, 500 MHz, 320 MHz of the 3.35 GHz band within the frequency range of 20.2-23.55 GHz).

In some embodiments, the satellite system uses the frequency band 17-20 GHz for earth to satellite communications.

In some embodiments, the satellite system uses the frequency band 20-24 GHz for earth to satellite communications.

In some embodiments, the satellite system uses the frequency band 25.5-27.0 GHz for earth to satellite communications.

In some embodiments, the satellite system uses the frequency band 37.5-42.5 GHz for earth to satellite communications.

In some embodiments, the legacy satellite system uses the frequency band 27-30 GHz for earth to satellite communications.

In some embodiments, the legacy satellite system uses the frequency band 40-42 GHz for earth to satellite communications.

In some embodiments, the legacy satellite system uses the frequency band 47-52 GHz for earth to satellite communications.

In 704, a second frequency reference generator is provided. In some embodiments, a second frequency reference generator generates a second frequency reference signal in a second frequency band. In various embodiments, the second frequency band is higher than 10 GHz, the second frequency band is higher than 20 GHz, or any other appropriate frequency band is used. In 706, a communication receiving channel is provided using the second frequency. For example, the receiver system receives using the second frequency, which is a reverse of a legacy satellite system that includes a legacy communication transmission channel for receiving data at the legacy satellite in the second frequency band. In some embodiments, the communication receiving channel comprises a broadband channel (e.g., 1,000 MHz, 500 MHZ, 320 MHz of the 3.35 GHz band within the frequency range of 20.2-23.55 GHz).

In some embodiments, the receiver system uses the frequency band 25.5-27.0 GHz for satellite to earth communications.

In some embodiments, the receiver system uses the frequency band 27-30 GHz for satellite to earth communications.

In some embodiments, the receiver system uses the frequency band 40-42 GHz for satellite to earth communications.

In some embodiments, the receiver system uses the frequency band 47-52 GHZ for satellite to earth communications.

In some embodiments, the legacy satellite system uses the frequency band 17-20 GHz for satellite to earth communications.

In some embodiments, the legacy satellite system uses the frequency band 20-24 GHz for satellite to earth communications.

In some embodiments, the legacy satellite system uses the frequency band 25.5-27 GHz for satellite to earth communications.

In some embodiments, the legacy satellite system uses the frequency band 37.5-42.5 GHz for satellite to earth communications.

In some embodiments, the receiver system further comprises a receiving antenna, wherein the communication receiving channel for receiving a direct spread signal uses the receiving antenna. In some embodiments, the satellite system further comprises a transmission antenna, wherein the communication transmission channel for transmitting a direct spread signal uses the transmission antenna.

In some embodiments, the receiving antenna comprises an antenna capable of forming a central beam with a half width of less than 20 degrees (e.g., 0.5, 1, 2, 5, 10, 15, or any other appropriate number of degrees). In various embodiments, the receiving antenna comprises a beamformed antenna, a phased-array antenna, a metamaterial antenna, an RF lens, an array with a reflector, a multi-element antenna (e.g., with 500-20,000 elements), or any other appropriate antenna or combination of antennas. In some embodiments, the receiving antenna is configured to receive multiple beams simultaneously. In some embodiments, the receiving antenna forms a null to reduce degradation from an interfering signal.

In some embodiments, the transmission antenna comprises an antenna capable of forming a central beam with a half width of less than 20 degrees (e.g., 0.5, 1, 2, 5, 10, 15, or any other appropriate number of degrees). In various embodiments, the transmission antenna comprises a beam-formed antenna, a phased-array antenna, a metamaterial antenna, an RF lens, an array with a reflector, a multi-element antenna (e.g., with 500-20,000 elements), or any other appropriate antenna or combination of antennas. In some embodiments, the transmitting antenna is configured to transmit multiple beams simultaneously. In some embodiments, the transmission antenna forms a null to reduce transmission towards an interfering receiver.

A satellite system is described. The satellite system includes an antenna and a processor. The processor is configured to establish initial contact with a receiver system using a wide beam antenna setup for the antenna, determine a narrow beam antenna setup for the antenna based at least in part on data from the initial contact, and provide position coordinates and time information using the narrow beam antenna setup.

In some embodiments, the position coordinates and time information are provided to a user. In some such embodiments, the position coordinates and time information are provided to the user via a user interface.

In some embodiments, the narrow beam antenna setup is configured to transmit a signal at an angle at least a minimum number of degrees above a horizon plane (e.g., greater than a minimum number of degrees above the horizon plane—for example, 36, 45, 54, or any other appropriate number of degrees). In some embodiments, angling the narrow beam antenna setup more perpendicular to the horizon plane reduces interference from signals transmitted closer to the horizon plane (e.g., from jammers, spoofers, etc.). In some embodiments, the wide beam antenna setup is configured to transmit a signal transmitted at an angle of at least 36 degrees above the horizon plane. For example, the wide beam antenna setup approximates a cone with at most a 90-degree aperture pointed directly toward the surface of the earth. In some embodiments, the narrow beam antenna setup has a beam angle width of less than 40 degrees (i.e., approximately a cone with at most a 40-degree aperture— for example, 35, 30, 25, 20, 15, 10, 5, 4, 3, 2, 1 degree cone aperture or any other appropriate degree cone aperture). For example, in some embodiments, the narrow beam antenna setup has a beam angle width of 1 degree. In some embodiments, the narrow beam antenna setup has a beam angle width of 4 degrees. In some embodiments, lowering beam width reduces interference (e.g., from a signal jammer, spoofer, another satellite system, etc.) and/or provides more localization for the PNT signals to a target receiver or terminal. In some embodiments, the narrow beam antenna setup is one of a plurality of narrow beam antenna setups. In various embodiments, the plurality of narrow beam antenna setups correspond to the receiver system (e.g., as the satellite system moves relative to the receiver system), correspond to a plurality of receiver systems, are configured in response to external data (e.g., weather or interference data in a particular area), or are configured in any other appropriate manner. For example, in response to data indicating stormy weather in an area, signal gain may be increased to improve transmission of the PNT signals within the area, In some embodiments, establishing initial contact comprises transmitting satellite data for a plurality of satellites. In various embodiments, the satellite data includes ephemeris data, almanac data, first predictive satellite motion models, second predictive satellite motion models, encryption information, or any other appropriate information. For example, portions of a satellite motion model, a satellite almanac, and updates to cryptographic keys are transmitted to the receiver system as a part of establishing the initial contact. In some embodiments, the first predictive satellite motion models and/or the second predictive satellite motion models allow for precise orbit determination. In some such embodiments, the first predictive satellite motion models and/or the second predictive satellite motion models include dynamic or kinematic parameters. In some embodiments, the dynamic or kinematic parameters are integrated with high-precision, multi-GNSS data processing software (e.g., Bernese GNSS Software).

In some embodiments, the receiver processor is further configured to determine a direction of an interfering beam. In some such embodiments, the processor is further configured to generate a spatial null in the direction of the interfering beam. For example, an interfering beam may be produced by a jammer (i.e., deliberately interfering with the receiver system), by crosstalk from another system, etc. Generating the spatial null in the direction of the interfering beam improves communication with the receiver system. In some such embodiments, a plurality of spatial nulls are generated in the direction of a set of strongest interfering beams (e.g., the three strongest interfering beams).

In some embodiments, the direction of the interfering beam is received from a database. In some embodiments, the direction of the interfering beam is determined based on a scan of received signals. In some embodiments, determining the direction of the interfering beam includes generating a spatial null in the direction of a received signal of the scan of received signals and determining whether signal strength of communications between the satellite system and the receiver system improved in response to generating the spatial null. For example, the scan of received signals is ordered by signal strength, and the strongest signals are iteratively nulled. In response to generating the spatial null, and strength of a signal carrying communications between the satellite system and the receiver system improving, the spatial null may be maintained. Otherwise, the signal is identified as a signal carrying communications between the satellite system and the receiver system. The next strongest signal(s) are then tested, and multiple nulls corresponding to the strongest interfering signals are maintained.

In some embodiments, the data is transmitted using a signal with a frequency of at least 25 GHz. In various embodiments, the antenna is at least one horn antenna, a phased-array antenna, a reflector and an array, an array-fed reflector antenna, a multi-element antenna (e.g., with 500-20,000 elements, or any other appropriate type of antenna.

A satellite system is disclosed. The satellite system is configured to communicate with receiver systems to provide PNT data with reduced interference from other systems (e.g., signal jammers, spoofers, legacy satellite systems, etc.). This is achieved by establishing initial contact with a receiver system using a wide beam antenna setup and determining narrow beam antenna setups based on the initial contact.

This communication system is designed to avoid some problems associated with the existing position, navigation, and time systems (e.g., GPS, GLONASS, Galileo, and BeiDou). In various embodiments, the wide beam antenna setup and/or the narrow beam antenna setups are configured to transmit signals at an angle at least 36 degrees above a horizon plane. The satellite system is able to avoid being as easy to jam or interfere with by limiting signals to being more overhead so that ground or near ground signals will not be an issue.

In some embodiments, the satellite system operates at frequencies that enable high data speed communications between the receiver system and the satellite system that can be passed between satellites of a constellation and then back down to a different receiver system. The higher frequencies enable higher accuracy compared to current position, navigation, and time systems at more overhead angles and the use of signal spreading to increase the receiver system's ability to extract useful signal from a noisy background environment. The higher frequencies also enable higher data rates and larger payloads of data compared to current position, navigation, and time systems allowing for multiple selectable channels to be transmitted from the satellite system. This allows for different groups of receiver systems to receive different accuracies of PNT signals, and for groups to receive signals that are spatially selective (e.g., in one geographical area enabled, but in another geographical area not enabled).

In various embodiments, the satellite system generates one or more spatial nulls in the direction of interfering beams (e.g., the strongest interfering beams). The spatial nulls improve the strength of communications with the receiver system, further reduce interference and further improve the performance of the communication system. In an example, signals are tested in order of signal strength (e.g., from a scan of received signals) and nulled if nulling the signal would improve the strength of the communications with the receiver system. If nulling the signal reduces the strength of the communications with the receiver system, the signal is assumed to be a communication signal from the receiver and in various embodiments is tracked (e.g., via angling a narrow beam setup toward the signal) or handled in any other appropriate manner.

A satellite receiver system is disclosed. The system comprises an antenna and a processor. The processor is configured to establish initial contact with a transmitter (e.g., a ground terminal) using a wide beam antenna setup for the antenna; determine a narrow beam antenna setup for the antenna; and receive data from the transmitter using the narrow beam antenna setup.

In some embodiments, the satellite receiver uses a wide beam pattern to listen for transmitters. Once an initial contact has been made and a link established between the satellite and the transmitter (e.g., a ground terminal), the satellite determines a narrow beam antenna setup for the antenna to communicate with the transmitter. In some embodiments, the satellite receiver supports communication with a multiple transmitters using a multiple narrow beam configuration for the antenna in receiving signals from the multiple transmitters.

A receiver system is described. The receiver system includes an antenna and a processor. The processor is configured to establish initial contact with a satellite using a wide beam antenna setup for the antenna, determine narrow beam antenna setups for the antenna based at least in part on satellite data from the initial contact, determine position coordinates and time information using position-navigation-time (PNT) data received from the narrow beam antenna setups, and provide the position coordinates and the time information.

In some embodiments, the position coordinates and time information are provided to a user. In some such embodiments, the position coordinates and time information are provided to the user via a user interface.

In some embodiments, a narrow beam antenna setup of the narrow beam antenna setups is configured to receive a signal transmitted at an angle at least minimum number of degrees above a horizon plane (e.g., greater than minimum number of degrees above the horizon plane—for example, 36, 45, 54, or any other appropriate number of degrees). In some embodiments, angling the narrow beam antenna setup farther above the horizon plane reduces interference from signals transmitted closer to the horizon plane (e.g., jammers, spoofers, etc.). In some embodiments, the wide beam antenna setup is configured to receive a signal transmitted at an angle of at least 36 degrees above the horizon plane. For example, the wide beam antenna setup may approximate a cone with a 90-degree aperture pointed directly upward (i.e., perpendicular to the horizon plane). In some embodiments, a narrow beam antenna setup of the narrow beam antenna setups has a beam angle width of less than 40 degrees (i.e., approximates a cone with at most a 40-degree aperture—for example, a 35, 30, 25, 20, 15, 10, 5, 4, 3, 2, 1 degree cone). For example, in some embodiments, the narrow beam antenna setup has a beam angle width of 1 degree. Lowering beam angle width reduces interference in some embodiments (e.g., from jammers, spoofers, etc.). In some embodiments, the narrow beam antenna setups include at least four narrow beam antenna setups. In various embodiments, the narrow beam antenna setups correspond to different satellites, correspond to a shared satellite (e.g., as it moves relative to the receiver system), or are configured in any other appropriate manner.

In some embodiments, establishing initial contact comprises receiving satellite data for a plurality of satellites. In various embodiments, the satellite data includes ephemeris data, almanac data, first predictive satellite motion model data, second predictive satellite motion model data, encryption information, or any other appropriate information. In an example, portions of a satellite motion model (e.g., motion model parameters), a satellite almanac, and updates to cryptographic keys are received while establishing the initial contact.

In some embodiments, establishing initial contact further comprises decoding the satellite data for the plurality of satellites. In some such embodiments, the satellite data is decoded sequentially (e.g., starting with data associated with a single satellite). In some embodiments, decoding accuracy is improved using satellite data that has already been decoded. For example, data associated with a single satellite is decoded. From the data associated with the single satellite, ephemeris and an approximate location of the receiver system are found. Using the ephemeris and the approximate location of the receiver system, decoding accuracy of subsequent satellites is improved.

In some embodiments, the processor is further configured to determine a direction of an interfering beam. In some such embodiments, the processor is further configured to generate a spatial null in the direction of the interfering beam. For example, an interfering beam is produced by a jammer (i.e., deliberately interfering with the receiver system), crosstalk from another system, etc. Generating the spatial null in the direction of the interfering beam strengthens the signal received from the narrow beam antenna setups. In some such embodiments, a plurality of spatial nulls are generated in the direction of a set of strongest interfering beams (e.g., the three strongest interfering beams).

In some embodiments, the direction of the interfering beam is received from a database. In some embodiments, the direction of the interfering beam is determined based on a scan of received signals. In some embodiments, determining the direction of the interfering beam includes generating a spatial null in the direction of a received signal of the scan of received signals and determining whether signal strength of a signal carrying the PNT data improved in response to generating the spatial null. For example, the scan of received signals is ordered by signal strength, and the strongest signals are then iteratively nulled. In response to generating the spatial null and strength of a signal carrying the PNT data improving, the spatial null is maintained. Otherwise, the signal is identified as a signal carrying the PNT data. The next strongest signals are then tested, and multiple nulls corresponding to the strongest interfering signals are maintained.

In some embodiments, the data is received using a signal with a frequency of at least 25 GHz. In various embodiments, the antenna is a horn antenna, array-fed reflector, a multi-element antenna (e.g., a 500 to 20,000 element antenna), or any other appropriate type of antenna.

A receiver system is disclosed. The receiver system is configured to communicate with satellites or aircraft to provide position coordinates and time information with reduced interference from other systems (e.g., signal jammers, spoofers, legacy satellite systems, etc.). This is achieved by establishing initial contact with a satellite using a wide beam antenna setup and determining narrow beam antenna setups based on the initial contact.

This communication system is designed to avoid some problems associated with the existing position, navigation, and time systems (e.g., GPS, GLONASS, Galileo, and BeiDou). In various embodiments, the wide beam antenna setup and/or the narrow beam antenna setups are configured to receive signals transmitted at an angle at least 36 degrees above a horizon plane. The receiver system is able to avoid being as easy to jam or interfere with by limiting incoming signals to being more overhead so that ground or near ground signals will not be an issue.

In some embodiments, the receiver system operates at frequencies that enable high data speed communication between the receiver system and the satellite that can be passed between satellites of a constellation and then back down to a different receiver system. The higher frequencies enable higher accuracy compared to current position, navigation, and time systems at more overhead angles and the use of signal spreading to increase the ground terminal's ability to extract useful signal from a noisy background environment. The higher frequencies also enable higher data rates and larger payloads of data compared to current position, navigation, and time systems allowing for multiple selectable channels to be transmitted from satellites. This allows for different groups of ground terminals to receive different accuracies of PNT signals, and for groups to receive signals that are spatially selective (e.g., in one geographical area enabled, but in another geographical area not enabled).

In various embodiments, the receiver system generates one or more spatial nulls in the direction of interfering beams (e.g., the strongest interfering beams). The spatial nulls may improve the strength of a signal carrying PNT data, further reduce interference and further improve the performance of the receiver system. In an example, signals are tested in order of signal strength (e.g., from a scan of received signals) and nulled if nulling the signal would improve the strength of the signal carrying PNT data. If nulling the signal reduces the strength of the signal carrying PNT data, the signal is assumed to be carrying PNT data and in various embodiments is tracked (e.g., via a narrow beam setup) or handled in any other appropriate manner.

Figure 8:
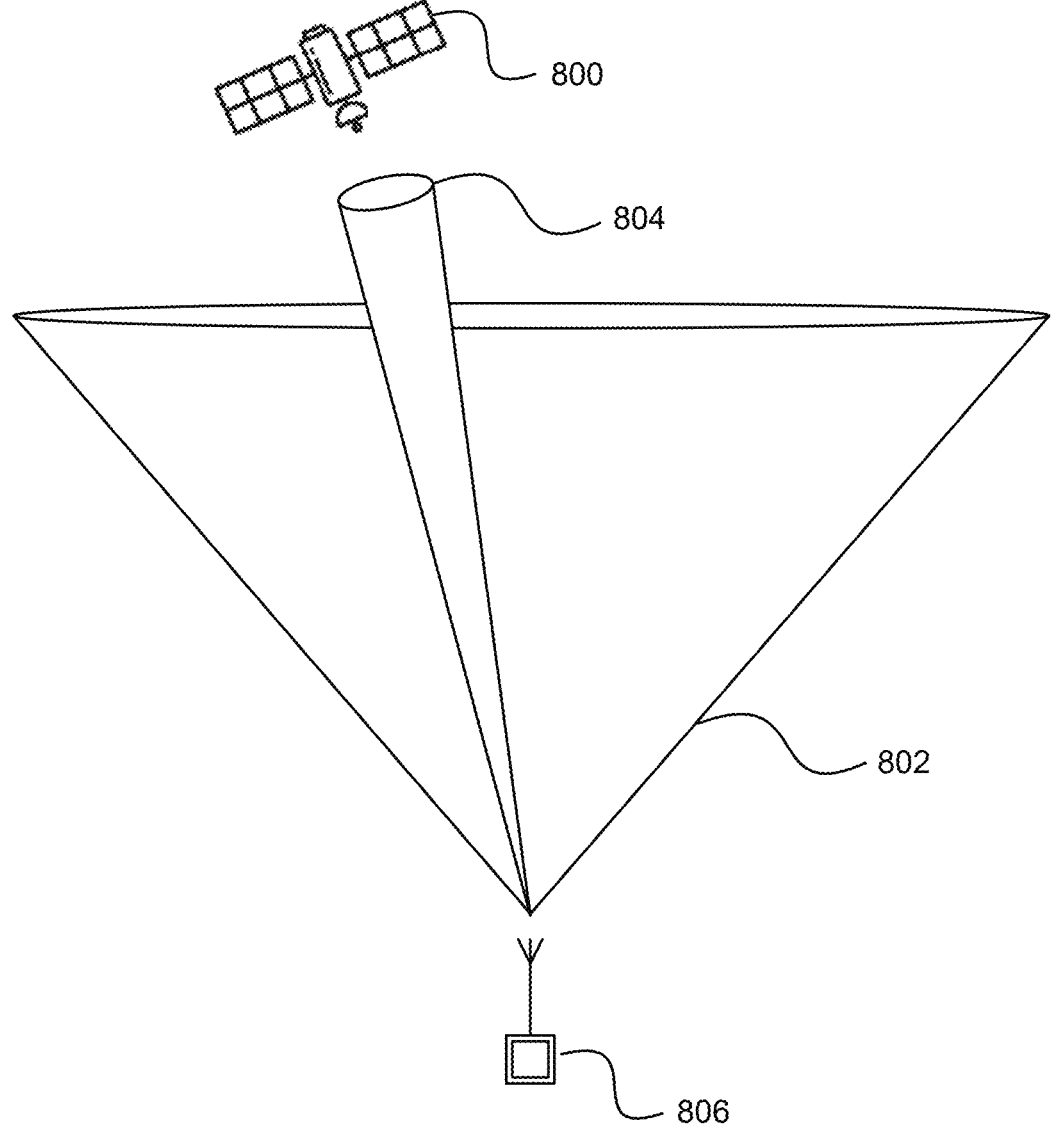
FIG. 8 is a diagram illustrating an embodiment of communications with a satellite PNT system.

FIG. 8 is a diagram illustrating an embodiment of communications with a satellite PNT system. In various embodiments, satellite 800 is analogous to satellite 100 of FIG. 1, satellite 200 of FIG. 2, satellite 310 of FIG. 3, satellite 410 of FIG. 4, or any other appropriate satellite system. In various embodiments, receiver 806 is analogous to receiver 208 of FIG. 2, user 308 of FIG. 3, terminal 416 of FIG. 4, or any other appropriate receiver or user system. Receiver 806 includes an antenna. In various embodiments, the antenna is a horn antenna, a plurality of horn antennas, an array-fed reflector, a multi-element antenna (e.g., 500 to 20,000 element antenna), or any other appropriate type of antenna. In the embodiment shown, receiver 806 establishes initial contact with satellite 800 using wide beam antenna setup 802. Receiver 806 determines narrow beam antenna setup 804 based on satellite data from the initial contact. In some embodiments, the satellite data is for a plurality of satellites (e.g., satellites of a shell or constellation including satellite 800). In various embodiments, satellite data includes ephemeris data, almanac data, motion model data, cryptographic encoding information, or any other appropriate data. In the embodiment shown, wide beam antenna setup 802 is configured to receive a signal transmitted at least 36 degrees above a horizon plane.

Narrow beam antenna setup 804 is directed toward satellite 800. In some embodiments, narrow beam antenna setup 804 has a beam angle width of less than 40 degrees. Narrow beam antenna setup 804 is one of a plurality of narrow beam antenna setups. For example, other narrow beam antenna setups directed toward other satellites in the shell or constellation including satellite 800 are determined based on the satellite data from the initial contact with satellite 800, from initial contact established with the other satellites, etc.

Receiver 806 determines position coordinates and time information using PNT data received from the plurality of narrow beam antenna setups including narrow beam antenna setup 804. In some embodiments, antenna setups of the plurality of narrow beam antenna setups use frequency bands above the 1-2 GHz range. In some such embodiments, the frequencies of signals carrying the PNT data are at least 25 GHZ. In various embodiments, the 25.5-27.0 GHZ frequency band, the 37.5-42.5 GHz frequency band, or another appropriate frequency band are used. The high frequencies allow for the PNT data to be transmitted at a higher accuracy than the standard 1-2 GHz range. This allows receiver 806 to determine position coordinates and time information to an accuracy comparable to or greater than standard PNT systems. Receiver 806 provides the position coordinates and time information (e.g., to a user via a user interface).

Figure 9:
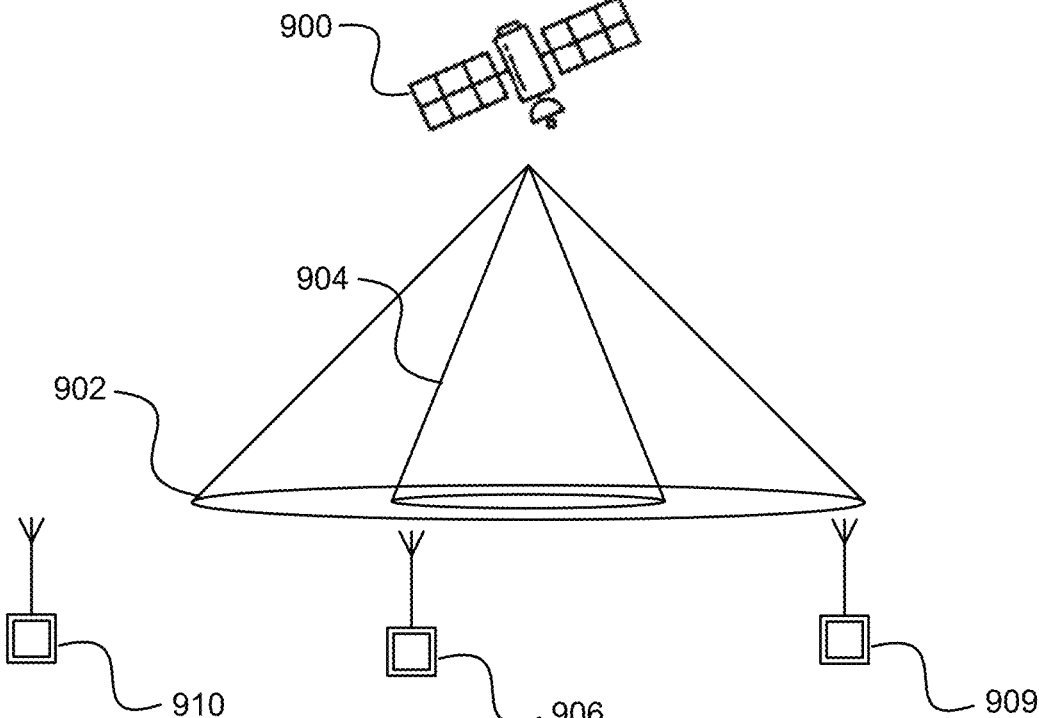
FIG. 9 is a diagram illustrating an embodiment of communications with a satellite PNT system.

FIG. 9 is a diagram illustrating an embodiment of communications with a satellite PNT system. In various embodiments, satellite 900 is analogous to satellite 100 of FIG. 1, satellite 200 of FIG. 2, satellite 310 of FIG. 3, satellite 410 of FIG. 4, satellite 800 of FIG. 8, or any other appropriate satellite system. Satellite 900 includes an antenna. In various embodiments, the antenna is a horn antenna, a plurality of horn antennas, an array-fed reflector, a multi-element antenna (e.g., 500 to 20,000 element antenna), or any other appropriate type of antenna. In various embodiments, receiver 906 is analogous to receiver 208 of FIG. 2, user 308 of FIG. 3, terminal 416 of FIG. 4, receiver 806 of FIG. 8, or any other appropriate receiver or user system.

In the embodiment shown, satellite 900 establishes initial contact with receiver 906 via wide beam antenna setup 902 and determines antenna setup 904 based on the initial contact. In some embodiments, antenna setup 904 is a narrow beam antenna setup. In some embodiments, antenna setup 904 has a beam angle width of less than 40 degrees (e.g., 35, 30, 25, 20, 15, 10, 5, 4, 3, 2, 1 degree width or any other appropriate width). In some embodiments, antenna setup 904 is angled (e.g., directed toward receiver 906 in a manner analogous to narrow beam antenna setup 804 of FIG. 8). Satellite 900 provides PNT data to receiver 906 using antenna setup 904. Receiver 906 determines position coordinates and time information based on the PNT data received from satellite 900 and/or other satellites (e.g., in the same shell or constellation as satellite 900).

In the embodiment shown, wide beam antenna setup 902 is configured to transmit signals at an angle of at least 36 degrees above a horizon plane (e.g., a 40, 45, 50, 55, 60, 65 degree angle above the horizontal plane). Thus, wide beam antenna setup 902 can be seen to exclude system 910. Antenna setup 904 can be seen to exclude system 909 and system 910. In some embodiments, system 909 and system 910 represent interfering systems (e.g., jammers, spoofers, transmitters of unrelated data, unfriendly listeners, receivers of unrelated data, etc.). In some embodiments, satellite 900 generates one or more spatial nulls to reduce interference of system 909 and system 910. Both high elevation angles of communications and nulling of interfering beams may improve satellite 900's resistance to jamming, spoofing, and other interference.

In some embodiments, system 909 and system 910 represent PNT receivers similar to receiver 906. In various embodiments, satellite 900 has not established contact with system 909 and system 910, or has established contact via other antenna setups (not shown). In some embodiments, system 909 and system 910 are handled by satellite 900 differently than receiver 906 (e.g., based on a user group, a geographic area, etc.). In an example, system 909 belongs to a user group associated with a lower-accuracy PNT signal, while system 910 is not supported by satellite 900 based on its geographic area. Satellite 900 is then associated with another antenna setup of satellite 900 or another satellite (e.g., in the same shell or constellation as satellite 900) and system 910 is not associated with an antenna setup. In some embodiments, high elevation angles of communications and the determination of narrow beam antenna setups enable satellite 900 to differentiate between systems belonging to different user groups, geographic areas, etc.

Figure 10A:
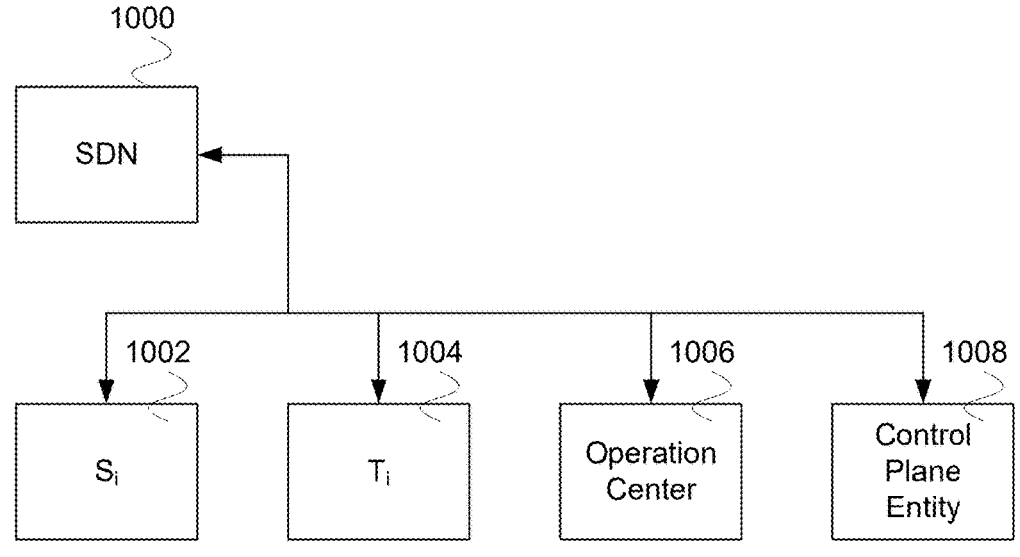
FIG. 10A is a diagram illustrating an embodiment of a system for mapping broadband steerable beams to antennas.

FIG. 10A is a diagram illustrating an embodiment of a system for mapping broadband steerable beams to antennas. In some embodiments, the broadband steerable beams comprise broadband steerable beams associated with broadband steerable transmitter (TX) subsystem(s) or receiver (RX) subsystem(s) of FIG. 17 or FIG. 18A. In some embodiments, the system for mapping broadband steerable beams to antennas determines wide beam antenna setups and/or narrow beam antenna setups for the antennas. In the example shown, at the system level, first software defined networking (SDN) 1000 plans which satellite serves which area and which users and from which start time to which end time. The next level details are then planned by SDN 1000 including which frequency and channel to use for which TX or RX, how much bandwidth, how to make sure interference and weather are accounted for (e.g., to calculate needed TX power and so on; on both a per-beam basis and per-satellite or per-terminal basis). SDN 1000 then fans out (e.g., distributes) these schedules to all network nodes well before the start times. In various embodiments, network nodes comprise one or more of a satellite (e.g., S_i 1002), a ground terminal (e.g., T_i 1004), a control plane entity (e.g., control plane entity 1008), an operation center (e.g., operation center 1006), or any other appropriate network node.

Figures 10B, 10C:
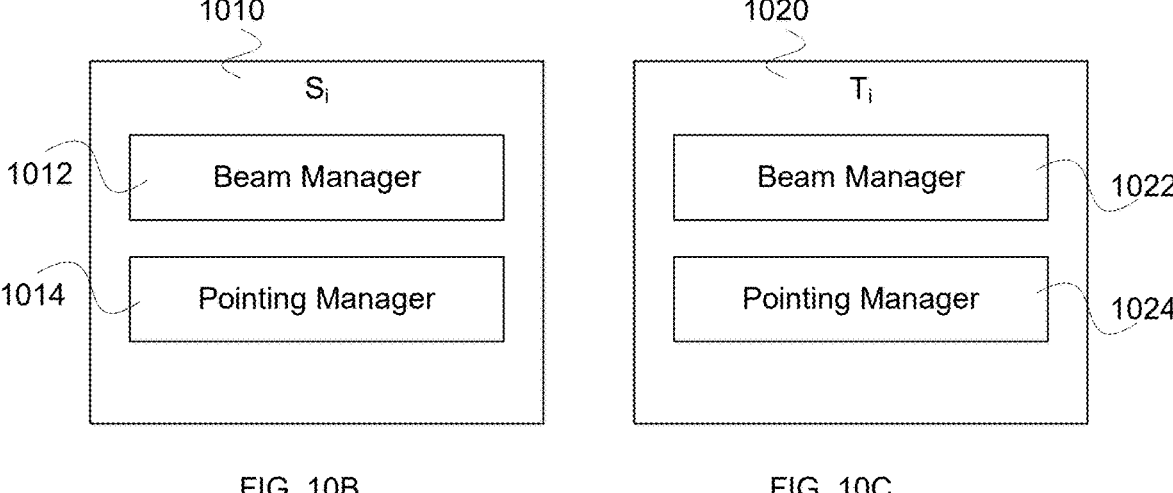
FIG. 10B is a diagram illustrating an embodiment of a system for mapping broadband steerable beams to antennas.
FIG. 10C is a diagram illustrating an embodiment of a system for mapping broadband steerable beams to antennas.

FIG. 10B is a diagram illustrating an embodiment of a system for mapping broadband steerable beams to antennas. In some embodiments, the system for mapping broadband steerable beams to antennas determines wide beam antenna setups and/or narrow beam antenna setups for the antennas. In some embodiments, the satellite of FIG. 10B is used to implement satellite (e.g., S_i 1002) of FIG. 10A. In the example shown, the satellite (e.g., S_i 1010) includes beam manager 1012 and pointing manager 1014. On the satellite TX or RX, a schedule is ingested by beam manager 1012, which basically knows where it will be at the start time, which area it needs to point to (e.g., where the area is specified in earth centered, earth fixed (ECEF) or other co-ordinates) and computes them into angles from the satellite (e.g., theta, phi relative to the satellite nadir pointing). Beam manager 1012 then does the next level of work to figure out the antenna driver parameters, which, depending on the antenna structure, could be element level phases, etc. These antenna driver parameters are then updated by pointing manager 1014 at a specific update rate-so that, as the satellite moves, the beam continues to point to the right point on the ground (e.g., a beam is directed to a location roughly every tens of milliseconds). Then either for beam sharing reasons or at the end time, there can be big jumps coming from the pointing manager 1014. In some embodiments, if the jumps are for beam sharing, the jumps are for cycling between one of N spots on some schedule (e.g., on one location (a first spot) for a time (a first duration) and then on another location (a second spot) for another time (a second duration), etc.). At handover, as the users associated with a spot are handed over (e.g., as in traffic to that spot is no longer routed through that beam) and that TX or RX beam either gets assigned to serve a new spot or stays unassigned for a defined set of time (all of which is known through the schedule). In some embodiments, RX beams are independently controlled with respect to TX beams (e.g., there is no tight timing relationship between TX and RX). In some embodiments, RX nulls are similarly controlled to track interfering sources. In some embodiments, multiple TX and RX beams are controlled for a satellite to point to target ground terminals for TX and RX communications and target interfering sources for blocking.

FIG. 10C is a diagram illustrating an embodiment of a system for mapping broadband steerable beams to antennas. In some embodiments, the system for mapping broadband steerable beams to antennas determines wide beam antenna setups and/or narrow beam antenna setups for the antennas. In some embodiments, the terminal of FIG. 10C is used to implement terminal (e.g., T_i 1004) of FIG. 10A. In the example shown, the terminal (e.g., T_i 1020) includes beam manager 1022 and pointing manager 1024. On the satellite TX or RX, a schedule is ingested by beam manager 1022, which basically knows where it will be at the start time, which area it needs to point to (e.g., where the area is specified in earth centered, earth fixed (ECEF) or other co-ordinates) and computes them into angles from the satellite (e.g., theta, phi relative to the satellite nadir pointing). Beam manager 1022 then does the next level of work to figure out the antenna driver parameters, which, depending on the antenna structure, could be element level phases, etc. These antenna driver parameters are then updated by pointing manager 1024 at a specific update rate-so that, as the satellite moves, the beam continues to point to the right point on the ground (e.g., a beam is directed to a location roughly every tens of milliseconds). Then either for beam sharing reasons or at the end time, there can be big jumps coming from the pointing manager 1024. In some embodiments, if the jumps are for beam sharing, the jumps are for cycling between one of N spots on some schedule (e.g., on one location (a first spot) for a time (a first duration) and then on another location (a second spot) for another time (a second duration), etc.). At handover, as the users associated with a spot are handed over (e.g., as in traffic to that spot is no longer routed through that beam) and that TX or RX beam either gets assigned to serve a new spot or stays unassigned for a defined set of time (all of which is known through the schedule). In some embodiments, RX beams are independently controlled with respect to TX beams (e.g., there is no tight timing relationship between TX and RX). In some embodiments, RX nulls are similarly controlled to track interfering sources. In some embodiments, TX nulls are similarly controlled to track satellites that are not supposed to receive transmissions from the ground terminal. In some embodiments, multiple TX and RX beams are controlled for a ground terminal to point to target satellites for TX and RX communications and target interfering sources for blocking.

Figure 10D:
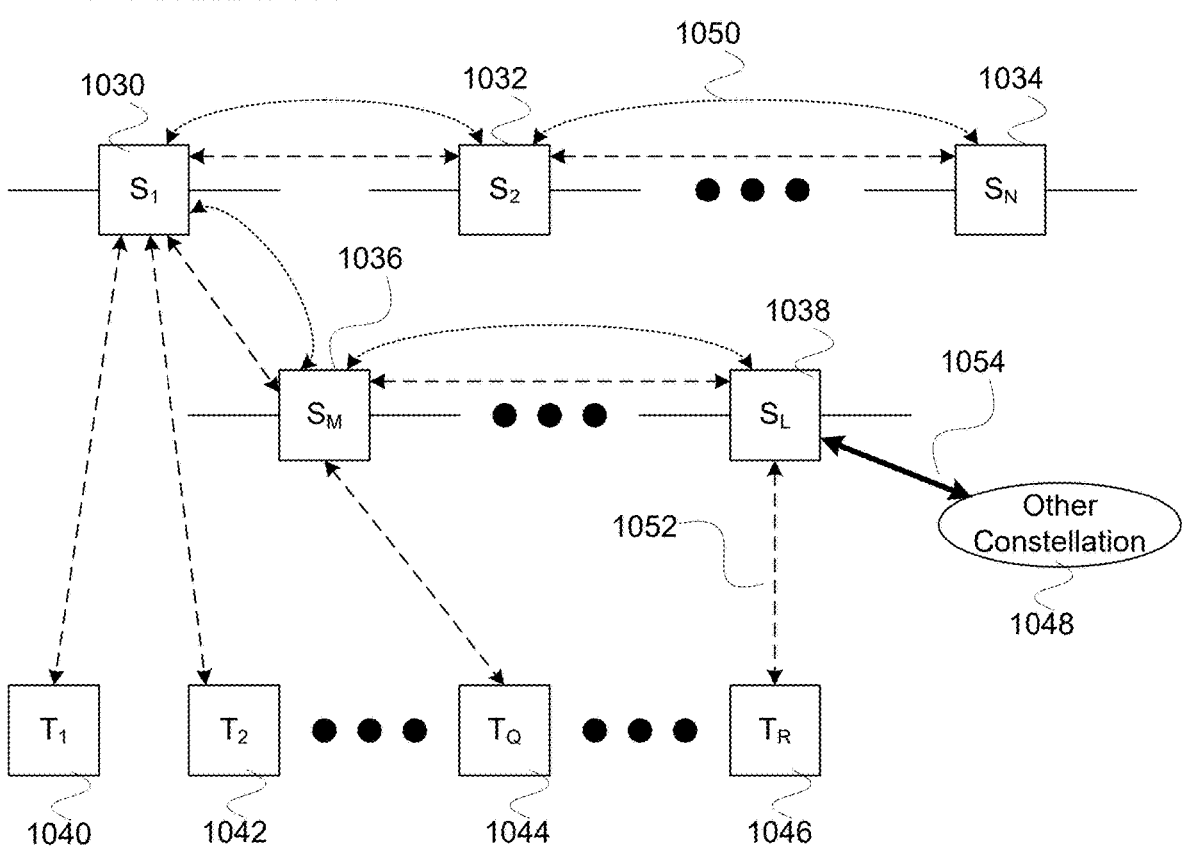
FIG. 10D is a diagram illustrating an embodiment of a constellation of satellites.

FIG. 10D is a diagram illustrating an embodiment of a constellation of satellites. In some embodiments, the satellites of FIG. 10 (e.g., satellite $(S_1)$ 1030, satellite $(S_2)$ 1032, satellite $(S_N)$ 1034, satellite $(S_M)$ 1036, satellite $(S_L)$ 1038, etc.) are analogous to satellite 100, 200, 310, 410, of FIGS. 1, 2, 3, and 4, respectively. In the example shown, the satellite network comprises satellite $(S_1)$ 1030, satellite $(S_2)$ 1032, satellite $(S_N)$ 1034, satellite $(S_M)$ 1036, satellite $(S_L)$ 1038 and terminal $(T_1)$ 1040, terminal $(T_2)$ 1042, terminal $(T_Q)$ 1044, and terminal $(T_R)$ 1046. Satellite $(S_1)$ 1030, satellite $(S_2)$ 1032, and satellite $(S_N)$ 1034, are in one plane/in one shell (e.g., analogous to shell 502 of FIG. 5) and satellite $(S_M)$ 1036 and satellite $(S_L)$ 1038 are in another plane/other shell. There is a connection (e.g., connection 1054) to other constellation 1048 from the constellation of satellites. Data connection 1052 is shown between terminal $(T_R)$ 1046 and satellite $(S_L)$ 1038, and there are other data connections shown between satellite $(S_M)$ 1036 and satellite $(S_L)$ 1038, between satellite $(S_M)$ 1036 and satellite $(S_1)$ 1030, between satellite $(S_1)$ 1030 and satellite $(S_2)$ 1032, between satellite $(S_2)$ 1032 and satellite $(S_N)$ 1034, between satellite $(S_M)$ 1036 and terminal $(T_Q)$ 1044, between terminal $(T_2)$ 1042 and satellite $(S_1)$ 1030, and between terminal $(T_1)$ 1040 and satellite $(S_1)$ 1030. There are timing synch connections shown between satellite $(S_1)$ 1030 and satellite $(S_2)$ 1032, satellite $(S_2)$ 1032 and satellite $(S_N)$ 1034 (e.g., link 1050), satellite $(S_1)$ 1030 and satellite $(S_M)$ 1036, and satellite $(S_M)$ 1036 and satellite $(S_L)$ 1038.

In some embodiments, the constellation of FIG. 10 comprises aircraft nodes in addition to or instead of satellites.

Figure 11A:
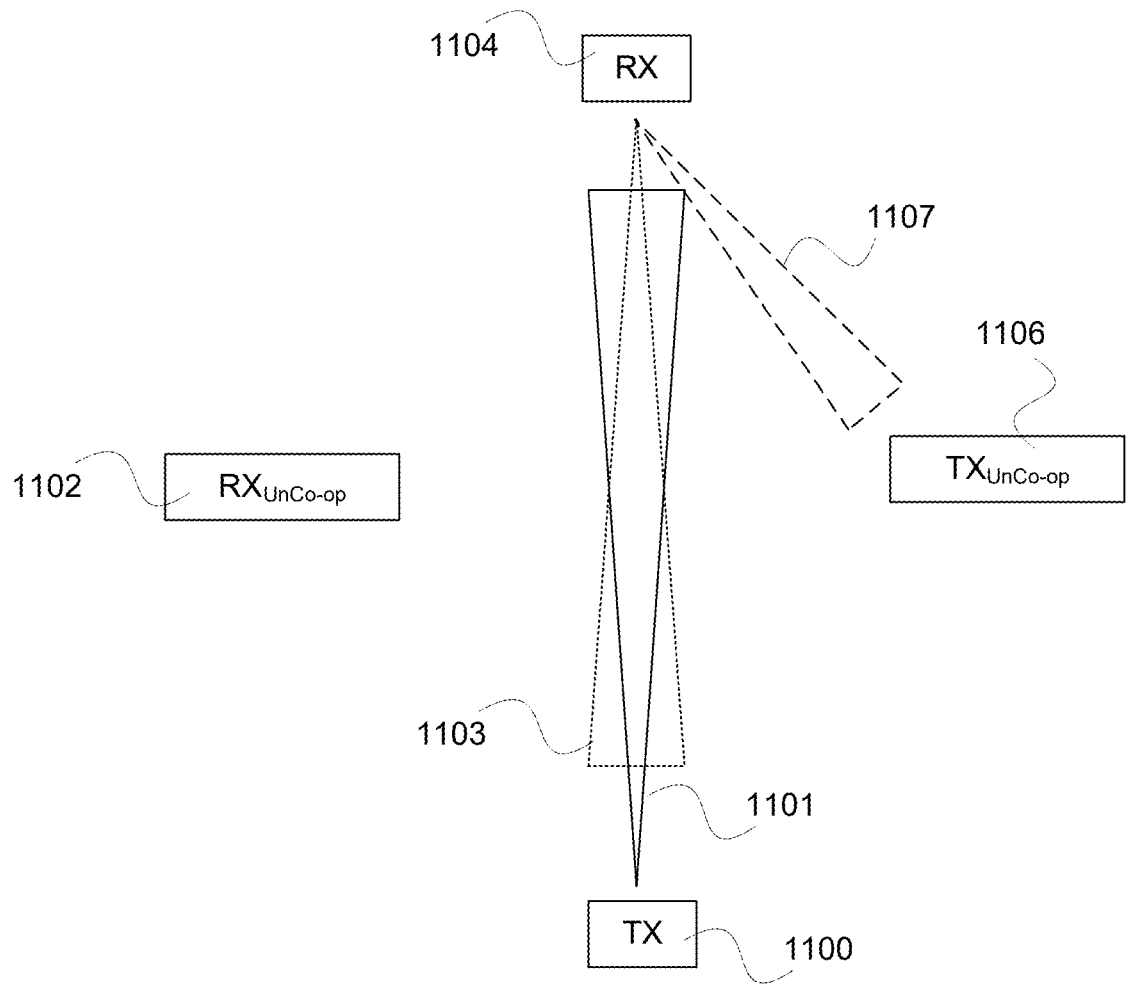
FIG. 11A is a diagram illustrating an embodiment of a system for antenna nulling.

FIG. 11A is a diagram illustrating an embodiment of a system for antenna nulling. In some embodiments, the communication system with transmitter 1100 and receiver 1104 comprises the satellite communication system of FIGS. 2, 3, 4, etc., with the transmitter being either the satellite, aircraft, or the terminal and the receiver being either the terminal, the aircraft, or the satellite, respectively. In the example shown, coexistence of transmitter 1100 with transmission antenna beam 1101 and receiver 1104 with receive antenna beam 1103 with non-cooperative transmitter 1106 can be achieved by the setting of the antenna array parameters (e.g., weights and phases of each of the receiving elements of an antenna array) of the receiving antenna of receiver 1104 to create a null (e.g., null cone 1107) in the direction of the interfering transmitter (e.g., non-cooperative transmitter 1106 communicating with non-cooperating receiver 1102) that may create interference. This nulling of the interfering signal exploits the large number of antenna elements that have sufficient flexibility to maintain tight angular tolerances for angular division duplexing (ADD) while providing >20 dB of interference rejection for 1 or more angles (e.g., those angles associated with interfering transmitters).

In some embodiments, a terminal, aircraft, or a satellite or control system such as a software-defined network has a stored database of locations of other system terminals and other system satellites and/or an understanding of the carrier frequency used for transmission. This location, frequency information, and/or other data such as topological information can be used to calculate the probability of potential interference of a transmitted signal (e.g., is within a distance that the transmitted signal at its frequency will interfere with a system receiver). A determination can be made as to whether an other system terminal or an other system satellite would generate potential interference to the system's terminal, aircraft, or satellite (e.g., that the other system terminal or satellite transmitter is within a threshold distance of the system receiver or is close enough transmitting the frequency towards the system receiver to cause interference). In response to the other system's device generating potential interference (e.g., being within the distance to cause interference at the frequency), indicating to the antenna to create a null (e.g., a receiving null) to reduce interference between the other system and the system's terminal or satellite. In some embodiments, a terminal, aircraft, or a satellite has a detector for transmissions from other system terminals and other system satellites and an understanding of the carrier frequency used for reception. This detection of an other system and direction that the other system has from the system can be used to calculate potential interference of received signal from the other system. A determination can also be made as to whether an other system terminal or an other system satellite is potentially interfering with the system's terminal, aircraft, or satellite. In response to the other system's device being potentially interfering, the antenna may be configured to create a null (e.g., a receiving null) to reduce interference between the other system and the system's terminal, aircraft, or satellite. In some embodiments, a combination of detection and using a database of stored location information are used to determine whether or not to create a null (e.g., a receiving null) and where or which direction to create a null.

Figure 11B:
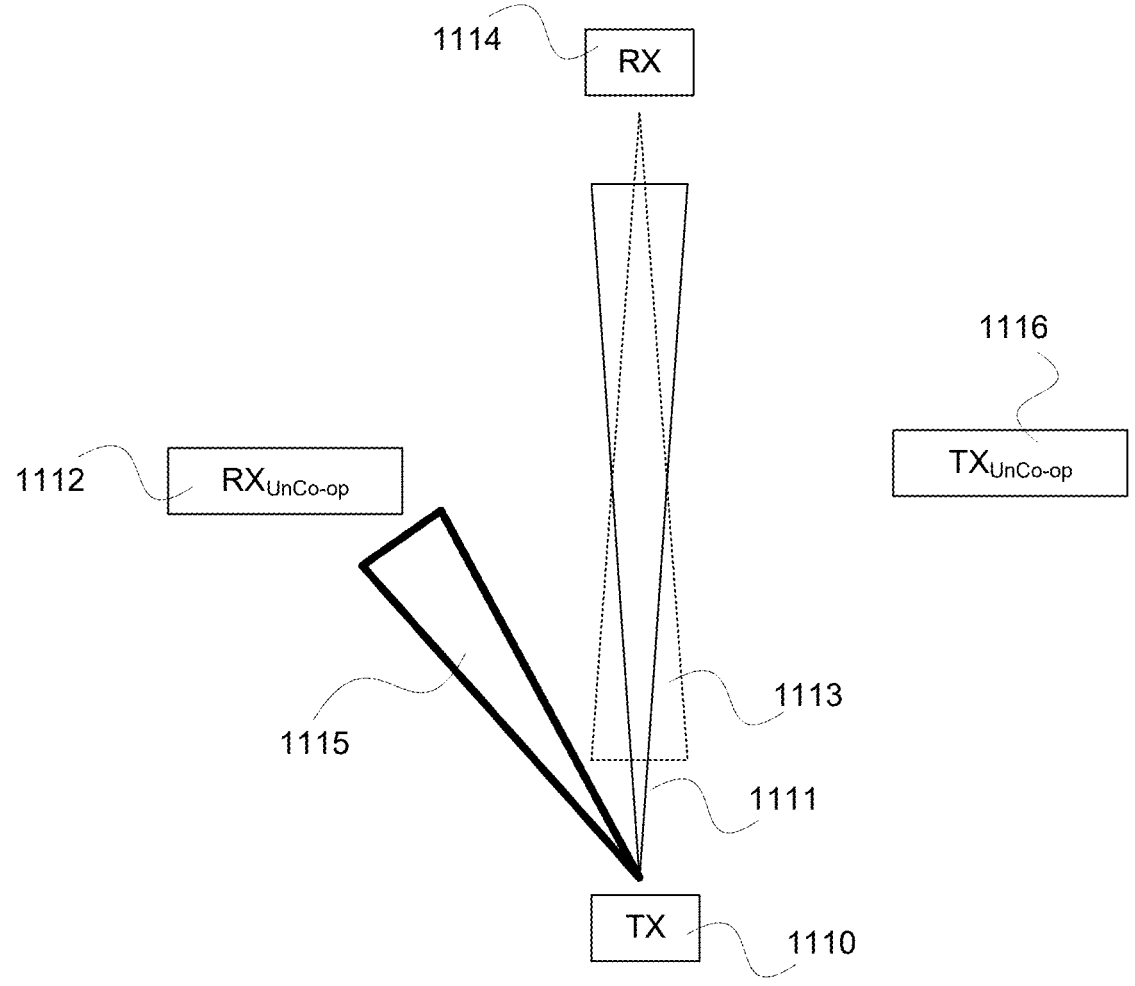
FIG. 11B is a diagram illustrating an embodiment of a system for antenna nulling.

FIG. 11B is a diagram illustrating an embodiment of a system for antenna nulling. In some embodiments, the communication system with transmitter 1110 and receiver 1114 comprises the satellite communication system of FIGS. 2, 3, 4, etc., with the transmitter being either the satellite, aircraft, or the terminal and the receiver being either the terminal, aircraft, or the satellite, respectively. In the example shown, coexistence of transmitter 1110 with transmission antenna beam 1111 and receiver 1114 with receive antenna beam 1113 with non-cooperative receivers (e.g., non-cooperative receiver 1112) can be achieved by the setting of the transmit array parameters (e.g., weights and phases of each of the transmitting elements) of the transmitter to nullform (e.g., null cone 1115) in the direction of non-cooperative receiver 1112 (e.g., a victim receiver) that may be interfered by the transmission of transmitter 1110. This nulling of the transmission signal exploits the large number of elements with sufficient flexibility to maintain tight angular tolerances for ADD while providing >20 dB less of signal power at 1 or more angles (e.g., those angles associated with receivers that the system does not want to deliver any power to).

In some embodiments, a terminal, a satellite, an aircraft, or control systems such as a software defined network has a stored database of locations of other system terminals and other system satellites or an other terrestrial system (e.g., fixed data terminals, mobile bases stations, possible mobile endpoint devices, etc.) and an understanding of the carrier frequency used for transmission and/or reception. This location and frequency information and/or other data such as topological information can be used to calculate a probability of potential interference of a received signal from the system. A determination can be made as to whether an other system terminal or an other system satellite would have a high probability of potential interference from the transmissions of the system's terminal, aircraft, or satellite. In response to the other system's device being subject to potential interference, the antenna may be configured to create a null (e.g., a transmitting null) to reduce interference between the system and the other system's terminal, aircraft, or satellite. In some embodiments, a terminal, aircraft, or a satellite has a detector for transmissions from other system terminals and other system satellites and/or an understanding of the carrier frequency used for reception. This detection of transmissions from an other system and direction that the other system has from the system can be used to calculate potential interference of a transmitted signal from the system. A determination can be made as to whether an other system terminal or an other system satellite is potentially interfered with by the system's terminal, aircraft, or satellite. In response to the system's device being potentially interfering, indicating to the antenna to create a null (e.g., a transmitting null) to reduce interference to the other system from the system's terminal or satellite. In some embodiments, a combination of detection and using a database of stored location information are used to determine whether or not to create a null (e.g., a transmitting null) and where or which direction to create a null.

In some embodiments, coexistence with non-cooperative receivers can be achieved through near-field operations. Large apertures create a highly variable phaser front that is in close proximity with a non-cooperative receiver that incorporates gain through a reflector or array. The lack of a planar phase front reduces the gain of the aperture and thus reduces the signal levels for the transmitter received by the non-cooperative receiver. The far field begins at 2D^2/lambda so for D of 0.5 m and lambda of 0.01 m, the far field begins at 50 m. Therefore, the near-field effect can be exploited to enable close proximity. For example, a 40 dBi antenna for an non-cooperative receiver would only have an effective 20 dB gain in the nearfield further enhancing coexistence.

In some embodiments, coexistence can be provided by overlaying ADD capabilities with frequency division duplexing (FDD) in which spectrum that is not co-channel with the non-cooperative system (receiver) can be used. Two mechanisms can be used: proactive and reactive. The proactive mechanism is the case when the location and band of the noncooperative systems is known. The transmitter in this case exploits the narrow beamwidths and the use of alternative spectrum either via alternate bands or via notching the spectrum used by the noncooperative receiver for the area requiring coexistence. The reactive mechanism is the case when the location is unknown but both the uplink and downlink of the noncooperative communication system is known. The system, using high frequency signals, detects either side of the transmission (uplink or downlink) and then employs the techniques described in the proactive approach to move away from the frequency that would generate co-channel interference.

Figure 12A:
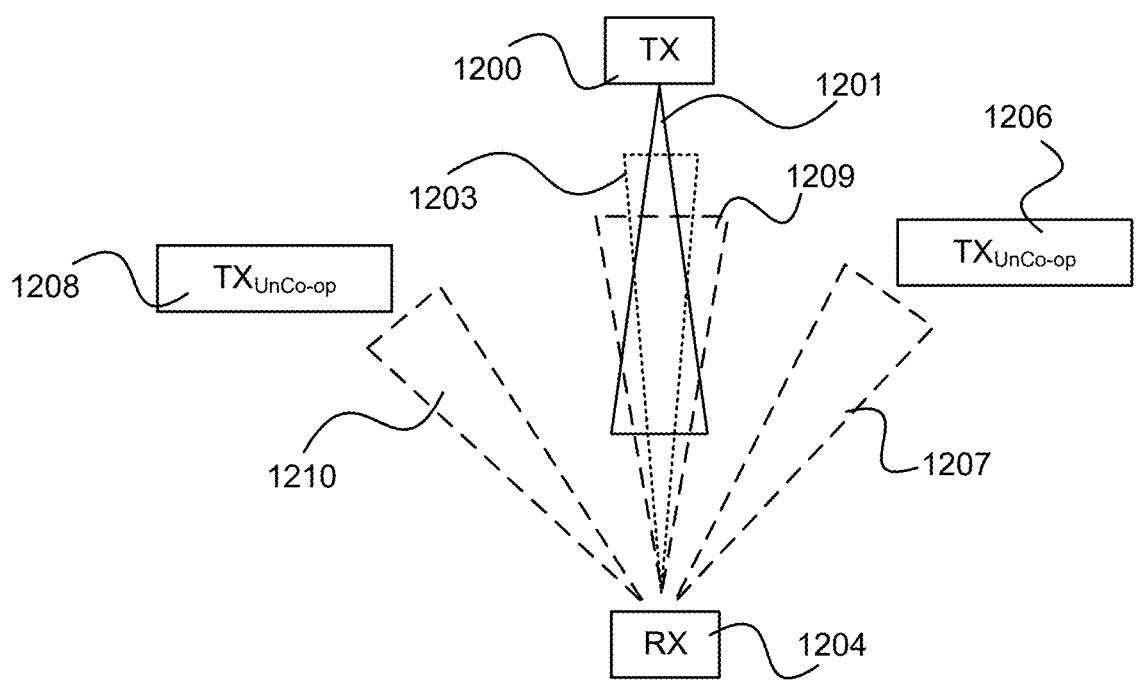
FIG. 12A is a diagram illustrating an embodiment of a system for antenna nulling including multiple null cones.

FIG. 12A is a diagram illustrating an embodiment of a system for antenna nulling including multiple null cones. The system for antenna nulling includes detection of signal 1201 from transmitter 1200 and signals from non-cooperative transmitter 1206 and non-cooperative transmitter 1208. In some embodiments, the communication system with transmitter 1200 and receiver 1204 comprises the satellite communication system of FIGS. 2, 3, 4, etc., with the transmitter being either the satellite, aircraft, or the terminal and the receiver being either the terminal, the aircraft, or the satellite, respectively. Coexistence of transmitter 1200 with transmission antenna beam carrying signal 1201 and receiver 1204 with receive antenna beam 1203 with non-cooperative transmitter 1206 and non-cooperative transmitter 1208 can be achieved by the setting of the antenna array parameters (e.g., weights and phases of each of the receiving elements of an antenna array) of the receiving antenna of receiver 1204 to create a null (e.g., null cone 1207) in the direction of the interfering transmitter (e.g., non-cooperative transmitter 1206). This nulling of interfering signals exploits the large number of antenna elements that have sufficient flexibility to maintain tight angular tolerances for ADD while providing >20 dB of interference rejection for 1 or more angles (e.g., those angles associated with interfering transmitters).

In the embodiment shown, receiver 1204 performs a scan of received signals. The scan of received signals includes signal 1201 and interfering signals from non-cooperative transmitter 1206 and non-cooperative transmitter 1208. Based on the scan of received signals, receiver 1204 determines the direction of the interfering signals. In some embodiments, receiver 1204 generates a spatial null in the direction of a set of strongest signals. For example, receiver 1204 sorts the received signals based on signal strength and generate spatial nulls in the direction of the three strongest interfering signals.

In an example, receiver 1204 determines that a signal in the direction of non-cooperative transmitter 1206 is stronger than other signals (e.g., in the directions of transmitter 1200 and non-cooperative transmitter 1208 or in other directions). In some embodiments, receiver 1204 then iteratively generates spatial nulls and determines whether signal strength of signal 1201, carrying PNT data, improved in response to generating the spatial null. Receiver 1204 first generates null cone 1207. Signal strength of signal 1201, carrying PNT data, improves. In response to the signal strength of signal 1201 improving, null cone 1207 is maintained and the signal in the direction of non-cooperative transmitter 1206 is determined to be an interfering signal.

When receiver 1204 generates null cone 1209, signal strength of signal 1201 is reduced. In response to the signal strength of signal 1201 not improving, null cone 1209 is removed. The signal in the direction of transmitter 1200 (i.e., signal 1201) is determined to be carrying PNT data. In some embodiments, receive antenna beam 1203 is created in response to the determination. Signal 1201 is also tracked (e.g., as the position of transmitter 1200 changes relative to receiver 1204, based on the PNT data carried by signal 1201) in some embodiments.

When receiver 1204 generates null cone 1210, signal strength of signal 1201 is increased. In response to the signal strength of signal 1201 improving, null cone 1210 is maintained. The signal in the direction of non-cooperative transmitter 1208 is determined to be an interfering signal.

In some embodiments, a combination of detection (e.g., in the manner described above) and a database of stored location information (e.g., in a form analogous to the system of FIG. 11A) are used to determine whether or not to create a null (e.g., a receiving null) and where or which direction to create a null.

Figure 12B:
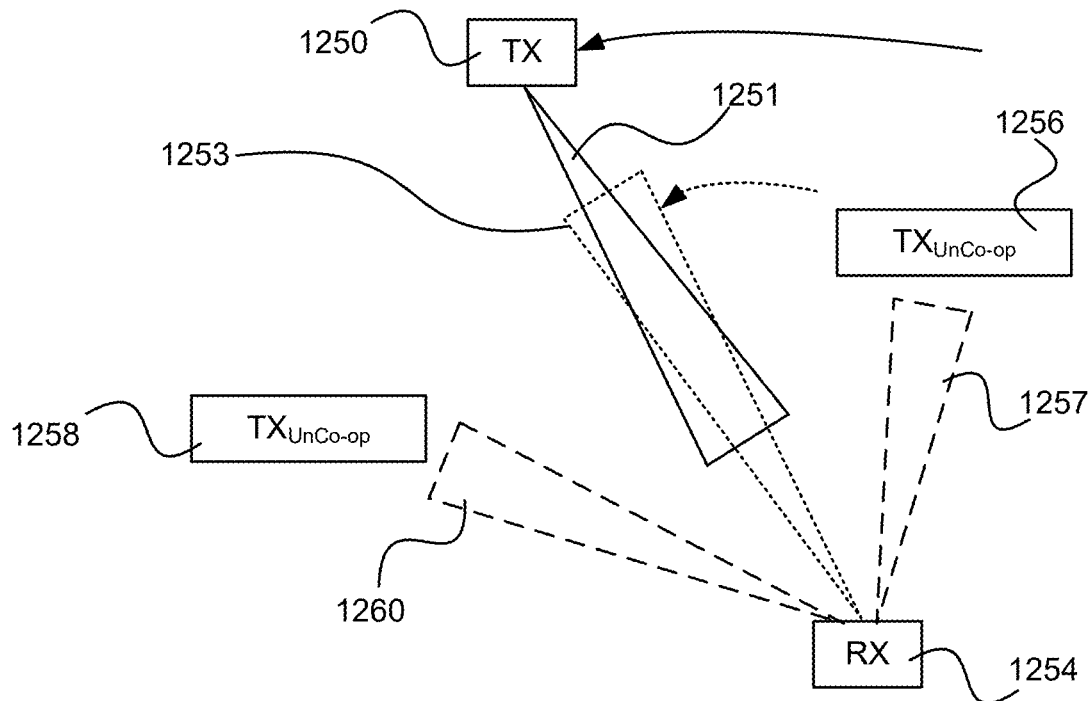
FIG. 12B is a diagram illustrating an embodiment of a system for antenna nulling including multiple null cones.

FIG. 12B is a diagram illustrating an embodiment of a system for antenna nulling including multiple null cones. The system for antenna nulling includes detection and tracking of signals (e.g., signal 1251) from transmitter 1250, non-cooperative transmitter 1206 and non-cooperative transmitter 1208. In some embodiments, the communication system with transmitter 1250 and receiver 1254 comprises the satellite communication system of FIGS. 2, 3, 4, etc., with the transmitter being either the satellite, aircraft, or the terminal and the receiver being either the terminal, the aircraft, or the satellite, respectively. Coexistence of transmitter 1250 with transmission antenna beam carrying signal 1251 and receiver 1254 with receive antenna beam 1253 with non-cooperative transmitter 1256 and non-cooperative transmitter 1258 can be achieved by the setting of the antenna array parameters (e.g., weights and phases of each of the receiving elements of an antenna array) of the receiving antenna of receiver 1254 to create a null (e.g., null cone 1257) in the direction of the interfering transmitter (e.g., non-cooperative transmitter 1256). This nulling of interfering signals exploits the large number of antenna elements that have sufficient flexibility to maintain tight angular tolerances for ADD while providing >20 dB of interference rejection for 1 or more angles (e.g., those angles associated with interfering transmitters).

In the embodiment shown, receiver 1254 is tracking signal 1251. As the position of transmitter 1250 changes relative to receiver 1254, based on PNT data carried by signal 1251, receiver 1254 directs receive antenna beam 1253 toward transmitter 1250, indicated in FIG. 12B by arrows (not labeled). Receiver 1254 also performs a scan of received signals. The scan of received signals includes signal 1251 and interfering signals from non-cooperative transmitter 1256 and non-cooperative transmitter 1258. Based on the scan of received signals, receiver 1254 determines the direction of the interfering signals. In some embodiments, the signals are iteratively tested via spatial nulling in the manner described in FIG. 12A. In some embodiments, based on the tracking, a null in the direction of signal 1251 is not tested. In some embodiments, (e.g., when angles of interfering signals may be predicted), interfering signals are tracked in a similar manner as signal 1251, and nulls are angled in the direction of the interfering signals in a manner analogous to angling receive antenna beam 1253. In various embodiments, combinations of detection, tracking, and/or a database of stored location information (e.g., in a form analogous to the system of FIG. 11A) are used to determine whether or not to create a null (e.g., a receiving null) and where or which direction to create a null.

Figure 13:
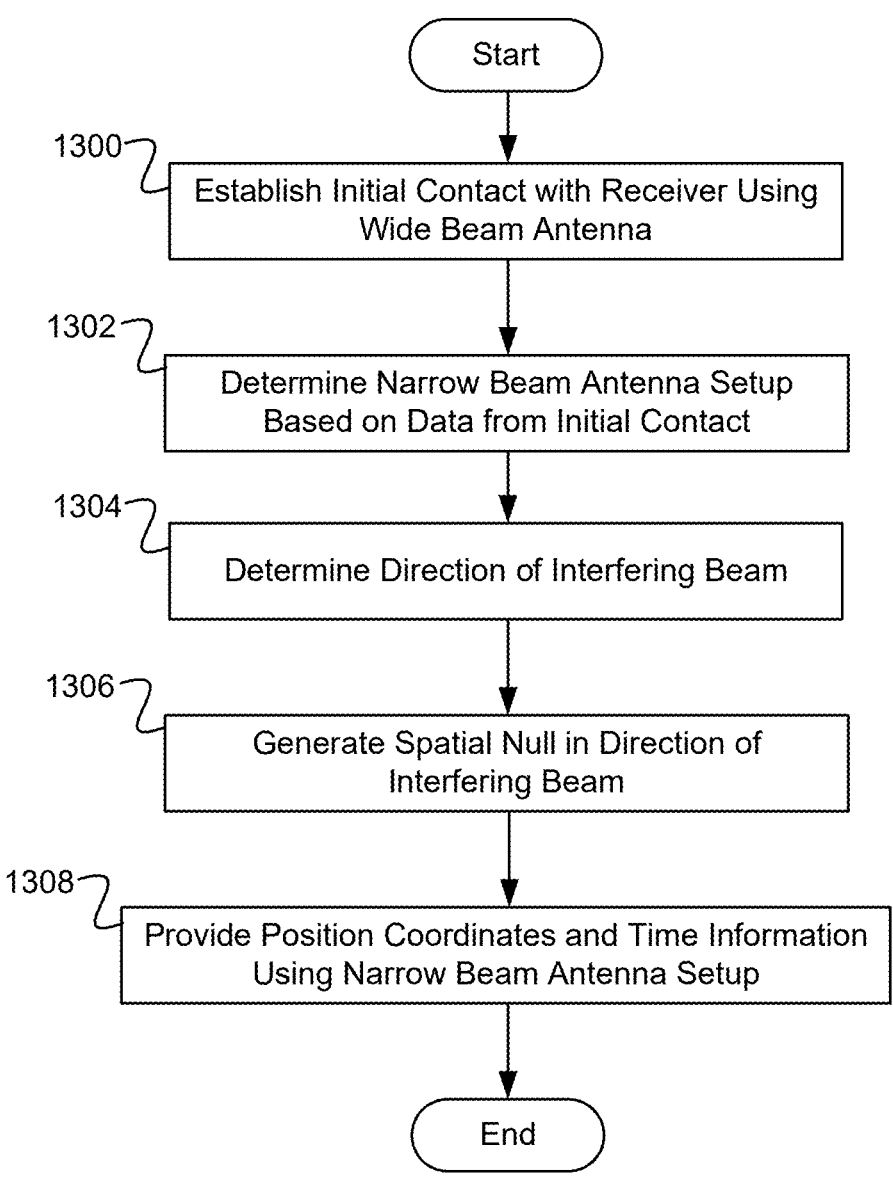
FIG. 13 is a flow diagram illustrating an embodiment of a process for communicating with a PNT receiver.

FIG. 13 is a flow diagram illustrating an embodiment of a process for communicating with a PNT receiver. In some embodiments, the process of FIG. 13 is implemented by satellite 100 of FIG. 1, satellite 200 of FIG. 2, satellite 310 of FIG. 3, satellite 410 of FIG. 4, satellite 800 of FIG. 8, or any other appropriate satellite or aircraft. In 1300, initial contact is established with a receiver (e.g., receiver 208 of FIG. 2, user 308 of FIG. 3, terminal 416 of FIG. 4, receiver 806 of FIG. 8, etc.) using a wide beam antenna setup. In some embodiments, establishing initial contact includes transmitting satellite data for a plurality of satellites. For example, a satellite implementing the process of FIG. 13 transmits satellite data for itself and other satellites in its shell or constellation. In various embodiments, the satellite data includes ephemeris data, satellite almanac data, first predictive satellite motion models, second predictive satellite motion models (e.g., for precise orbit determination which include dynamic or kinematic parameters that can be integrated with high precision, multi-GNSS data processing software), cryptographic encoding information, or any other appropriate information. In an example, the satellite data includes portions of a satellite motion model, a satellite almanac, and updates to cryptographic keys (e.g., for particular groups of users). In some embodiments, the wide beam antenna setup is configured to transmit signals at an angle at least 36 degrees above a horizon plane (e.g., 40, 45, 54, 60, or any other appropriate number of degrees above the horizontal plane). In some embodiments, the satellite data is transmitted using a signal with a frequency of at least 25 GHZ.

In 1302, a narrow beam antenna setup is determined based on data from the initial contact. In various embodiments, the data includes satellite data (as described above), handshake data, user data, approximate location data (e.g., determined by the receiver based on the initial contact), encryption data, interference data (e.g., weather data, obstruction data, data relating to interference from an external system, etc.) or any other appropriate data. In some embodiments, the narrow beam antenna setup is one of a plurality of narrow beam antenna setups (e.g., for different receivers, for multiple channels toward a shared receiver, for multiple areas including poor weather or obstructions, etc.). In some embodiments, the narrow beam antenna setup has a beam angle width of less than 40 degrees (e.g., 1, 2, 3, 4, 5, 10, 15, 20, 25, 30, 35, or any other appropriate number of degrees).

In 1304, the direction of an interfering beam is determined. In some embodiments, the direction of the interfering beam is received from a database. In some embodiments, the direction of the interfering beam is determined based on a scan of received signals. In various embodiments, combinations of detection, tracking, and/or a database of stored location information are used to determine the direction of the interfering beam.

In 1306, a spatial null is generated in the direction of the interfering beam. In some embodiments, the spatial null is one of a plurality of spatial nulls. For example, a plurality of spatial nulls are generated in the direction of a set of strongest interfering beams. In some embodiments, determining the direction of the interfering beam includes generating a spatial null in the direction of a received signal of a scan of received signals and determining whether signal strength of communications with the receiver improved in response to generating the spatial null.

In 1308, position coordinates and time information (e.g., PNT data) is provided to the receiver using the narrow beam antenna setup of 1302. In some embodiments, the PNT data is transmitted using a signal with a frequency of at least 25 GHZ.

Figure 14:
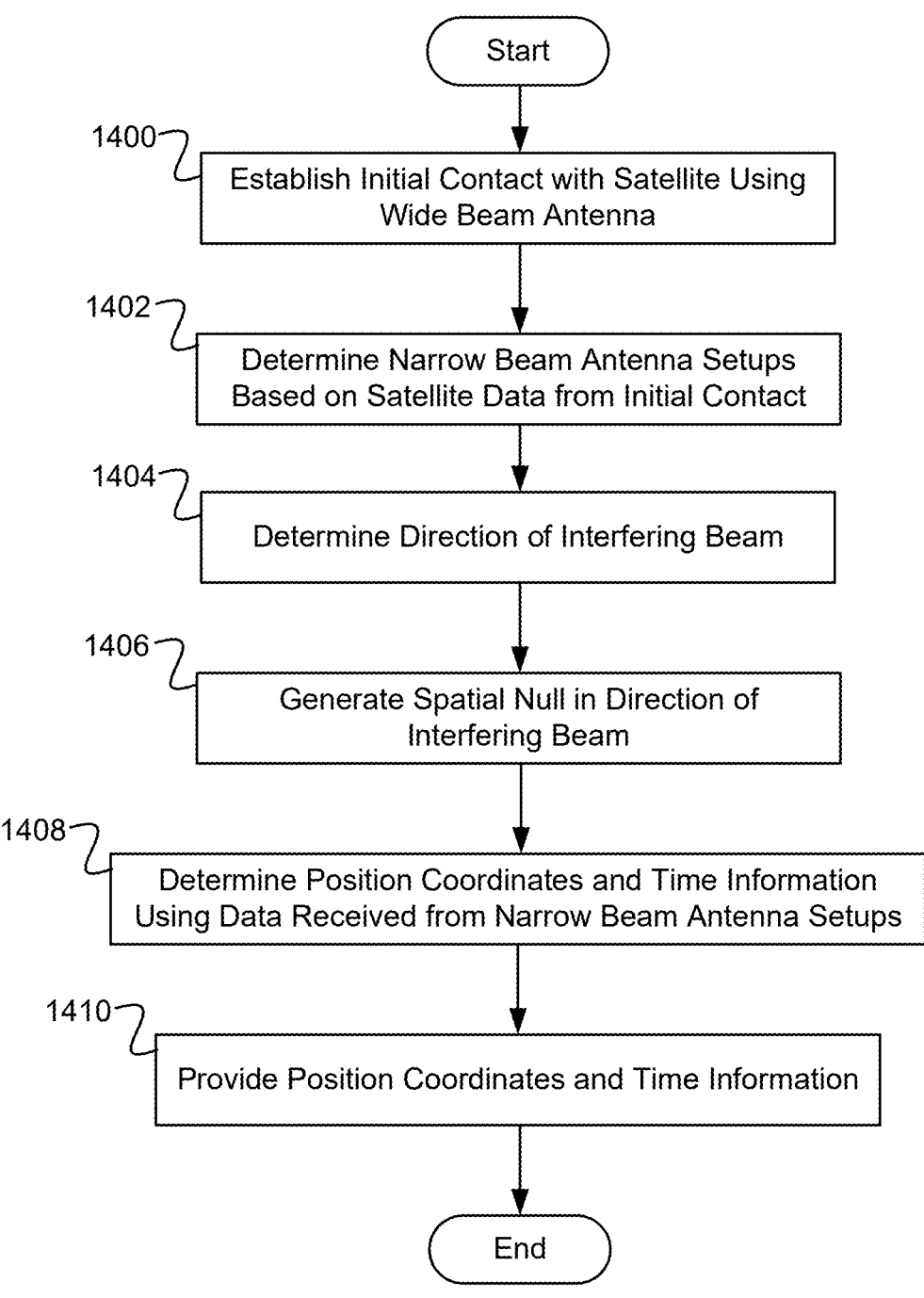
FIG. 14 is a flow diagram illustrating an embodiment of a process for communicating with a satellite PNT system.

FIG. 14 is a flow diagram illustrating an embodiment of a process for communicating with a satellite PNT system. In some embodiments, the process of FIG. 14 is implemented by receiver 208 of FIG. 2, terminal 416 of FIG. 4, receiver 806 of FIG. 8, or any other appropriate receiver or terminal system. In 1300, initial contact is established with a satellite or aircraft (e.g., satellite 100 of FIG. 1, satellite 200 of FIG. 2, satellite 310 of FIG. 3, satellite 410 of FIG. 4, satellite 800 of FIG. 8, etc.) using a wide beam antenna setup. In some embodiments, establishing initial contact includes receiving satellite data. In some embodiments, the satellite data is for a plurality of satellites. For example, a receiver implementing the process of FIG. 14 receives satellite data for the satellite or aircraft with which initial contact is established as well as satellite data for other satellites in its shell or constellation. In various embodiments, the satellite data includes ephemeris data, almanac data, satellite motion model data, cryptographic encoding information, or any other appropriate information. For example, a receiver receives satellite data including portions of a satellite motion model, a satellite almanac, and updates to cryptographic keys (e.g., for particular groups of users). In some embodiments, establishing the initial contact includes transmission of data, such as handshake data, user data, approximate location data (e.g., determined based on the initial contact), encryption data, weather data, obstruction data, etc. In some embodiments, the wide beam antenna setup is configured to receive signals at an angle at least minimum number of degrees above a horizon plane (e.g., a 36, 45, 54 degree minimum or any other appropriate number of degrees). In some embodiments, the satellite data is received from a signal with a frequency of at least 25 GHZ.

In 1402, a plurality of narrow beam antenna setups is determined based on satellite data from the initial contact. In various embodiments, the narrow beam antenna setups correspond to different satellites, correspond to a shared satellite (e.g., as it moves relative to the system implementing the process of FIG. 14), or are configured in any other appropriate manner. In some embodiments, the plurality of narrow beam antenna setups includes at least four narrow beam antenna setups. In some embodiments, the narrow beam antenna setups have a beam angle width of less than 40 degrees (e.g., a 35, 30, 25, 20, 15, 10, 5, 4, 3, 2, 1, degree angle width or any other appropriate angle width).

In 1404, the direction of an interfering beam is determined. In some embodiments, the direction of the interfering beam is received from a database. In some embodiments, the direction of the interfering beam is determined based on a scan of received signals. In various embodiments, combinations of detection, tracking, and/or a database of stored location information are used to determine the direction of the interfering beam.

In 1406, a spatial null is generated in the direction of the interfering beam. The spatial null may be one of a plurality of spatial nulls. For example, a plurality of spatial nulls may be generated in the direction of a set of strongest interfering beams. In some embodiments, determining the direction of the interfering beam includes generating a spatial null in the direction of a received signal of a scan of received signals and determining whether signal strength of communications with the satellite or aircraft improved in response to generating the spatial null.

In 1408, position coordinates and time information are determined using data received from the plurality of narrow beam antenna setups of 1402. In some embodiments, the data is received from a signal with a frequency of at least 25 GHz. In various embodiments, the data includes PNT data, ranging accuracy of the PNT data, ranging or pseudo-ranging information (e.g., data to allow the system implementing the process of FIG. 14 to improve, update or maintain the plurality of narrow beam antenna setups), or any other appropriate information. For example, based on the data received from the plurality of narrow beam antenna setups, relative distances from a plurality of transmitters toward which the plurality of narrow beam antenna setups are directed are determined, and using the relative distances and angles of the plurality of narrow beam antenna setups, the position coordinates and time information are determined.

In 1410, the position coordinates and time information are provided. In some embodiments, the position coordinates and time information are provided to a user (e.g., user 309 of FIG. 3). In some embodiments, the position coordinates and time information are provided via a user interface. In some embodiments, the position coordinates and time information are modified based on a user group or other property of the user (e.g., lowered in accuracy for a user group, provided in response to a cryptographic key associated with a user group, etc.).

Figure 15:
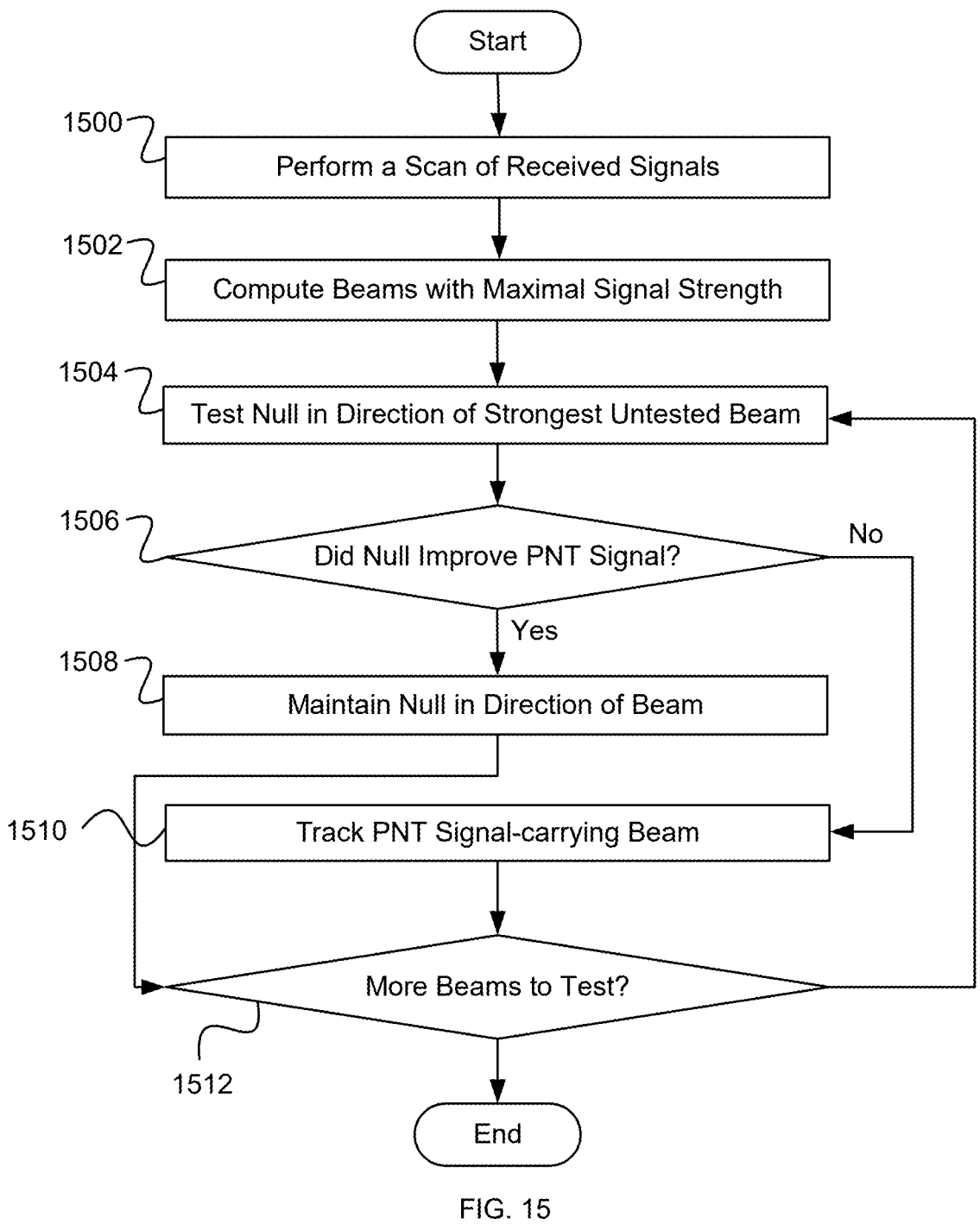
FIG. 15 is a flow diagram illustrating an embodiment of a process for detection of interfering signals.

FIG. 15 is a flow diagram illustrating an embodiment of a process for detection of interfering signals. In some embodiments, the process of FIG. 15 is implemented by a receiver (e.g., receiver 1204 of FIG. 12A) or a satellite system (e.g., transmitter 1110 of FIG. 11B). In some embodiments, the process of FIG. 15 implements 1304 and/or 1306 of FIG. 13. In some embodiments, the process of FIG. 15 implements 1404 and/or 1406 of FIG. 14.

In 1500, a scan of received signals is performed. In some embodiments, the scan of received signals includes cooperative signals (e.g., PNT signals) and/or interfering signals.

In 1502, beams with maximal signal strength are computed. In some embodiments, the received signals are sorted from strongest to weakest. In some embodiments, a fixed number of beams (e.g., the ten strongest received signals) are computed.

In 1504, a spatial null is tested in the direction of the strongest untested beam. In some embodiments, beam strengths are recomputed and/or received signals are rescanned in response to the spatial null being tested. In various embodiments, signals are despread, demodulated, or processed in any other appropriate manner to identify PNT data within the signals.

In 1506, it is determined whether the spatial null improved the strength of a signal carrying PNT data. In response to the signal strength of the signal carrying PNT data improving, control passes to 1508. In 1508, the spatial null is maintained in the direction of the (now tested) beam. In response to the signal strength of the signal carrying PNT data not improving, control passes to 1510. In response to the signal strength not improving, it is assumed that the spatial null is directed at a beam carrying PNT data. In 1510, the PNT signal-carrying beam is tracked. For example, as the position of the transmitter of the beam changes, based on the PNT data carried by the beam, the position of the transmitter is estimated.

In 1512, it is determined whether there are more beams to test. In some embodiments, a fixed number of beams are nulled (e.g., the three strongest interfering beams). In response to there being more beams to test, control passes to 1504. In response to there not being more beams to test, the process of FIG. 15 terminates.

Figure 16:
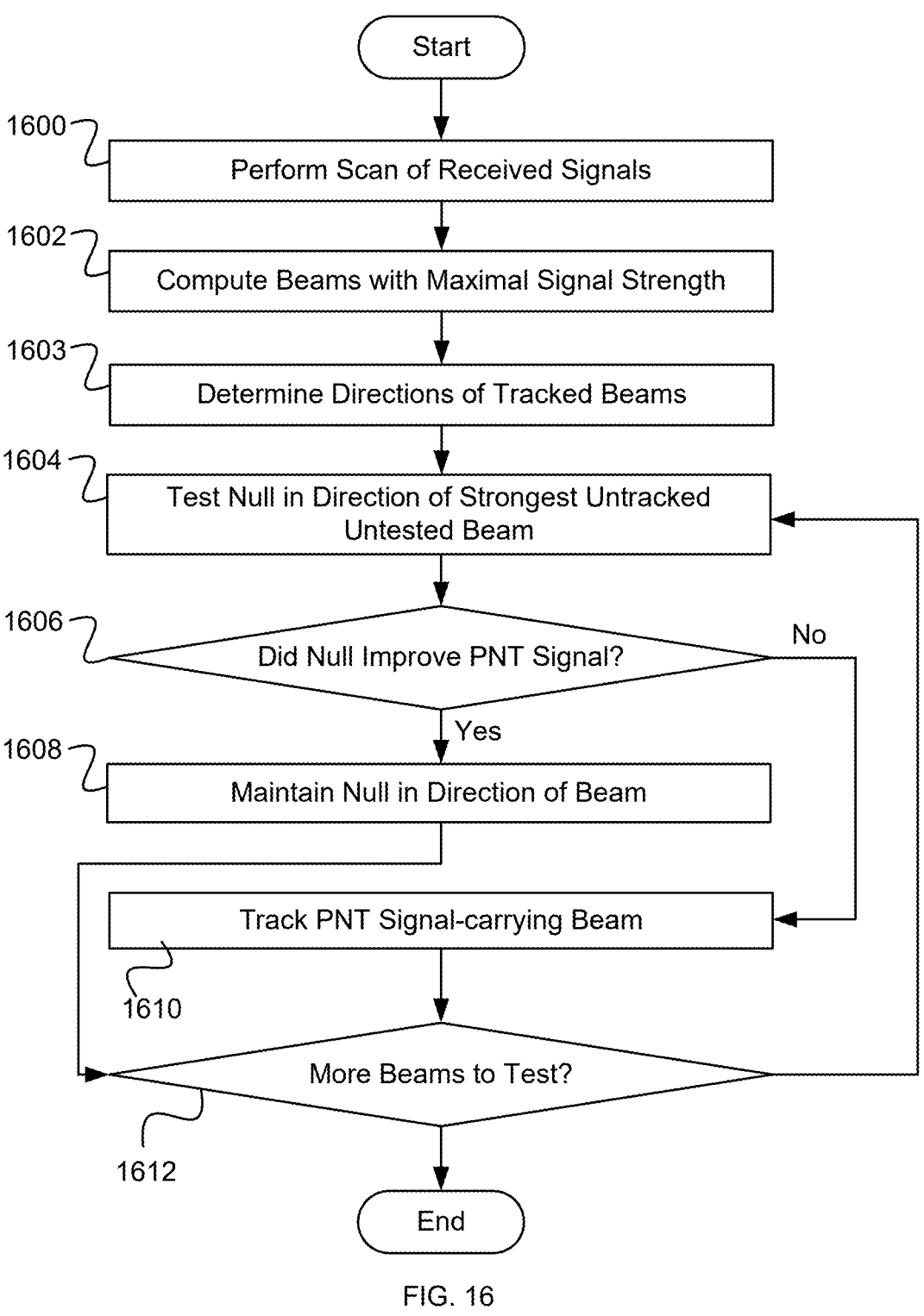
FIG. 16 is a flow diagram illustrating an embodiment of a process for detection of interfering signals including prior tracking of PNT signals.

FIG. 16 is a flow diagram illustrating an embodiment of a process for detection of interfering signals including prior tracking of PNT signals. In some embodiments, the process of FIG. 16 is implemented by a receiver (e.g., receiver 1204 of FIG. 12A) or a satellite system (e.g., transmitter 1110 of FIG. 11B). In some embodiments, the process of FIG. 16 implements 1304 and/or 1306 of FIG. 13. In some embodiments, the process of FIG. 15 implements 1404 and/or 1406 of FIG. 14.

In 1600, a scan of received signals is performed. In some embodiments, the scan of received signals includes cooperative signals (e.g., PNT signals) and/or interfering signals.

In 1602, beams with maximal signal strength are computed. In some embodiments, the received signals are sorted from strongest to weakest. In some embodiments, a fixed number of beams (e.g., the ten strongest received signals) are computed.

In 1603, the directions of tracked beams are computed. In some embodiments, the tracked beams are determined using the process of FIG. 15 (e.g., 1510 of FIG. 15). In some embodiments, PNT data is used to determine the directions of the tracked beams. For example, as the position of the transmitter of the beam changes, based on the PNT data carried by the beam, the position of the transmitter is estimated and the direction of the beam is determined.

In 1604, a spatial null is tested in the direction of the strongest untested and untracked beam. In some embodiments, the tracked beams are known or assumed to carry PNT data. In some embodiments, beam strengths are recomputed and/or received signals are rescanned in response to the spatial null being tested. In various embodiments, signals are despread, demodulated, or processed in any other appropriate manner to identify PNT data within the signals.

In 1606, it is determined whether the spatial null improved the strength of a signal carrying PNT data. In response to the signal strength of the signal carrying PNT data improving, control passes to 1608. In 1608, the spatial null is maintained in the direction of the (now tested) beam. In response to the signal strength of the signal carrying PNT data not improving, control passes to 1610. In response to the signal strength not improving, it is assumed that the spatial null is directed at a beam carrying PNT data. In 1610, the PNT signal-carrying beam is tracked. For example, as the position of the transmitter of the beam changes, based on the PNT data carried by the beam, the position of the transmitter is estimated.

In 1612, it is determined whether there are more beams to test. In some embodiments, a fixed number of beams are nulled (e.g., the three strongest interfering beams). In response to there being more beams to test, control passes to 1604. In response to there not being more beams to test, the process of FIG. 16 terminates.

In some embodiments, (e.g., when angles of interfering beams may be predicted), interfering signals are tracked in a similar manner as cooperative signals, and nulls are directed toward interfering signals in a manner analogous to receive antenna setups being directed toward cooperative signals. In various embodiments, combinations of detection (e.g., in a manner analogous to the process of FIG. 15), tracking, and/or a database of stored location information (e.g., in a form analogous to the system of FIG. 11A) are used in combination to determine whether or not to create a null (e.g., a receiving null) and where or which direction to create a null.

A satellite communication system is disclosed. The satellite system comprises a processor configured to: determine a waveform and a set of data characteristics for transmitting position and time information; and transmit the position and time information.

A receiver system is disclosed. The receiver system comprises a processor configured to determine a waveform and a set of data characteristics for receiving position and time information; and receiving the position and time information.

In some embodiments, a satellite system sends a signal to a receiver system. The signal is sent using a particular waveform and a particular set of data characteristics. The particular waveform and/or the particular set of data characteristics are programmable. In various embodiments, the satellite system and/or the receiver system are configurable using one or more programmable settings that is/are able to select aspects of the communication between the satellite system—for example, a programmable setting selects a chip rate, a code length, a transmission power, a waveform jitter, a polarization state, a spatial availability, a signal accuracy, a signal error characteristics, a cryptographic key, an ECC encoding, an interleaving, or any other aspect of communication. In various such embodiments, the ECC encoding comprises Reed-Solomon codes, convolutional codes, low-density parity-check, or any other appropriate encoding method(s). In some embodiments, the interleaving comprises block time interleavers including matrix blocks. In various embodiments, selecting the spatial availability includes limiting power, limiting beam footprint, or selecting waveform parameters that have not been provided to ground receivers.

In some embodiments, a satellite system sends a signal to a receiver system. The signal is sent using a particular waveform and a particular data characteristic. A first particular waveform and a first particular data characteristic is used to make contact between a satellite and a receiver. After initial contact, information is passed between the satellite system and the receiver system enabling communication between the satellite system and the receiver system using a second particular waveform and a second particular data characteristic. In various embodiments, the satellite system and/or the receiver system are configurable using one or more programmable settings that is/are able to select aspects of the communication between the satellite system—for example, a programmable setting selects a chip rate, a code length, a transmission power, a waveform jitter, a polarization state, a spatial availability, a signal accuracy, a signal error characteristics, a cryptographic key, an ECC encoding, an interleaving, or any other aspect of communication. In various embodiments, selecting the spatial availability includes limiting power, limiting beam footprint, or selecting waveform parameters that have not been provided to ground receivers. In various embodiments, the cryptographic key may use a symmetric or asymmetric encryption method. In some embodiments, the cryptographic key is a pre-stored key. For example, in some embodiments, the cryptographic key is used for AES-256 encryption. In some embodiments, the cryptographic key is a dynamically formed key. For example, in some embodiments, the cryptographic key is used for Diffie-Hellman PKI public-private key encryption.

In some embodiments, the waveform and/or the data characteristic of the set of data characteristics or the waveform and the data characteristic of the set of data characteristics are based at least in part on a user group. In some embodiments, the processor is further configured to establish an initial contact with a receiver system using an other waveform and an other set of data characteristics. In some embodiments, the processor is further configured to establish an initial contact with a satellite system using an other waveform and an other set of data characteristics. In some embodiments, the other waveform or the other set of data characteristics is based at least in part on a user group.

In some embodiments, a particular waveform and a particular data characteristic are associated with one of two communication services: a low data rate (LDR) service or a high data rate (HDR) service. For example, a first waveform corresponds to a LDR service and a second waveform corresponds to a HDR service.

Figure 17:
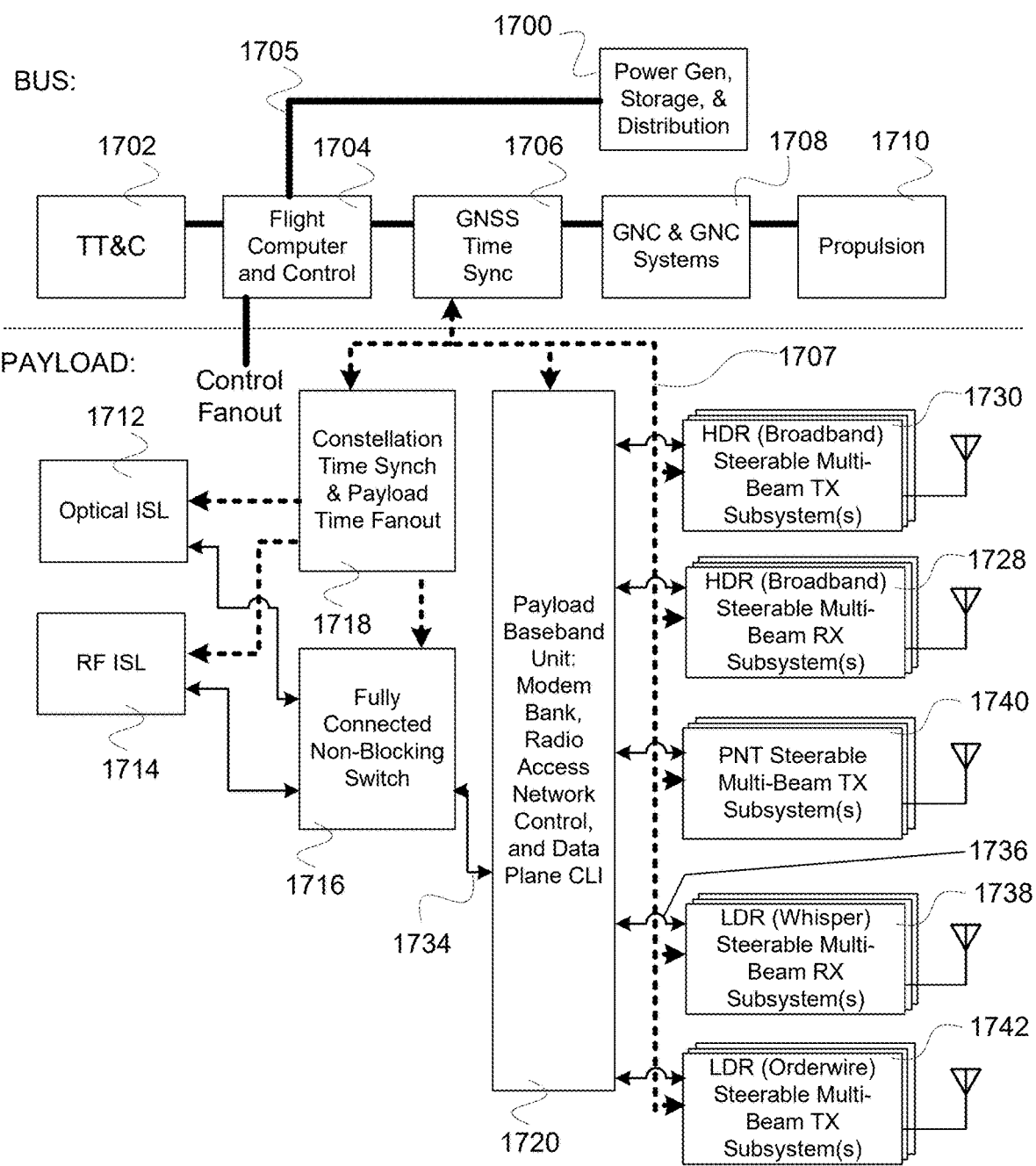
FIG. 17 is a diagram illustrating an embodiment of a satellite of a satellite system.

FIG. 17 is a diagram illustrating an embodiment of a satellite of a satellite system. In some embodiments, the satellite of FIG. 17 is used for satellite 100, 200, 202, 204, 206, 208, 410, 430, 800, and 900 of satellite system of FIGS. 1, 2, 4A, 4B, 8, and 9. In various embodiments, the satellite system comprises a system in a satellite, in an airplane, in an aircraft, in a balloon, in a blimp, or any other appropriate craft. In the example shown, the satellite of FIG. 17 includes a bus section with power generation, storage, and distribution 1700, telemetry, tracking, and control 1702, flight computer and control 1704, Global Navigation Satellite System (GNSS) time sync 1706, Guidance, Navigation, and Control (GNC) and GNC systems 1708, and propulsion 1710. The satellite of FIG. 17 also includes a payload section with optical inter satellite link (ISL) 1712, RF ISL 1714, fully connected non-blocking switch 1716, constellation time synch & payload time fanout 1718, payload baseband unit: modem bank, radio access network control, and data plane command line interface (CLI) 1720, LDR steerable multi-beam RX subsystem(s) 1738, low data rate PNT TX subsystem(s) 1740, LDR steerable multi-beam TX subsystem(s) 1742, HDR steerable multi-beam RX subsystem(s) 1728, and HDR steerable multi-beam TX subsystem(s) 1730.

In some embodiments, the satellite of FIG. 17 includes hardware for operating the satellite. For example, energy is stored and generated by power generation, storage, & distribution 1700, which distributes power to the satellite system. Flight computer and control 1704 provides overall control and coordination of the satellite system including power generation, storage, & distribution 1700. Flight computer and control 1704 is coupled to the other units of the satellite system via a set of connections (e.g., the control fanout). Flight computer and control 1704 is coupled to telemetry, tracking, and control 1702, Global Navigation Satellite System (GNSS) time sync 1706, Guidance, Navigation, and Control (GNC) and GNC systems 1708, and propulsion 1710 for operating the satellite system—for example, these systems relate to establishing and maintaining the satellite position with respect to the earth and other satellites in the constellation of satellites including determining an orbit location, establishing a time reference, operating the propulsion system to adjust location in response to not being at an appropriate location, determining how to adjust the location in response to not being at an appropriate location, and determining when the orbit location is as desired.

In some embodiments, a radio frequency signal is received by antenna(s) coupled to LDR steerable multi-beam RX subsystem(s) 1738. In some embodiments, each of LDR steerable multi-beam RX susbsystem(s) 1738 is coupled to a separate antenna. In some embodiments, a set of LDR steerable multi-beam RX subsystems 1738 are coupled to a single antenna. The radio frequency signal is processed using a LDR steerable multi-beam RX subsystem(s) 1738 to create a raw data stream, wherein the processing includes one or more of: amplifying, filtering, synchronization, correlating, timing, doppler adjusting, de-spreading, de-chirping, and de-hopping. In some embodiments, the raw data stream is passed along path 1736 to Payload Baseband Unit: Modem Bank, Radio Access Network Control, and Data Plane CLI 1720. In various embodiments, Payload Baseband Unit: Modem Bank, Radio Access Network Control, and Data Plane CLI 1720 performs one or more of the following processing steps: deinterleaving, demodulation, decryption, and error correction coding (ECC) decoding to generate a processed data stream.

In various embodiments, the processed data stream comprises one or more of system authentication data, command data, communication data, or any other appropriate data. In some embodiments, processed data is passed along path 1734 to fully connected non-blocking switch 1716. Data can be sent off satellite by sending the data to other satellites (e.g., via RF ISL 1714 and Optical ISL 1712) or back down to earth (e.g., via LDR steerable multi-beam TX subsystem(s) 1742 or HDR steerable multi-beam TX subsystem(s) 1730).

In some embodiments, an RF signal is received via HDR steerable multi-beam RX subsystem(s) 1728 coupled to antenna(s). In some embodiments, each of HDR steerable multibeam RX subsystem(s) 1728 is coupled to a separate antenna. In some embodiments, a set of HDR steerable multi-beam RX subsystem(s) 1728 are coupled to a single antenna. The radio frequency signal is processed to create a raw data stream using a HDR steerable multi-beam RX subsystem(s) 1728, wherein the processing includes one or more of: amplifying, filtering, synchronization, correlating, timing, doppler adjusting, de-spreading, de-chirping, and de-hopping. In some embodiments, the raw data stream is passed along to Payload Baseband Unit: Modem Bank, Radio Access Network Control, and Data Plane CLI 1720. In some embodiments, Payload Baseband Unit: Modem Bank, Radio Access Network Control, and Data Plane CLI 1720 performs one or more of the following processing steps: deinterleaving, demodulation, decryption, and error correction coding (ECC) decoding to generate a processed data stream.

In various embodiments, the processed data stream comprises one or more of system authentication data, command data, communication data, or any other appropriate data. In some embodiments, processed data is passed along path 1734 to fully connected non-blocking switch 1716. Data can be sent off satellite by sending the data to other satellites (e.g., via RF ISL 1714 and Optical ISL 1712) or back down to earth (e.g., via steerable multi-beam TX subsystem(s) 1742 or broadband steerable multi-beam TX subsystem(s) 1730).

In some embodiments, low data rate PNT TX subsystem(s) 1740 transmit a position, navigation, and timing signal using an antenna. In some embodiments, low data rate PNT TX subsystem(s) receives its position, navigation, and timing signal from a timing reference that is established and maintained by the satellite network. In some embodiments, the local timing reference GNSS Time Sync 1706 is synchronized to the satellite network using a network time sync signal.

In some embodiments, a radio frequency signal is received by antenna(s) coupled to LDR steerable multi-beam TX subsystem(s) 1742. In some embodiments, each of LDR steerable multi-beam TX susbsystem(s) 1742 is coupled to a separate antenna. In some embodiments, a set of LDR steerable multi-beam TX subsystems 1742 are coupled to a single antenna. In some embodiments, the user data stream is passed from Payload Baseband Unit: Modem Bank, Radio Access Network Control, and Data Plane CLI 1720 to LDR steerable multi-beam TX subsystems 1742. In various embodiments, Payload Baseband Unit: Modem Bank, Radio Access Network Control, and Data Plane CLI 1720 performs one or more of the following processing steps: interleaving, modulation, encryption, and error correction coding (ECC) encoding to generate a data stream. The data stream is processed using LDR steerable multi-beam TX subsystem(s) 1742 to create a transmission signal, wherein the processing includes one or more of: amplifying, filtering, synchronization, correlating, timing, doppler adjusting, spreading, chirping, and hopping.

Figure 18:
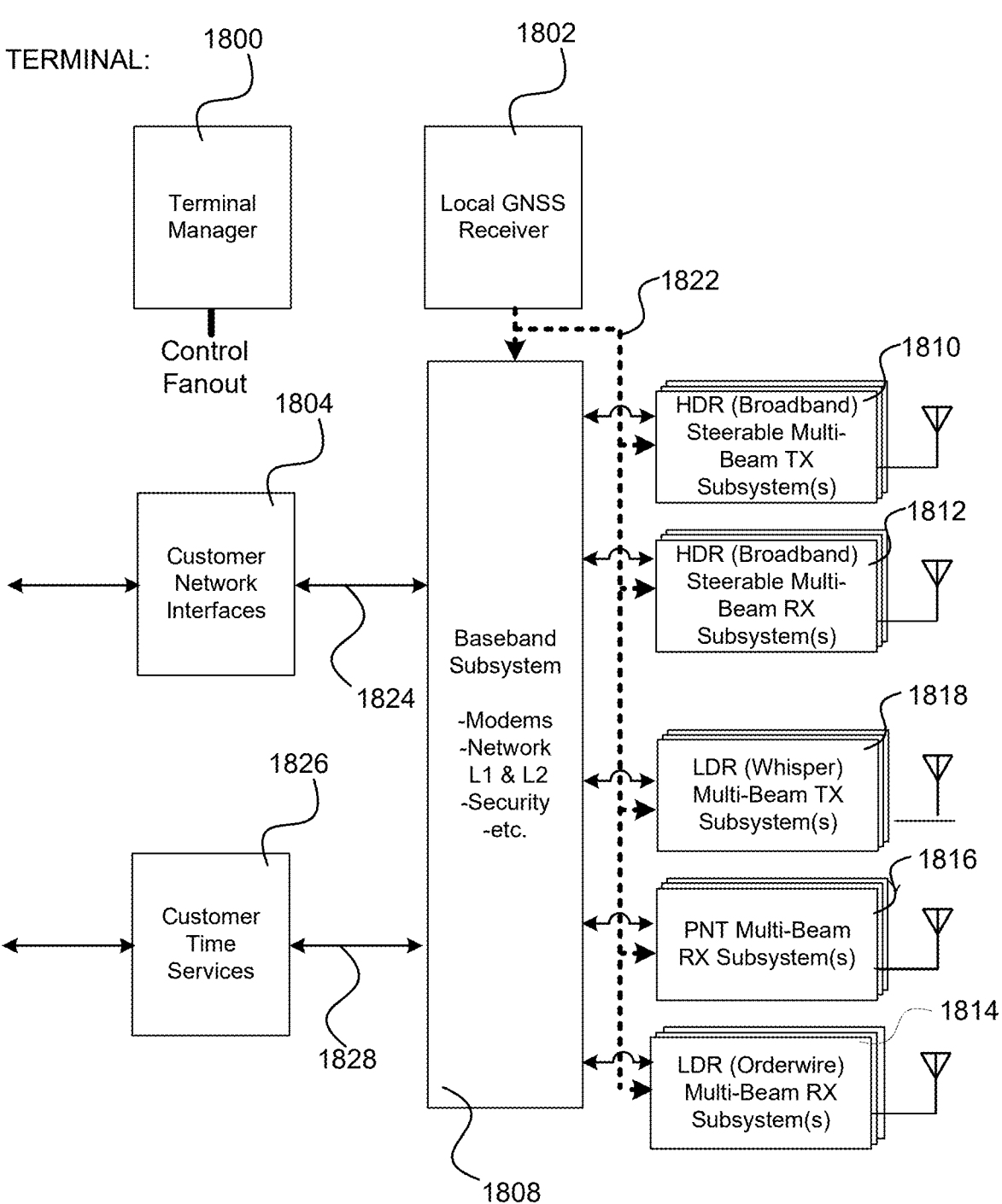
FIG. 18 is a diagram illustrating an embodiment of a terminal of a satellite system.

FIG. 18 is a diagram illustrating an embodiment of a terminal of a satellite system. In some embodiments, the satellite of FIG. 18 is used for terminal or receiver 208, 416, 436, 806, 906, 909, and 910 of satellite system of FIGS. 2, 4A, 4B, 8, and 9. In the example shown, the terminal includes terminal manager 1800, local GNSS Receiver 1802, customer network interfaces 1804, customer time services 1826, baseband subsystem 1808 (e.g., including modems, network L1 & L2, security, etc.), zero or more LDR multi-beam TX subsystem(s) 1818, low data rate PNT RX subsystem(s) 1816, one or more LDR multi-beam RX subsystem(s) 1814, zero or more HDR (broadband) steerable multi-beam RX subsystem(s) 1812, and zero or more HDR steerable multi-beam TX subsystem(s) 1810.

In various embodiments, a terminal is configured for specific functionality: 1) receiving low bandwidth (LDR) data, 2) receiving PNT, 3) receiving and sending low bandwidth (LDR) data, or 4) receiving and/or sending high bandwidth (HDR) data.

In some embodiments, a terminal that has functionality of receiving low bandwidth (LDR) data includes only one or more LDR multi-beam RX subsystem(s) 1814 for receiving low bandwidth (LDR) data.

In some embodiments, a terminal that has functionality of receiving PNT includes one or more LDR multi-beam RX subsystem(s) 1814, a low data rate PNT RX subsystem(s) 1816, and zero or more LDR multi-beam TX subsystem(s) 1818.

In some embodiments, a terminal that has functionality of receiving low bandwidth (LDR) data includes one or more LDR multi-beam RX subsystem(s) 1814 for receiving low bandwidth (LDR) data and one or more LDR multi-beam TX subsystem(s) 1818 for sending low bandwidth (LDR) data.

In some embodiments, a terminal that has functionality of receiving low bandwidth (LDR) data includes one or more LDR multi-beam RX subsystem(s) 1814 for receiving low bandwidth (LDR) data, zero or more LDR multi-beam TX subsystem(s) 1818 for sending low bandwidth (LDR) data, zero or more HDR steerable multi-beam RX subsystem(s) 1812 for receiving high bandwidth (HDR) data, and zero or more HDR steerable multi-beam TX subsystem(s) 1810 for sending high bandwidth (HDR) data.

In some embodiments, a radio frequency signal is received by antenna(s) coupled to LDR multi-beam RX subsystem(s) 1814. In some embodiments, each of LDR multi-beam RX susbsystem(s) 1814 is coupled to a separate antenna. In some embodiments, a set of LDR multi-beam RX subsystems 1814 are coupled to a single antenna. The radio frequency signal is processed using a LDR multi-beam RX subsystem(s) 1814, wherein the processing includes one or more of: amplifying, filtering, synchronization, correlating, timing, doppler adjusting, de-spreading, de-chirping, and de-hopping. In some embodiments, LDR multi-beam RX subsystem(s) 1814 performs one or more of the following processing steps: deinterleaving, demodulation, and error correction coding (ECC) decoding to generate a raw data stream. The raw data stream is passed along path to Baseband Subsystem 1808 including modems, network L1 & L2, security, etc. In some embodiments, Baseband Subsystem 1808 processing includes decryption of the raw data stream to generate a decrypted data stream.

In some embodiments, an RF signal is received via HDR steerable multi-beam RX subsystem(s) 1812 coupled to antenna(s). In some embodiments, each of HDR steerable multi-beam RX subsystem(s) 1812 is coupled to a separate antenna. In some embodiments, a set of HDR steerable multi-beam RX subsystem(s) 1812 are coupled to a single antenna. The radio frequency signal is processed using a HDR steerable multi-beam RX subsystem(s) 1812, wherein the processing includes one or more of: amplifying, filtering, synchronization, correlating, timing, doppler adjusting, de-spreading, de-chirping, and de-hopping. In some embodiments, HDR steerable multi-beam RX subsystem(s) 1812 performs one or more of the following processing steps: deinterleaving, demodulation, and error correction coding (ECC) decoding to generate a raw data stream. The raw data stream is passed along to Baseband Subsystem 1808. In some embodiments, Baseband Subsystem 1808 processing includes decryption of the raw data stream to generate a decrypted data stream.

In various embodiments, the decrypted data stream comprises one or more of system authentication data, command data, communication data, or any other appropriate data. Data can be sent off terminal by sending the data to other satellites (e.g., via LDR multi-beam TX subsystem(s) 1818 or HDR steerable multi-beam TX subsystem(s) 1810).

In some embodiments, low data rate PNT RX subsystem(s) 1816 receives a position, navigation, and timing information using an antenna. In some embodiments, low data rate PNT RX subsystem(s) receives its position, navigation, and timing signal from a timing reference that is established and maintained by the satellite network. In some embodiments, the local timing reference customer time services 1826 is synchronized to the satellite network using PNT time sync signal 1828.

Figure 19A:
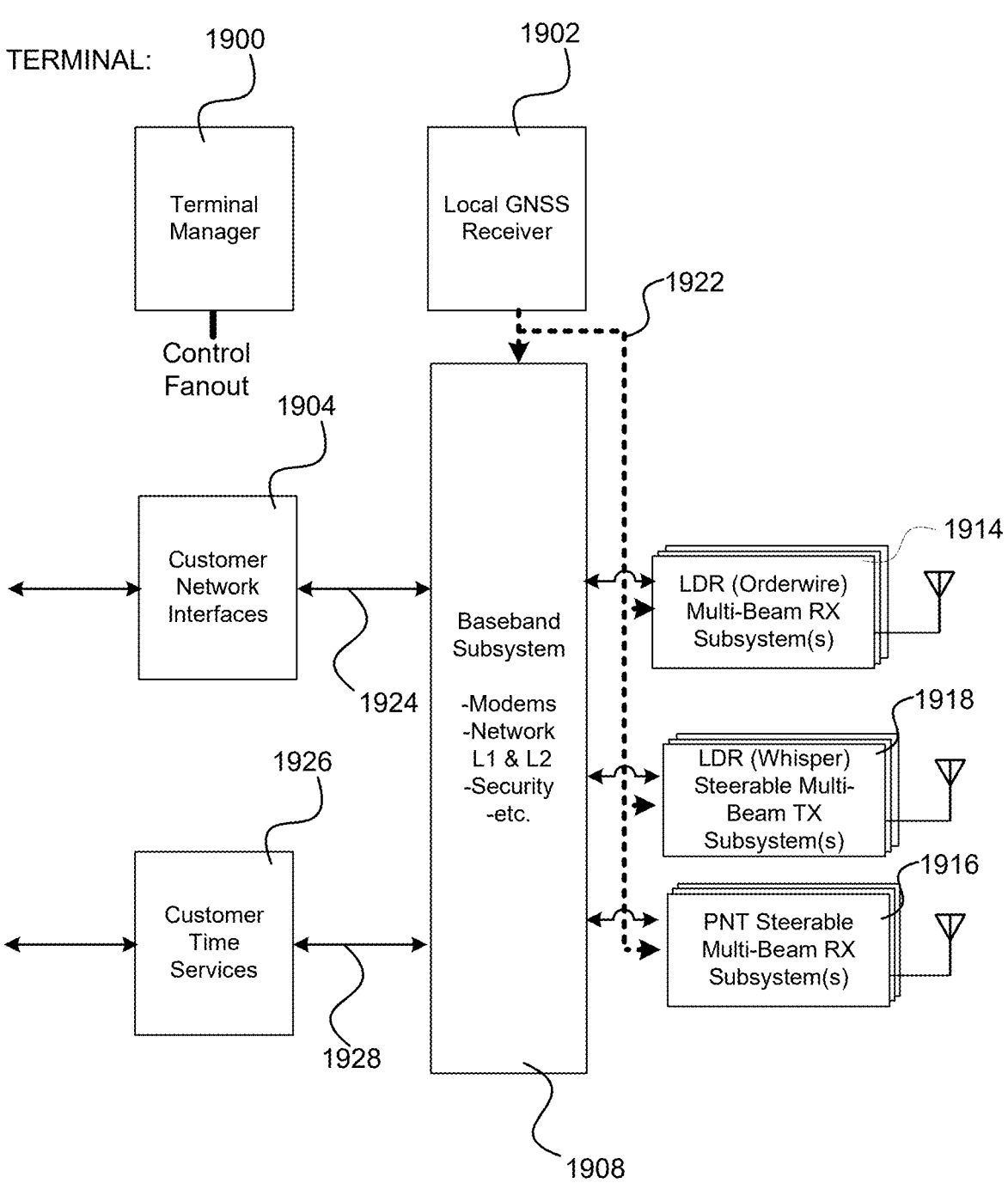
FIG. 19A is a diagram illustrating an embodiment of a terminal of a satellite system.

FIG. 19A is a diagram illustrating an embodiment of a terminal of a satellite system. In some embodiments, the satellite of FIG. 19A is used for terminal or receiver 208, 416, 436, 806, 906, 909, and 910 of satellite system of FIGS. 2, 4A, 4B, 8, and 9. In the example shown, the terminal includes terminal manager 1900, local GNSS Receiver 1902, customer network interfaces 1904, customer time services 1926, baseband subsystem 1908 (e.g., including modems, network L1 & L2, security, etc.), zero or more LDR TX subsystem(s) 1918, one or more LDR RX subsystem(s) 1914, and low data rate PNT RX subsystem(s) 1916.

In various embodiments, a terminal is configured for specific functionality: 1) receiving low bandwidth (LDR) data, 2) receiving PNT, 3) receiving and sending low bandwidth (LDR) data, or 4) receiving and/or sending high bandwidth (HDR) data.

In some embodiments, a terminal that has functionality of receiving low bandwidth data includes only one or more LDR RX subsystem(s) 1914 for receiving low bandwidth (LDR) data.

In some embodiments, a terminal that has functionality of receiving PNT includes one or more LDR RX subsystem(s) 1914, a low data rate PNT RX subsystem(s) 1916, and zero or more LDR TX subsystem(s) 1918.

In some embodiments, a terminal that has functionality of receiving low bandwidth (LDR) data includes one or more LDR RX subsystem(s) 1914 for receiving low bandwidth (LDR) data and one or more LDR TX subsystem(s) 1918 for sending low bandwidth (LDR) data.

In some embodiments, a terminal that has functionality of receiving low bandwidth (LDR) data includes one or more LDR multi-beam RX subsystem(s) 1914 for receiving low bandwidth (LDR) data, zero or more LDR multi-beam TX subsystem(s) 1918 for sending low bandwidth (LDR) data, zero or more HDR steerable multi-beam RX subsystem(s) 1912 for receiving high bandwidth (HDR) data, and zero or more HDR steerable multi-beam TX subsystem(s) 1910 for sending high bandwidth (HDR) data.

In some embodiments, a radio frequency signal is received by antenna(s) coupled to LDR multi-beam RX subsystem(s) 1914. In some embodiments, each of LDR multi-beam RX susbsystem(s) 1914 is coupled to a separate antenna. In some embodiments, a set of LDR multi-beam RX subsystems 1914 are coupled to a single antenna. The radio frequency signal is processed using a LDR multi-beam RX subsystem(s) 1914, wherein the processing includes one or more of: amplifying, filtering, synchronization, correlating, timing, doppler adjusting, de-spreading, de-chirping, and de-hopping. In some embodiments, LDR multi-beam RX subsystem(s) 1914 performs one or more of the following processing steps: deinterleaving, demodulation, and error correction coding (ECC) decoding to generate a raw data stream. The raw data stream is passed along path to Baseband Subsystem 1908 including modems, network L1 & L2, security, etc. In some embodiments, Baseband Subsystem 1908 processing includes decryption of the raw data stream to generate a decrypted data stream.

In various embodiments, the decrypted data stream comprises one or more of system authentication data, command data, communication data, or any other appropriate data. Data can be sent off terminal by sending the data to other satellites (e.g., via LDR multi-beam TX subsystem(s) 1918).

In some embodiments, low data rate PNT RX subsystem(s) 1916 receives a position, navigation, and timing information using an antenna. In some embodiments, low data rate PNT RX subsystem(s) receives its position, navigation, and timing signal from a timing reference that is established and maintained by the satellite network. In some embodiments, the local timing reference customer time services 1926 is synchronized to the satellite network using PNT time sync signal 1928.

Figure 19B:
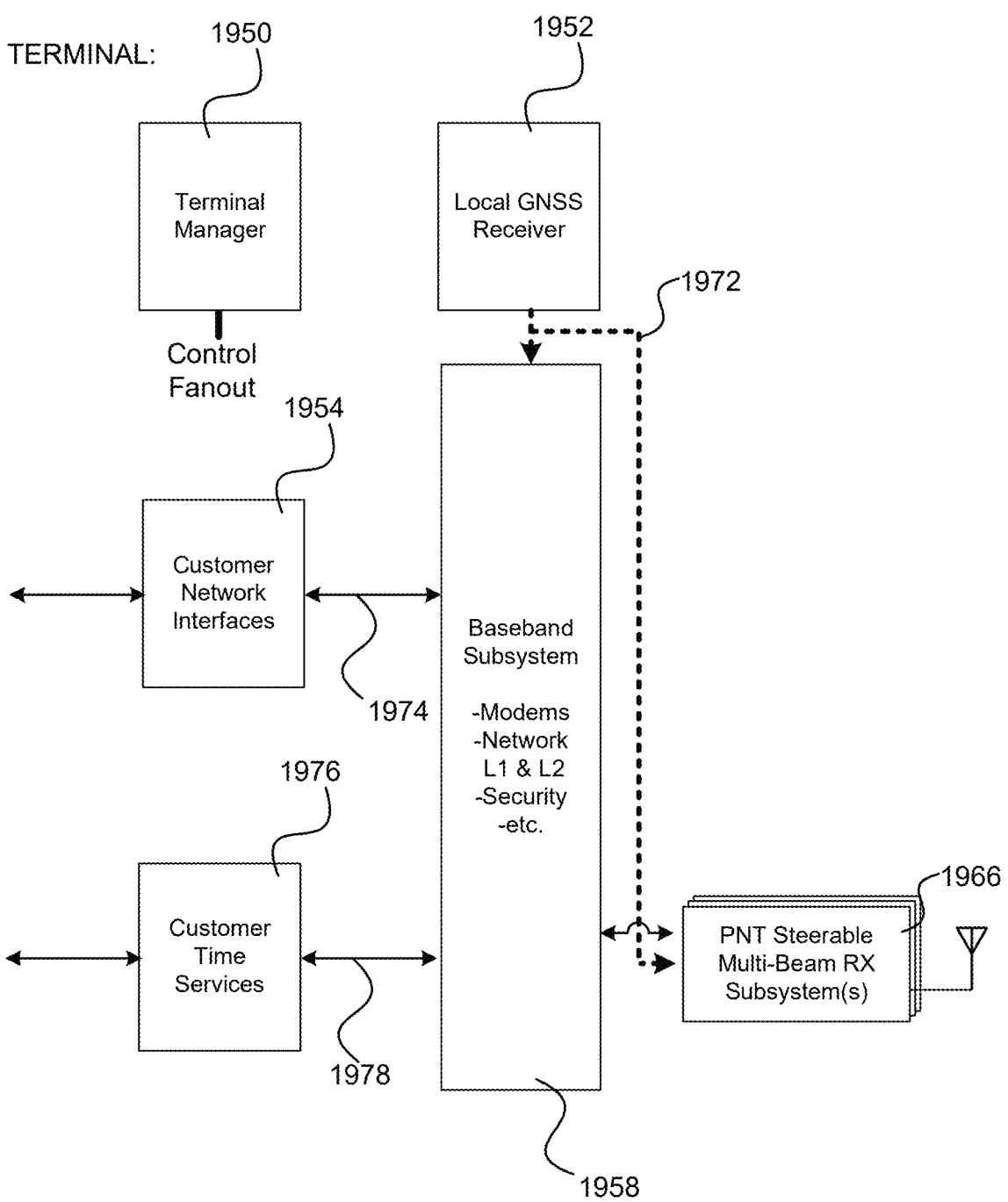
FIG. 19B is a diagram illustrating an embodiment of a terminal of a satellite system.

FIG. 19B is a diagram illustrating an embodiment of a terminal of a satellite system. In some embodiments, the satellite of FIG. 19B is used for terminal or receiver 208, 416, 436, 442, 445, 446, 455, 466, 469, 472, 473, 484, 487, 490, 493, 496, 806, 906, 909, and 910 of satellite system of FIGS. 2, 4A, 4B, 4C, 4D, 4E, 4F, 4G, 4H, 4I, 4J, 4K, 4L, 4M, 4N, 4O, 8, and 9. In the example shown, the terminal includes terminal manager 1950, local GNSS Receiver 1952, customer network interfaces 1954, customer time services 1976, baseband subsystem 1958 (e.g., including modems, network L1 & L2, security, etc.), zero or more LDR multi-beam TX subsystem(s) 1968, one or more LDR multi-beam RX subsystem(s) 1964, and low data rate PNT RX subsystem(s) 1966.

In various embodiments, a terminal is configured for specific functionality: 1) receiving low bandwidth (LDR) data, 2) receiving PNT, 3) receiving and sending low bandwidth (LDR) data, or 4) receiving and/or sending high bandwidth (HDR) data.

In some embodiments, a terminal that has functionality of receiving low bandwidth (LDR) data includes only one or more LDR multi-beam RX subsystem(s) 1964 for receiving low bandwidth (LDR) data.

In some embodiments, a terminal that has functionality of receiving PNT includes one or more LDR multi-beam RX subsystem(s) 1964, a low data rate PNT RX subsystem(s) 1966, and zero or more LDR multi-beam TX subsystem(s) 1968.

In some embodiments, a terminal that has functionality of receiving low bandwidth (LDR) data includes one or more LDR multi-beam RX subsystem(s) 1964 for receiving low bandwidth (LDR) data and one or more LDR multi-beam TX subsystem(s) 1968 for sending low bandwidth (LDR) data.

In some embodiments, a terminal that has functionality of receiving low bandwidth (LDR) data includes one or more LDR multi-beam RX subsystem(s) 1964 for receiving low bandwidth (LDR) data, zero or more LDR multi-beam TX subsystem(s) 1968 for sending low bandwidth (LDR) data, zero or more HDR steerable multibeam RX subsystem(s) 1962 for receiving high bandwidth (HDR) data, and zero or more HDR steerable multi-beam TX subsystem(s) 1960 for sending high bandwidth (HDR) data.

In some embodiments, a radio frequency signal is received by antenna(s) coupled to LDR multi-beam RX subsystem(s) 1964. In some embodiments, each of LDR multi-beam RX susbsystem(s) 1964 is coupled to a separate antenna. In some embodiments, a set of LDR multi-beam RX subsystems 1964 are coupled to a single antenna. The radio frequency signal is processed using a LDR multi-beam RX subsystem(s) 1964, wherein the processing includes one or more of: amplifying, filtering, synchronization, correlating, timing, doppler adjusting, de-spreading, de-chirping, and de-hopping. In some embodiments, LDR multi-beam RX subsystem(s) 1964 performs one or more of the following processing steps: deinterleaving, demodulation, and error correction coding (ECC) decoding to generate a raw data stream. The raw data stream is passed along path to Baseband Subsystem 1958 including modems, network L1 & L2, security, etc. In some embodiments, Baseband Subsystem 1958 processing includes decryption of the raw data stream to generate a decrypted data stream.

In various embodiments, the decrypted data stream comprises one or more of system authentication data, command data, communication data, or any other appropriate data.

In some embodiments, low data rate PNT multi-beam RX subsystem(s) 1966 receives a position, navigation, and timing information using an antenna. In some embodiments, low data rate PNT RX subsystem(s) receives its position, navigation, and timing signal from a timing reference that is established and maintained by the satellite network. In some embodiments, the local timing reference customer time services 1926 is synchronized to the satellite network using PNT time sync signal 1978.

Figure 20:
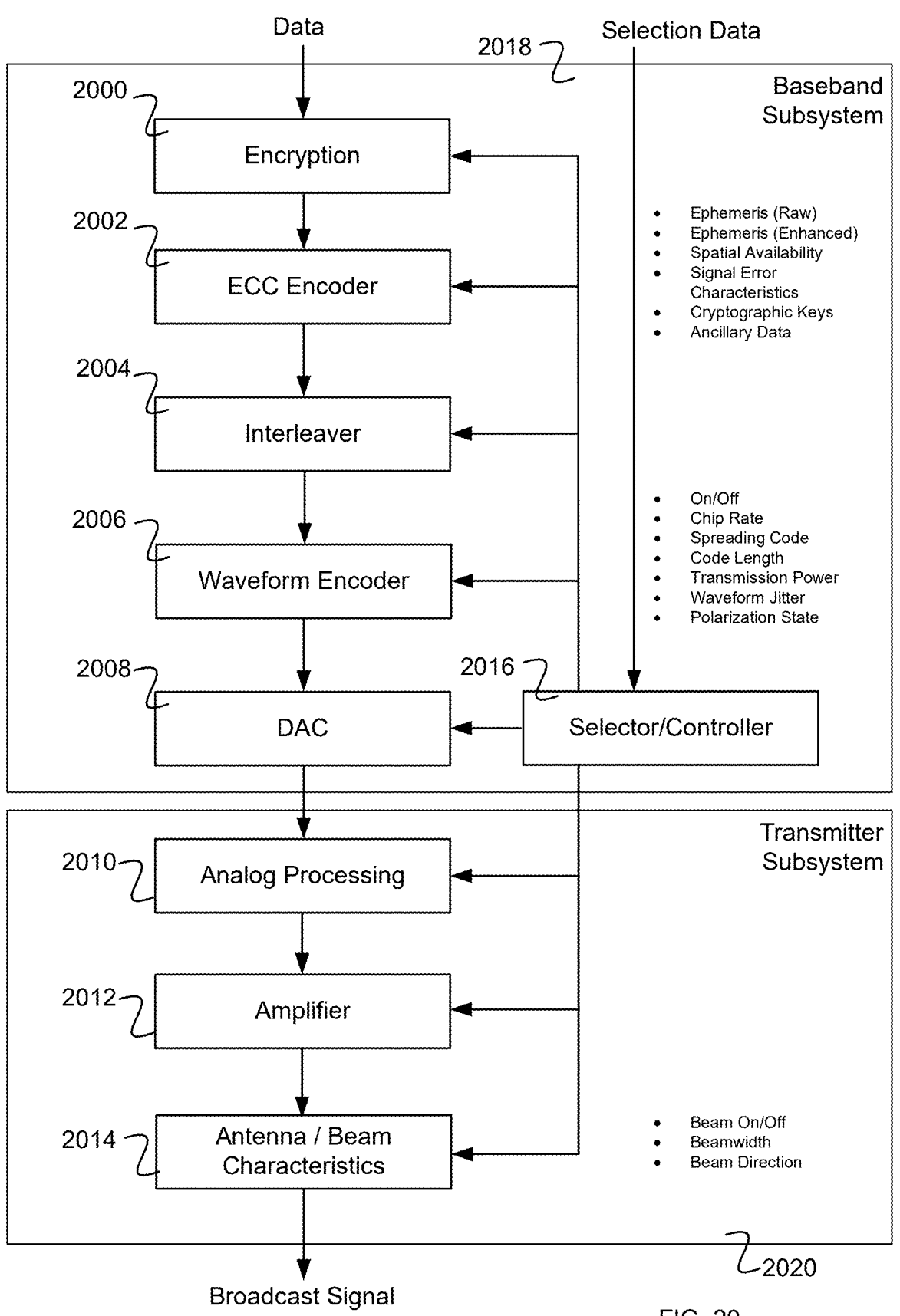
FIG. 20 is a diagram illustrating an embodiment of an encoding channel.

FIG. 20 is a diagram illustrating an embodiment of an encoding channel. In some embodiments, the encoding channel of FIG. 20 comprises an encoding channel of a satellite or terminal (e.g., an encoding or decoding channel of a satellite of FIG. 17, a terminal of FIG. 18, and/or a terminal of FIG. 19A or FIG. 19B). In the example shown, data is received and encrypted using encryption 2000 and error correction encoded by ECC encoder 2002 and interleaved by interleaver 2004 and waveform encoded by waveform encoder 2006. The waveform (e.g., modulation symbols) is converted to an analog signal by digital to analog converter (DAC) 2008. The analog signal is processed by analog processing 2010 and amplified by amplifier 2012 and finally sent to antenna/beam characteristics 2014 for broadcasting. Selector/controller 2016 enables the modification of baseband subsystem 2018 and/or transmitter subsystem 2020. For example, selector/controller 2016 is able to modify the encryption code, error correction code, the interleaving, the waveform code, the DAC rate, the amplifier gain, the antenna configuration using a selection data. In various embodiments, data is encrypted using pre-stored keys (e.g., AES-256 encryption), dynamically formed keys (e.g., Diffie-Hellman public key infrastructure (PKI) public-private key encryption), or any other appropriate encryption method.

In various embodiments, one or more of the components of the encoding channel are shared for two encoding channels. For example, the ECC encoder is shared, the modulation encoder is shared, the interleaver is shared, the DAC is shared, the amplifier is shared, and/or the antenna is shared.

In some embodiments, the selection is enabled by a field programmable gate array that implements the elements of the encoding channel(s) and/or decoding channel(s). For example, the field programmable gate array enables selection, switching, or reprogramming to reconfigure or restructure the encoding channel(s) and/or the decoding channel(s).

In some embodiments, the field programmable gate array enables sharing of components of one or more encoding channels and/or one or more decoding channels.

In various embodiments, selector/controller 2016 enables the programmable selection of spreading code, chip rate, code length, transmission power, waveform jitter, polarization state, signal accuracy, signal error characteristics, cryptographic key, ECC encoding, interleaving, user group, spatial availability, beam width, beam direction, or any other appropriate broadcast signal selectable parameter.

In some embodiments, selector/controller 2016 receives selection data—for example, a specific spreading code, a specific chip rate, a specific code length, a specific transmission power, a specific waveform jitter, a specific polarization state, a specific signal accuracy, a specific signal error characteristics, a specific cryptographic key, a specific ECC encoding, a specific interleaving, a specific user group, a specific spatial availability, a specific beam width, a specific beam direction, and/or any other appropriate broadcast signal selectable parameter. In some embodiments, selector/controller 2016 receives selection data—for example, a date, a time, and/or a location that is used to look up a selection of one or more of a specific spreading code, a specific chip rate, a specific code length, a specific transmission power, a specific waveform jitter, a specific polarization state, a specific signal accuracy, a specific signal error characteristics, a specific cryptographic key, a specific ECC encoding, a specific interleaving, a specific user group, a specific spatial availability, a specific beam width, a specific beam direction, and/or any other appropriate broadcast signal selectable parameter.

In various embodiments, selector/controller 2016 accesses a memory storing configurations associated with a user group, a user team, or a user group and a user team.

Figure 21:
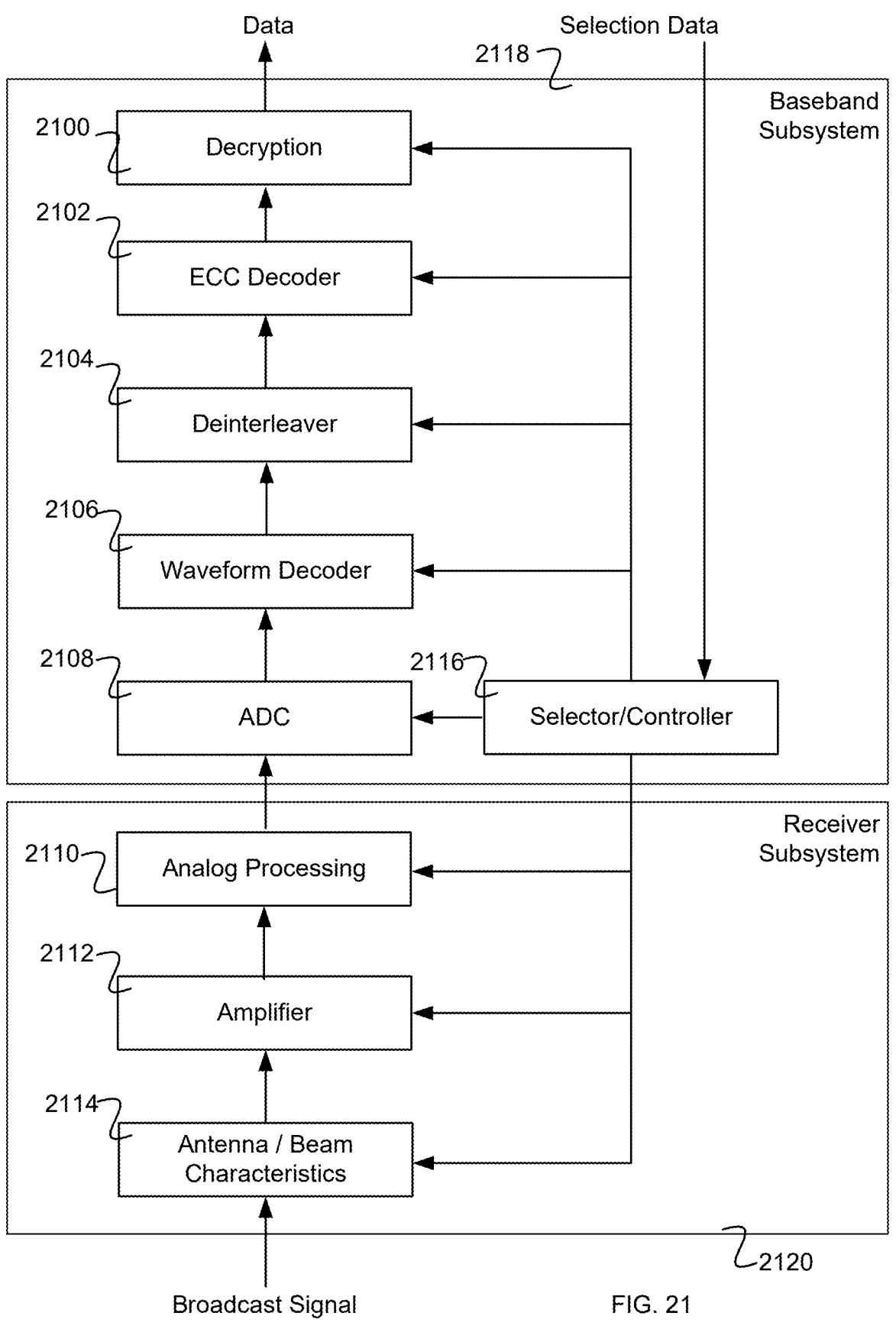
FIG. 21 is a diagram illustrating an embodiment of a decoding channel.

FIG. 21 is a diagram illustrating an embodiment of a decoding channel. In some embodiments, the encoding channel of FIG. 21 comprises an encoding channel of a satellite or terminal (e.g., an encoding or decoding channel of a satellite of FIG. 17, a terminal of FIG. 18, and/or a terminal of FIG. 19A or FIG. 19B). In the example shown, a broadcast signal is received by antenna/beam characteristics 2114 and amplified by amplifier 2112 and processed by analog processing 2110. The amplified signal is then converted to a digital signal using analog to digital converter (ADC) 2108. The signal is waveform decoder 2106 and deinterleaved using deinterleaver 2104 and ECC decoded using ECC decoder 2102 and decrypted using decryption 2100 to generate the data received. Selector/controller 2116 enables the modification of the decoding channel. For example, selector/controller 2116 is able to modify the decoding of the error correction code, the modulation code, change the deinterleaving, the ADC rate, the amplifier gain, the antenna configuration using a selection data.

In various embodiments, data is decrypted using pre-stored keys (e.g., AES-256 encryption), dynamically formed keys (e.g., Diffie-Hellman PKI public-private key encryption), or any other appropriate decryption method.

In various embodiments, one or more of the components of the decoding channel are shared for two decoding channels. For example, the ECC decoder is shared, the modulation decoder is shared, the deinterleaver is shared, the ADC is shared, the amplifier is shared, and/or the antenna is shared.

In some embodiments, the selection is enabled by a field programmable gate array that implements the elements of the encoding channel(s) and/or decoding channel(s). For example, the field programmable gate array enables selection, switching, or reprogramming to reconfigure or restructure the encoding channel(s) and/or the decoding channel(s). In some embodiments, the field programmable gate array enables sharing of components of one or more encoding channels and/or one or more decoding channels.

In various embodiments, selector/controller 2116 enables the programmable selection of spreading code, chip rate, code length, transmission power, waveform jitter, polarization state, signal accuracy, signal error characteristics, cryptographic key, ECC encoding, interleaving, user group, spatial availability, beam width, beam direction, or any other appropriate broadcast signal selectable parameter.

In some embodiments, selector/controller 2116 receives selection data—for example, a specific spreading code, a specific chip rate, a specific code length, a specific transmission power, a specific waveform jitter, a specific polarization state, a specific signal accuracy, a specific signal error characteristics, a specific cryptographic key, a specific ECC encoding, a specific interleaving, a specific user group, a specific spatial availability, a specific beam width, a specific beam direction, and/or any other appropriate broadcast signal selectable parameter. In some embodiments, selector/controller 2116 receives selection data—for example, a date, a time, and/or a location that is used to look up a selection of one or more of a specific spreading code, a specific chip rate, a specific code length, a specific transmission power, a specific waveform jitter, a specific polarization state, a specific signal accuracy, a specific signal error characteristics, a specific cryptographic key, a specific ECC encoding, a specific interleaving, a specific user group, a specific spatial availability, a specific beam width, a specific beam direction, and/or any other appropriate broadcast signal selectable parameter.

In various embodiments, selector/controller 2116 accesses a memory storing configurations associated with a user group, a user team, or a user group and a user team.

Table 1 is an example embodiment of selectable parameters including spreading code length, processing gain, and data rate for a selected chip rate. In some embodiments, parameters associated with a column of Table 1 are selected (e.g., by selector/controller 2016 of FIG. 20, by selector/controller 2116 of FIG. 21, etc.). In some embodiments, other parameters (e.g., corresponding to other chip rates) are selected.

TABLE 1

| Chip Rate (per second) | 1,073,741,824 | | | | | | |
|---|---|---|---|---|---|---|---|
| Spreading Code Length (bits) | 128 | 1,024 | 8,192 | 65,536 | 1,048,576 | 8,388,608 | 67,108,864 |
| Processing Gain (dB) | 21.1 | 30.1 | 39.1 | 48.2 | 60.2 | 69.2 | 78.3 |
| Data Rate (bps) | 8,388,608 | 1,048,576 | 131,072 | 16,384 | 1,024 | 128 | 16 |

Table 2 is an example embodiment of selectable parameters including processing gain, coding gain, and data rate. Values of Table 2 correspond to a 256-bit encryption method. Bit per second values for data rate fill cells of Table 2 and correspond to a given coding gain (row) and processing gain (column). In some embodiments, parameters associated with a cell of Table 2 are selected (e.g., by selector/controller 2016 of FIG. 20, by selector/controller 2116 of FIG. 21, etc.). In some embodiments, other parameters (e.g., corresponding to other encryption methods) are selected.

TABLE 2

| | | Processing Gain (dB) | | | | | | |
|---|---|---|---|---|---|---|---|---|
| | | 21.1 | 30.1 | 39.1 | 48.2 | 60.2 | 69.2 | 78.3 |
| Coding | 0 | 8,386,560 | 1,047,040 | 130,560 | 15,360 | 0 | 0 | 0 |
| Gain (dB) | 0.3 | 7,339,520 | 916,408 | 112,640 | 12,800 | 0 | 0 | 0 |
| | 0.6 | 6,289,920 | 785,920 | 97,280 | 10,240 | 0 | 0 | 0 |
| | 1.0 | 5,242,880 | 655,360 | 81,920 | 10,240 | 0 | 0 | 0 |
| | 1.5 | 4,193,280 | 522,240 | 64,000 | 7,680 | 0 | 0 | 0 |
| | 2.1 | 3,143,680 | 391,680 | 48,640 | 5,120 | 0 | 0 | 0 |
| | 3.0 | 2,096,640 | 261,120 | 30,720 | 2,560 | 0 | 0 | 0 |
| | 4.5 | 1,047,040 | 130,560 | 15,360 | 0 | 0 | 0 | 0 |

Table 3 is an other example embodiment of selectable parameters including processing gain, coding gain, and data rate. Values of Table 3 correspond to a 1024-bit encryption method. Bit per second values for data rate fill cells of Table 3 and correspond to a given coding gain (row) and processing gain (column). In some embodiments, parameters associated with a cell of Table 3 are selected (e.g., by selector/controller 2016 of FIG. 20, by selector/controller 2116 of FIG. 21, etc.). In some embodiments, other parameters (e.g., corresponding to other encryption methods) are selected.

TABLE 3

| Processing Gain (dB) | | | | | | | | |
|---|---|---|---|---|---|---|---|---|
| | | Processing Gain (dB) | | | | | | |
| | | 21.1 | 30.1 | 39.1 | 48.2 | 60.2 | 69.2 | 78.3 |
| Coding | 0 | 8,386,560 | 1,044,480 | 122,880 | 10,240 | 0 | 0 | 0 |
| Gain (dB) | 0.3 | 7,331,840 | 916,408 | 112,640 | 10,240 | 0 | 0 | 0 |
| | 0.6 | 6,287,360 | 778,240 | 92,160 | 10,240 | 0 | 0 | 0 |
| | 1.0 | 5,242,880 | 655,360 | 81,920 | 10,240 | 0 | 0 | 0 |
| | 1.5 | 4,188,160 | 522,240 | 61,440 | 0 | 0 | 0 | 0 |
| | 2.1 | 3,143,680 | 389,120 | 40,960 | 0 | 0 | 0 | 0 |
| | 3.0 | 2,088,960 | 256,000 | 30,720 | 0 | 0 | 0 | 0 |
| | 4.5 | 1,044,480 | 122,880 | 10,240 | 0 | 0 | 0 | 0 |

In some embodiments, the disclosed comprises a secondary downlink using a same frequency band as a primary downlink, where the secondary downlink comprises a spread signal and where the secondary downlink has a lower bandwidth signal capacity compared to a higher bandwidth primary downlink signal capacity.

In some embodiments, the disclosed comprises a secondary downlink using a different frequency band as a primary downlink, where the secondary downlink comprises a spread signal and where the secondary downlink has a lower bandwidth signal capacity compared to a higher bandwidth primary downlink signal capacity.

In some embodiments, the disclosed comprises a secondary uplink using a same frequency band as a primary uplink, where the secondary downlink comprises a spread signal and where the secondary downlink has a lower bandwidth signal capacity compared to a higher bandwidth primary downlink signal capacity.

In some embodiments, the disclosed comprises a secondary uplink using a different frequency band as a primary uplink, where the secondary downlink comprises a spread signal and where the secondary downlink has a lower bandwidth signal capacity compared to a higher bandwidth primary downlink signal capacity.

In some embodiments, the disclosed comprises a secondary uplink or downlink using a long chip or long key encoding in a frequency band.

In various embodiments, the disclosed comprises a secondary uplink or downlink using amplitude shift key, phase shift key, frequency shift key, and/or combination shift key modulation coding, orthogonal frequency division multiplexing, quadrature amplitude modulation coding, binary phase shift key modulation coding, or any other appropriate modulation coding for the secondary channel.

In various embodiments, the disclosed comprises a secondary uplink or downlink using error correction codes, Reed-Solomon codes, Reed-Muller codes, convolutional codes, block codes, low density parity check codes, turbo codes, forward error correction codes, or any other appropriate error correction code.

In some embodiments, the disclosed comprises interleaving data, modulation symbols, error correction symbols, or any other appropriate interleaving for the communication channel.

In some embodiments, the disclosed comprises a coordination circuit to schedule transmissions on a primary downlink and a secondary downlink. For example, the schedule may include one or more of the following: transmissions on only the primary downlink, on the primary downlink and the secondary downlink simultaneously, on only the secondary downlink, or any other appropriate combination of transmission elements.

Figure 22:
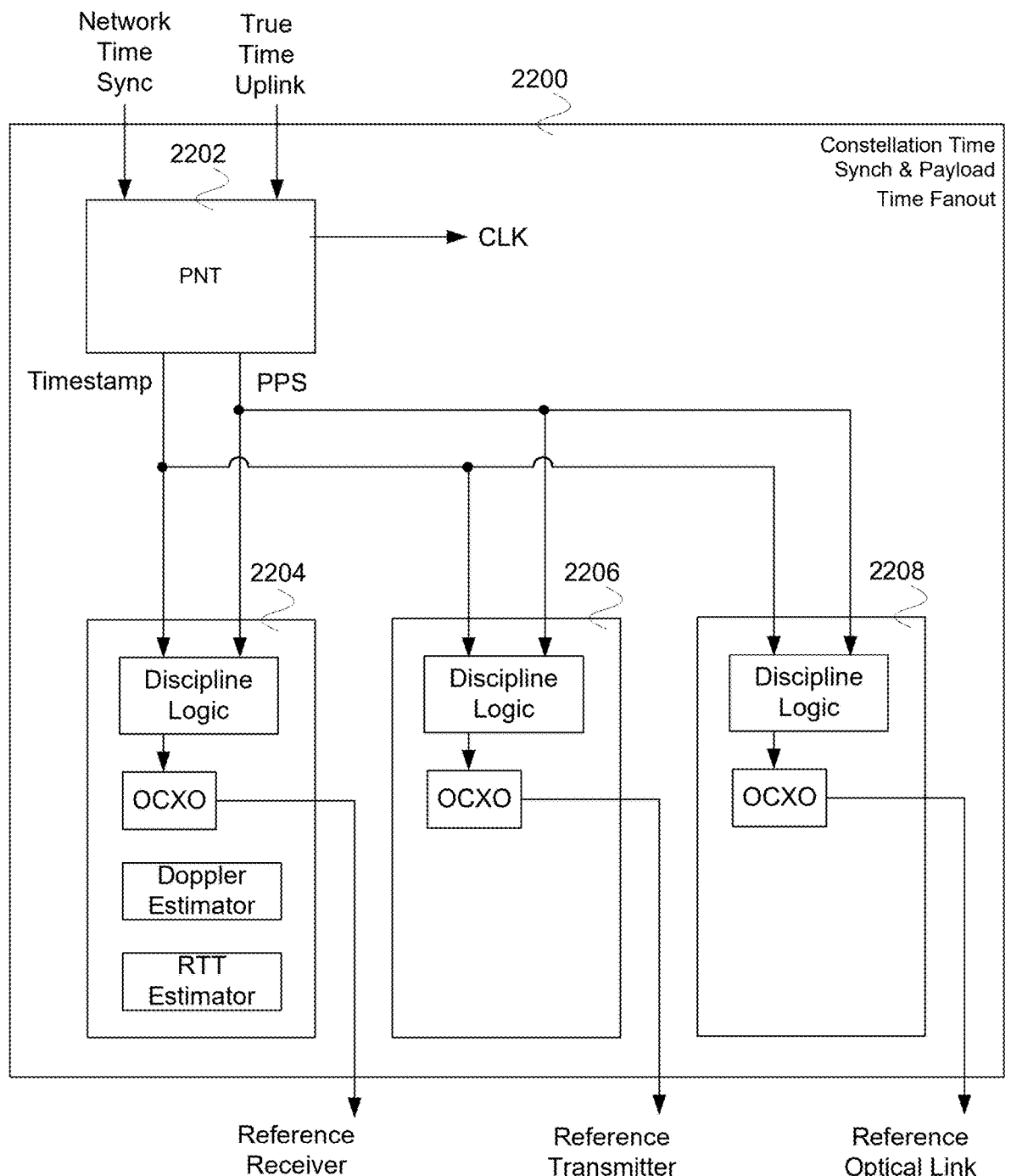
FIG. 22 is a diagram illustrating an embodiment of timing system for a terminal of satellite network.

FIG. 22 is a diagram illustrating an embodiment of timing system for a terminal of satellite network. In some embodiments, constellation time sync and payload time fanout 2200 comprises GNSS time sync 1706 of FIG. 17. In the example shown, timing system of constellation time sync and payload time fanout 2200 comprises PNT 2202, fanout of timestamp and pulse per second (PPS), time subsystem 2204, time subsystem 2206, and time subsystem 2208. PPS and timestamp signal are distributed via a fanout to RX and TX subsystems. In some embodiments, time subsystem 2204 comprises discipline logic which receives reference signals (e.g., PPS and timestamp) to generate a transmission reference frequency (e.g., reference 2 for transmission F2 of FIG. 4B) using OCXO coupled to the discipline logic, which is locked to reference signals (e.g., PPS and timestamp) from PNT 2202. Time subsystem 2206 includes discipline logic and OCXO which are used to generate a receiver reference frequency (e.g., reference 1 for receiving F1 of FIG. 4B) that is locked to reference signals (e.g., PPS and timestamp) from PNT 2202. Time subsystem 2204 also includes doppler estimator and round trip time (RTT) estimator to assist in locking to received signals. In some embodiments, time subsystem 2208 comprises discipline logic which receives reference signals (e.g., PPS and timestamp) to generate a transmission and a reception reference frequency (e.g., reference for communication with other satellites using an optical link) using OCXO coupled to the discipline logic, which is locked to reference signals (e.g., PPS and timestamp) from PNT 2202.

Figure 23A:
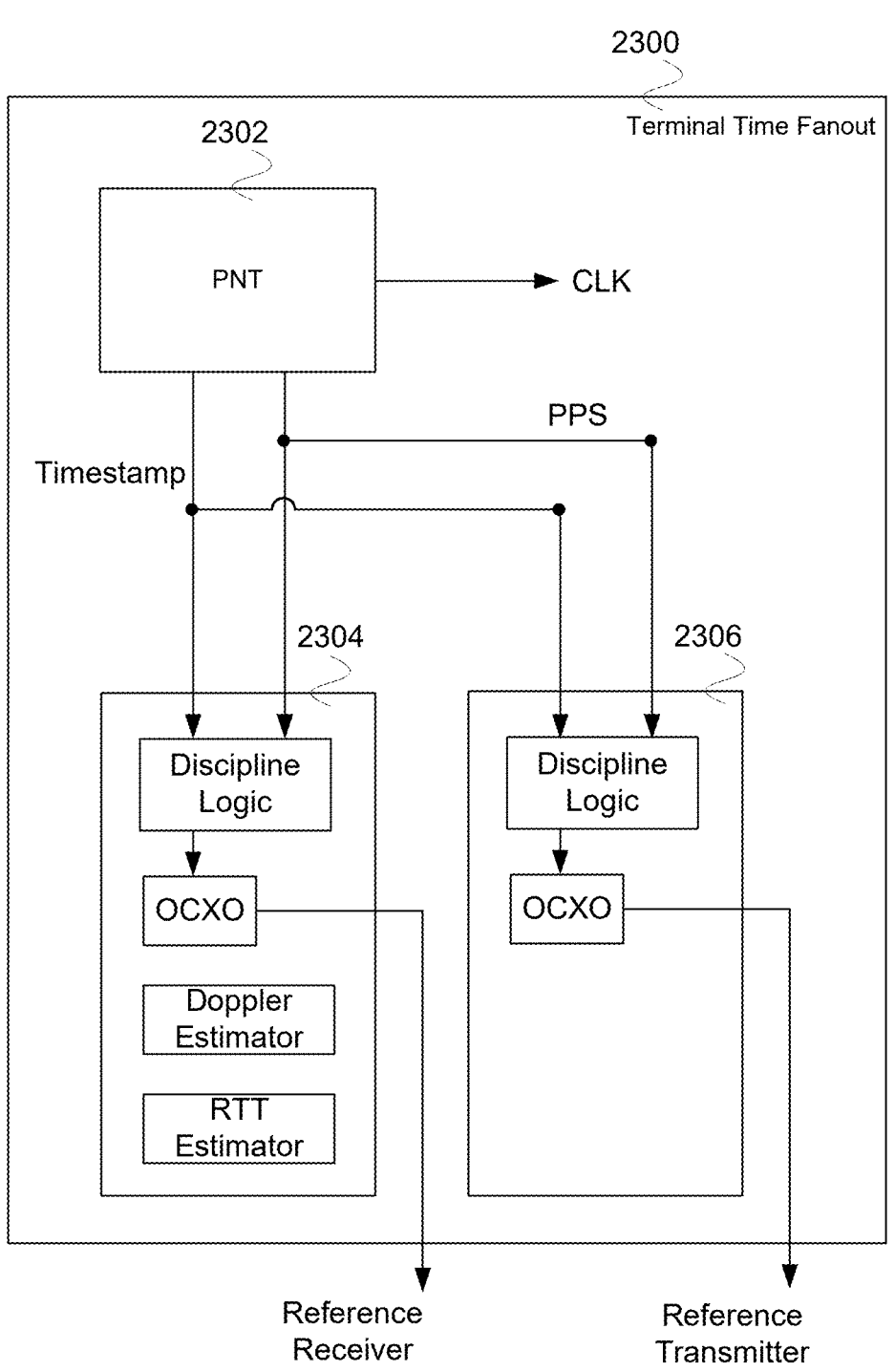
FIG. 23A is a diagram illustrating an embodiment of timing system for a terminal of satellite network.

FIG. 23A is a diagram illustrating an embodiment of timing system for a terminal of satellite network. In some embodiments, constellation time sync and payload time fanout 2300 of FIG. 23A comprises local GNSS Receiver 1802 of FIG. 18, local GNSS Receiver 1902 of FIG. 19A, or GNSS time sync 1952 of FIG. 19B. In the example shown, timing system of constellation time sync and payload time fanout 2300 comprises PNT 2302, fanout of timestamp and PPS, time subsystem 2304, and time subsystem 2306. PPS and timestamp signal are distributed via a fanout to RX and TX subsystems. In some embodiments, time subsystem 2304 comprises discipline logic which receives reference signals (e.g., PPS and timestamp) to generate a transmission reference frequency (e.g., reference 1 for transmission F1 of FIG. 4B) using OCXO coupled to the discipline logic, which is locked to reference signals (e.g., PPS and timestamp) from PNT 2302. Time subsystem 2306 includes discipline logic and OCXO which are used to generate a receiver reference frequency (e.g., reference 2 for receiving F2 of FIG. 4B) that is locked to reference signals (e.g., PPS and timestamp) from PNT 2302. Time subsystem 2304 also includes doppler estimator and RTT estimator to assist in locking to received signals.

Figure 23B:
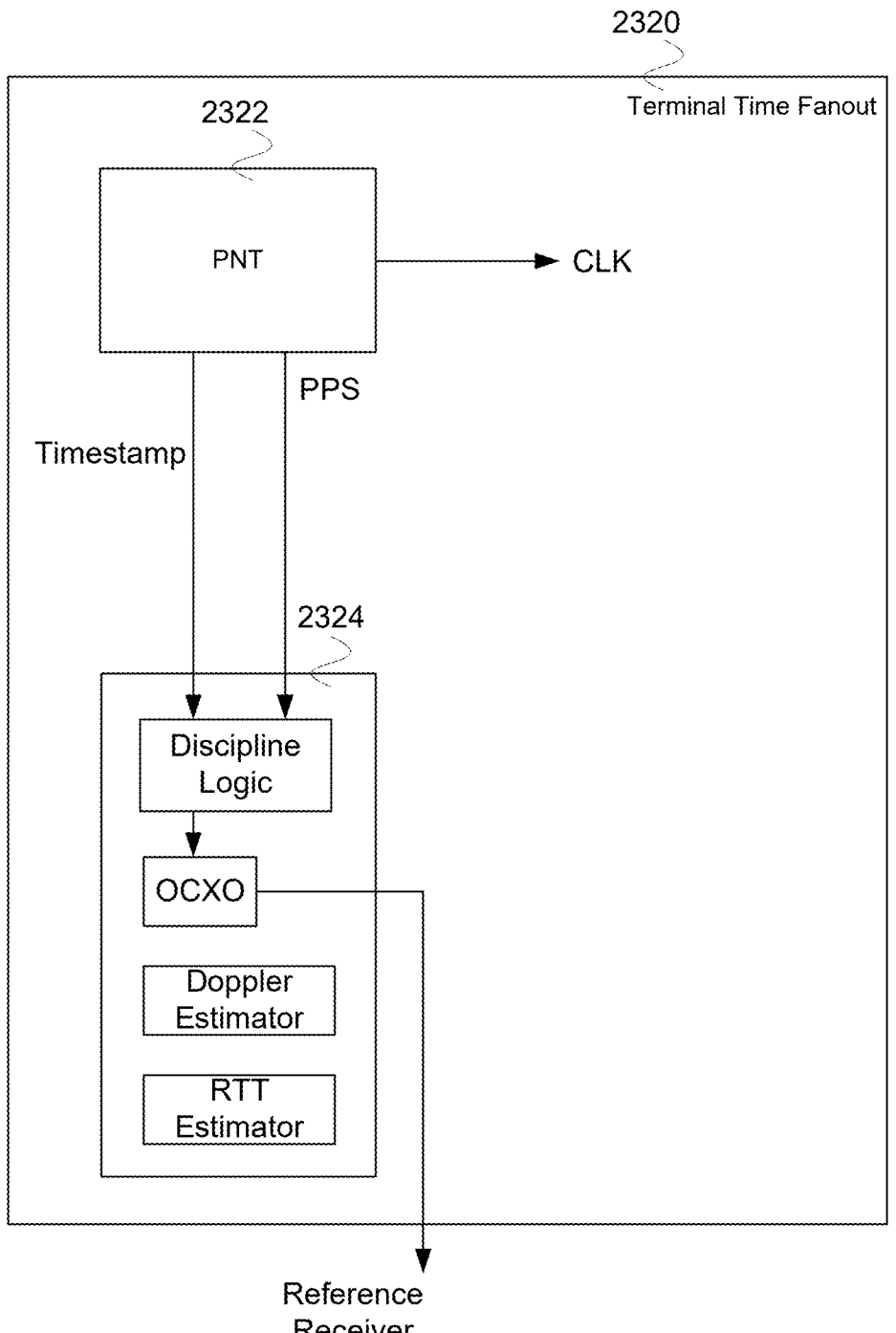
FIG. 23B is a diagram illustrating an embodiment of timing system for a terminal of satellite network.

FIG. 23B is a diagram illustrating an embodiment of timing system for a terminal of satellite network. In some embodiments, constellation time sync and payload time fanout 2320 of FIG. 23B comprises local GNSS Receiver 1802 of FIG. 18, local GNSS Receiver 1902 of FIG. 19A, or GNSS time sync 1952 of FIG. 19B. In the example shown, timing system of constellation time sync and payload time fanout 2320 comprises PNT 2322, fanout of timestamp and PPS, time subsystem 2324, and time subsystem 2326. PPS and timestamp signal are distributed via a fanout to RX and TX subsystems. In some embodiments, time subsystem 2324 comprises discipline logic which receives reference signals (e.g., PPS and timestamp) to generate a transmission reference frequency (e.g., reference 1 for transmission F1 of FIG. 4B) using OCXO coupled to the discipline logic, which is locked to reference signals (e.g., PPS and timestamp) from PNT 2322. Time subsystem 2326 includes discipline logic and OCXO which are used to generate a receiver reference frequency (e.g., reference 2 for receiving F2 of FIG. 4B) that is locked to reference signals (e.g., PPS and timestamp) from PNT 2322. Time subsystem 2324 also includes doppler estimator and RTT estimator to assist in locking to received signals.

Figure 24:
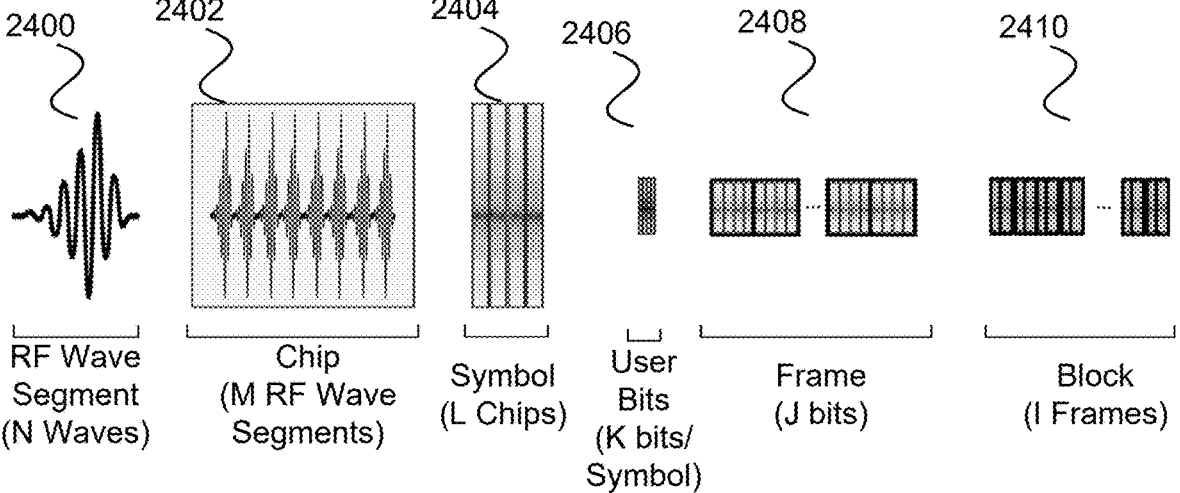
FIG. 24 is a diagram illustrating an embodiment of communication form for a satellite system.

FIG. 24 is a diagram illustrating an embodiment of communication form for a satellite system. In some embodiments, the communication form of FIG. 24 is used to communicate between a satellite and a receiver (e.g., satellite 410 and terminal 416 of FIG. 4A, Satellite 460 and terminal 466 of FIG. 4B, satellite of FIG. 17, terminal of FIG. 18, FIG. 19A, and/or FIG. 19B, etc.). In the example shown, a signal received by a satellite or terminal system (e.g., a HDR signal, a LDR signal, a LDR signal, a PNT signal, or any other appropriate system signal) comprises a block (e.g., block 2410) of data that holds H bits (e.g., H=J×I bits) in I frames, where each frame (e.g., frame 2408) includes J bits and is comprised of J/K symbols, where there are K user bits per symbol (e.g., user bits 2406), where a symbol (e.g., symbol 2404) has L chips, where each chip (e.g., chip 2402) includes M RF wave segments, and where each RF wave segment (e.g., RF wave segment 2400) includes N waves of the signal.

In some embodiments, there are a number of bits or bytes in a block and/or frame that are efficiently packed so that there is no space lost (e.g., 8 frames per block, 16 frames per block, 8, 16, 32, 64, 128, 256, 512, 1024, 2048, 4096 bits per frame, etc.).

In some embodiments, a block has 10 frames (e.g., 10,000 bits and each frame has 1000 bits). In some embodiments, there is 1 user bit per symbol. In some embodiments, there are 105 chips per symbol. In some embodiments, there are 40 waves per chip. In some embodiments, there are 5 waves per RF wave segment that spans 125 ps. In some embodiments, 1 chip spans 1 ns. In some embodiments, there are 12 messages in a block and each message is 80 bits.

Figure 25:
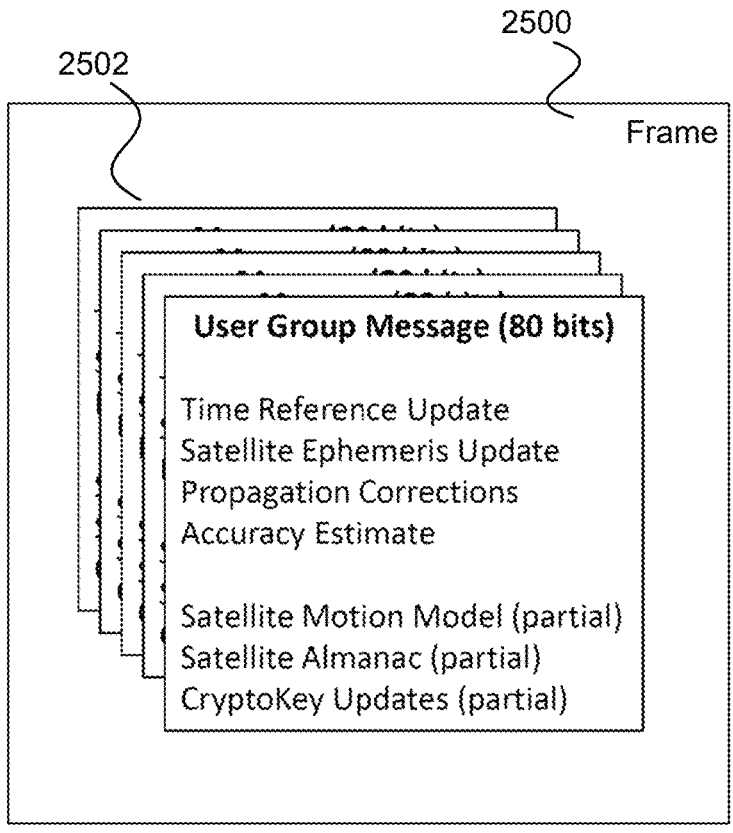
FIG. 25 is a diagram illustrating an embodiment of a frame.

FIG. 25 is a diagram illustrating an embodiment of a frame. In some embodiments, frame 2500 is used to implement frame 2408 of FIG. 24. In the example shown, frame 2500 includes a number of group messages (e.g., 4, 8, 12, 16, 32 or any appropriate number of messages) where each group message includes a number of user bits (e.g., 32, 64, 80, 96, or any other appropriate number of bits). In various embodiments, a user group message comprises one or more of the following: a time reference update, a satellite ephemeris update, a propagation correction, an accuracy estimate, a satellite motion model (partial), a satellite almanac (partial), a cryptokey update (partial), or any other appropriate data. In various embodiments, the partial data comprises data spread across multiple messages (e.g., across user group messages in a single frame or multiple frames). In some embodiments, a frame spans 100 ms and includes 1000 bits.

In an example, a frame spans 100 ms. In some embodiments, the frame includes at least three datagrams spanning up to 400 bits. A datagram of the at least three datagrams is associated with a user group. In some such embodiments, the user group is associated with a cryptographic key. In various embodiments, the datagram includes a time reference update, an ephemeris update for one or more satellites (e.g., a subset of satellites within field of view of a receiver system), propagation corrections, an accuracy estimate, satellite motion model parameters, a satellite almanac, cryptographic key updates, data structure formatting, or any other appropriate data. In some embodiments, the at least three datagrams are separately modified (e.g., accuracy is modified or in some cases impaired differently within each datagram of the at least three datagrams).

In various embodiments, a datagram includes time reference, satellite ephemeris for one or more satellites, satellite motion model parameters for the one or more satellites, local propagation corrections for the transmitting satellite, or any other appropriate data. In various such embodiments, the one or more satellites include satellites within field of view of a particular satellite's ground footprint, all satellites in a constellation, or any other appropriate set or subset of satellites. In some embodiments, a datagram is associated with a cryptographic key. In some embodiments, the cryptographic key is specific to an area (e.g., a ground footprint of a satellite) and a time period. In some such embodiments, the area is one of at least ten areas. In various embodiments, the time period is a four-hour period, 168-hour (one week) period, or any other appropriate time period. In various embodiments, the at least ten areas are modified based on the time period (e.g., every four hours) or another appropriate time period.

Figure 26:
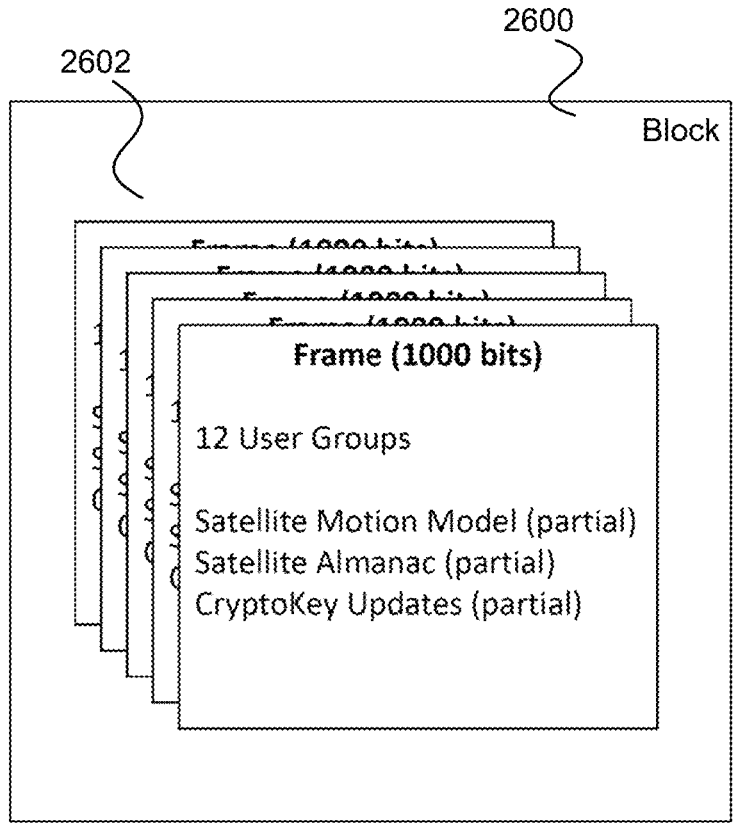
FIG. 26 is a diagram illustrating an embodiment of a block.

FIG. 26 is a diagram illustrating an embodiment of a block. In some embodiments, block 2600 is used to implement block 2410 of FIG. 24. In the example shown, block 2600 includes a number of frames (e.g., 10 frames) where each frame includes a number of bits (e.g., 1000 bits). In various embodiments, a frame includes 12 user group messages that includes satellite motion model (partial) information, satellite almanac (partial) information, cryptokey updates (partial), or any other appropriate information.

Figure 27:
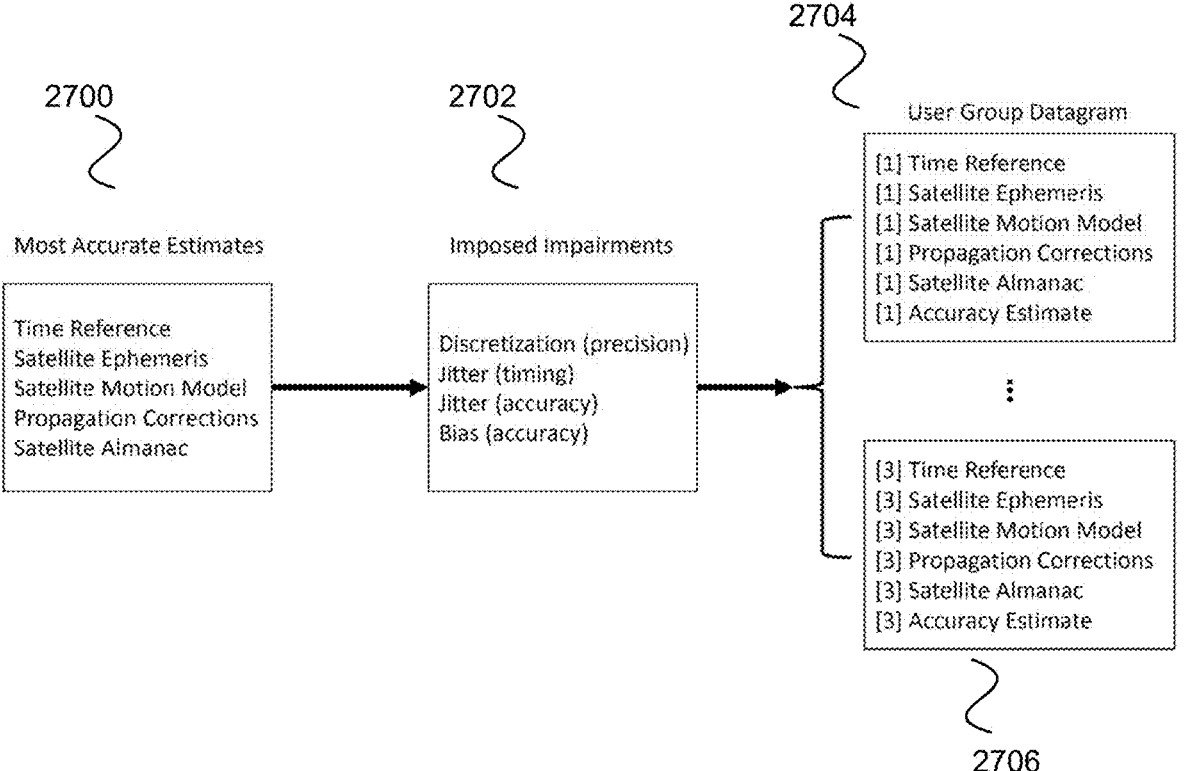
FIG. 27 is a diagram illustrating an embodiment of user group message information.

FIG. 27 is a diagram illustrating an embodiment of user group message information. In some embodiments, user group message information of FIG. 27 comprises user group message information of FIG. 25. In the example shown, different user groups have different accuracy levels of information (e.g., high level accuracy information, medium level accuracy information, low level accuracy information, etc.). Information for user group datagram 2704 and user group datagram 2706 each include time reference data, satellite ephemeris data, satellite motion model data, propagation correction data, satellite almanac data, and accuracy data. Information for user group datagram 2704 and user group datagram 2706 is derived from most accurate estimates 2700 of Time reference data, satellite ephemeris data, satellite motion model data, propagation correction, and satellite almanac. This most accurate estimates 2700 data is processed to generate imposed impairments 2702—for example, a discretization (e.g., precision) impairment, a jitter (e.g., timing) impairment, a jitter (e.g., accuracy) impairment, a bias (e.g., accuracy) impairment, etc. The imposed impairments 2702 are used with the most accurate estimates 2700 to generate user group datagram 2704 and user group datagram 2706 information with the different accuracy levels.

Figure 28:
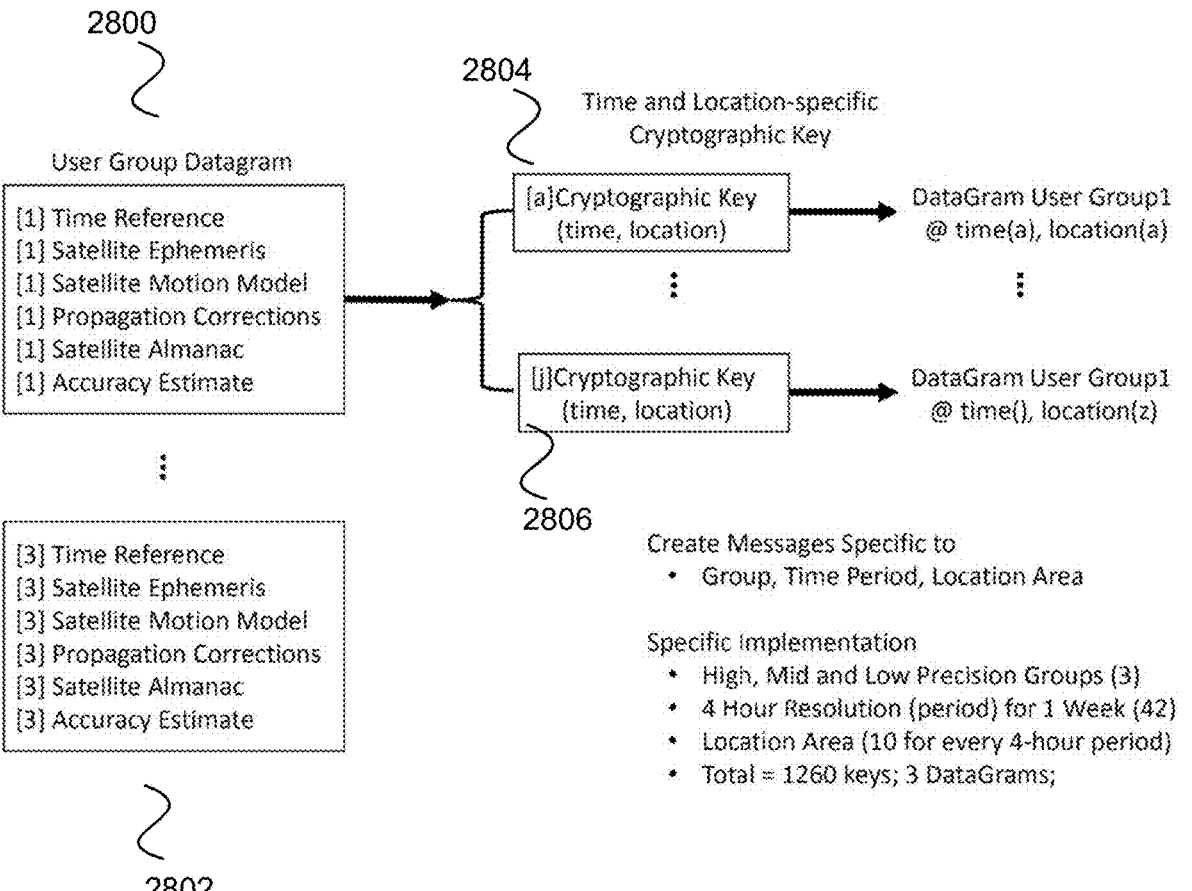
FIG. 28 is a diagram illustrating an embodiment of a group, a time period, and a location area selectivity.

FIG. 28 is a diagram illustrating an embodiment of a group, a time period, and a location area selectivity. In some embodiments, the user group datagram 2800 or user group datagram 2802 information of FIG. 28 comprises user group information of FIG. 27 (e.g., user group datagram 2704 and/or user group datagram 2706 information). In the example shown, user group datagram 2800 or user group datagram 2802 have data that can be configured for enabling selectivity of access to PNT information. For example, using cryptographic key 2804 and cryptographic key 2806 that are time period, location area, and group selective. In some embodiments, the system includes high, middle, and low precision groups, a 4 hour precision resolution (time period) for a week (e.g., 42 total time periods), and 10 location areas for every 4-hour period) for a total of 1260 keys in 3 datagrams.

Figure 29:
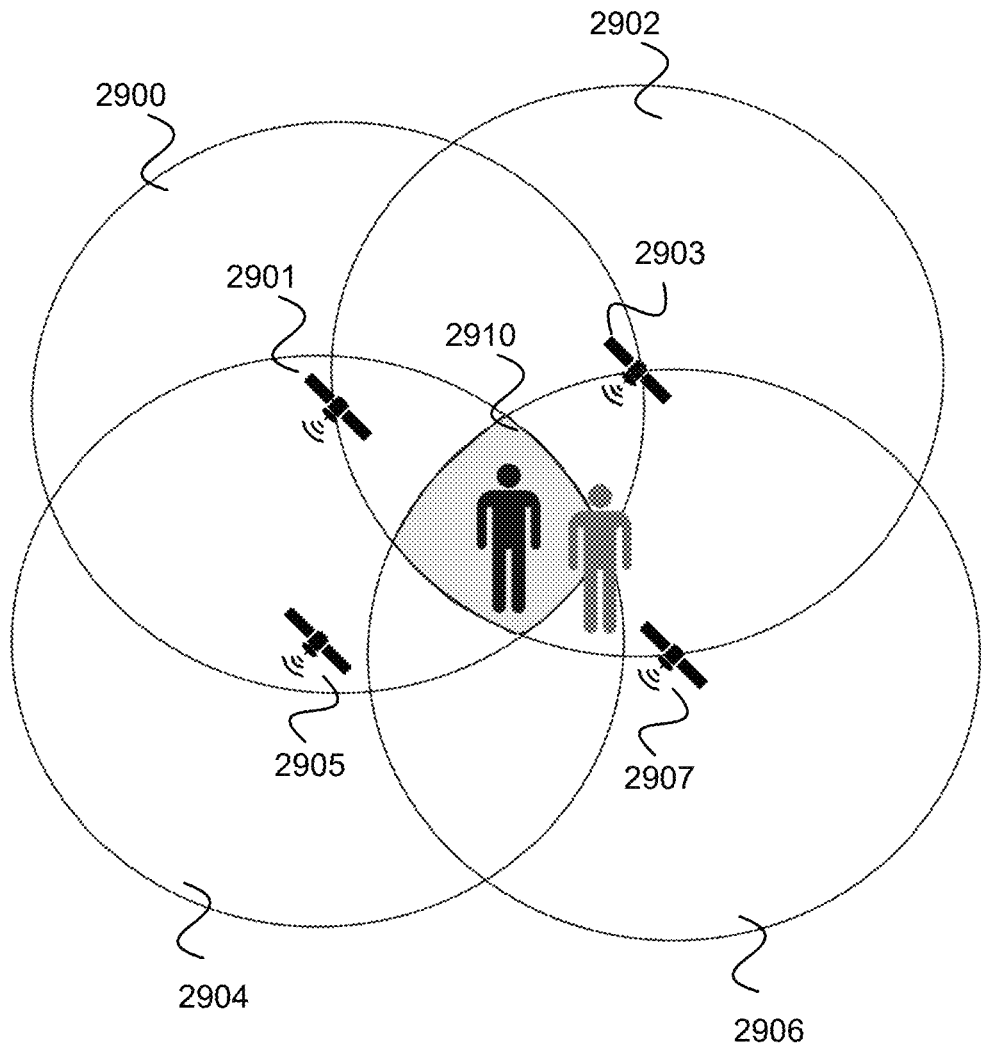
FIG. 29 is a diagram illustrating an embodiment of a spatial selectivity.

FIG. 29 is a diagram illustrating an embodiment of a spatial selectivity. In some embodiments, the satellites of FIG. 29 (e.g., satellite 2901, satellite 2903, satellite 2905, and satellite 2907) comprise satellite (e.g., satellite 410 of FIG. 4A, satellite 460 of FIG. 4B, satellite of FIG. 17, etc.). In the example shown, satellite 2901 projects its signal over area 2900, satellite 2903 projects its signal over area 2902, satellite 2905 projects its signal over area 2904, and satellite 2907 projects its signal over area 2906. The selectivity codes are set so that only in area 2910 are data for PNT accessible from 4 satellites.

Figure 30:
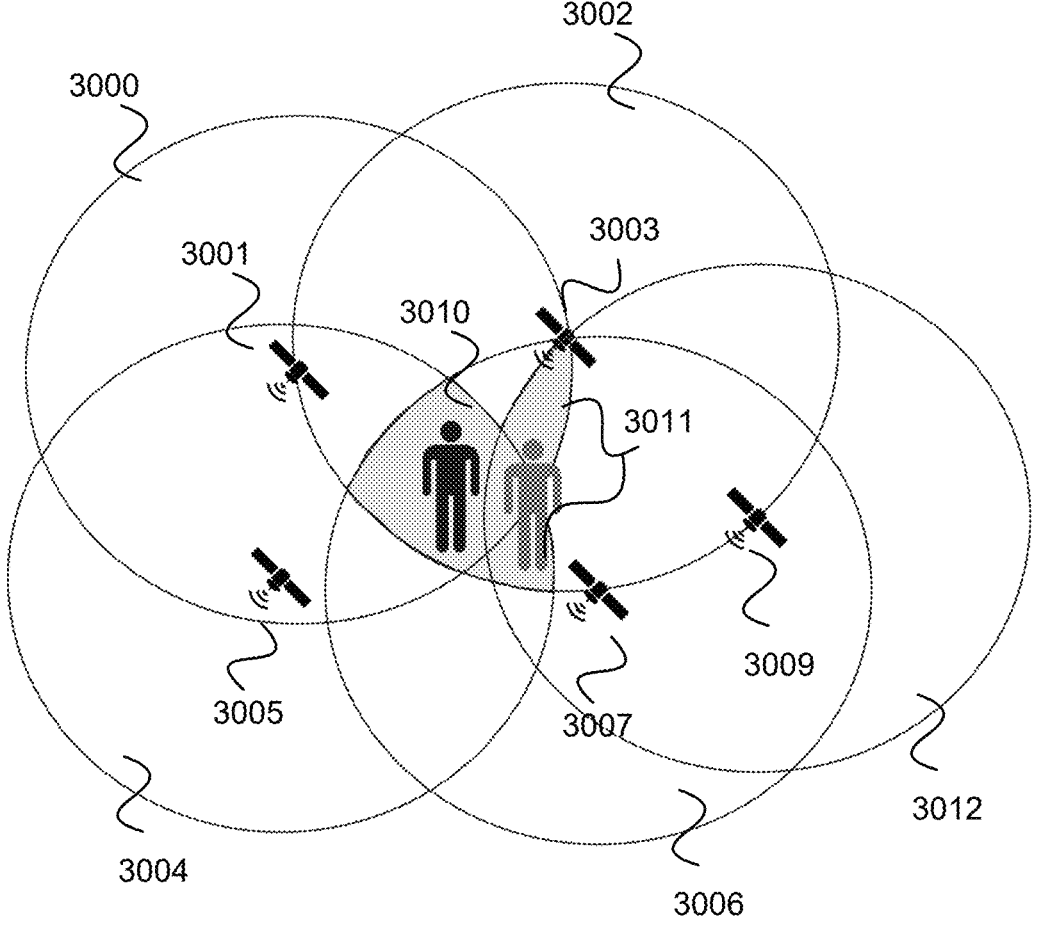
FIG. 30 is a diagram illustrating an embodiment of a spatial selectivity.

FIG. 30 is a diagram illustrating an embodiment of a spatial selectivity. In some embodiments, the satellites of FIG. 30 (e.g., satellite 3001, satellite 3003, satellite 3005, satellite 3007, and satellite 3009) comprise satellite (e.g., satellite 410 of FIG. 4A, satellite 460 of FIG. 4B, satellite of FIG. 17, etc.). In the example shown, satellite 3001 projects its signal over area 3000, satellite 3003 projects its signal over area 3002, satellite 3005 projects its signal over area 3004, satellite 3007 projects its signal over area 3006, and satellite 3009 projects its signal over area 3012. The selectivity codes are set so that only in area 3010 and areas 3011 are data for PNT accessible from 4 satellites.

Figure 31:
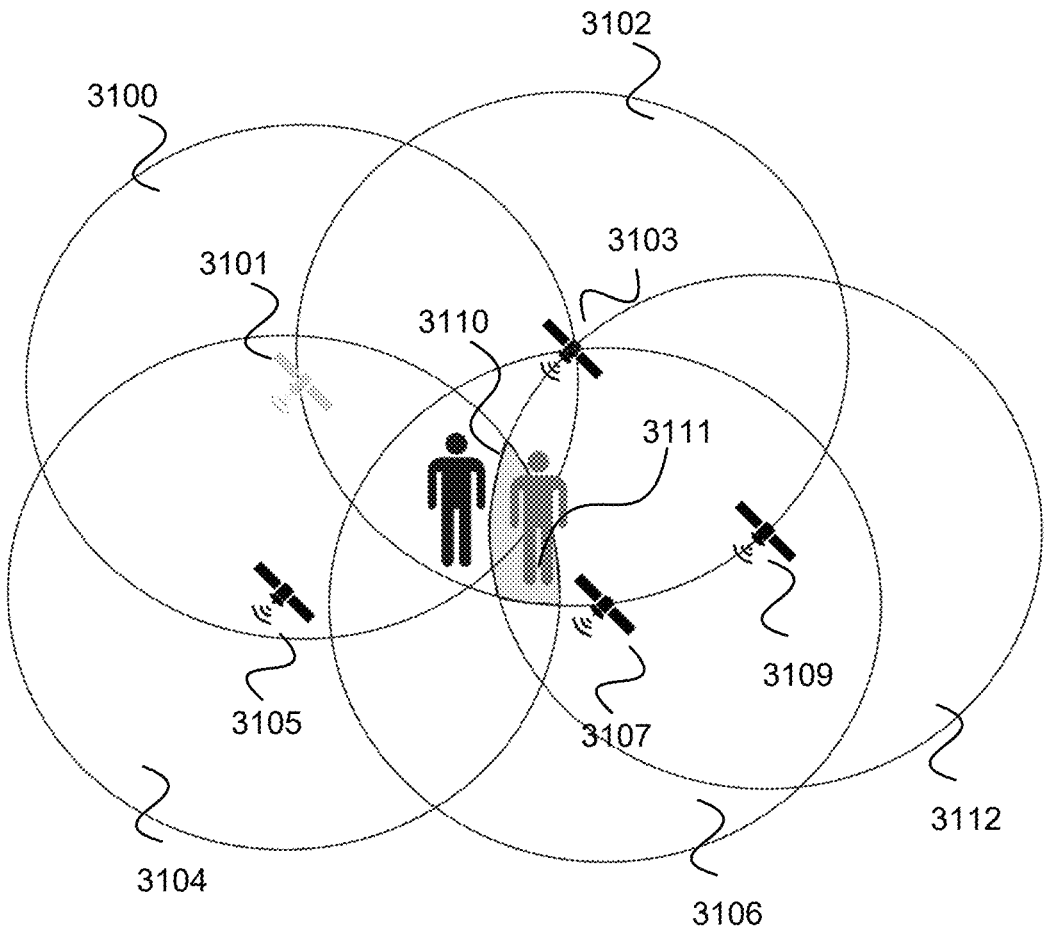
FIG. 31 is a diagram illustrating an embodiment of a spatial selectivity.

FIG. 31 is a diagram illustrating an embodiment of a spatial selectivity. In some embodiments, the satellites of FIG. 31 (e.g., satellite 3101, satellite 3103, satellite 3105, satellite 3107, and satellite 3109) comprise satellite (e.g., satellite 410 of FIG. 4A, satellite 460 of FIG. 4B, satellite of FIG. 17, etc.). In the example shown, satellite 3101 projects its signal over area 3100, satellite 3103 projects its signal over area 3102, satellite 3105 projects its signal over area 3104, satellite 3107 projects its signal over area 3106, and satellite 3109 projects its signal over area 3112. The selectivity codes are set so that only in area 3110 and areas 3111 are data for PNT accessible from 4 satellites.

Figure 32:
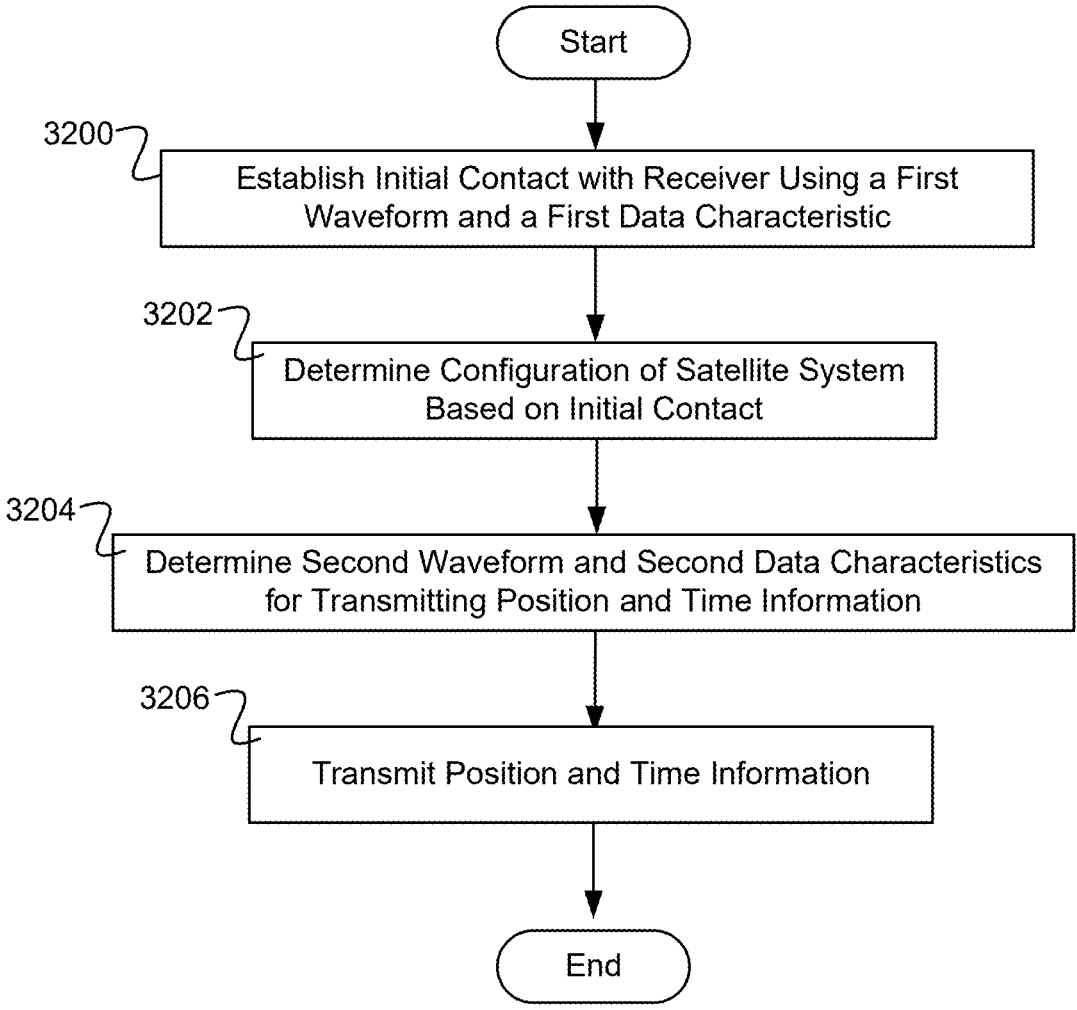
FIG. 32 is a flow diagram illustrating a embodiment of a process for a satellite system.

FIG. 32 is a flow diagram illustrating a embodiment of a process for a satellite system. In some embodiments, the process of FIG. 32 is implemented by a satellite or receiver (e.g., a ground terminal). In the example shown, in 3200 an initial contact is established with a receiver using a first waveform and a first data characteristic. In 3202 a configuration is determined of satellite system based on an initial contact. In 3204, a second waveform and a second data characteristic is determined for transmitting position and time information. In 3206, position and time information is transmitted.

Figure 33A:
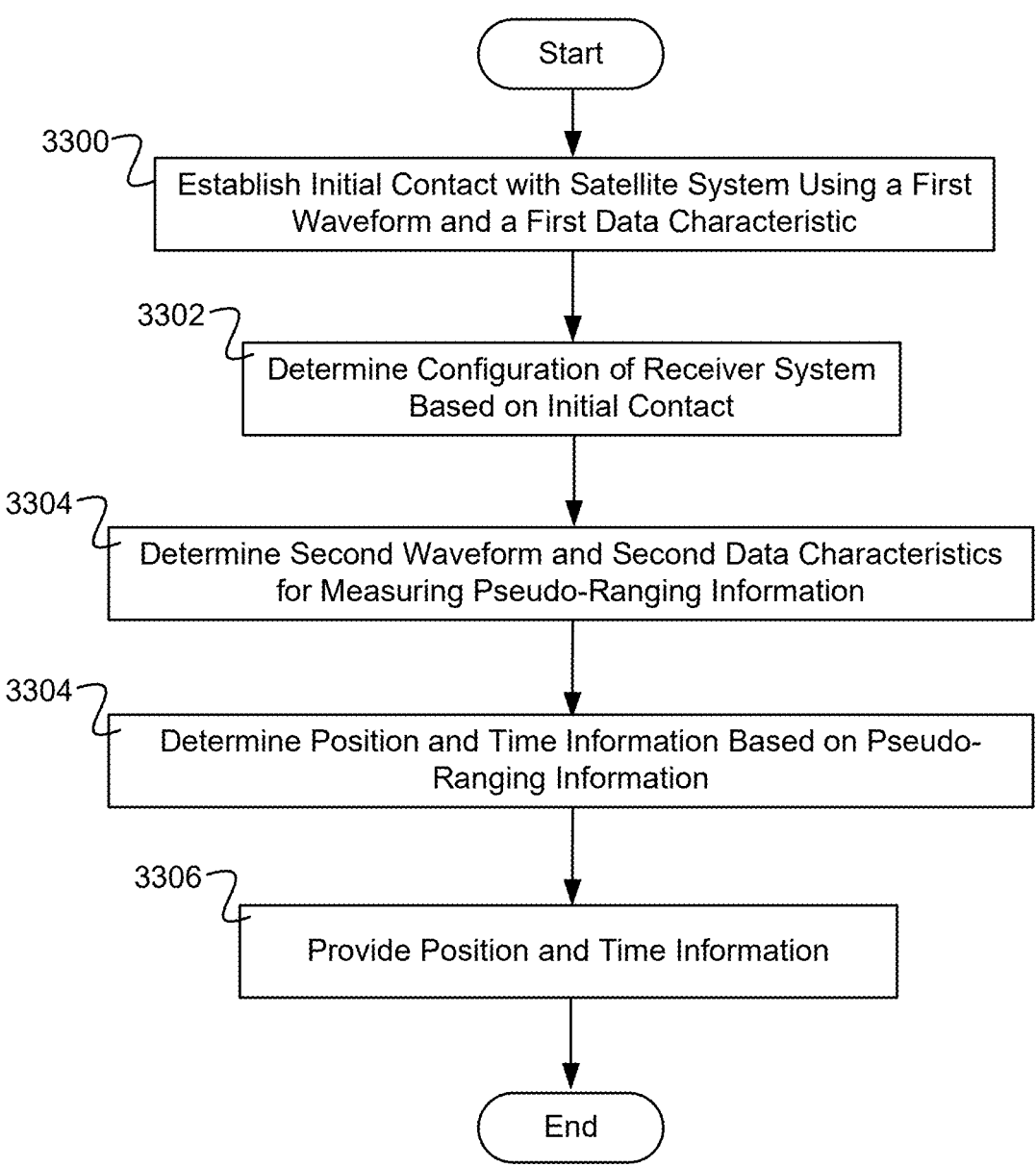
FIG. 33A is a flow diagram illustrating a embodiment of a process for a satellite system.

FIG. 33A is a flow diagram illustrating a embodiment of a process for a satellite system. In some embodiments, the process of FIG. 33A is implemented by a satellite or receiver (e.g., a ground terminal). In the example shown, in 3300 an initial contact is established with a satellite system using a first waveform and a first data characteristic. In 3302 a configuration is determined of receiver system based on an initial contact. In 3304, a second waveform and a second data characteristic is determined for measuring pseudoranging information. In 3306, position and time information is provided.

Figure 33B:
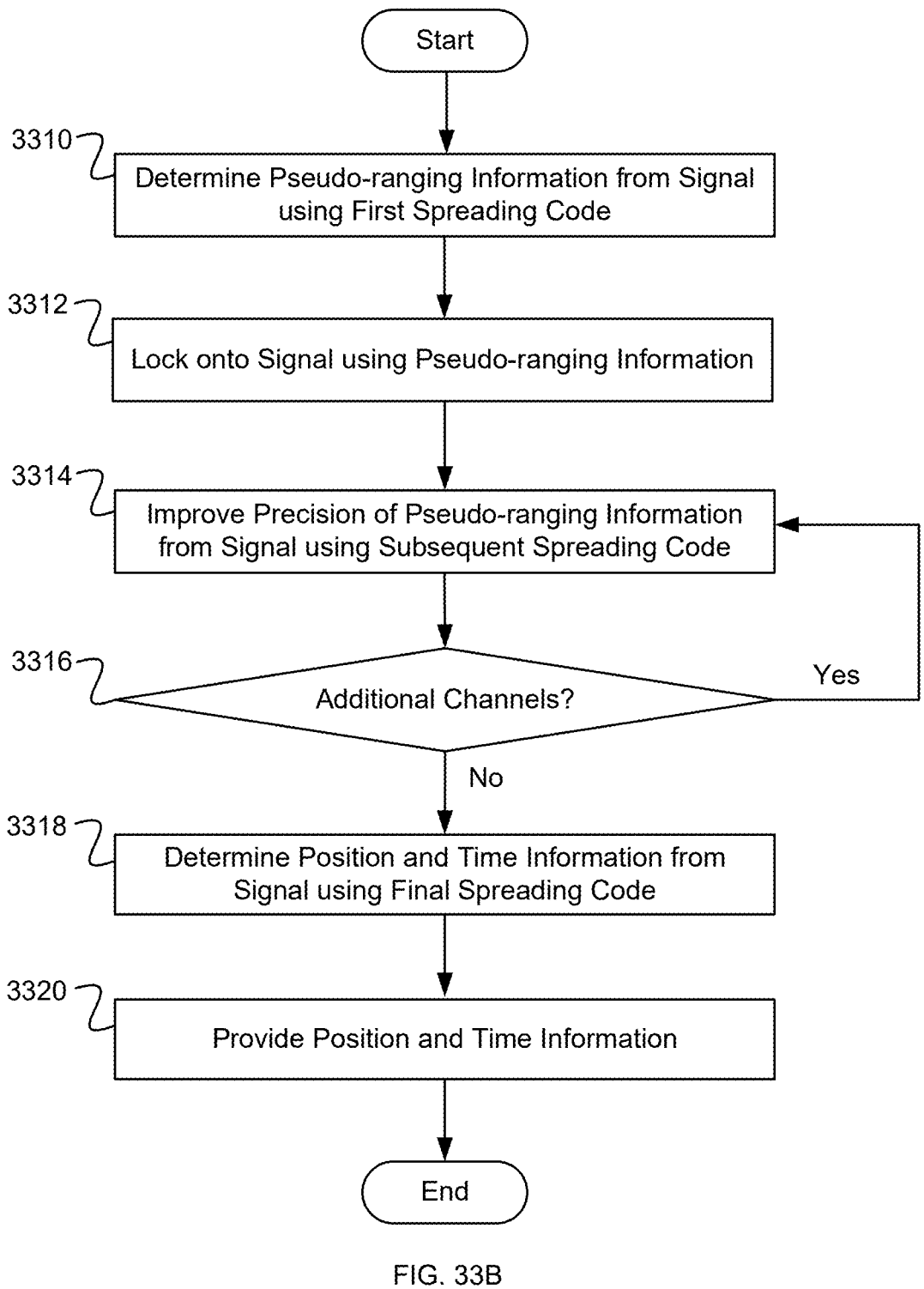
FIG. 33B is a flow diagram illustrating an embodiment of a process for a receiver system.

FIG. 33B is a flow diagram illustrating an embodiment of a process for a receiver system. In some embodiments, the process of FIG. 33B is implemented by a terminal system or receiver (e.g., terminal 416 of FIG. 4A, terminal 466 of FIG.

4B, terminal of FIG. 18, FIG. 19A, and/or FIG. 19B). In some embodiments, the process of FIG. 33A is used implement 3304 of FIG. 33B. In the example shown, in 3310 pseudo-ranging information is determined from signal using first spreading code. In 3312, a signal is locked onto using the pseudo-ranging information. In 3314, the precision of the pseudo-ranging information is improved from the signal using a subsequent spreading code. In 3316 it is determined whether there are additional channels. In response to there being additional channels, control passes to 3314. In response to there not being additional channels, control passes to 3318. In 3318, position and time information is determined from the signal using final spreading code. In 3320, position and time information is provided.

Figure 33C:
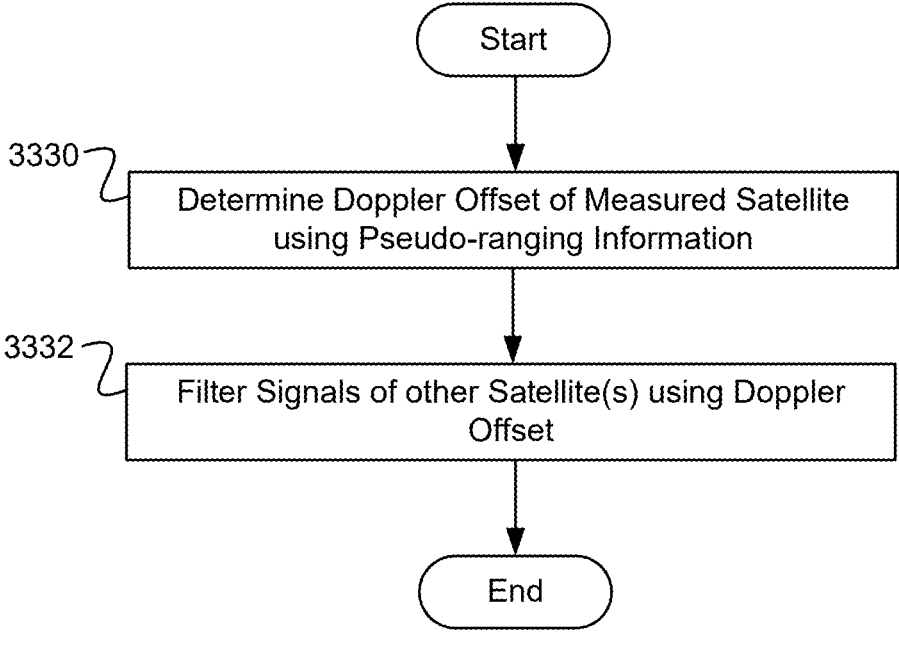
FIG. 33C is a flow diagram illustrating an embodiment of a process for a receiver or satellite system.

FIG. 33C is a flow diagram illustrating an embodiment of a process for a receiver or satellite system. In some embodiments, the process of FIG. 33C is implemented by a terminal system or receiver (e.g., terminal 416 of FIG. 4A, terminal 466 of FIG. 4B, terminal of FIG. 18, FIG. 19A, and/or FIG. 19B). In the example shown, in 3330 a doppler offset of a measured satellite is determined using pseudo-ranging information. In 3332, signals of other satellite(s) is/are filtered using the doppler offset.

Figure 34:
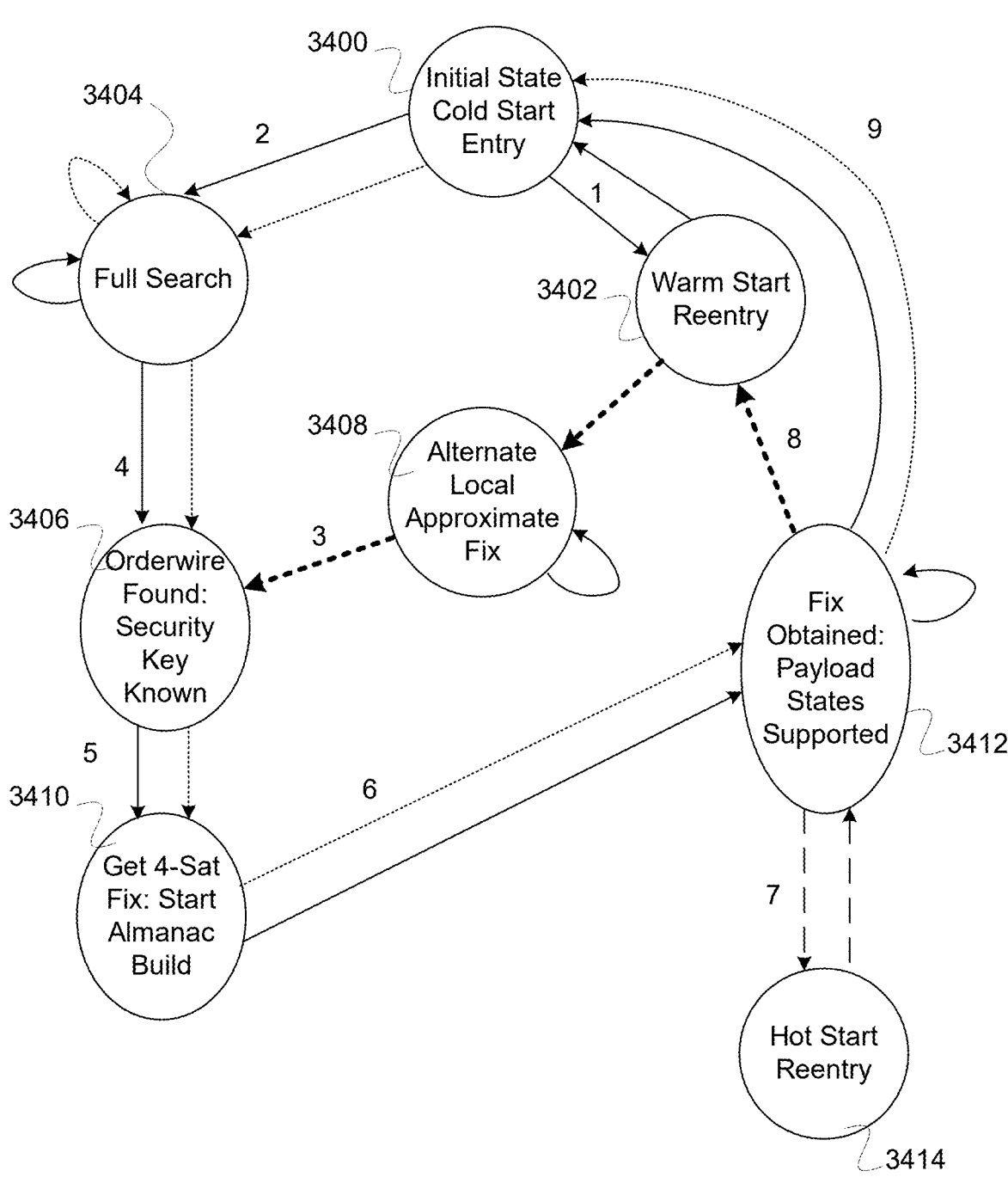
FIG. 34 is a diagram illustrating an embodiment of states for a terminal system.

FIG. 34 is a diagram illustrating an embodiment of states for a terminal system. In some embodiments, the states are used in communicating between a satellite and a receiver (e.g., satellite 410 and terminal 416 of FIG. 4A, Satellite 460 and terminal 466 of FIG. 4B, satellite of FIG. 17, terminal of FIG. 18, FIG. 19A, and/or FIG. 19B, etc.). In the example shown, state 3400 comprises an initial state referred to as a cold start entry point. For example, a terminal is powered on and needs to establish a connection to the satellite network. In some embodiments, it is determined whether the system is able to start with a warm start because the system has information about its position, constellation's satellites positions, and/or time (e.g., from a stored position in global positioning system (GPS) information, WiFi delivered information, etc.) that is sufficient to try a narrower search to acquire contact with the constellation. In response to determining that the system is able to start with a warm start, the system transitions to state 3402. In response to determining that the system is not able to start with a warm start, the system transitions to state 3404 from state 3400. In some embodiments, for state 3400, optimizations to improve cold start occur in multiple steps. In some embodiments, a fall back comprises a brute force search (e.g., a broad search over doppler space and time). In some embodiments, an original satellite almanac is used to estimate a satellite location. In some embodiments, in the case that a self-location estimate is less than ½ beamwidth, then a doppler range is computed to reduce the search space. In some embodiments, a timeout associated with a search comprises a lack of signal acquisition lock (e.g., a timeout of 2 seconds of data—for example, generally less than 20 seconds). In some embodiments, if a warm start is not available, a repeated code within a spreading sequence allows a reduced doppler and time search with reduced processing gain; this technique is effective at higher signal to noise ratio (SNR) when the channel is not degraded due to environmental conditions.

In state 3404, the system does a full search based on the information it possesses (e.g., previously stored information stored in non-volatile memory (NVM), driver-based configuration, etc.). For example, the terminal system listens for initial contact information on a system designated frequency or frequencies. In this example, the terminal system does a broad search with wider parameter sweeps under the assumption that the location or time information has potential inaccuracies so that relative satellite positions are not exactly known. Once transmissions on the system designated frequency or frequencies is acquired and a known configuration is identified (e.g., a LDR transmission), the state transitions to state 3406.

In state 3402, the system does a warm start reentry with control passing to state 3408. For example, control passes to state 3408. In state 3408, an alternate more limited search is performed with the knowledge of a local position and time (e.g., using a GPS lock of the terminal) and the terminal system listens for initial contact information on a system designated frequency or frequencies. Once transmissions on the system designated frequency or frequencies is acquired and a known configuration is identified (e.g., a LDR transmission), the state transitions to state 3406. In some embodiments, in response to state 3402 timing out or the warm start reentry failing then warm start state transitions back to state 3412 (not shown) with an indication to transition to cold start entry state (e.g., state 3400) or transitions directly to state 3400 (also not shown).

In state 3406, once one satellite is known and the system has LDR connectivity, a security key is acquired to obtain a secure fix for secure communications between the ground terminal and the satellite network and almanac information is acquired to do a 4-satellite fix to be able to perform full demodulation, decoding, decryption, and positioning for the terminal. The state transitions to state 3410.

In state 3410, get 4-satellite fix and complete almanac build. For example, beamforming gain is used towards other satellites in the constellation beyond the initial LDR connected satellite to obtain enough information for full satellite position lock or full broadband data connectivity. In some embodiments, the 4-satellite fix includes aging out satellites and acquiring new satellites to maintain connectivity with the satellite network. Once fix is obtained, the state transitions to 3412.

In state 3412, the network fix has been obtained and payload states are supported. For example, the terminal system maintains connectivity with the satellite network and while connected the network supports different services such as a position, navigation, and timing service, a broadband data network service, a low data rate data network service, etc. In some embodiments, when a fix is obtained it means that a steady state of connectivity with the satellites of the system or a global navigation satellite system (GNSS) or both are known. In some embodiments, in state 3412, the almanac is stored periodically to a non-volatile memory in the terminal. In some embodiments, in state 3412, in response to a loss of lock or connectivity with the network, the terminal attempts to recover lock in the order of using a hot start reentry (e.g., hot start reentry state 3414), using a warm start reentry (e.g., warm start reentry state 3402), and then using a cold start entry (e.g., initial state cold start entry state 3400) with appropriate optimizations and timeouts.

In state 3414, shows a hot start re-entry state, which is used to reestablish connectivity with the satellite network to a terminal if the loss of lock is known momentary and prior state has high integrity so that the reacquisition of connectivity can take advantage of the relative known locations of satellites from the position of the terminal previously established during the locked session. In some embodiments, state 3414 includes reacquisition optimizations using current estimates of satellite locations using almanac, orbit prediction models within PNT messages, and current receiver location and time to reduce doppler/time offset search space and quick timeout (e.g., 1 second). In some embodiments, in response to state 3414 timing out or the hot start reentry failing then hot start state transitions back to 3412 with an indication to transition to warm start reentry state (e.g., state 3402) or transitions directly to state 3402 (not shown).

In some embodiments, if the terminal does not have GPS/GNSS or it is blocked then the system will follow the dotted line paths. In some embodiments, if there is no alternate path to get a fix then the warm and hot start have to depend or prior PNT states that are helpful or do a cold start.

A satellite communication system is disclosed. The satellite communication system comprises a transmitter and a processor. The processor is configured to receive data at a satellite; determine a satellite time for the satellite based at least in part on the data; adjust a local time reference of the satellite; and provide the satellite time from the satellite to another satellite in a constellation.

A satellite communication system is disclosed. The satellite communication system comprises a transmitter and a processor. The processor is configured to receive true time at a terminal; acquire a first communication link with a satellite using a first protocol; determine a second communication link with the satellite using a second protocol; and provide the true time to the satellite in a constellation using the transmitter.

In some embodiments, a communication system includes a ground station and a constellation of satellites. The satellite system is used for delivering position, navigation, and time information. In some embodiments, the ground station provides the satellite constellation satellites with a true time so that a satellite can update its clock and recalibrate to a time reference (e.g., the true time). The satellites of the satellite constellation can then be updated by having the satellite propagate the true time to other satellites in the constellation.

In some embodiments, the ground station provides almanac information and/or satellite orbit elements. For example, satellite almanac information may include location accuracy, time synch accuracy, last position update time, last motion model update time, etc. As another example, satellite orbit elements include eccentricity, a semi-major axis, semi-minor axis, a semi-parameter, an apoapsis, a periapsis, an inclination, a longitude ascending node, an argument of periapsis, a longitude of periapsis, etc.

In some embodiments, receiving the data comprises acquiring a communication link. In some embodiments, the data comprises receiving the time-of-day using a communication link. In some such embodiments, the time-of-day has a resolution of 1 ps or less and an accuracy of 100 ps or less (i.e., lower time values, higher resolution and accuracy). In some embodiments, receiving the time-of-day comprises receiving a first short pulse or a first high bandwidth signal. In some such embodiments, the first short pulse is at most 100 ps. In some embodiments, the first high bandwidth signal is at least 10 GHz. In some embodiments, receiving the time-of-day comprises measuring a time of arrival of the first short pulse or the first high bandwidth signal. In some embodiments, receiving the time-of-day comprises transmitting a second short pulse or a second high bandwidth signal after a precise time delay from the time of arrival of the first short pulse or the first high bandwidth signal. In some embodiments, the precise time delay comprises a time delay with a precision of 100 ps or less (i.e., lower time value, higher precision). In some embodiments, receiving the time-of-day comprises receiving a propagation time. In some embodiments, receiving the time-of-day comprises determining a propagation time. In some embodiments, the propagation time is determined with an accuracy of 100 ps or less (i.e., lower time value, higher accuracy). In some embodiments, determining the satellite time is based on the propagation time. In some embodiments, receiving the data at the satellite is from a ground station. In some embodiments, receiving the data at the satellite is from an other satellite. In some embodiments, the satellite time is adjusted for the other satellite based on the propagation time and transmitted to the other satellite. For example, if the propagation time is determined to be exactly 10 ns, a modified satellite time exactly 10 ns less than the satellite time may be transmitted to the other satellite. Thus, the other satellite receives an unbiased value for the satellite time limited by the accuracy of the ground station time. In some embodiments, providing the satellite time comprises acquiring a communication link. In some embodiments, the satellite time comprises transmitting a time-of-day using the communication link. In some embodiments, providing the satellite time comprises transmitting a first short pulse or first high bandwidth signal. In some embodiments, providing the satellite time comprises measuring a time of arrival of a second short pulse or second high bandwidth signal. In some embodiments, providing the satellite time comprises receiving a second short pulse or second high bandwidth signal after a precise time delay from the time of arrival of the first short pulse or first high bandwidth signal. In some embodiments, providing the satellite time comprises transmitting a propagation time. In some embodiments, providing the satellite time comprises uses an optical link. In some embodiments, the true time is received using United State Navel Observatory (USNO) time standard or GPS. In some embodiments, the position of the terminal (e.g., a ground terminal) is received using USNO time standard or GPS. In some embodiments, the true time is received to an accuracy of 1 ns or less (i.e., lower time value, higher accuracy). In some embodiments, the position of the terminal is received to an accuracy of 0.3 m or less (i.e., lower distance value, higher accuracy). In some embodiments, the position of the terminal is transmitted to the satellite in the constellation using the transmitter. In some embodiments, providing the true time comprises transmitting a time-of-day using the communication link at the satellite. In some embodiments, providing the true time comprises transmitting a first short pulse or first high bandwidth signal. In some embodiments, providing the true time comprises measuring a time of arrival of a second short pulse or second high bandwidth signal. In some embodiments, providing the true time comprises receiving a second short pulse or second high bandwidth signal that was sent after a precise time delay from the time of arrival of the first short pulse or first high bandwidth signal at the satellite. In some embodiments, providing the satellite time comprises transmitting a propagation time. In some embodiments, the processor is further configured to provide a satellite almanac. In some embodiments, the satellite almanac comprises a location accuracy. In some embodiments, the satellite almanac comprises a time synch accuracy. In some embodiments, the processor is further configured to provide orbit elements to the satellite using the transmitter. In various embodiments, the orbit elements comprise an eccentricity, a semi-major axis, a semi-minor axis, or a semi-parameter. In various embodiments, orbit elements comprise an apoapsis, a periapsis, or an inclination. In various embodiments, orbit elements comprise a longitude ascending node, an argument of periapsis, or a longitude of periapsis.

Figure 35:
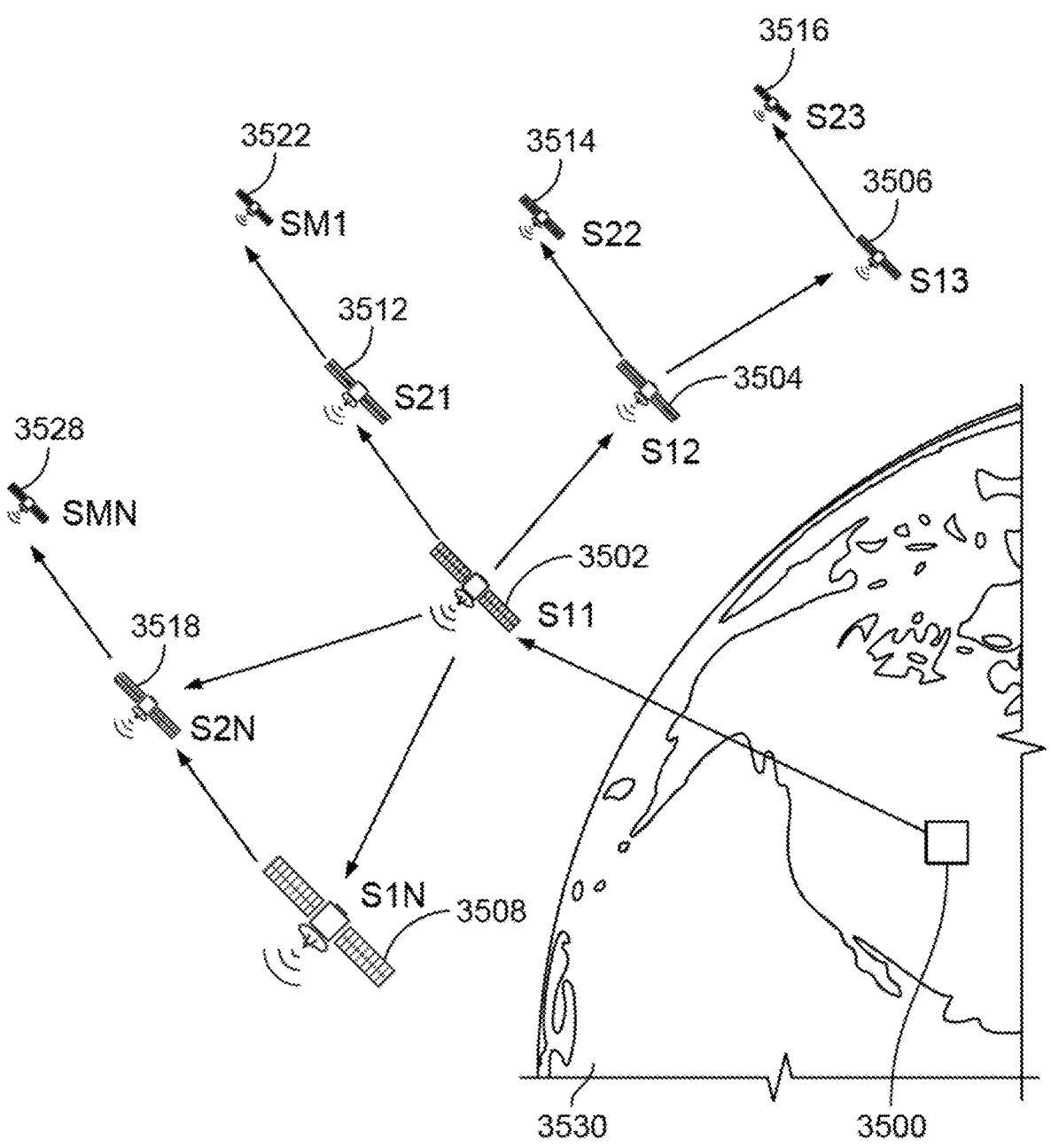
FIG. 35 is a block diagram illustrating an embodiment of a satellite system.

FIG. 35 is a block diagram illustrating an embodiment of a satellite system. In various embodiments, a satellite of the constellation in FIG. 35 comprises a satellite (e.g., satellite 100 of FIG. 1, satellite 410 of FIG. 4A, satellite 460 of FIG. 4B, or any other appropriate satellite. In the example shown, ground station 3500 is located on planet earth 3530. Ground station 3500 communicates with a satellite of a satellite constellation (e.g., satellite S11 3502). Ground station 3500 receives its time and/or its location (e.g., using GPS) from a service or prior measurement. Ground station 3500 provides its time and/or its location to satellite S11 3502. In various embodiments, ground station 3500 provides one or more of the following to satellite S11 3502: an almanac, satellite positions, satellite models, satellite model parameters, or any other appropriate information. Satellite S11 3502 determines a local satellite true time based at least in part on the time received from ground station 3500. In some embodiments, satellite S11 3502 determines a local satellite position based at least in part on the location received from ground station 3500.

In some embodiments, the satellite then passes on information (e.g., time, position, almanac, satellite positions, satellite models, satellite model parameters, etc.) to constellation members (e.g., satellite S11 3502 sends information to satellite S12 3504, satellite S21 3512, satellite S2N 3518, and satellite S1N 3508)—for example, passing it to neighboring constellation satellites. Subsequently, the constellation members that have received information then pass the information to other constellation members (e.g., next neighbors—for example for satellite S2N 3518 sends to satellite SMN 3528, satellite S1 3512 sends to satellite SM1 3522, satellite S12 3504 sends to satellite S22 3514, satellite S12 3504 sends to satellite S13 3506, and satellite S1N 3508 sends to satellite S2N 3518).

Figure 36:
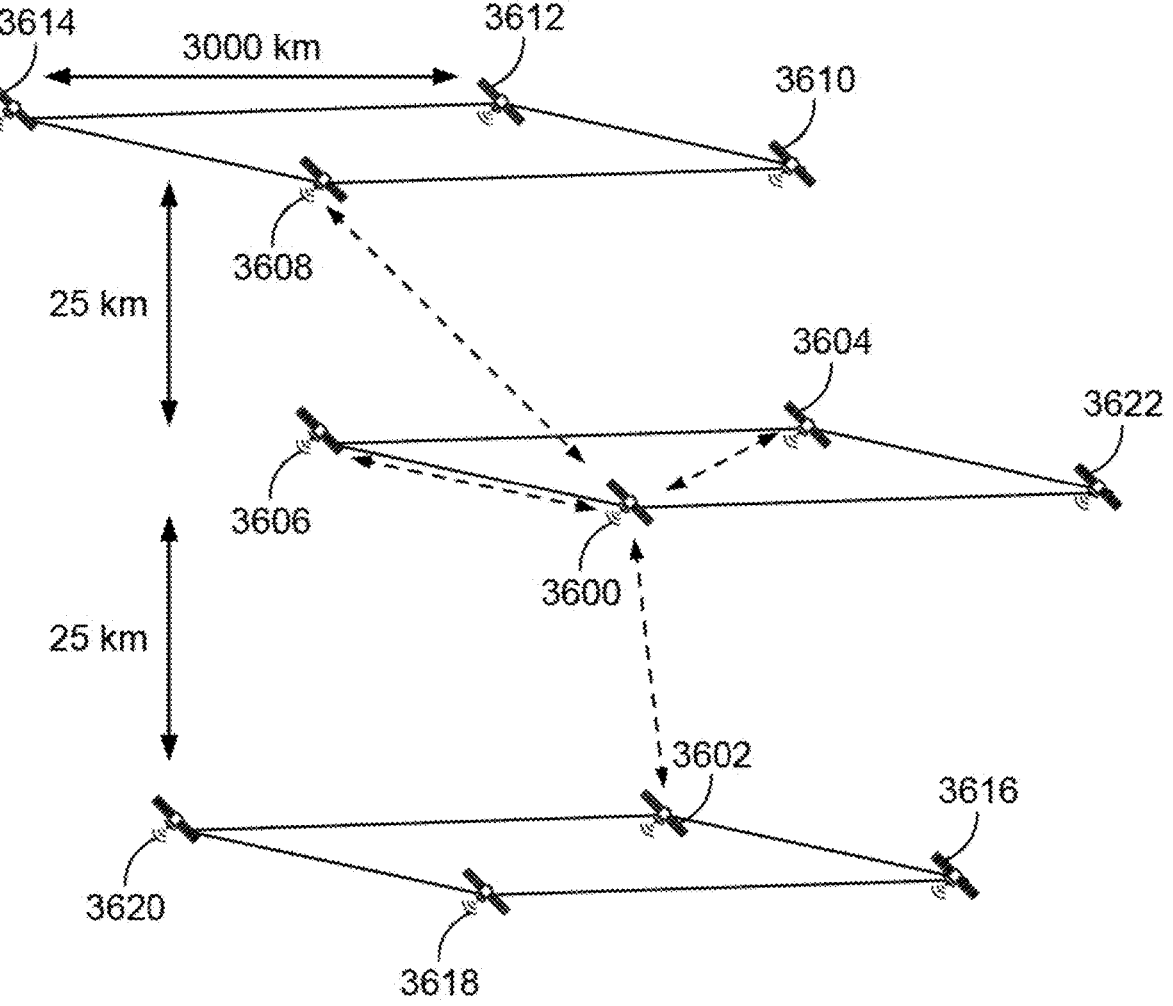
FIG. 36 is a diagram illustrating an embodiment of a satellite system.

FIG. 36 is a diagram illustrating an embodiment of a satellite system. In some embodiments, the portion of the satellite system shown in FIG. 36 comprises satellites (e.g., satellite 3600, satellite 3602, satellite 3604, satellite 3606, satellite 3608, satellite 3610, satellite 3612, satellite 3614, satellite 3616, satellite 3618, satellite 3620, satellite 3622, etc.) that are implemented using satellite 100 of FIG. 1. In the example shown, satellite 3600 has an updated set of information (e.g., time, location, models, almanac, etc.) and sends updates to neighboring satellites in the constellation (e.g., satellite 3602, satellite 3604, satellite 3606, and satellite 3608).

In some embodiments, the constellation comprises satellites in a number of shells that are separated by a difference in altitude (e.g., 25 km), where the satellites are separated within the shell by a separation distance (e.g., 3000 km). In the example shown, satellites are shown in three shells: a lower shell with four satellites (e.g., satellite 3602, satellite 3616, satellite 3618, and satellite 3620), a middle shell with four satellites (e.g., satellite 3600, satellite 3604, satellite 3606, and satellite 3622), and an upper shell with four satellites (e.g., satellite 3608, satellite 3610, satellite 3612, and satellite 3614).

In some embodiments, the multi-shell, multi-plane, multi-satellite constellation provides for a superior geometric dilution of precision (GDOP) (e.g., less than 2). In some embodiments, the transfer of information comprises a hand-shaking 2-step process that includes a time transfer between satellite pairs (e.g., using short pulses or high bandwidth signals and time-of-flight measures via an optical link). In some embodiments, the transfer of information comprises PNT acquisition from multiple (e.g., greater than four) satellites (e.g., achieving less than 5 cm location error and less than 100 ps timing error).

Figure 37:
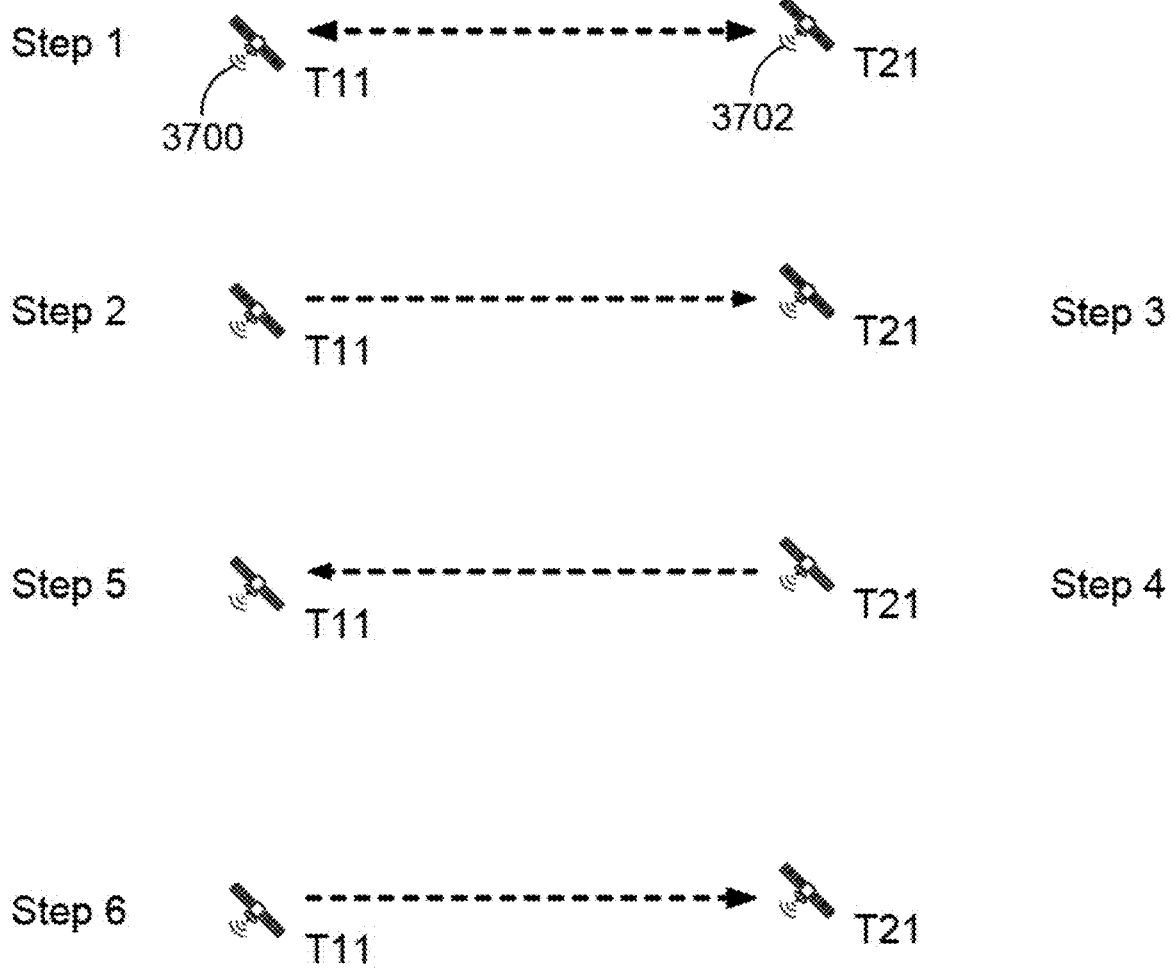
FIG. 37 is a diagram illustrating an embodiment of a satellite system.

FIG. 37 is a diagram illustrating an embodiment of a satellite system. In some embodiments, the steps of FIG. 37 comprises a transfer of timing information between satellites (e.g., satellite 3600 and satellite 3602, satellite 3604, satellite 3606, or satellite 3608). In the example shown, step 1 comprises acquiring communication between two satellites (e.g., satellite T11 3700 and satellite T21 3722 in step 1) and transmitting almanac estimates (e.g., satellite position model parameters) and a time-of-day). Step 2 comprises satellite T11 transmitting a short pulse (e.g., less than 10 ps) to satellite T21 at a first time-of-day. Step 3 a time-of-day (TOD2) is measured when the short pulse is received by satellite T21. Step 4 comprises satellite T21 transmits a short pulse (e.g., less than 10 ps) to satellite T11 after a precise time delay (e.g., delta T). Step 5 comprises a time-of-day (TOD3) measurement when the pulse is received by satellite T11 and a range between the satellites is determined using the time-of-day measurements (e.g., (TOD3−TOD2−delta T)/2). Step 6 comprises satellite T11 communicating to satellite T21 a current time of day (TOD4) and range and satellite T21 computes its time-of-day from TOD4 plus offset from propagation time from traveling the range between the satellites.

Figure 38:
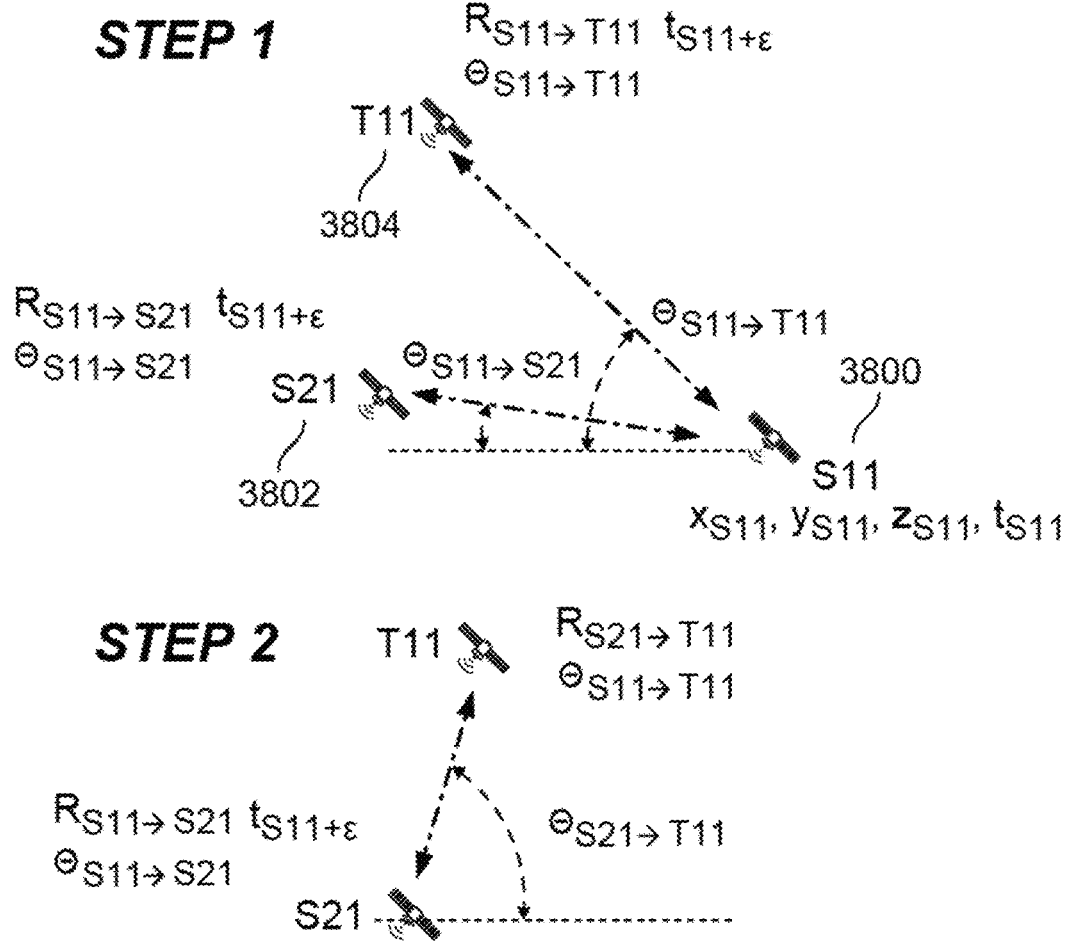
FIG. 38 is a diagram illustrating an embodiment of a satellite system.

FIG. 38 is a diagram illustrating an embodiment of a satellite system. In some embodiments, the steps of FIG. 38 comprise a transfer of position information between satellites (e.g., between S11 3800 and S21 3802 and T11 3804 in step 1). In the example shown, step 1 comprises a time transfer between a node with a known location and time (e.g., S11) to neighboring nodes (e.g., S21 and T11). Ranges are computed between S11 and S21 and between S11 and T11 from a time of arrival for a time transfer and a measurement of angles (e.g., measured using an optical link with a precision optical head) between nodes (e.g., $\theta_{S11 \to S21}$ and $\theta_{S11 \to T11}$). Step 2 comprises a time transfer between nodes (e.g., between S21 and T11. Range is computed between S21 and T11 from a time of arrival for a time transfer and a measurement of an angle (e.g., measured using an optical link with a precision optical head) between nodes (e.g., $\theta_{S21 \to T11}$). Step 3 (not shown) comprises computing the position of S21 and T11 from six equations (e.g., the 3 angle equations and the 3 range equations to compute the 6 position unknowns).

Figure 39:
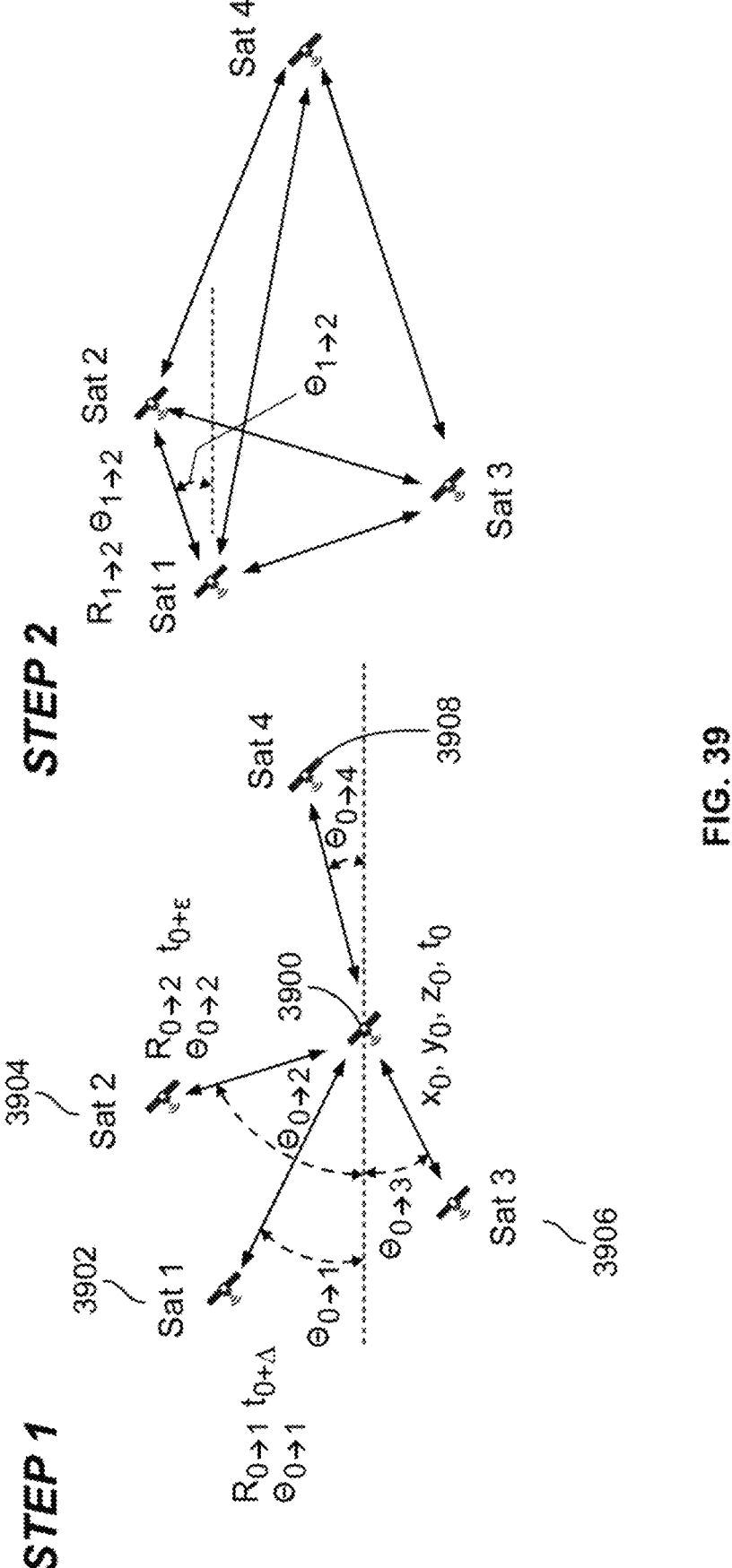
FIG. 39 is a diagram illustrating an embodiment of a satellite system.

FIG. 39 is a diagram illustrating an embodiment of a satellite system. In some embodiments, the steps of FIG. 39 comprise a transfer of position information between satellites (e.g., between satellite 3900 and sat 1 3902, sat 2 3904, sat 3 3906, and sat 4 3908 of step 1). In the example shown, step one comprises deriving the location and time unknowns associated with four satellites (e.g., sat 1 3902, sat 2 3904, sat 3 3906, and sat 4 3908 of step 1) using 4 angle measurements from the known satellite (e.g., satellite 3900 with a known position and time) and 4 range measurements from the known satellite. In addition, there are also 6 angle measurements and 6 ranges between the pairs of the unknown satellites (e.g., angles and ranges between {sat 1, sat 2}, {sat 1, sat 3}, {sat 1, sat 4}, {sat 2, sat 3}, {sat 2, sat 4}, and {sat 3, sat 4}). These 20 equations can be used to solve for the 16 unknowns (e.g., positions and time) for the four unknown satellites.

Figure 40:
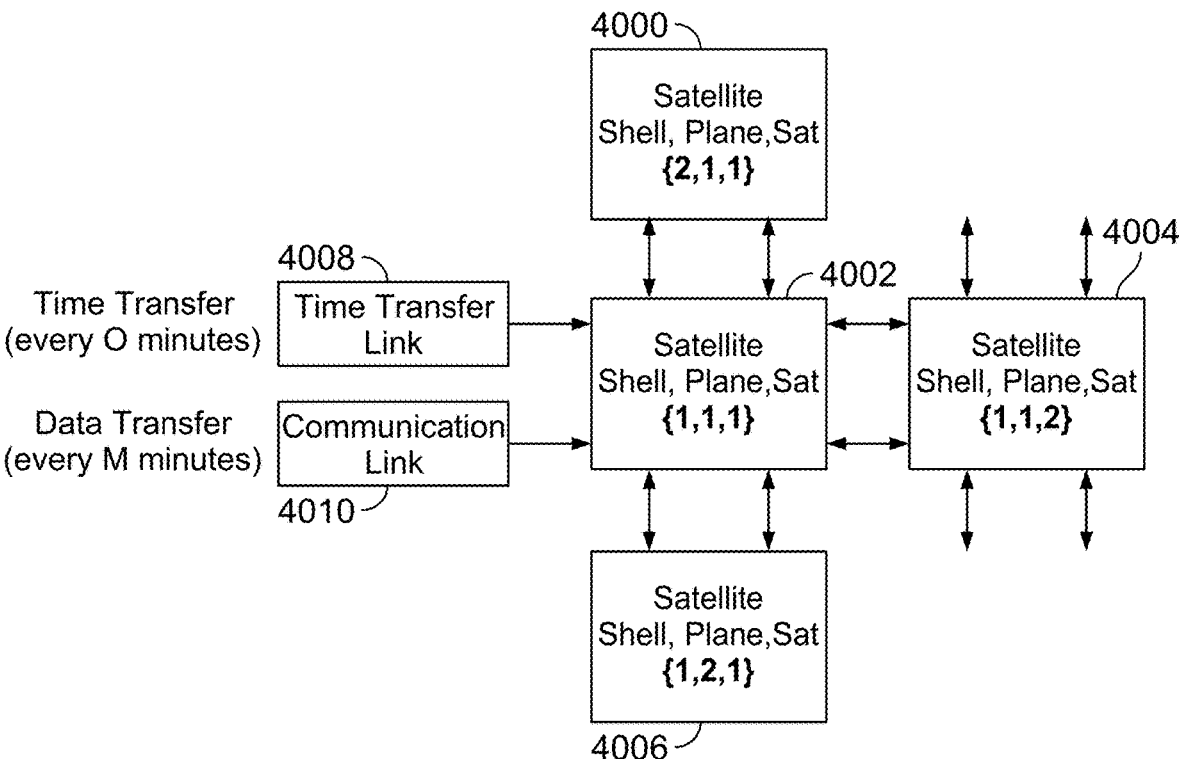
FIG. 40 is a diagram illustrating an embodiment of a satellite system.

FIG. 40 is a diagram illustrating an embodiment of a satellite system. In some embodiments, satellite 4000, satellite 4002, satellite 4004, or satellite 4006 of FIG. 40 comprises satellite 100 of FIG. 1. In the example shown, satellite 4000, satellite 4002, satellite 4004, or satellite 4006 communicate with each other and with other satellites using time transfer link 4008 and/or communication link 4010. In some embodiments, a time transfer occurs periodically using time transfer link 4008 (e.g., every O minutes—for example, every 1 minute, 2, 3, 4, 5, 10, 15, 20, 25, 30, 35, 40, 45, 50, 55, 60 minutes). In some embodiments, a data transfer occurs periodically using communication link 4010 (e.g., every M minutes—for example, every 1 minute, 2, 3, 4, 5, 10, 15, 20, 25, 30, 35, 40, 45, 50, 55, 60 minutes).

Figure 41:
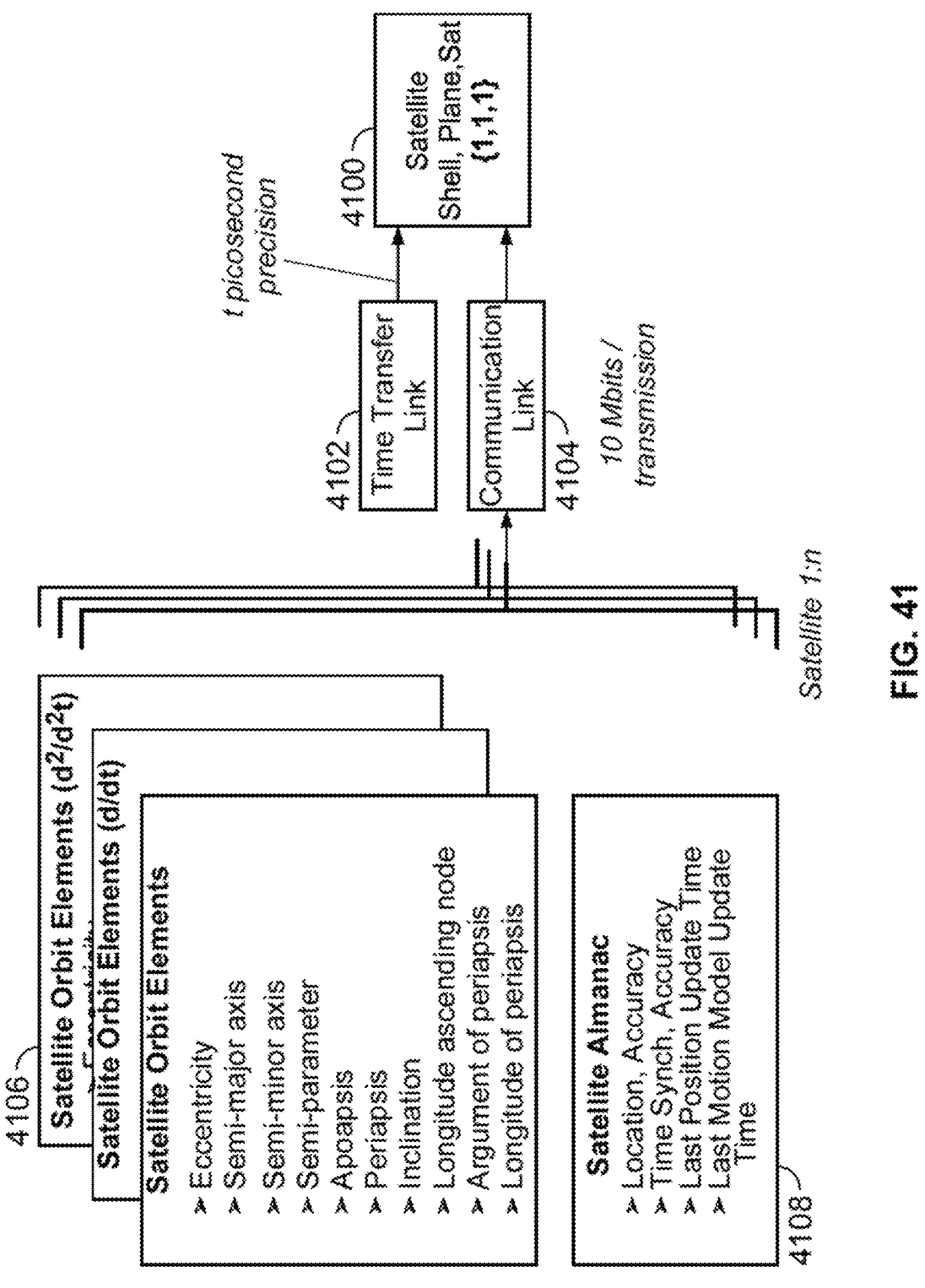
FIG. 41 is a diagram illustrating an embodiment of a satellite system.

FIG. 41 is a diagram illustrating an embodiment of a satellite system. In some embodiments, satellite 4100 of FIG. 41 comprises satellite 100 of FIG. 1. In the example shown, satellite 4100 receives time information using time transfer ink 4102 (e.g., t picosecond precision timing information derived using optical pulses and time of arrival measurements). Satellite 4100 receives data related to satellite position using communication link 4104 (e.g., 10 Mbits/transmission). In various embodiments, data received/transmitted comprises one or more of the following: a satellite almanac (e.g., a location accuracy, a time synch accuracy, a last position update time, a last motion model update time, etc.), satellite orbit elements, derivatives of satellite orbit elements, double derivatives of satellite orbit elements (e.g., eccentricity, semi-major axis, semi-minor axis, semi-parameter, apoapsis, periapsis, inclination, longitude ascending node, argument of periapsis, longitude of periapsis, etc.), or any other appropriate satellite orbit elements.

Figure 42:
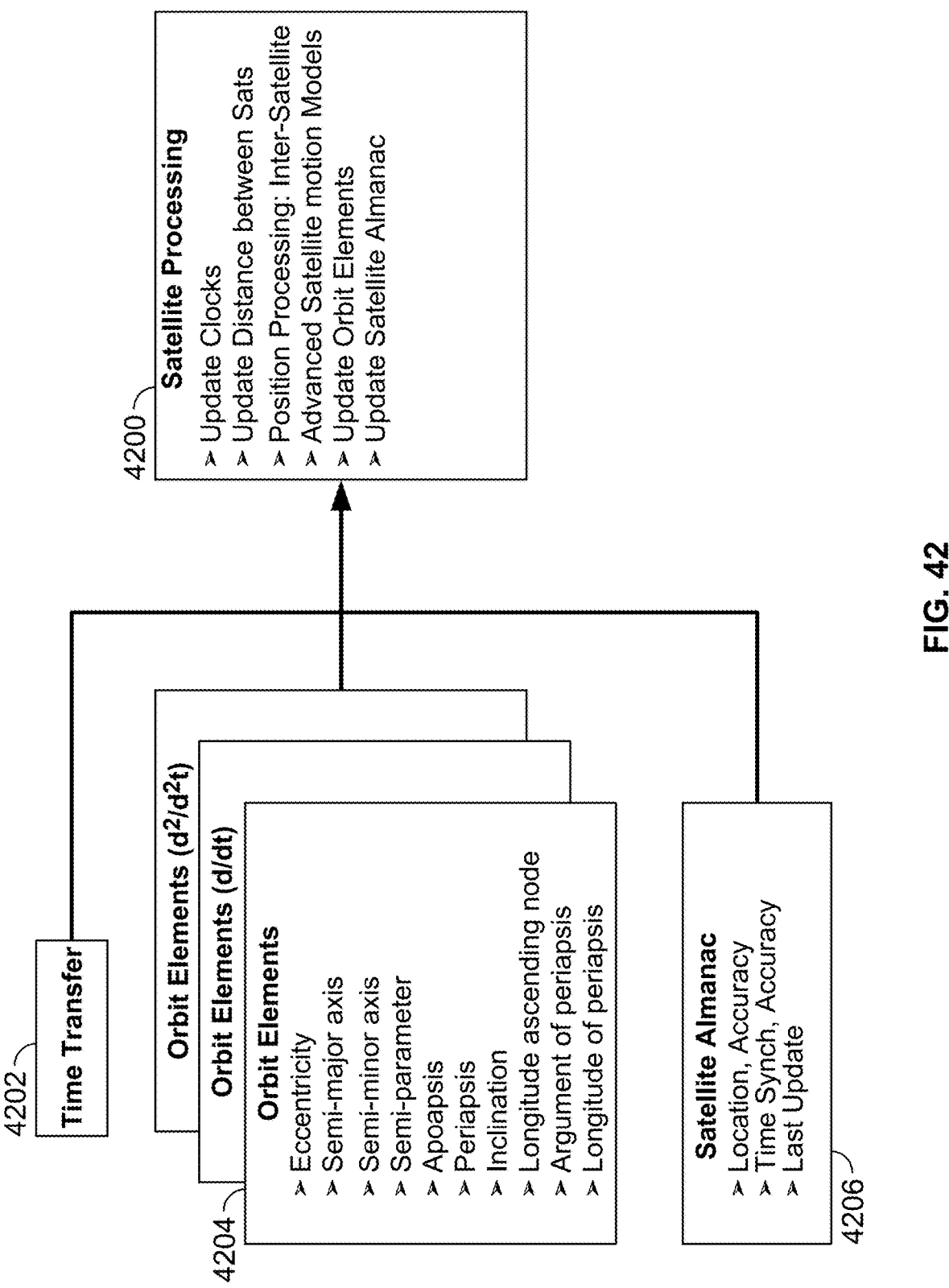
FIG. 42 is a diagram illustrating an embodiment of a satellite system.

FIG. 42 is a diagram illustrating an embodiment of a satellite system. In some embodiments, satellite processing 4200 comprises processing a satellite (e.g., satellite 100 of FIG. 1) performs upon receiving data. In the example shown, satellite processing 4200 receives data (e.g., orbit elements, derivatives of orbit elements, and double derivatives of orbit elements 4204, satellite almanac 4206, etc.) related to satellite position using communication link 4104 (e.g., 10 Mbits/transmission). In various embodiments, data received/transmitted comprises one or more of the following: a satellite almanac (e.g., a location accuracy, a time synch accuracy, a last position update time, a last motion model update time, etc.), satellite orbit elements, derivatives of satellite orbit elements, double derivatives of satellite orbit elements (e.g., eccentricity, semi-major axis, semi-minor axis, semi-parameter, apoapsis, periapsis, inclination, longitude ascending node, argument of periapsis, longitude of periapsis, etc.), or any other appropriate satellite orbit elements. Satellite processing 4200 receives timing information from time transfer 4202. Satellite processing 4200 determines one or more of the following: an update for clocks, an update for a distance between satellites, intersatellite distances/positions, advanced satellite motion models, an update for orbit elements, an update for a satellite almanac, or any other appropriate processing.

Figure 43:
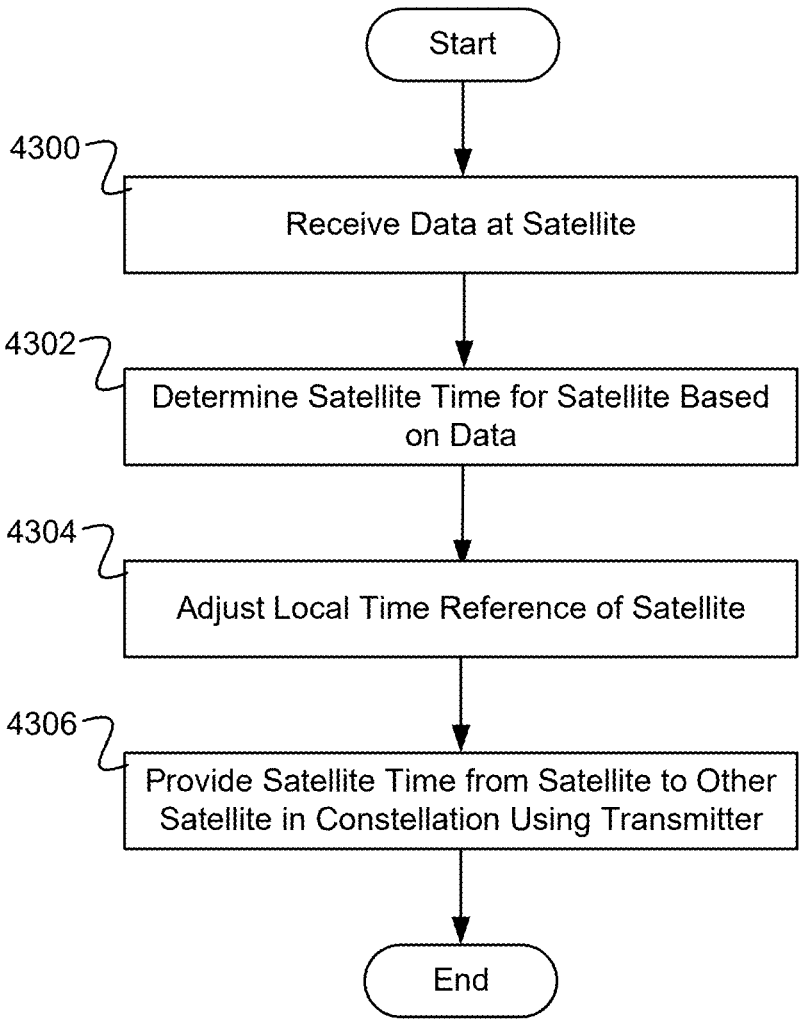
FIG. 43 is a flow diagram illustrating an embodiment of a process for a satellite system.

FIG. 43 is a flow diagram illustrating an embodiment of a process for a satellite system. In some embodiments, a processor of a satellite or terminal (e.g., a processor of baseband unit 1720 of FIG. 17, baseband subsystem 1808 of FIG. 18, baseband subsystem 1922 of FIG. 19, etc.) execute the process or a portion of the process of FIG. 43. In the example shown, in 4300 data is received at satellite. For example, timing information and/or location information is received by a satellite from a ground control station. In 4302, satellite time is determined for the satellite based on the data. For example, timing information comprises time of arrival information and/or time of day information that is provided from a ground station to a satellite. In 4304, a local time reference of the satellite is adjusted. For example, the clock or local time is adjusted based at least in part on the determined satellite time. In 4306, satellite time is provided from the satellite to other satellite(s) in the constellation using a transmitter. For example, the time and/or the location of the satellite is provided to another satellite using a transmitter (e.g., an optical transmitter).

Figure 44:
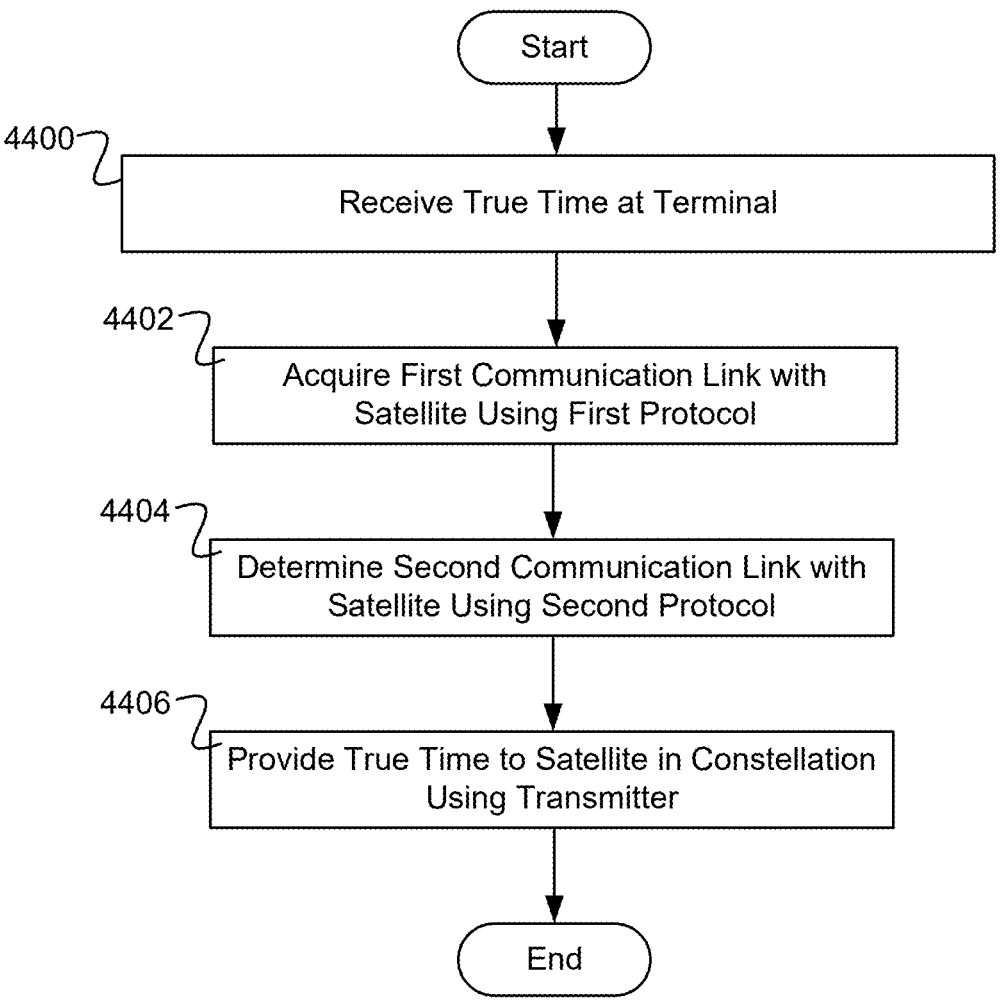
FIG. 44 is a flow diagram illustrating an embodiment of a process for a satellite system.

FIG. 44 is a flow diagram illustrating an embodiment of a process for a satellite system. In some embodiments, a processor of a satellite or terminal (e.g., a processor of baseband unit 1720 of FIG. 17, baseband subsystem 1808 of FIG. 18, baseband subsystem 1922 of FIG. 19A, baseband subsystem 1972 of FIG. 19A, etc.) execute the process or a portion of the process of FIG. 44. The example shown, in 4400 true time is received at a terminal. For example, true time is received from a GPS system, an internet system, a time reference system, or any other appropriate system. In 4402, a first communication link is acquired with a satellite using a first protocol. For example, an introduction or first protocol is used to establish communication between the ground terminal and the satellite. In 4404, a second communication link is determined with the satellite using a second protocol. For example, a second protocol is used for communication using a selected user group. In 4406, true time is provided to the satellite in the constellation using a transmitter. For example, the satellite propagates the timing information to other satellites.

A communication satellite system is disclosed. The system comprises a transmitter, a receiver, and a processor. The processor is configured to provide a LDR-PNT signal using the transmitter; receive a network entry request using the receiver; and provide acknowledgement of network entry for communication.

A communication satellite system is disclosed. The system comprises a receiver, a transmitter, and a processor. The processor is configured to receive a LDR-PNT signal using the receiver; provide a network entry request using the transmitter; and receive acknowledgement of network entry for communication.

In some embodiments, the communication system comprises a high data rate (HDR) communication service and a low data rate (LDR) communication service. The HDR communication service and LDR communication service are controlled by algorithms using data shared between the two services. The LDR communication service provides the HDR communication service time synchronization, terrestrial node location, beam angles, link start times, and initial link quality. The HDR communication service provides the LDR communication service the time-of-link release, time-of-link loss, and quality of link statistics.

In some embodiments, the HDR communication service uses the information to determine the initial transmission parameters such as modulation, transmit power, and bandwidth. The fast control loop of the HDR communication service updates the transmission parameters using control plane messages within the HDR messages.

In some embodiments, the system incorporates a "split stack" configuration in which latency tolerant control plane features such as network entry, re-establishment, and time synchronization are provided using a separate physical layer (e.g., a separate transceiver using a separate frequency block and modulation). Specifically, the HDR communication service and the LDR communication service each have their own antenna, transceiver (e.g., with separate filters, amplifiers, etc.), and modulation decoder.

In some embodiments, due to the physical attributes of scalable LEO or MEO satellite systems for communications (e.g., a satellite system that employs multiple transmit and receive beams and has round-trip transmission times of greater than 5 ms) that link control includes both fast loops (e.g., large data streams) and slower loops (e.g., network entry and beam selection). Thus, a system that purposefully demarks these functions provides a new mechanism for efficient, scaleable, enterprise-level satellite communications.

In some embodiments, the HDR communication service provides power-per-bit and spectrally efficient links (e.g., links using a selectable set of bandwidths—for example, one of a plurality of selectable bandwidths that is greater than 20 MHz and less than 2000 MHz of bandwidth) with selectable set of data rates (e.g., one of a plurality of selectable data rates that is greater than 20 Mbps and less than 20 Gbps). In various embodiments, the HDR communication service uses time-division-multiple-access (TDMA) and/or spatial-division-multiple-access (SDMA) modulation communication methods. In some embodiments, the HDR communication service includes latency intolerant in-band control plane data (e.g., time-slot and frequency sub-block reservations, modulation, power control, etc.).

In some embodiments, the LDR communication service provides spatially efficient but spectrally inefficient links (e.g., using links with selectable bandwidths that are greater than 100 MHz and less than 2000 MHz of bandwidth) with selectable data rates (e.g., a link with selectable data rate that are greater than 1 kbps and less than 10 Mbps). In various embodiments, the LDR communication service uses code-division-multiple-access (CDMA) and/or carrier-sense-multiple-access (CSMA). In some embodiments, the LDR communication service includes latency tolerant control plane data (e.g., time and location synchronization, beam availability, processing gain, encryption keys, etc.).

In some embodiments, the LDR communication service provides PNT services. In some embodiments, the LDR-PNT is a communication service (e.g., a broadcast service, a multicast service, a unicast in formulation service, etc.) in which data is encoded in both a communication message (e.g., a satellite almanac) and a waveform (e.g., a transmission time and/or a range). In some embodiments, the LDR-PNT communication service is enabled when a density of the satellite constellation in a specific geography or the motion constraints of the terrestrial receiver allows for the computation of unambiguous time and position.

In some embodiments, the LDR communication service sends and receives low data-rate traffic unrelated to HDR communication service controls or PNT services, but that leverage the very large field of regard of the satellite LDR antenna aperture, such as Internet-of-things (IoT) messages directed to a single or group of terminals. In some embodiments, the LDR communication service uses a common or different spreading code to isolate communications groups from each other. In some embodiments, LDR terminals are able to reply to messages using the LDR uplink apertures— for example, sending a reply to messages that acknowledge receipt, provide data, etc.

In some embodiments, the system uses LDR satellite to earth communication and LDR earth to satellite communication. In some embodiments, the system uses LDR satellite to earth communication and HDR earth to satellite communication. In some embodiments, the system uses HDR satellite to earth communication and LDR earth to satellite communication. In some embodiments, the system uses HDR satellite to earth communication and HDR earth to satellite communication.

In some embodiments, the system transitions between different modes of communication on request (e.g., a transition between LDR-LDR communications to LDR-HDR, HDR-LDR, or HDR-HDR communication, a transition between LDR-HDR to LDR-LDR, HDR-LDR, or HDR-HDR, a transition between HDR-LDR to LDR-LDR, LDR- HDR, or HDR-HDR, or a transition between HDR-HDR to LDR-LDR, LDR-HDR, or HDR-LDR).

Figure 45:
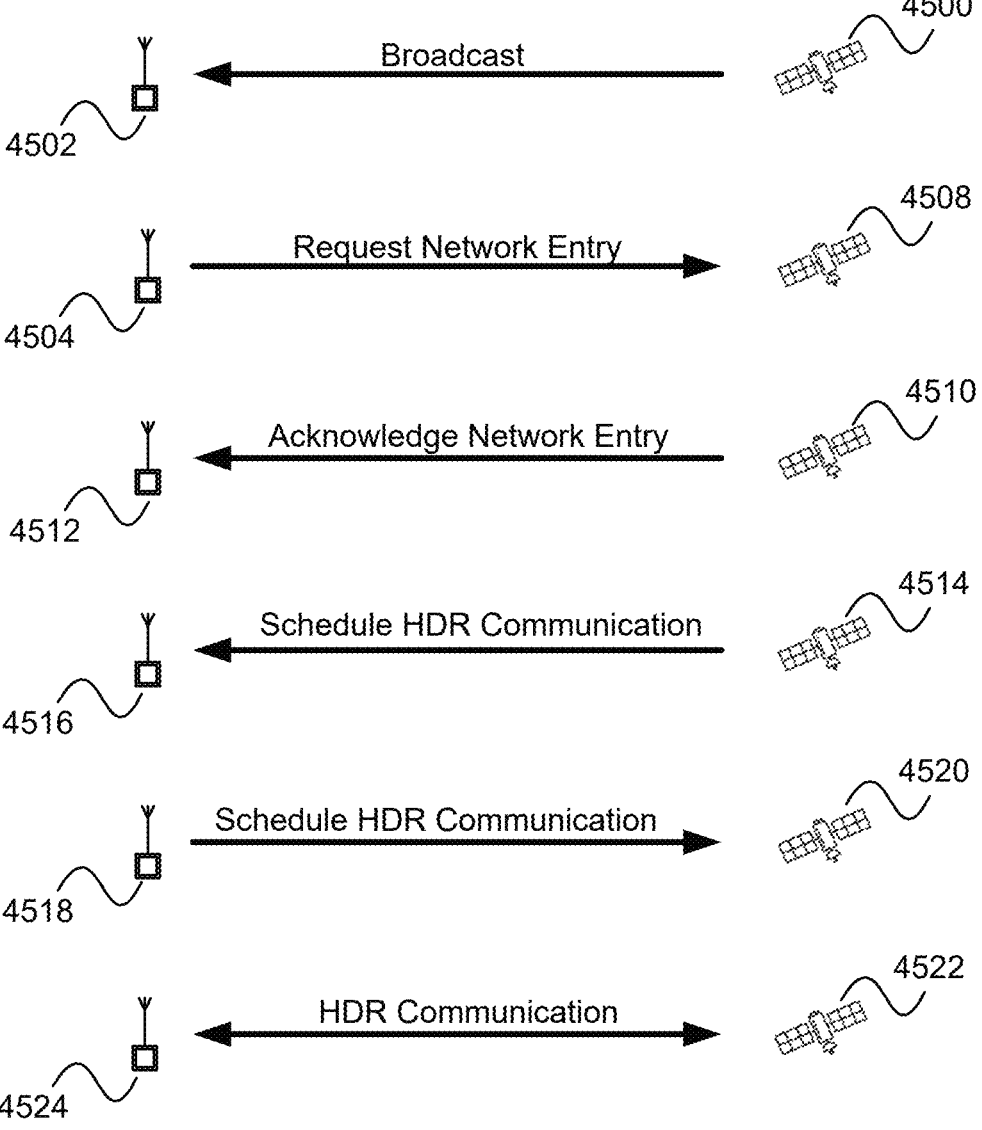
FIG. 45 is a diagram illustrating an embodiment of a communication system.

FIG. 45 is a diagram illustrating an embodiment of a communication system. In some embodiments, a terminal (e.g., terminal 4502, terminal 4504, terminal 4512, terminal 4516, terminal 4518, and terminal 4524) and a satellite (e.g., satellite 4500, satellite 4508, satellite 4510, satellite 4514, satellite 4520, and satellite 4522) comprise satellite 410 and terminal 416 of FIG. 4A, satellite 460 and terminal 466 of FIG. 4B, etc.). In the example shown:

1. A LDR-PNT signal (e.g., over a 1 GHz frequency band) is broadcast from satellite 4500 of a satellite constellation and includes in the transmitted data a relative measure of the availability of HDR assets of satellite 4500 as well as other satellite locations;

2. Terminal 4502 (e.g., a terrestrial LDR-PNT receiver node) decodes the LDR-PNT signal to determine the transmitted data and measures the transmission time from a sufficient number of satellites to self-locate and to track satellites in its Field-of-View. In some embodiments, terminal 4502 generates a RF channel estimate between terminal 4502 and the multiple satellites including satellite 4500. In some embodiments, the signal characteristics and the satellite ephemeris are used for doppler estimation and compensation for subsequent received signals.

3. Terminal 4504 (e.g., a terrestrial LDR transmitter) requests network entry by transmitting request data (e.g., a node ID, authentication information, a terminal location, etc.) to a satellite (e.g., satellite 4508), but using additional antenna gain terminal 4504 that is possible now that the location of the satellite is known (e.g., the available HDR assets that were transmitted through the prior LDR-PNT transmitted data).

4. Satellite 4510 (e.g., a satellite LDR receiver) acknowledges network entry and provides the satellite ID for HDR communications to terminal 4512 and a time to expect HDR media access control (MAC) handshake with terminal 4512.

5. Satellite 4514 (e.g., a satellite HDR transmitter with software defined networking (SDN) software) schedules communications with terminal 4516 (e.g., a terrestrial terminal HDR receiver).

6. Terminal 4518 (e.g., a terrestrial terminal HDR transmitter) schedules communications with satellite 4520 (e.g., a satellite HDR receiver). In some embodiments, the signal characteristics and the satellite ephemeris are used for doppler estimation and compensation.

7. Terminal 4524 sets a high gain receive antenna aperture directed at satellite 4522 (e.g., the scheduled HDR satellite in communication with the HDR terminal), and satellite 4522 sets a high gain antenna aperture beam directed at terminal 4524 at the scheduled time. A HDR synchronization protocol then executes to set up high data rate communications between terminal 4524 and satellite 4522, and network entry is complete.

Figure 46:
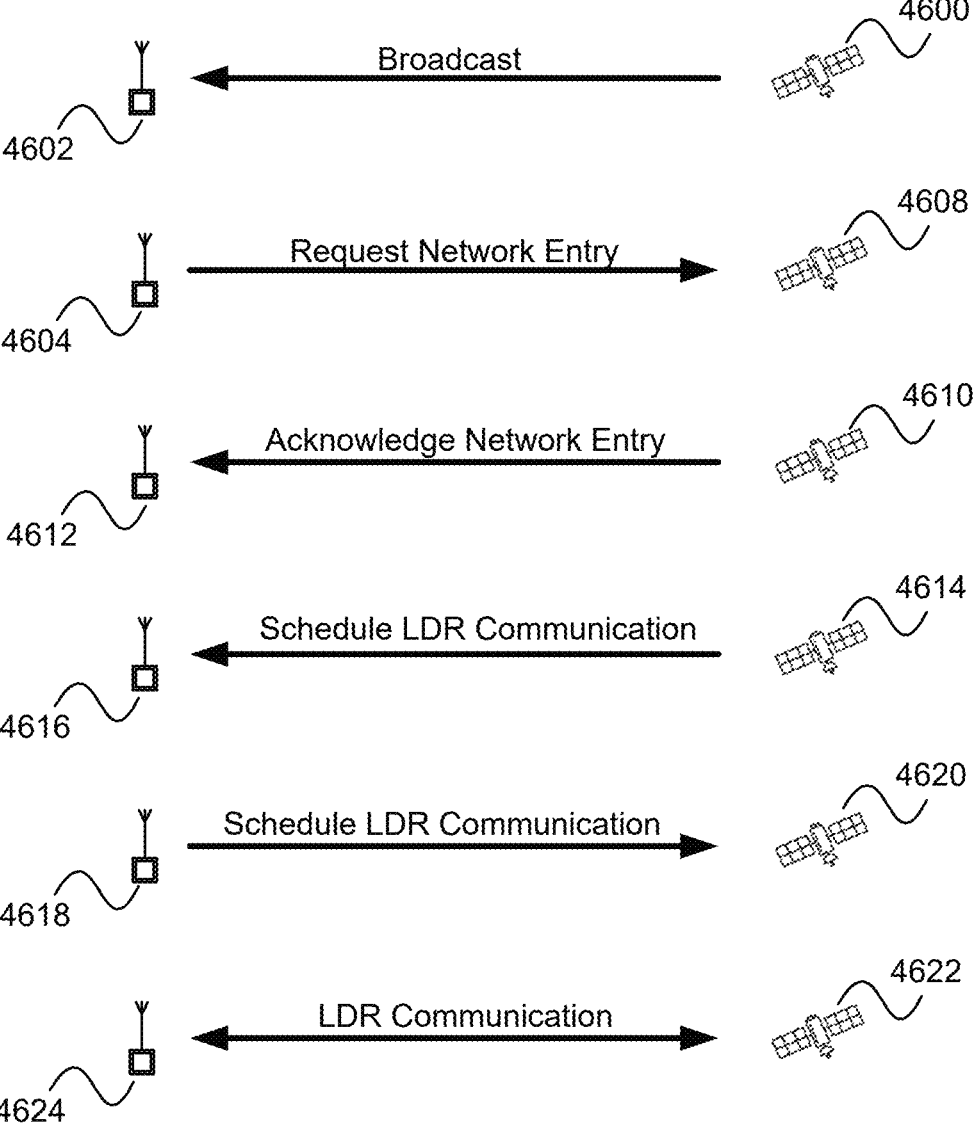
FIG. 46 is a diagram illustrating an embodiment of a communication system.

FIG. 46 is a diagram illustrating an embodiment of a communication system. In some embodiments, a terminal (e.g., terminal 4602, terminal 4604, terminal 4612, terminal 4616, terminal 4618, and terminal 4624) and a satellite (e.g., satellite 4600, satellite 4608, satellite 4610, satellite 4614, satellite 4620, and satellite 4622) comprise satellite 410 and terminal 416 of FIG. 4A, satellite 460 and terminal 466 of FIG. 4B, etc.). In the example shown:

1. A LDR-PNT signal (e.g., over a 1 GHz frequency band) is broadcast from satellite 4600 of a satellite constellation and includes in the transmitted data a relative measure of the availability of LDR assets of satellite 4600 as well as other satellite locations;

2. Terminal 4602 (e.g., a terrestrial LDR-PNT receiver node) decodes the LDR-PNT signal to determine the transmitted data and measures the transmission time from a sufficient number of satellites to self-locate and to track satellites in its Field-of-View. In some embodiments, terminal 4602 generates a RF channel estimate between terminal 4602 and the multiple satellites including satellite 4600. In some embodiments, the signal characteristics and the satellite ephemeris are used for doppler estimation and compensation for subsequent received signals.

3. Terminal 4604 (e.g., a terrestrial LDR transmitter) requests network entry by transmitting request data (e.g., a node ID, authentication information, a terminal location, etc.) to a satellite (e.g., satellite 4608), but using additional antenna gain terminal 4604 that is possible now that the location of the satellite is known (e.g., the available LDR assets that were transmitted through the prior LDR-PNT transmitted data).

4. Satellite 4610 (e.g., a satellite LDR receiver) acknowledges network entry and provides the satellite ID for HDR communications to terminal 4612 and a time to expect LDR media access control (MAC) handshake with terminal 4612.

5. Satellite 4614 (e.g., a satellite LDR transmitter with software defined networking (SDN) software) schedules communications with terminal 4616 (e.g., a terrestrial terminal LDR receiver).

6. Terminal 4618 (e.g., a terrestrial terminal LDR transmitter) schedules communications with satellite 4620 (e.g., a satellite LDR receiver). In some embodiments, the signal characteristics and the satellite ephemeris are used for doppler estimation and compensation.

7. Terminal 4624 sets a high gain receive antenna aperture directed at satellite 4622 (e.g., the scheduled LDR satellite in communication with the LDR terminal), and satellite 4622 sets a high gain antenna aperture beam directed at terminal 4624 at the scheduled time. A LDR synchronization protocol then executes to set up low data rate communications between terminal 4624 and satellite 4622, and network entry is complete.

Figure 47A:
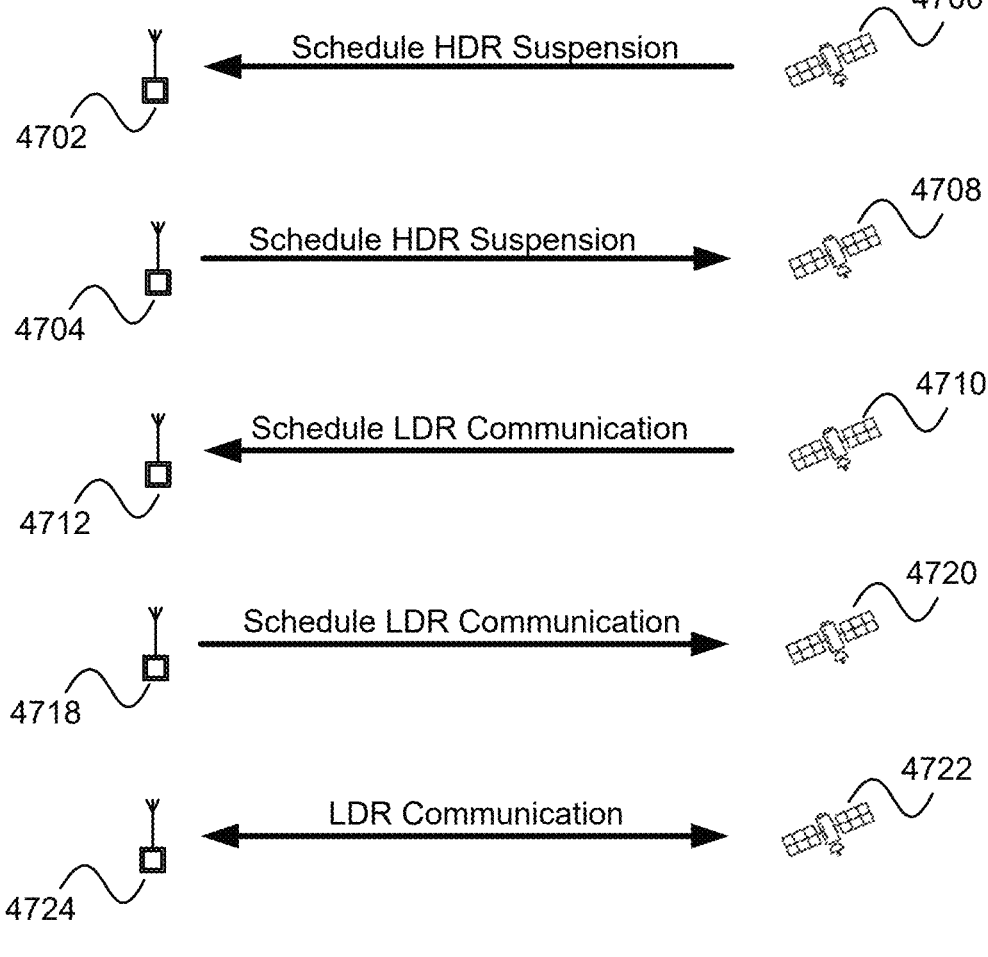
FIG. 47A is a diagram illustrating an embodiment of a communication system.

FIG. 47A is a diagram illustrating an embodiment of a communication system. In some embodiments, a terminal (e.g., terminal 4702, terminal 4704, terminal 4712, terminal 4718, and terminal 4724) and a satellite (e.g., satellite 4700, satellite 4708, satellite 4710, satellite 4720, and satellite 4722) comprise satellite 410 and terminal 416 of FIG. 4A, satellite 460 and terminal 466 of FIG. 4B, etc.). In the example shown:

1. In HDR communication mode, satellite 4700 schedules HDR communication mode suspension with terminal 4702.

2. In HDR communication mode, terminal 4704 schedules HDR communication mode suspension with satellite 4708.

3. In LDR communication mode, satellite 4710 schedules LDR communication mode with terminal 4712.

4. In LDR communication mode, terminal 4718 schedules LDR communication mode with satellite 4720.

5. A LDR synchronization protocol then executes to set up low data rate communications between terminal 4724 and satellite 4722.

Figure 47B:
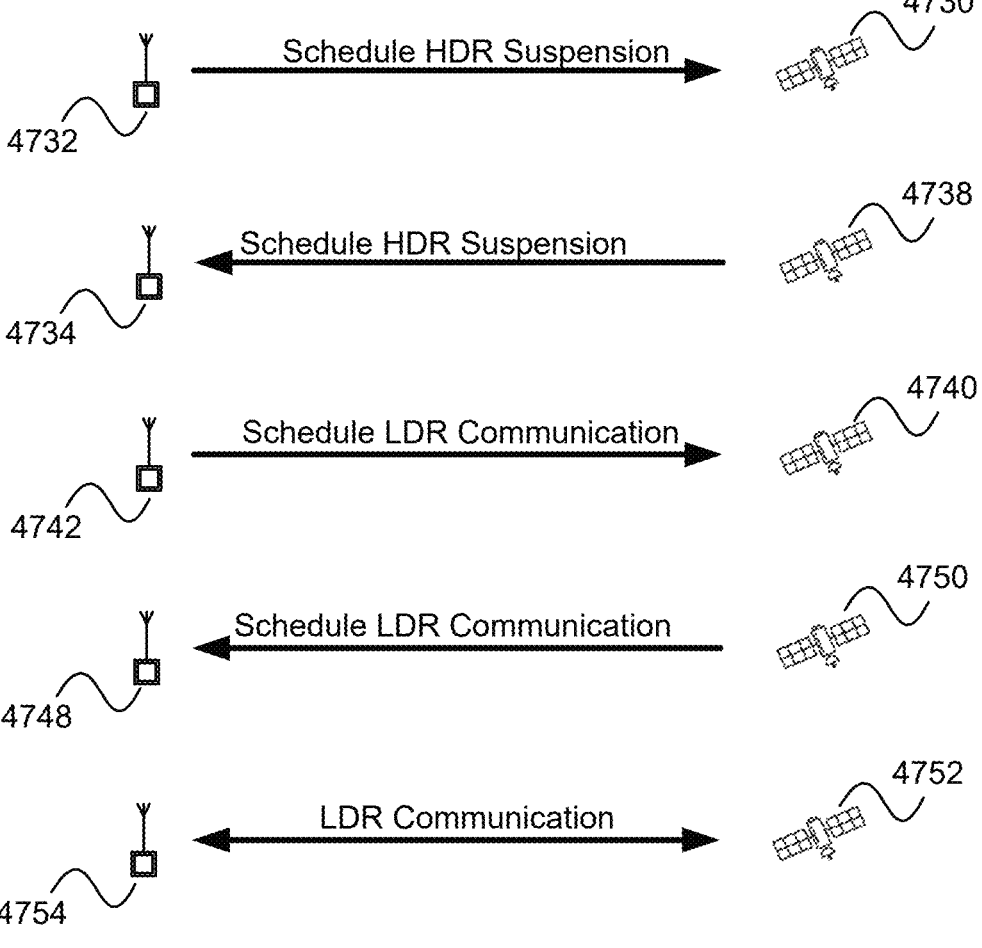
FIG. 47B is a diagram illustrating an embodiment of a communication system.

FIG. 47B is a diagram illustrating an embodiment of a communication system.

In some embodiments, a terminal (e.g., terminal 4732, terminal 4734, terminal 4742, terminal 4748, and terminal 4754) and a satellite (e.g., satellite 4730, satellite 4738, satellite 4740, satellite 4750, and satellite 4752) comprise satellite 410 and terminal 416 of FIG. 4A, satellite 460 and terminal 466 of FIG. 4B, etc.). In the example shown:

1. In HDR communication mode, terminal 4732 schedules HDR communication mode suspension with satellite 4730.

2. In HDR communication mode, satellite 4738 schedules HDR communication mode suspension with terminal 4734.

3. In LDR communication mode, terminal 4742 schedules LDR communication mode with satellite 4740.

4. In LDR communication mode, satellite 4750 schedules LDR communication mode with terminal 4748.

5. A LDR synchronization protocol then executes to set up low data rate communications between terminal 4754 and satellite 4752.

Figure 48:
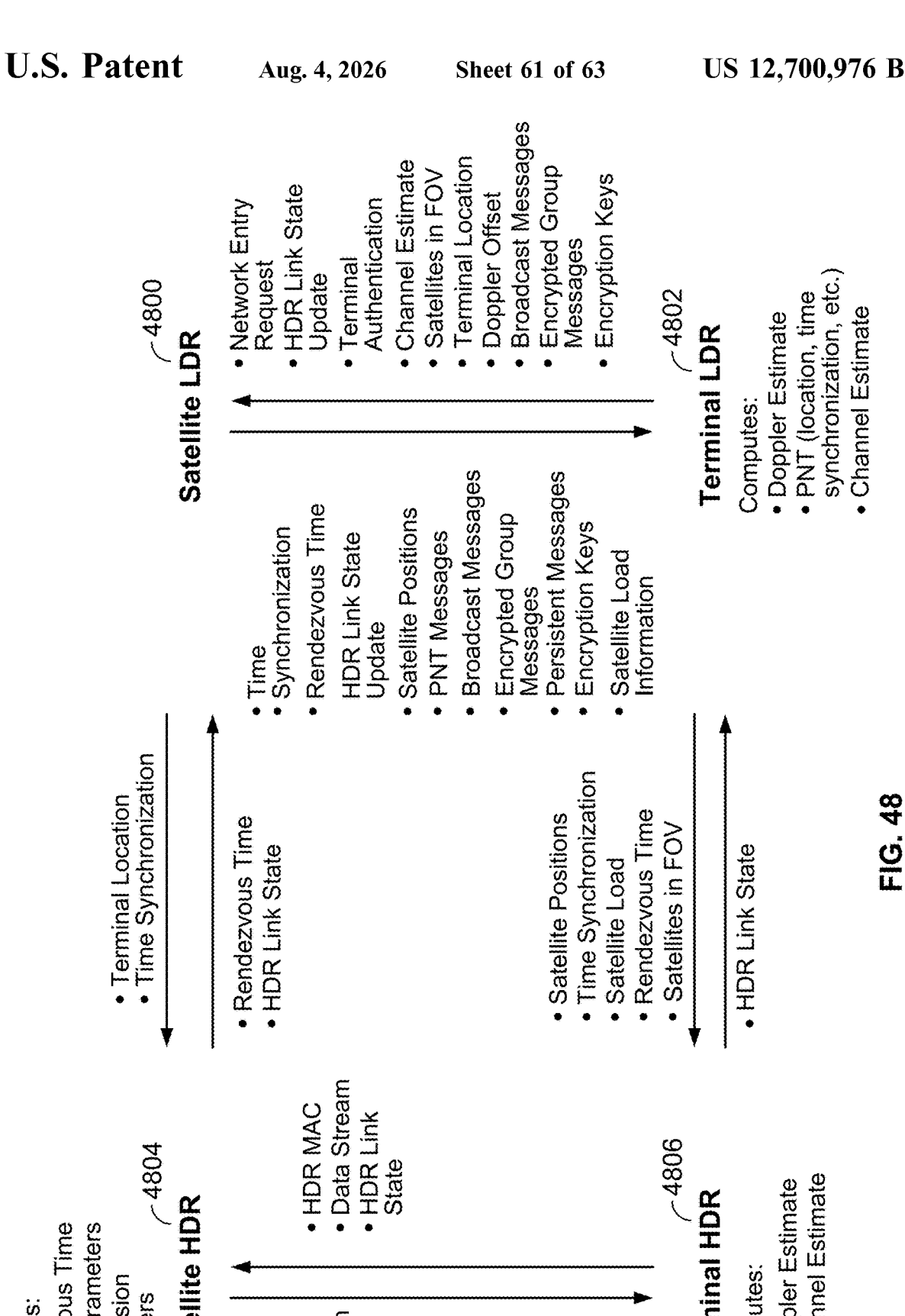
FIG. 48 is a diagram illustrating an embodiment of a system for communication.

FIG. 48 is a diagram illustrating an embodiment of a system for communication. In some embodiments, satellite LDR 4800 and satellite HDR 4804 are executed using Payload Baseband Unit 1720, LDR steerable multi-beam TX subsystem(s) 1742, LDR steerable multi-beam RX subsystem(s) 1738, HDR steerable multi-beam TX subsystem(s) 1730, and HDR steerable multi-beam RX subsystem(s) 1728 of FIG. 17. In some embodiments, terminal LDR 4802 and terminal HDR 4806 are executed using Baseband subsystem 1808, LDR multi-beam TX subsystem(s) 1818, LDR multi-beam RX subsystem(s) 1814, HDR steerable multi-beam TX subsystem(s) 1810, and HDR steerable multi-beam RX subsystem(s) 1812 of FIG. 18. In the example shown, the HDR communication service and the LDR communication service are controlled by algorithms using data shared between the two services and their associated control planes. The data exchanged between a satellite and a terminal for the LDR communication service and HDR communication service and computations of the LDR and HDR services are as follows:

Satellite LDR 4800 to terminal LDR 4802 data flow: satellite LDR 4800 provides to terminal 4802 control data including time synchronization, rendezvous time (for HDR link), and HDR link state update. It also provides service messages including satellite positions (e.g., an almanac), PNT messages, broadcast messages, encrypted group messages, persistent messages, and encryption keys. It further provides satellite load information.

Terminal LDR 4802 computation: terminal LDR 4802 computes a doppler estimate (e.g., between a satellite and a terminal), PNT (e.g., location, time synch, etc.), and a channel estimate.

Terminal LDR 4802 to satellite LDR 4800 data flow: terminal LDR 4802 provides control data such as a network entry request, an HDR link state update, a terminal authentication, a channel estimate, satellites in field of view (FOV), a terminal location, and a doppler offset. Terminal LDR 4802 also provides service messages including broadcast messages, encrypted group messages, and encryption keys.

Satellite LDR 4800 to Satellite HDR 4804 data flow: satellite LDR 4800 provides terminal location and time synchronization.

Satellite HDR 4804 to Satellite LDR 4800 data flow: satellite HDR 4804 provides rendezvous time and HDR Link State (e.g., Up/Break/Pause).

Satellite HDR 4804 computation: satellite HDR 4804 computes a rendezvous time, beam parameters (e.g., for pointing antenna arrays), transmission parameters (e.g., modulation parameters, transmit power, bandwidth, etc.)

Satellite HDR 4804 to Terminal HDR 4806 data flow: Satellite HDR 4804 provides control data such as HDR link state (e.g. Up/Pause/Break) and HDR MAC information (e.g., beam parameters, transmission parameters, etc.). Satellite HDR 4804 also provides service messages including the HDR data stream.

Terminal HDR 4806 to Satellite HDR 4804 data flow: Terminal HDR 4806 provides control data such as HDR link state (e.g. Up/Pause/Break) and HDR MAC information (e.g., beam parameters, transmission parameters, etc.). Terminal HDR 4806 also provides service messages including the HDR data stream.

Terminal HDR 4806 computation: terminal HDR 4806 computes a channel estimate and a doppler estimate between the terminal node and the satellite.

Terminal HDR 4806 to Terminal LDR 4802 data flow: terminal HDR 4806 provides HDR link state information.

Terminal LDR 4802 to Terminal HDR 4806 data flow: terminal LDR 4802 provides satellite positions (e.g., an almanac), time synchronization, satellite load, rendezvous time, and satellites in FOV.

Figure 49:
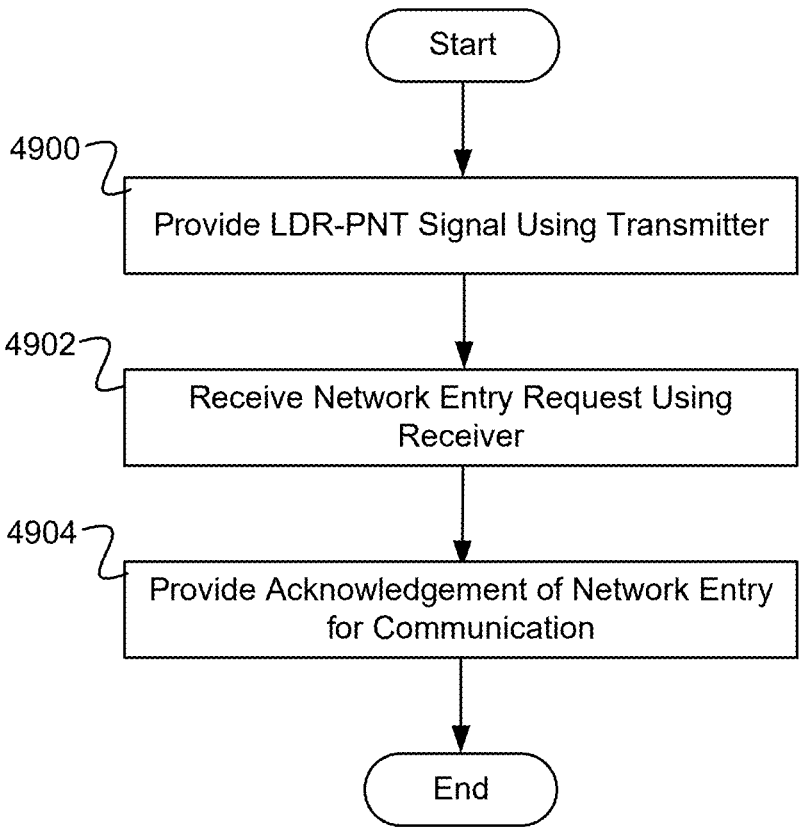
FIG. 49 is a flow diagram illustrating an embodiment of a process for a satellite system.

FIG. 49 is a flow diagram illustrating an embodiment of a process for a satellite system. In some embodiments, the process of FIG. 49 is executed by a satellite of the satellite system (e.g., satellite 100 of FIG. 1, satellite 410 of FIG. 4A, satellite 430 of FIG. 4B, etc.). In the example shown, in 4900 a LDR-PNT signal is provided using a transmitter. For example, the satellite transmits a PNT signal using a low data rate channel. In 4902, a network entry request is received using a receiver. For example, a satellite receiver receives a request via a LDR data channel to enter the communication network. In 4904, an acknowledgement of network entry for communication is provided. For example, a satellite transmitter provides an indication to a terminal or receiver that network entry is acknowledged, and communication is enabled for the network between the terminal or receiver and the satellite constellation.

Figure 50:
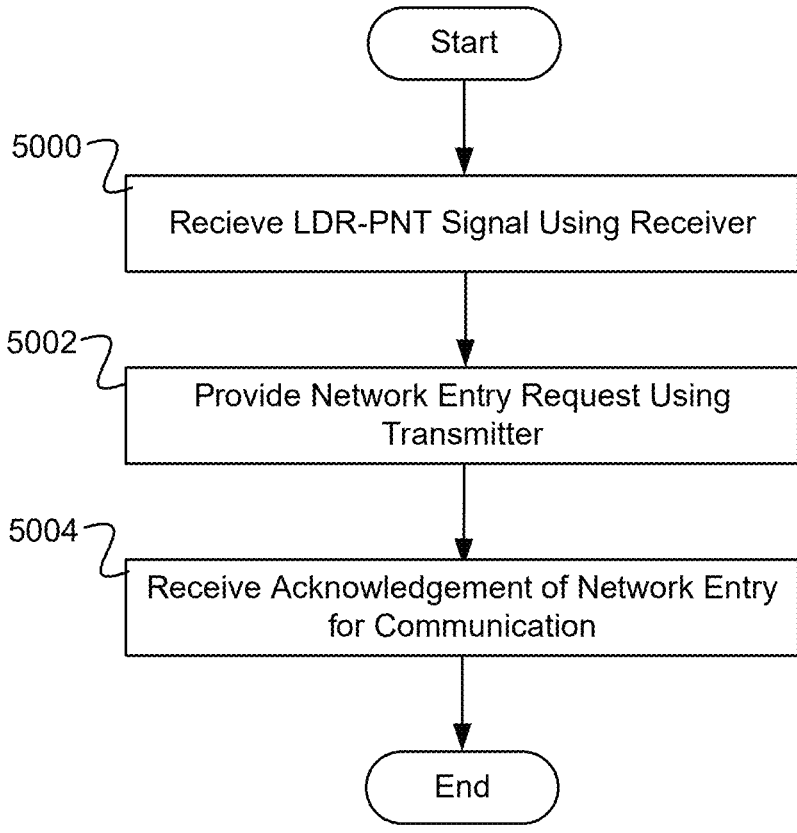
FIG. 50 is a flow diagram illustrating an embodiment of a process for a satellite system.

FIG. 50 is a flow diagram illustrating an embodiment of a process for a satellite system. In some embodiments, the process of FIG. 50 is executed by a receiver or terminal of the satellite system (e.g., terminal or receiver 416 of FIG. 4A, satellite 436 of FIG. 4B, etc.). In the example shown, in 5000 a LDR-PNT signal is received using a receiver. For example, the terminal receives a PNT signal using a low data rate channel. In 5002, a network entry request is provided using a transmitter. For example, a terminal transmitter transmits a request via a LDR data channel to enter the communication network. In 5004, an acknowledgement of network entry for communication is received. For example, a terminal receives an indication from a satellite that network entry is acknowledged, and communication is enabled for the network between the terminal or receiver and the satellite constellation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a receiver;
   a transmitter;
   a processor configured to:
      receive a LDR-PNT signal using the receiver;
      determine, based on the LDR-PNT signal, whether to provide a first network entry request or a second network entry request, wherein the first network entry request is for LDR communication and the second network entry request is for HDR communication;
      provide the first network entry request or the second network entry request using the transmitter; and
      receive acknowledgement of network entry for communication.

2. The system of claim 1, wherein the communication comprises communication using a LDR link.

3. The system of claim 1, wherein the communication comprises communication using an HDR link.

4. The system of claim 1, wherein the LDR-PNT signal includes control data.

5. The system of claim 4, wherein the control data comprises time synchronization.

6. The system of claim 4, wherein the control data comprises a rendezvous time for an HDR link.

7. The system of claim 4, wherein the control data comprises an HDR link state.

8. The system of claim 1, wherein the LDR-PNT signal includes service messages.

9. The system of claim 8, wherein the service messages include a satellite almanac.

10. The system of claim 8, wherein the service messages include broadcast messages.

11. The system of claim 8, wherein the service messages include encrypted group messages.

12. The system of claim 8, wherein the service messages include encryption keys.

13. The system of claim 1, wherein the first network entry request or the second network entry request includes a node ID of a terminal.

14. The system of claim 1, wherein the first network entry request or the second network entry request includes authentication information.

15. The system of claim 1, wherein the first network entry request or the second network entry request includes a terminal location.

16. The system of claim 1, wherein the acknowledgement of network entry comprises a satellite ID.

17. The system of claim 1, wherein the acknowledgement of network entry comprises a time to expect a LDR handshake or an HDR handshake.

18. The system of claim 1, wherein the LDR communication or the HDR communication is scheduled at a scheduled time with a satellite.

19. The system of claim 18, wherein a high gain aperture beam is directed at the satellite at the scheduled time.

20. A method, comprising:
   receiving a LDR-PNT signal using the receiver;
   determining, based on the LDR-PNT signal, whether to provide a first network entry request or a second network entry request, wherein the first network entry request is for LDR communication and the second network entry request is for HDR communication;

providing the first network entry request or the second
   network entry request using the transmitter; and
receiving acknowledgement of network entry for com-
   munication.

\* \* \* \* \*